(12) United States Patent
Morrow et al.

(10) Patent No.: US 10,226,672 B2
(45) Date of Patent: *Mar. 12, 2019

(54) LACROSSE HEAD POCKET AND RELATED METHOD OF MANUFACTURE

(71) Applicant: Warrior Sports, Inc., Warren, MI (US)

(72) Inventors: David K. Morrow, Metamora, MI (US); Bruce Huffa, Encino, CA (US); Thomas H. Burns, Royal Oak, MI (US); Richard J. Janisse, Windsor (CA); Sean J. Slater, Royal Oak, MI (US); Dale W. Kohler, Metamora, MI (US); Craig M. Herman, Pleasant Ridge, MI (US)

(73) Assignee: Warrior Sports, Inc., Warren, MI (US)

( * ) Notice: Subject to any disclaimer, the term of this patent is extended or adjusted under 35 U.S.C. 154(b) by 614 days.

This patent is subject to a terminal disclaimer.

(21) Appl. No.: 14/971,020

(22) Filed: Dec. 16, 2015

(65) Prior Publication Data

US 2016/0096094 A1    Apr. 7, 2016

Related U.S. Application Data

(63) Continuation of application No. 14/815,201, filed on Jul. 31, 2015, now Pat. No. 9,259,883.

(Continued)

(51) Int. Cl.
*B29C 65/00* (2006.01)
*A63B 59/20* (2015.01)
(Continued)

(52) U.S. Cl.
CPC .............. *A63B 59/20* (2015.10); *B29C 45/14* (2013.01); *B29C 45/14065* (2013.01);
(Continued)

(58) Field of Classification Search
CPC ....................................................... A63B 59/20
(Continued)

(56) References Cited

U.S. PATENT DOCUMENTS

| | | | |
|---|---|---|---|
| 1,017,376 A | * | 2/1912 | Brandt ................... A63B 67/22 473/507 |
| 1,411,459 A | | 4/1922 | Severin |

(Continued)

FOREIGN PATENT DOCUMENTS

| | | |
|---|---|---|
| CA | 2326206 | 5/2001 |
| CA | 2359858 | 4/2002 |

(Continued)

OTHER PUBLICATIONS

Photo of deBeer Lacrosse Head.

(Continued)

*Primary Examiner* — Matthew J Daniels
*Assistant Examiner* — Andrew D Graham
(74) *Attorney, Agent, or Firm* — Warner Norcross + Judd, LLP

(57) ABSTRACT

A lacrosse head pocket and a related method of manufacture are provided to facilitate consistent, repeatable and/or custom manufacture of lacrosse equipment. The pocket can be constructed from multiple different sections joined with one another, or can be knitted, weaved or otherwise assembled on an automated assembly machine from strands, and/or can be formed as a unitary textile material having regions/sections with different physical and/or mechanical properties. The pocket can be integrally molded within portions of a lacrosse head to eliminate manually constructed connections between the pocket and lacrosse head. The lacrosse head can be integrally molded with a lacrosse handle to provide a one-piece unitary lacrosse stick. Related methods of manufacturing also are provided.

20 Claims, 38 Drawing Sheets

Related U.S. Application Data

(60) Provisional application No. 62/034,252, filed on Aug. 7, 2014, provisional application No. 62/067,151, filed on Oct. 22, 2014, provisional application No. 62/111,837, filed on Feb. 4, 2015, provisional application No. 62/147,795, filed on Apr. 15, 2015.

(51) Int. Cl.

| | | |
|---|---|---|
| *D04B 1/22* | (2006.01) | |
| *D05B 1/02* | (2006.01) | |
| *B29C 65/02* | (2006.01) | |
| *B29C 45/14* | (2006.01) | |
| *B29C 70/68* | (2006.01) | |
| *D05B 19/12* | (2006.01) | |
| *D04B 15/78* | (2006.01) | |
| *D03D 51/00* | (2006.01) | |
| *D03D 1/00* | (2006.01) | |
| *D03D 13/00* | (2006.01) | |
| *A63B 102/14* | (2015.01) | |
| *B29L 31/52* | (2006.01) | |
| *B29C 45/76* | (2006.01) | |
| *B29K 101/00* | (2006.01) | |
| *B29K 623/00* | (2006.01) | |
| *B29K 677/00* | (2006.01) | |
| *B29C 45/00* | (2006.01) | |
| *B29C 45/16* | (2006.01) | |
| *B29K 77/00* | (2006.01) | |
| *B29L 28/00* | (2006.01) | |
| *B29K 101/12* | (2006.01) | |
| *B29C 65/18* | (2006.01) | |

(52) U.S. Cl.
CPC ........ *B29C 45/14786* (2013.01); *B29C 65/02* (2013.01); *B29C 70/688* (2013.01); *D03D 1/00* (2013.01); *D03D 13/004* (2013.01); *D03D 51/00* (2013.01); *D04B 1/22* (2013.01); *D04B 15/78* (2013.01); *D05B 1/02* (2013.01); *D05B 19/12* (2013.01); *A63B 2102/14* (2015.10); *B29C 45/0046* (2013.01); *B29C 45/14221* (2013.01); *B29C 45/14262* (2013.01); *B29C 45/14336* (2013.01); *B29C 45/1671* (2013.01); *B29C 45/76* (2013.01); *B29C 65/18* (2013.01); *B29C 66/1122* (2013.01); *B29C 66/301* (2013.01); *B29C 66/43* (2013.01); *B29C 66/729* (2013.01); *B29C 66/73921* (2013.01); *B29C 66/81427* (2013.01); *B29C 66/919* (2013.01); *B29C 66/91421* (2013.01); *B29C 2045/14147* (2013.01); *B29C 2045/14245* (2013.01); *B29K 2023/06* (2013.01); *B29K 2077/00* (2013.01); *B29K 2101/00* (2013.01); *B29K 2101/12* (2013.01); *B29K 2623/0683* (2013.01); *B29K 2677/00* (2013.01); *B29K 2713/00* (2013.01); *B29L 2028/00* (2013.01); *B29L 2031/52* (2013.01); *B29L 2031/5227* (2013.01); *B29L 2031/5245* (2013.01); *D03D 2700/265* (2013.01); *D10B 2403/033* (2013.01); *D10B 2507/00* (2013.01)

(58) Field of Classification Search
USPC ........................................................ 473/513
See application file for complete search history.

(56) References Cited

U.S. PATENT DOCUMENTS

| | | | |
|---|---|---|---|
| 2,039,138 A | | 4/1936 | Auer |
| 2,042,984 A | | 6/1936 | Fritz |
| 2,659,958 A | | 11/1953 | Johnson |
| 3,389,580 A | | 6/1968 | Bentley et al. |
| 3,702,702 A | * | 11/1972 | Hoult .................... A63B 60/06 473/513 |
| 3,726,112 A | | 4/1973 | Roque |
| 3,789,098 A | | 1/1974 | Cole et al. |
| 3,822,062 A | * | 7/1974 | Tucker .................. A63B 51/02 473/513 |
| 3,905,088 A | * | 9/1975 | Tucker .................. A63B 59/20 29/433 |
| 4,022,477 A | * | 5/1977 | Pool ...................... A63B 51/02 29/433 |
| 4,034,984 A | * | 7/1977 | Crawford ............ A63B 49/022 473/513 |
| 4,049,273 A | * | 9/1977 | Pool ...................... A63B 51/02 473/513 |
| 4,097,046 A | * | 6/1978 | Friant ................... A63B 60/00 473/513 |
| 4,153,251 A | * | 5/1979 | Pond ..................... A63B 51/02 473/513 |
| 4,185,822 A | | 1/1980 | Li |
| 4,273,331 A | | 6/1981 | Fischer |
| 4,460,178 A | | 7/1984 | Ulman |
| 4,861,042 A | | 8/1989 | Trettin |
| 4,938,480 A | * | 7/1990 | Lods ..................... A63B 51/02 473/513 |
| D318,509 S | | 7/1991 | Naumburg, Jr. |
| 5,174,580 A | * | 12/1992 | Pratt ..................... A63B 60/08 473/513 |
| 5,269,532 A | * | 12/1993 | Tucker .................. A63B 49/02 473/513 |
| 5,339,657 A | * | 8/1994 | McMurray ............ D04B 21/10 66/195 |
| 5,425,541 A | * | 6/1995 | Ambros ................ A63B 60/42 473/513 |
| 5,735,759 A | | 4/1998 | Lin et al. |
| 5,752,496 A | | 5/1998 | McPherson |
| 5,771,716 A | * | 6/1998 | Schlussel ............... D04B 21/10 66/193 |
| 5,920,970 A | | 7/1999 | Coblentz |
| 5,957,791 A | | 9/1999 | Nichols et al. |
| 6,213,901 B1 | | 4/2001 | Collinson |
| 6,318,131 B1 | * | 11/2001 | Kobata .................... D04B 1/22 66/64 |
| 6,390,232 B1 | | 5/2002 | Kirschbaum |
| 6,402,646 B1 | | 6/2002 | Wolf |
| 6,447,410 B2 | | 9/2002 | Crawford |
| 6,471,276 B1 | | 10/2002 | Brunsman et al. |
| 6,506,132 B1 | * | 1/2003 | Brine, III ............ A63B 49/038 473/513 |
| 6,520,875 B1 | * | 2/2003 | Crawford ............... A63B 51/02 473/513 |
| 6,533,686 B2 | | 3/2003 | LeMire |
| 6,540,950 B1 | | 4/2003 | Coffield |
| 6,572,498 B2 | | 6/2003 | Nevers |
| 6,626,774 B2 | | 9/2003 | Sorbie |
| 6,641,492 B2 | | 11/2003 | LeMire |
| 6,852,047 B2 | | 2/2005 | Tucker, Sr. |
| 6,916,259 B2 | | 7/2005 | Kohler et al. |
| 6,966,854 B1 | * | 11/2005 | Gait ....................... A63B 51/01 473/513 |
| 7,022,035 B2 | | 4/2006 | Morrow et al. |
| 7,070,523 B1 | | 7/2006 | Gait |
| 7,131,919 B2 | | 11/2006 | Kohler et al. |
| 7,192,369 B2 | | 3/2007 | Morrow |
| 7,211,009 B2 | | 5/2007 | Samaras et al. |
| 7,238,128 B1 | | 7/2007 | Filice et al. |
| 7,278,936 B2 | * | 10/2007 | Tucker, Jr. ............. A63B 59/20 473/513 |
| 7,331,884 B2 | | 2/2008 | Samaras et al. |
| RE40,182 E | | 3/2008 | Morrow |

(56) References Cited

U.S. PATENT DOCUMENTS

| | | | |
|---|---|---|---|
| 7,338,396 B2 | 3/2008 | Gait | |
| 7,347,011 B2 | 3/2008 | Dua et al. | |
| 7,364,519 B1 | 4/2008 | Gait | |
| 7,390,275 B1 | 6/2008 | Gait | |
| 7,458,908 B1 | 12/2008 | Gait | |
| 7,503,859 B1* | 3/2009 | Gait | A63B 51/12 473/513 |
| 7,507,171 B2 | 3/2009 | Gait | |
| 7,524,253 B1 | 4/2009 | Gait | |
| 7,727,092 B2 | 6/2010 | Lignelli et al. | |
| 7,736,251 B2 | 6/2010 | Rogers et al. | |
| 7,749,112 B2 | 7/2010 | Hayden et al. | |
| 7,749,113 B2 | 7/2010 | Morrow et al. | |
| 7,833,116 B2 | 11/2010 | Tucker, Sr. et al. | |
| 7,854,670 B2 | 12/2010 | Gait | |
| 7,963,867 B1* | 6/2011 | Gait | A63B 59/20 473/513 |
| 7,979,918 B2 | 7/2011 | Sandusky et al. | |
| 8,083,978 B1 | 12/2011 | Fox et al. | |
| 8,235,846 B2 | 8/2012 | Winningham et al. | |
| 8,282,512 B1 | 10/2012 | Winningham et al. | |
| 8,371,966 B2 | 2/2013 | Winningham et al. | |
| 8,839,532 B2 | 9/2014 | Huffa et al. | |
| 9,283,699 B2* | 3/2016 | Morrow | D05B 1/02 |
| 9,492,723 B1* | 11/2016 | McCampbell | A63B 59/02 |
| 2001/0044347 A1* | 11/2001 | Crawford | A63B 51/02 473/513 |
| 2002/0107094 A1 | 8/2002 | LeMire | |
| 2002/0160865 A1* | 10/2002 | Brine, III | A63B 60/00 473/513 |
| 2002/0173389 A1* | 11/2002 | Morrow | A63B 51/02 473/513 |
| 2003/0100388 A1 | 5/2003 | LeMire | |
| 2003/0181270 A1* | 9/2003 | Morrow | A63B 51/02 473/513 |
| 2004/0029657 A1 | 2/2004 | Scaramuzzino | |
| 2005/0010142 A1 | 1/2005 | Kim | |
| 2006/0046876 A1 | 3/2006 | Tucker, Jr. | |
| 2006/0194655 A1* | 8/2006 | Tucker, Sr. | A63B 59/20 473/513 |
| 2006/0258488 A1 | 11/2006 | Lamson et al. | |
| 2007/0010357 A1* | 1/2007 | Matthew | A63B 59/20 473/513 |
| 2007/0054760 A1* | 3/2007 | Gait | A63B 59/20 473/513 |
| 2007/0191153 A1* | 8/2007 | Gait | A63B 51/12 473/513 |
| 2008/0026883 A1* | 1/2008 | MacNeil | A63B 59/20 473/513 |
| 2008/0127615 A1 | 6/2008 | Gait | |
| 2008/0146385 A1 | 6/2008 | Lundberg | |
| 2008/0146387 A1* | 6/2008 | Gait | A63B 59/20 473/513 |
| 2008/0214336 A1* | 9/2008 | Lamson | A63B 59/20 473/513 |
| 2008/0268987 A1* | 10/2008 | Lignelli | A63B 59/20 473/513 |
| 2010/0075785 A1* | 3/2010 | Winningham | A63B 59/20 473/513 |
| 2011/0160007 A1* | 6/2011 | Winningham | A63B 59/20 473/513 |
| 2012/0122617 A1* | 5/2012 | Szurley | A63B 59/20 473/513 |
| 2012/0165140 A1* | 6/2012 | Bound | A63B 60/00 473/513 |
| 2012/0205268 A1* | 8/2012 | Kreger | A63B 71/0045 206/315.1 |
| 2012/0246973 A1 | 10/2012 | Dua | |
| 2012/0255670 A1 | 10/2012 | Winningham et al. | |
| 2012/0318026 A1 | 12/2012 | Dua et al. | |
| 2013/0296082 A1* | 11/2013 | Gonzalez | A63B 60/00 473/513 |
| 2014/0103566 A1 | 4/2014 | Janisse | |
| 2014/0106910 A1* | 4/2014 | Burns | B29C 70/688 473/513 |
| 2014/0106911 A1 | 4/2014 | Burns | |
| 2014/0173934 A1 | 6/2014 | Bell | |
| 2014/0186090 A1 | 7/2014 | Gozzo | |
| 2014/0221137 A1 | 8/2014 | Krysiak et al. | |
| 2014/0302951 A1* | 10/2014 | White | A63B 59/20 473/513 |
| 2014/0349789 A1* | 11/2014 | Szurley | B32B 37/185 473/513 |
| 2015/0018136 A1* | 1/2015 | Goldstein | B29C 67/0059 473/513 |
| 2015/0059154 A1 | 3/2015 | Miceli et al. | |
| 2016/0024693 A1* | 1/2016 | Henry | D02G 3/443 66/202 |
| 2016/0101333 A1 | 4/2016 | McCampbell | |

FOREIGN PATENT DOCUMENTS

| | | |
|---|---|---|
| CN | 104117674 | 10/2014 |
| CN | 104274912 | 1/2015 |
| CN | 104324493 | 2/2015 |
| GB | 2274067 A | 7/1994 |
| JP | H02-116390 | 5/1990 |
| JP | H07-39612 | 2/1995 |

OTHER PUBLICATIONS

Webpage download, e-lacrosse, 2003, www.e-lacrosse.com/stech67.php, 10 pages.

Webpage download, Dupont2013, 2013, www.dupont.com/products-and-services/fabrics-fibers-nonwovens/fibers/brands/kevlar.html/, 5 pages.

U.S. Appl. No. 62/061,631, filed Oct. 8, 2014 by Jake McCampbell.

US Lacrosse, 2018 Stick Rules, available at https://www.uslacrosse.org/sites/default/files/public/documents/rules/2018-ncaa-stick-rules.pdf (Year: 2018).

* cited by examiner

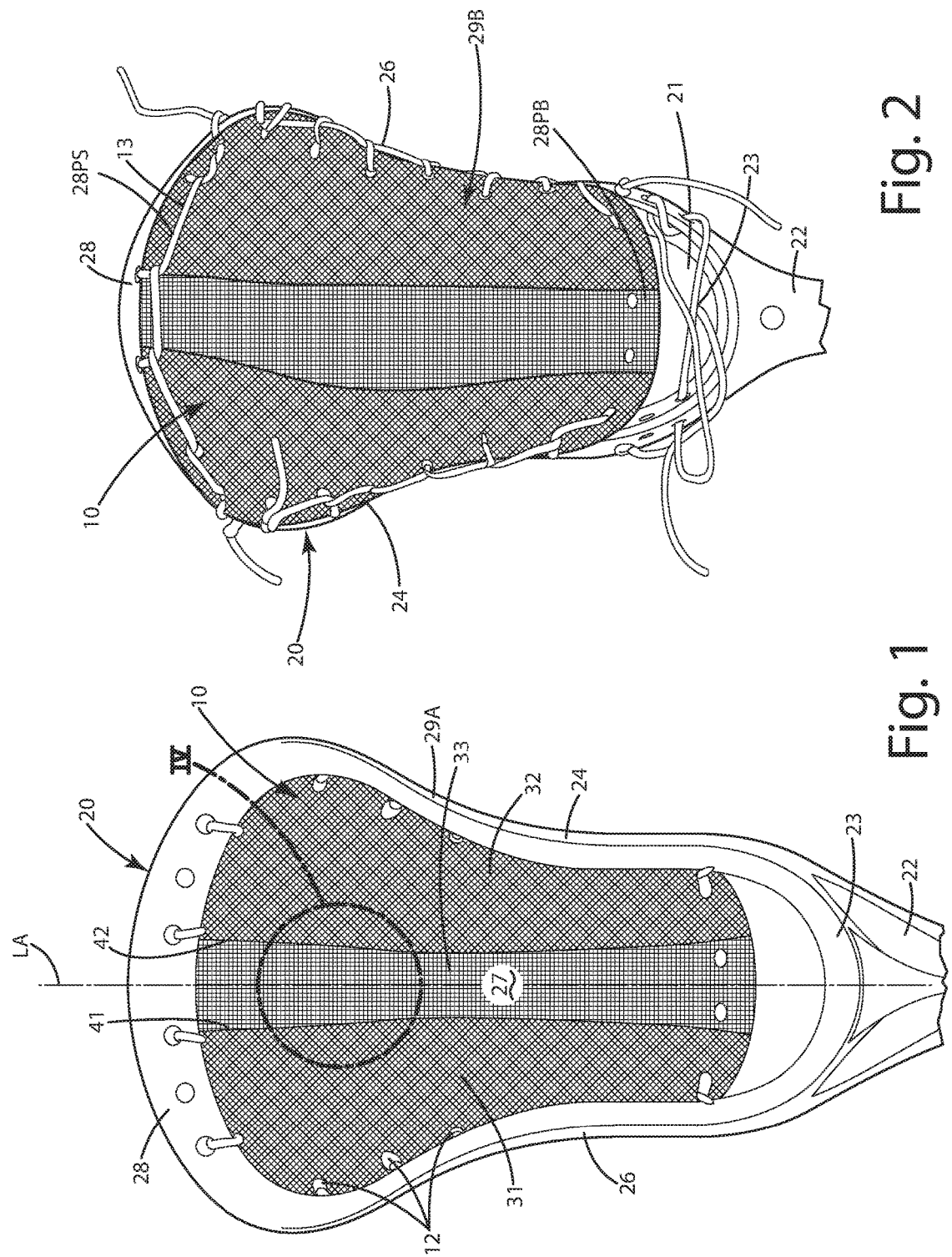

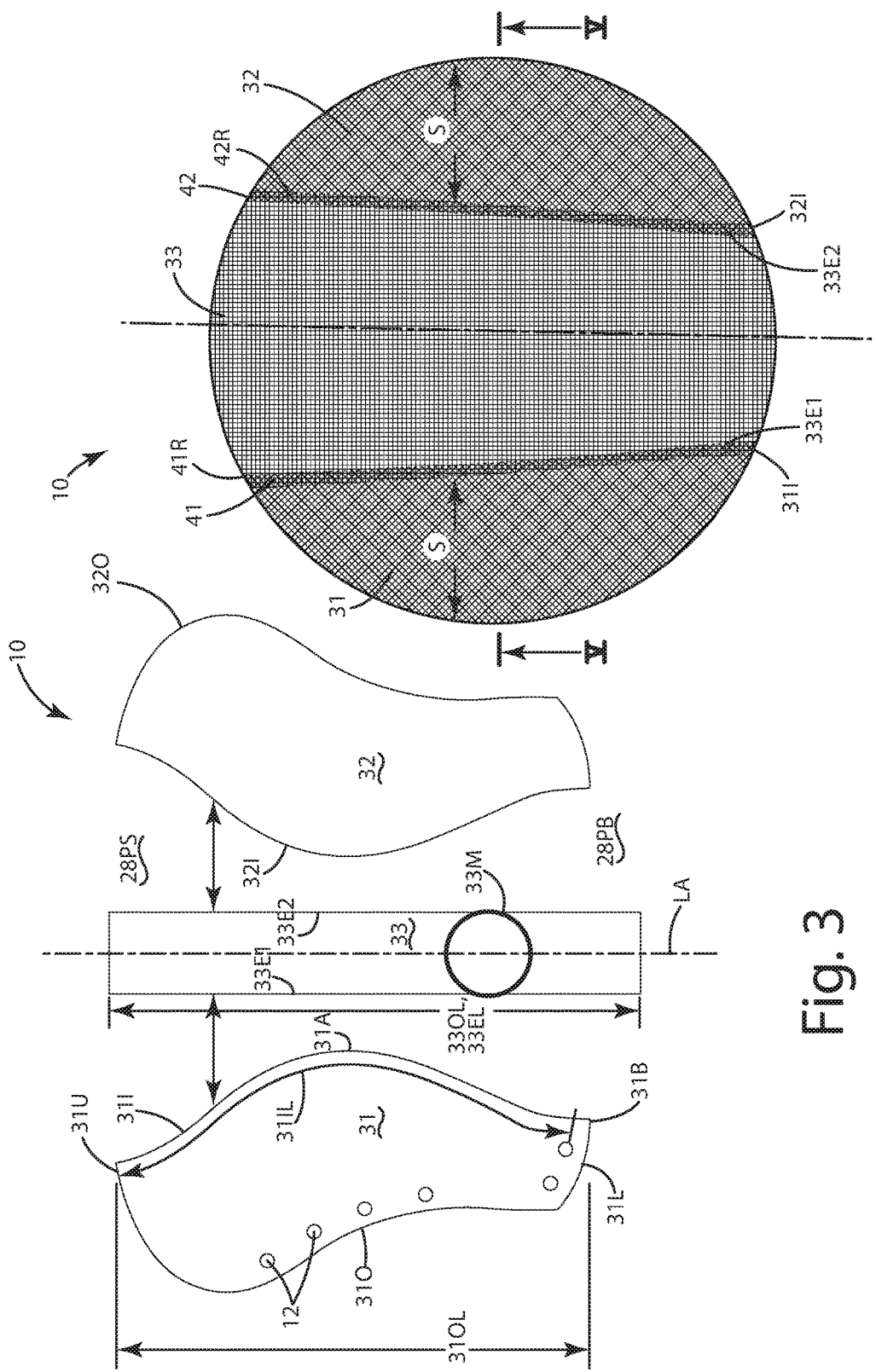

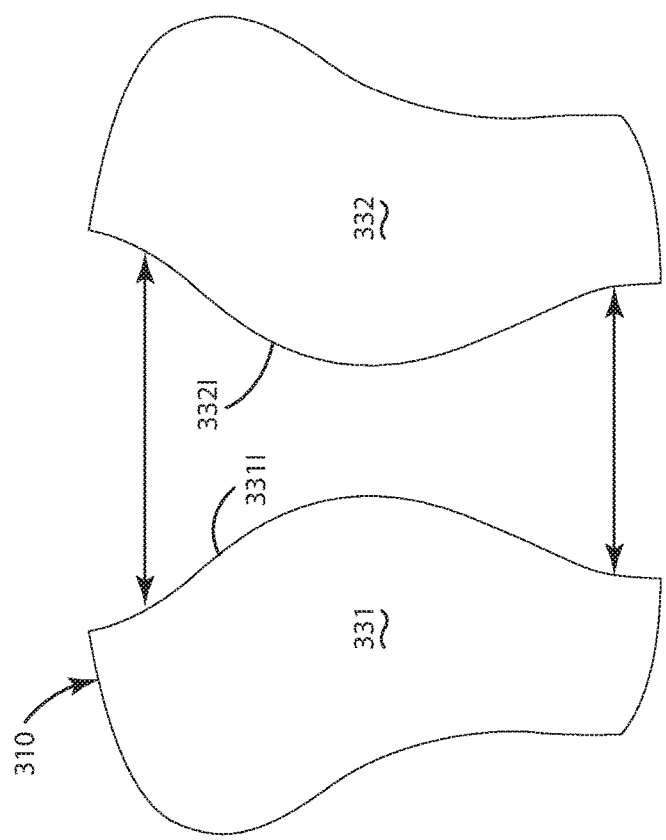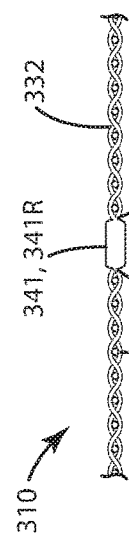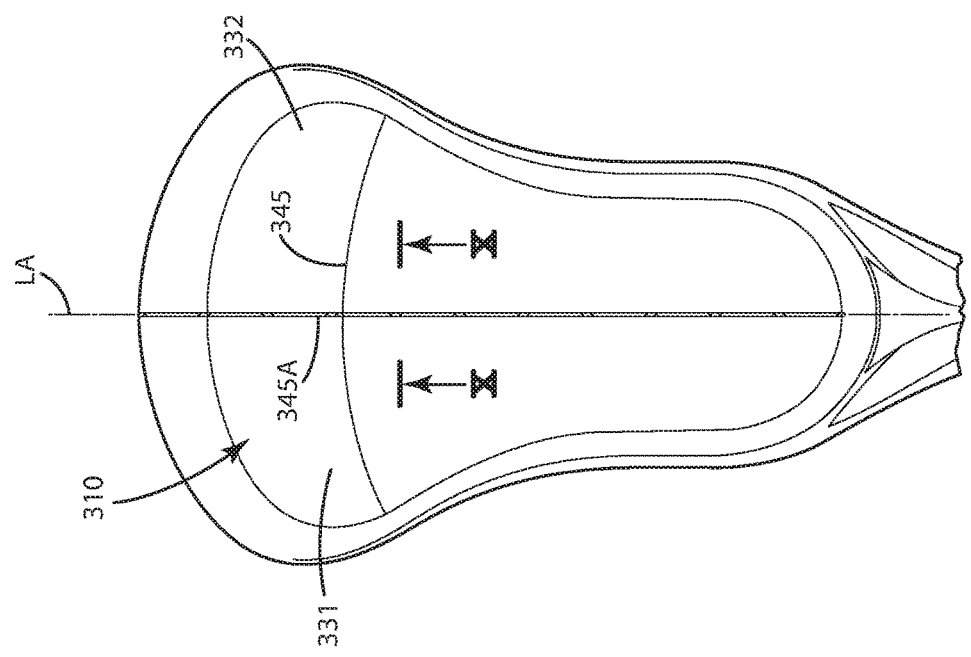

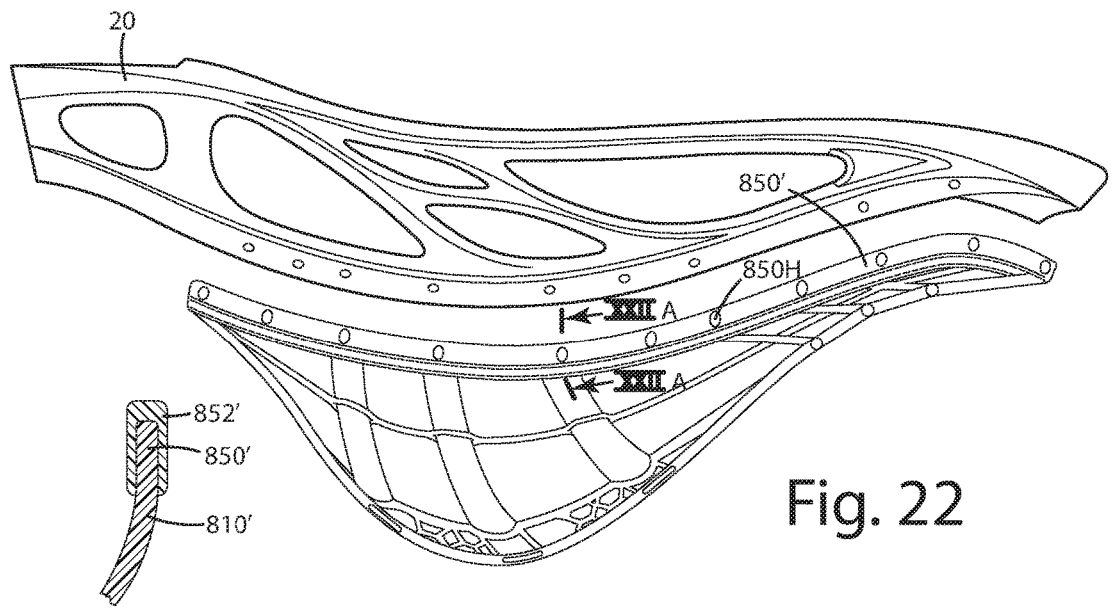
Fig. 22
Fig. 22A
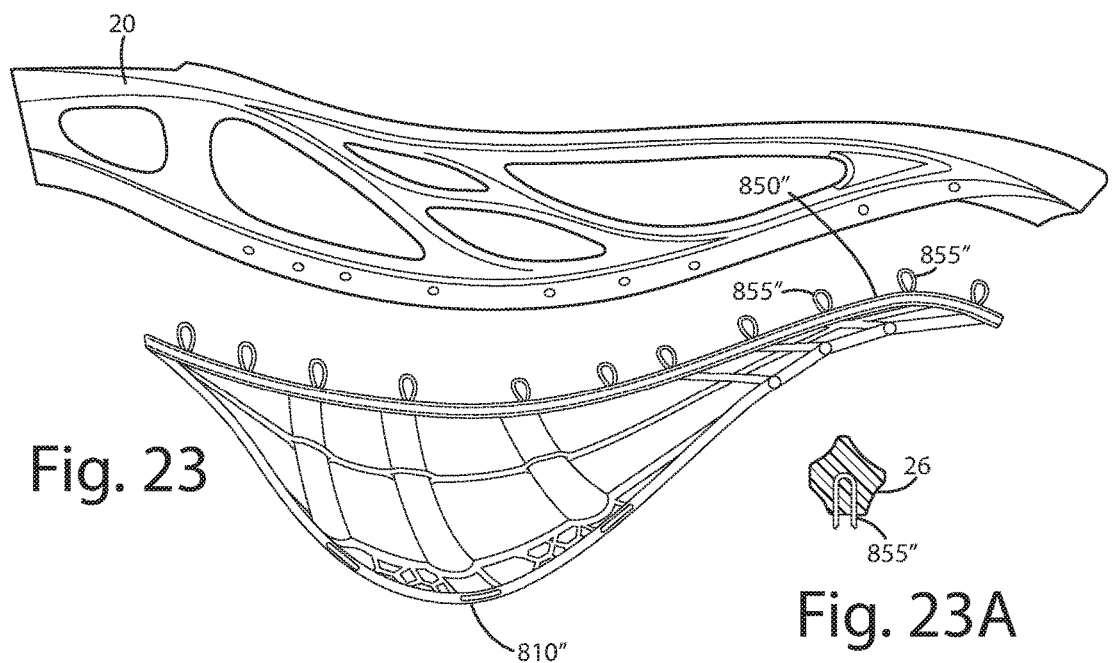
Fig. 23
Fig. 23A

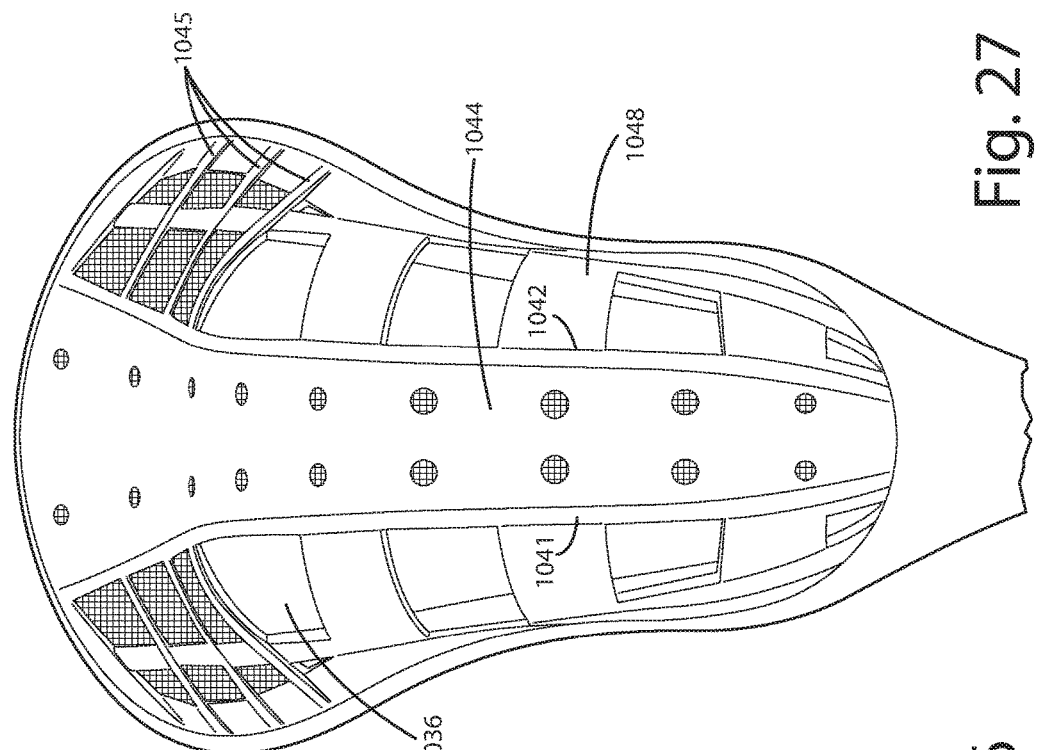
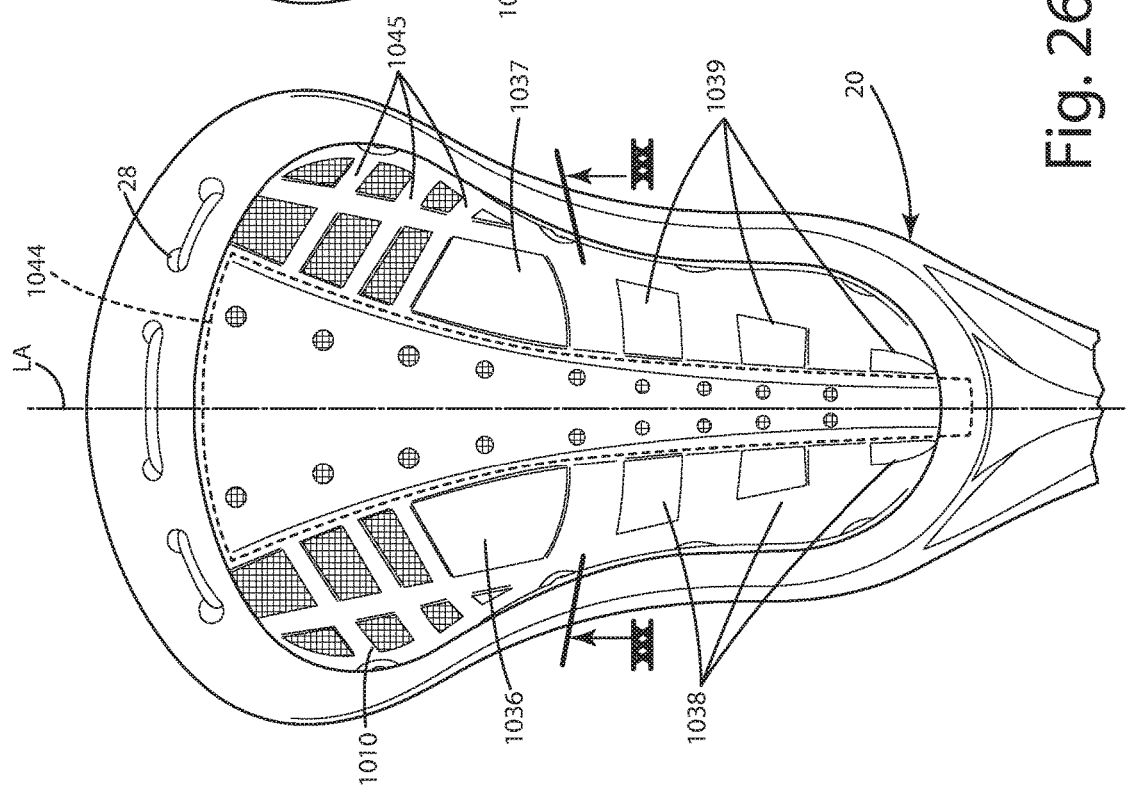

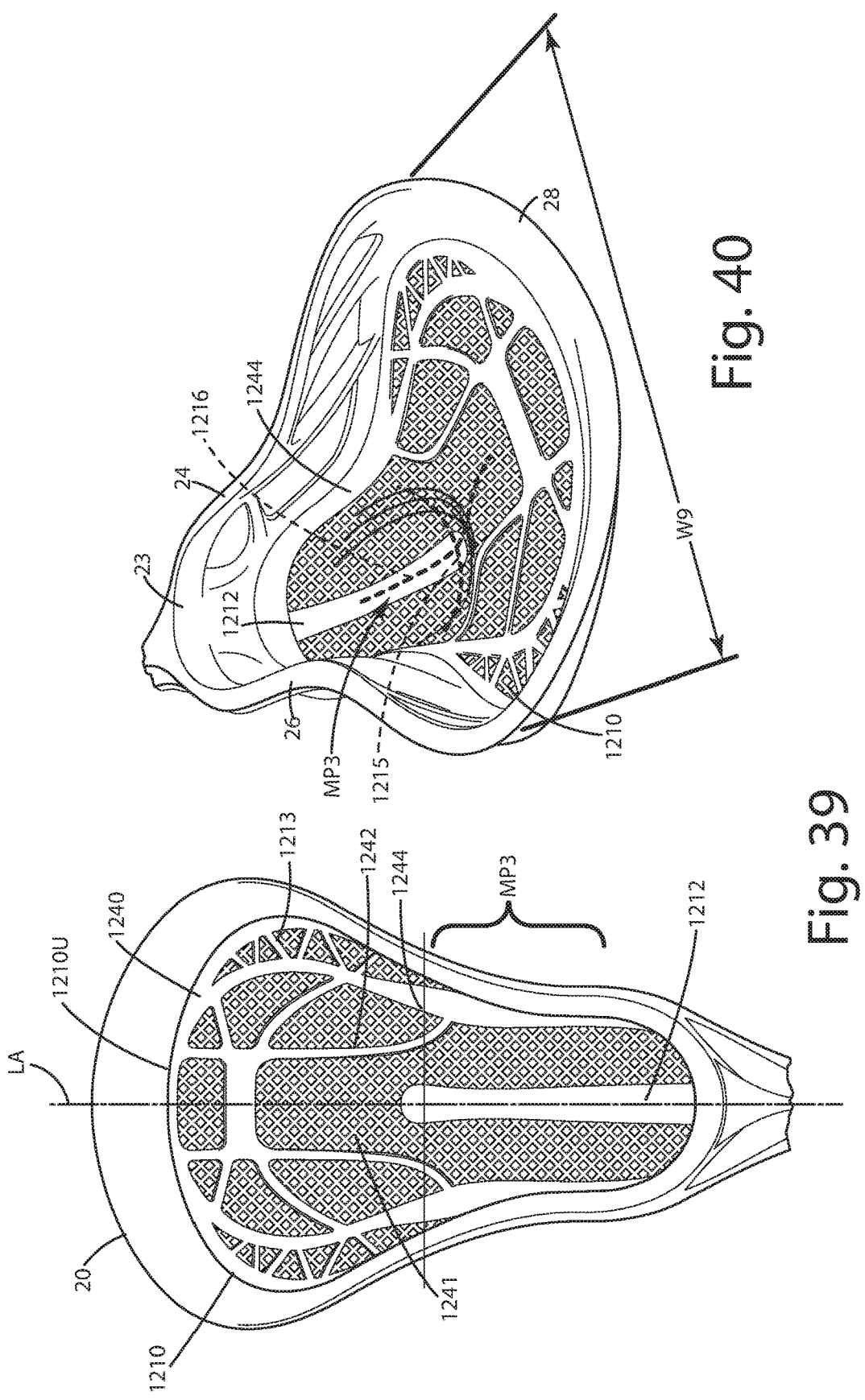

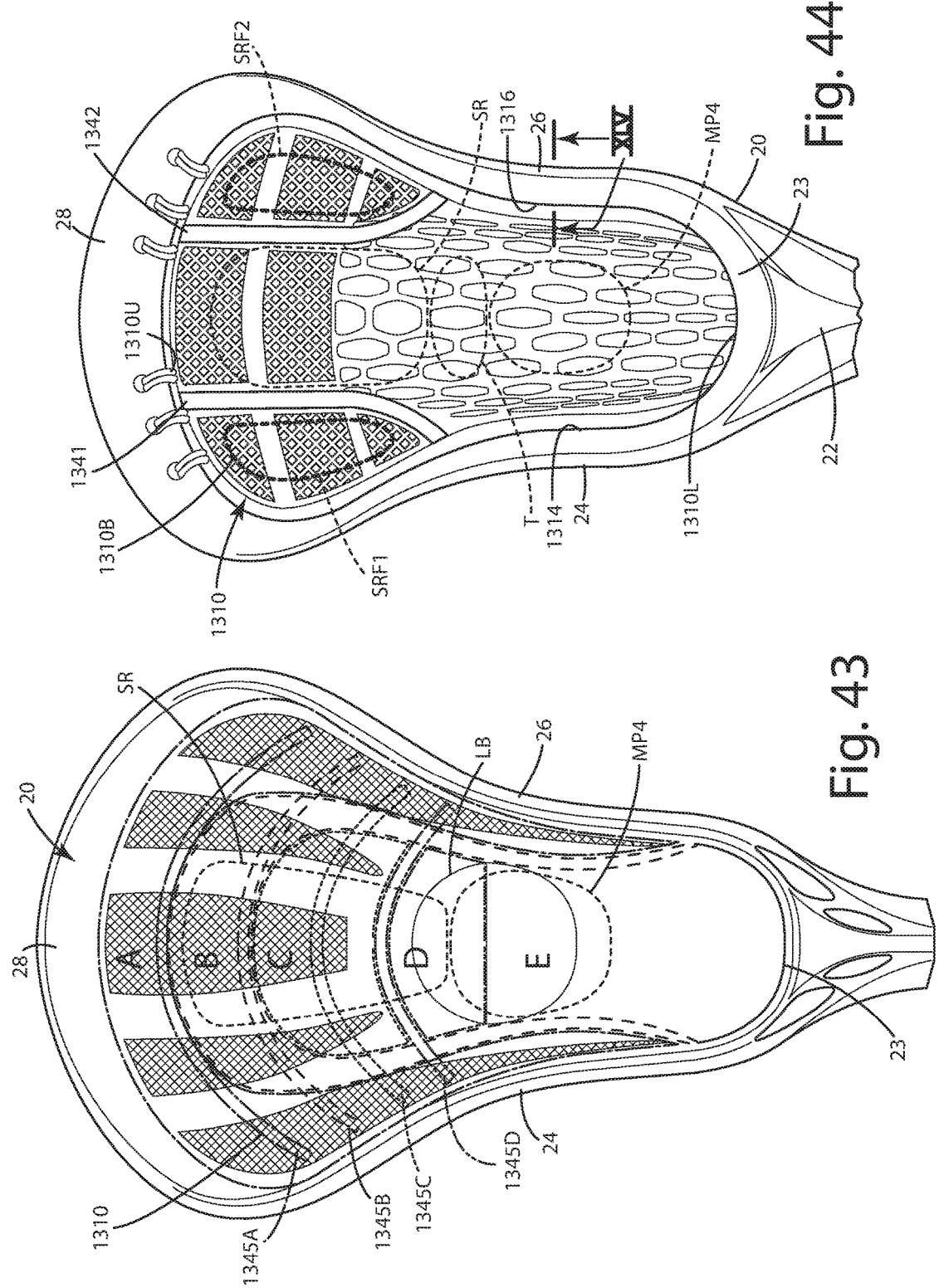

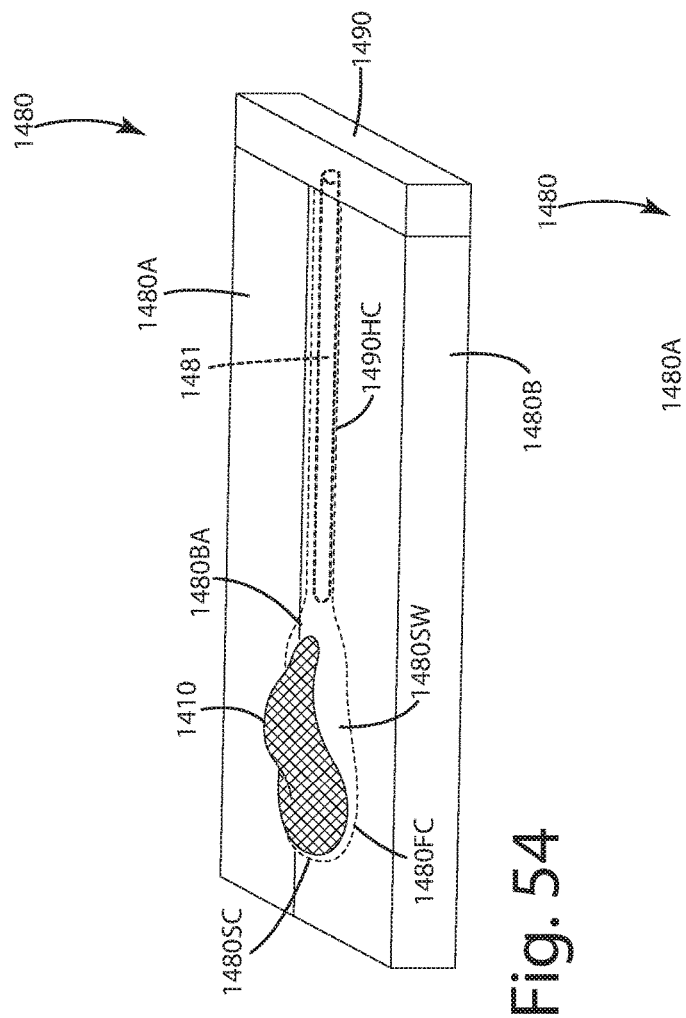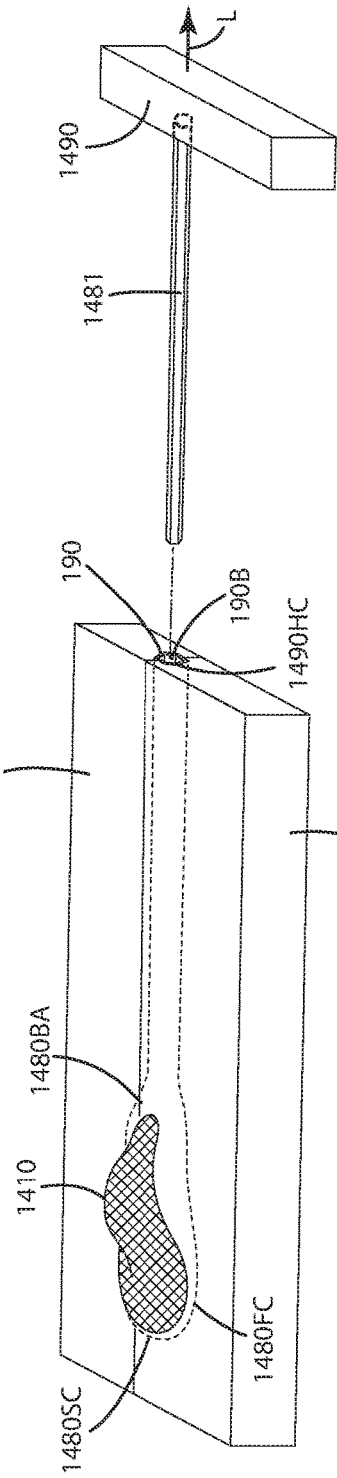

LACROSSE HEAD POCKET AND RELATED METHOD OF MANUFACTURE

BACKGROUND OF THE INVENTION

The present invention relates generally to lacrosse equipment, and more particularly, to a lacrosse head pocket and a related method of manufacture.

Conventional lacrosse sticks include a head joined with a handle. The head includes a frame that forms a region within which a lacrosse ball can be caught, held or shot. A net is joined with the back side of the frame. Typically, the net is constructed from conventional, large diameter laces (e.g., a traditional pocket) or mesh (e.g., a mesh pocket), which is further connected to the frame via multiple small holes defined by the frame. The net forms a pocket within which the lacrosse ball is held while a player is in possession of the ball, and can be a determinant factor as to the player's ability to catch, retain and shoot the ball.

When the net is in the form of a traditional pocket, it usually includes four separate leather large dimension thongs joined with the laces. The laces are held in place with sidewall strings that are carefully sewn through net holes in the sidewall of the lacrosse head. Such traditional pockets typically require extensive maintenance, and are prone to deteriorated performance when the thongs are subject to moisture. Repeated use of a traditional pocket also can stretch out the thongs, thereby changing the shape and performance of the pocket. Over time, the pocket begins to behave differently. In turn, the pocket has varying performance consistency over its useful life. Players thus have to adapt to the changing pocket, or adjust the pocket to a preferred condition.

In addition, when a traditional pocket wears out, the mere thought of replacing it can be daunting to many, particularly younger or less experienced lacrosse players. This also can be true for mesh pockets, which include a single piece of soft mesh material that is carefully attached directly to the lacrosse head. The reason many players dread replacing or servicing pockets is because most pockets require a complex lacing procedure, which is mastered by only a limited number of individuals, to secure the net to a lacrosse head and attain a desired pocket configuration. Thus, many lacrosse players, particularly youths and newcomers to the sport, are left at the mercy of having to wait for their lacrosse sticks to be restrung by someone else, and even then, after the pocket is strung, it usually takes several weeks or months until the pocket is properly broken in to achieve a desired profile.

Mesh pockets also have other drawbacks. One in particular is the absence of shooting strings, a shooting ramp or a defined ball channel within the single piece of mesh. Users sometimes intertwine additional pieces of lace in the mesh to form the same, but this can require a special level of skill and time to do it properly.

Some manufacturers have attempted to combine different types of pockets. For example, one type of pocket includes a mesh part near the ball stop of the head, and a plastic sheet near the scoop. The sheet is laced to the mesh, with the lacing extending across the width of the pocket. Another type of pocket includes two meshes. One mesh, such as a ten hole mesh, is near the scoop, and another mesh, such as a seven hole mesh, is in the throat and near the ball stop.

While conventional lacrosse pockets provide some level of ball control and shooting performance, there remains room for improvement.

SUMMARY OF THE INVENTION

A lacrosse head is provided including a lacrosse pocket that is durable and provides desirable playing characteristics. The pocket is easy to manufacture, replace and/or service. The pocket also can be repeatedly replicated to provide consistent performance from one pocket to the next. A method for making the pocket also is provided.

In one embodiment, the pocket includes first and second pocket sections. The pocket sections can be separately and independently constructed, and each can include first and second respective edges. The first and second edges can be joined along a first seam. The first seam can form a first seam-runner extending generally between the scoop and the base, optionally extending along and/or generally parallel to a longitudinal axis of the pocket and/or head to which the pocket is attached. Generally, the first seam-runner is adapted to guide a lacrosse ball as it exits the lacrosse pocket.

In another embodiment, the pocket includes a first lateral pocket section a second lateral pocket section, with a middle pocket section disposed therebetween. The lateral sections are joined with the middle section along first and second seams, which respectively form first and second seam-runners. The seam runners can form a ball channel along which a lacrosse ball can be guided as the ball exits the lacrosse pocket.

In still another embodiment, the seams where edges of different sections are joined can be formed via a thermal bond. The different sections and/or the edges can be constructed from a thermoplastic polymer material that, when heated, melts or softens so that portions of the edges and/or sections meltingly intermingle and then bond with one another after these items cool.

In yet another embodiment, the seams, where edges of different sections are joined, can be formed by stitching of the edges and/or sections together with stitching. The stitching can project upward from front surfaces of the sections a preselected distance to form raised seam-runners useful for further guiding a lacrosse ball as it exits the pocket.

In even another embodiment, the seams, where edges of different sections are joined, can be formed by adhering the edges and/or sections together with an adhesive. The adhesive can permeate and/or embed within strands of the edges and/or sections, thereby holding the sections together at the seams.

In a further embodiment, a method of manufacturing the lacrosse pocket is provided. The method can include providing first and second pocket sections constructed independently and separately from one another and including respective first and second edges; joining the edges along a first seam extending at least one of a long and generally parallel to a longitudinal axis of the pocket and/or head. The first seam forms a first seam-runner extending generally between the scoop and the base. The first seam-runner is adapted to guide a lacrosse ball as it exits the lacrosse pocket.

In still a further embodiment, the method can include thermally bonding the edges and/or sections to one another, optionally via the application of heat along the seam. The material of the sections can melt and/or soften so that the sections are secured to one another when cooled.

In yet a further embodiment, the method can include adhering and/or stitching the edges of the different sections together to form the first seam. The stitching can be raised above the surfaces of the sections to form a raised seam-runner.

In another, further embodiment, the lacrosse pocket can be constructed from a textile, fabric and/or mesh material that is engineered for specific pocket shapes and functionality in different regions of the pocket. The textile material can be substantially unitary and one piece; however, different portions or regions of the unitary textile material can be reinforced with additional strands that are knitted, weaved, or otherwise included in the material in a manner that affects the functional characteristics and properties of the material in the region within which those strands are located. Optionally, the textile material can include multiple different knit and/or weave patterns in different regions of the pocket to provide the desired properties. For example, in the middle of the pocket and/or in the throat of the pocket, the textile material can be constructed from a unitary, stretchable weaved or knitted textile material. As the pocket transitions to the scoop, generally in the upper half or third of the pocket, the textile material can include, in the same unitary textile material, a multiple layer density weave that provides added reinforcement and enhanced rigidity in that region of the pocket. Thus, the pocket can include a stretch and a non-stretch region in the same unitary textile material.

In yet another further embodiment, the pocket can be constructed from a textile material, having engineered characteristics as noted above to provide specific pocket shapes. In addition, the pocket can include a flexible frame. This flexible frame can be constructed from a polymeric material, for example, thermoplastic, polymers, such as thermoplastic polyurethane (TPU) or similar materials that is bonded to the textile material. For example, the TPU can be RF welded directly to the strands of the textile. The flexible frame can include runners and optionally shooting elements. A perimeter element or edge element for reinforcing the edges of the pocket where it attaches to a head also can be included in the frame. The flexible frame can provide grip and/or stiffness in strategic locations throughout the pocket. For example, the runners of the flexible frame can form at least a portion of a ball channel extending from the throat toward the scoop. These runners can better grip a lacrosse ball than the textile material over which the runner is located. In turn, this can impart spin to the ball as it exits the head upon shooting or passing activities.

The lacrosse pocket and methods herein can provide a pocket that is virtually unaffected by weather changes, temperature changes and moisture, which enables it to have a substantially consistent profile and configuration throughout such conditions. In turn, this enables the player to play with confidence, even under adverse environmental conditions. The pocket can be pre-assembled, and easily installed on a lacrosse head. The sections and seam-runners can be custom configured to provide desired performance characteristics of the pocket. Where it includes a preselected set of contours, the pocket herein can require minimal break-in, maintenance and skill for installation on a lacrosse head. The pocket herein also can be less expensive to manufacture and assemble than conventional lacrosse head pockets.

Further, the pockets herein that are preformed and pre-shaped are surprisingly consistent from one pocket to the next. This contrasts with manually strung traditional and mesh pockets, which were generally inconsistent due to human error or techniques in stringing the pocket. In addition, the pockets herein and their methods of manufacture are suitable to produce repeatable, consistent and highly customized pockets. Indeed, a player can select a particular pocket profile and performance characteristics. A manufacturer can consistently custom form that pocket over and over for the player. In this manner, a player can purchase the "same" pocket and/or lacrosse head every time they need a new one. The methods herein thus provide ways to precisely replicate pockets and heads at a commercial level.

These and other objects, advantages, and features of the invention will be more fully understood and appreciated by reference to the description of the current embodiment and the drawings.

Before the embodiments herein are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a top view of a lacrosse head including a current embodiment of a lacrosse pocket;

FIG. 2 is bottom view of the lacrosse head and pocket;

FIG. 3 is top view of multiple sections that comprise the pocket in a two dimensional form before assembly;

FIG. 4 is a close up view of the lacrosse pocket along seams joining the sections;

FIG. 8 is a top view of a lacrosse head including a third alternative embodiment of the lacrosse pocket;

FIG. 9 is top view of multiple sections that comprise the third alternative embodiment of the lacrosse pocket in a two dimensional form before assembly;

FIG. 10 is a section view of the third alternative embodiment of the lacrosse pocket illustrating seams formed via thermal bonding taken along lines X-X of FIG. 8;

FIG. 22 is a section view of the eighth alternative embodiment of the lacrosse pocket illustrating a reinforcement element;

FIG. 22A is a side view of the reinforcement element of the lacrosse pocket;

FIG. 23 is a side view of the lacrosse head of the eighth alternative embodiment illustrating lace loops that join the pocket with the lacrosse head;

FIG. 23A is a section view of the lace loops within the lacrosse pocket;

FIG. 26 is a top view of the lacrosse head including a tenth alternative embodiment of a lacrosse pocket;

FIG. 27 is a bottom view of the lacrosse head including the tenth alternative embodiment of the lacrosse pocket;

FIG. 39 is a top view of a lacrosse head including a twelfth alternative embodiment of a lacrosse pocket;

FIG. 40 is a front perspective view of the lacrosse pocket of the twelfth alternative embodiment;

FIG. 43 is a front view of a lacrosse head including a unitary textile material lacrosse pocket of the thirteenth alternative embodiment, the lacrosse pocket being divided into different functional zones;

FIG. 44 is a front view of the lacrosse pocket of the thirteenth alternative embodiment illustrating different components thereof;

FIG. 54 is a perspective view of a mold used to integrally molded the lacrosse pocket of the fourteenth alternative embodiment into a lacrosse head and also to form a lacrosse handle integral with the lacrosse head;

FIG. 55 is a perspective view of the mold showing a slide being removed from a bore of the molded handle;

DETAILED DESCRIPTION OF THE CURRENT EMBODIMENTS

I. Overview

Figure 5:
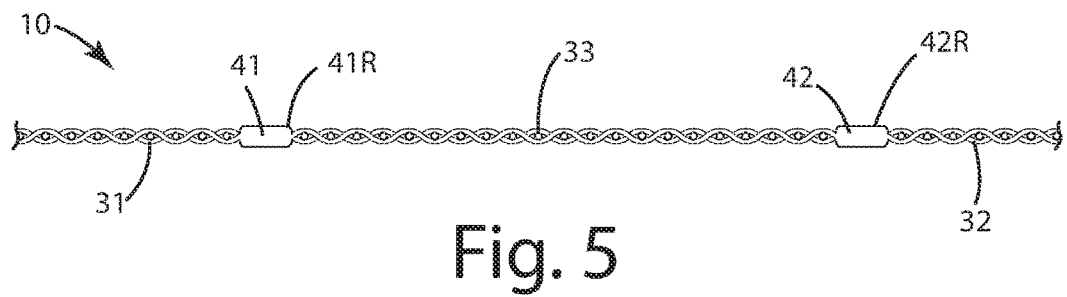
FIG. 5 is a section view of the lacrosse pocket taken along line V-V of FIG. 4.

A current embodiment of a lacrosse head pocket is shown in FIGS. 1-6 and generally designated 10. The lacrosse pocket 10 is adapted to be secured to a lacrosse head 20 to form a "strung" lacrosse head. The lacrosse head 20 can be further joined with a handle (not shown) to form a completed lacrosse stick. As shown in FIG. 1, the lacrosse pocket 10 is in the form of a multi-sectioned pocket including no conventional woven lacing, webbing or thongs in the inside pocket area 27 bounded by the lacrosse head 20. The pocket 10 includes first and second lateral sections 31 and 32. These lateral sections are generally joined to the sidewall and portions of the scoop and/or base of the lacrosse head as described further below. Between them is a middle pocket section 33. The edges of the respective first and second lateral sections 31 and 32 are joined with opposing edges of the middle pocket section 33. At this location of joining, first and second seams 41 and 42 are formed. These first and second seams 41 and 42 generally form first and second seam runners 41R and 42R, respectively. The seam runners can create a ball channel and/or otherwise guide the ball generally parallel to a longitudinal axis LA of the lacrosse head 20 and/or lacrosse pocket 10. Generally, as used herein, the longitudinal axis LA can be associated with either the head or the pocket.

As shown in FIG. 5, the seams 41, 42 can be formed and the respective sections joined via a thermal bond. As used herein, the term thermal bond or variants thereof can mean a bond, link or structure that joins two elements, for example, sections, through a process that involves a softening and/or melting of a material, and/or strands thereof, optionally a thermoplastic polymer material, within at least one of the sections. The materials of the sections and/or edges are secured to one another when cooled. As further used herein, the term "thermal bonding" or variants thereof can mean a securing technique between two or more sections or edges that involves a softening and/or melting of a material, optionally a thermoplastic polymer material, in at least one of the sections or edges such that the material of those elements are secured to each other when cooled. Examples of thermal bonding can include melting or softening of a first edge and a second edge of respective sections so that the materials from which the sections are constructed meltingly intermingle with one another and are secured together when cooled. Thermal bonding can alternatively and/or additionally include melting or softening of materials, optionally thermoplastic polymeric materials, from which the sections and/or edges are constructed so that the material of at least one edge or section extends into, infiltrates and/or embeds into the structure or components of another section and/or edge, for example, by extending around or bonding with strands of one or more of the sections and/or edges to secure the same together when cooled. Additionally, thermal bonding does not generally involve the use of stitching or adhesives but involves directly bonding elements to each other via the application of heat. Generally, a thermal bond can be produced via heating, melting, radio frequency welding, sonic welding, steaming and/or otherwise heating at least one of the edges and/or sections to be joined along a respective seam. In some cases, however, stitching and/or adhesives optionally can be used to supplement a thermal bond or the joining of elements via thermal bonding. Needle punching may also be used to join the sections or supplement a thermal bond.

II. Construction

The various structural components and construction of the current embodiment will now be described. Returning to FIGS. 1 and 2, the pocket 10 is joined with a lacrosse head, which is shown as a men's lacrosse head. The pocket described herein, however can be readily used and implemented on a woman's lacrosse head. The lacrosse head 20, and in particular, the frame of the lacrosse head 20, includes a base 21 including a ball stop 23 attached to a throat 22 which can be further connected to a handle (not shown). The frame includes opposing sidewalls 24 and 26 extending from the base or ball stop and/or scoop 28 connected to and joining the sidewalls 24 and 26. The lacrosse head 20 can include a front side 29A and a rear side 29B. The head 20 also can define an interior pocket area 27, which is bounded generally by the sidewalls 24, 26, the ball stop 23 and the scoop 21. In this area, a lacrosse ball (not shown) is usually caught, handled and/or shot from a lacrosse head 20.

The pocket 10 can include a network of strands that are structurally joined with one another in a woven, nonwoven or other network, with the strands optionally extending and connecting with one another. As shown in FIGS. 1 and 2, the pocket includes a first lateral pocket section 31 and a second lateral pocket section 32. These lateral pocket sections extend toward the sidewalls 26 and 24 of the lacrosse head 20, and can be adapted for attachment directly thereto. For example, these sections and other components of the pocket can define one or more string holes 12 through which connection lacing 13 can be sewn or threaded. The connection lacing 13 is further strung through net holes defined by the respective sidewall, scoop and/or ball stop of the lacrosse head 20. It is by this connection that the lacrosse pocket can be connected and easily attached to the lacrosse head. Optionally, the holes 12 can be reinforced with grommets, or polymeric or metal rings, or other structures that can prevent the lacing 13 from pulling through, ripping or otherwise tearing the lacrosse pocket 10. Generally, the holes 12 defined by the pocket 10 can be laid out in a simple and efficient configuration so that even the inexperienced user can readily and easily attach the lacrosse pocket to the head with the connective lacing 13, thereby installing the pocket on the head.

The pocket 10 as illustrated in the current embodiments of FIGS. 1-4 includes a middle pocket section 33 that is joined with respective first 31 and second 32 lateral pocket sections. Although shown as including only one middle pocket section, the pocket can include any multiple of different pocket sections. As illustrated, the first lateral pocket section 31 includes an outer edge 31O and an inner edge 31I. The second lateral pocket section 32 can include a similar inner edge 32I and outer edge 32O, and respective dimensions as the first lateral pocket section 31, and therefore will not be described in further detail here. The outer edge 31O is generally configured and structured so that it can be disposed immediately adjacent and optionally in contact with the sidewall 26 of the head. In this manner, that outer edge 31O can generally follow the contours of the lacrosse head, and in particular, the sidewall and/or portion of the scoop and ball stop. The outer edge 31O transitions to a lower edge 31L. This lower edge can be configured for placement immediately adjacent the ball stop 21 and/or base 23 of the head 20. This lower edge 31L can define one or more net holes to facilitate attachment of the pocket in its location via the connective lacing 13 to the ball stop and/or base. The outer edge 31O and lower edge 31L each can transition to an inner edge 31I. This inner edge 31I can extend from the scoop toward the ball stop 21 when the pocket is installed in the head 20. This inner edge 31I also can be contoured to include a curved and/or angled configuration extending from an uppermost extremity 31U of the first lateral pocket section 31 to a lowermost extremity 31B of the first lateral pocket section.

As illustrated in FIG. 3, the edge 31L can generally be curved. This inner edge 31I also can be of a predetermined inner edge length 31IL. This inner edge length can have particular relationships and proportions relative to other dimensions of the components of the lacrosse pocket. For example, the lacrosse pocket section 31 can be of an overall length 31OL, which is the length between the uppermost extremity 31U and the lowermost extremity 31B of the pocket section 31 when laid out flat in a two dimensional form. Optionally, the overall length 31OL corresponds to the distance from the scoop to the ball stop taken along the longitudinal axis of the lacrosse head 20. The inner edge length 31 IL can generally be greater than the overall length 31OL of the lateral pocket section 31. The length of the outer edge 31O can be greater than or equal to the overall length 31OL of the lateral pocket section.

As shown in FIG. 3, the lateral section 31 can be configured so that the inner edge 31I includes an apex 31A. This apex can be defined along the inner edge, opposite the outer edge 31O. The apex can correspond to the "deepest" portion of the pocket when the pocket is fully constructed and/or installed upon a head. The apex can correspond to the at rest location of a lacrosse ball when it is disposed in the lacrosse pocket and the head is held generally horizontal or level with the ground. The precise location of the apex 31A also can define the shooting and cradling capabilities of the head. The apex 31A can be located at predetermined locations along the inner edge 31I between the uppermost extremity 31U and lowermost extremity 31B.

As shown in FIGS. 1 and 3, the first and second lateral pocket sections 31 and 32 can be located on opposite side of the longitudinal axis LA of the pocket and/or head. Of course, this orientation can be varied. Indeed, the first and second lateral pocket sections can be directly connected to one another and form an integral one-piece sheet or structure. As mentioned above, the pocket sections also can be constructed from woven or nonwoven sheets of fabric or other materials. These components optionally can be constructed from thermoplastic polymer materials. The thermoplastic polymer materials can be the same for all the different pocket sections, for example, the first and second lateral pocket sections and the middle pocket section. The sheets of material for these sections can be die cut, laser cut or otherwise formed in different shapes and sizes so that when combined they form a desired pocket configuration.

The first and second lateral pocket sections 31 and 32 can be joined with or secured to a middle pocket section 33. As illustrated, this middle pocket section 33 can be of a generally rectangular configuration and can extend along and/or parallel to the longitudinal axis LA. The middle pocket section 33 can include edges 33E1 and 33E2, which optionally can be disposed on opposite sides of the longitudinal axis LA of a pocket and/or head. These edges 33E1 and 33E2 can be generally parallel to one another as illustrated. Optionally, these edges can be divergent from one another from the base to the scoop. Alternatively, they may be of a curved, angled and/or contoured configuration (rather than linear, as shown) depending on the desired performance of the pocket. As illustrated, the middle pocket section can be of a uniform width and can extend from the scoop portion 28PS to the base portion 28PB of the pocket 10. Optionally however, the width of the middle pocket section can vary and/or undulate, depending on the particular ball channel to be formed with that component.

Optionally, the middle pocket section can have, and its edges can define, an overall length 33OL. This overall length 33OL optionally can be greater than the overall length 31OL of the first lateral pocket portion 31, when the middle pocket section 33 and lateral pocket sections 31, 32 are laid out in a two-dimensional configuration, for example, when the materials from which these components are constructed are lying flat on a horizontal surface before being attached and joined with one another. Further optionally, the length of the edge 33EL can be identical to or substantially the same as the inner edge length 31 IL of the first lateral pocket section 31. Of course, in certain configurations, these lengths can vary, and can be in any proportion relative to one another.

As shown in FIG. 4, the different sections of the pocket can be laid out and configured so that the strands making up the respective sections are oriented in different configurations. For example, the strands in the middle pocket section 33 can be weaved, and can be oriented generally parallel to and/or perpendicular to the longitudinal axis LA of the pocket. The strands of the middle pocket section can be crisscrossed generally forming squares between crossed strands. The lateral sections 31 and 32 can include strands that are oriented at a 45° or other angle relative to the longitudinal axis LA. These strands crisscross one another, in an over-under, over-under manner to form generally open diamond-shaped holes therebetween. In this orientation, the material making up the sections 31 and 32 can stretch more easily in directions S, so that the lateral sections can better hold the ball for a longer period of time before it is launched out of the pocket. This stretchability also can provide added flexibility to the lateral sections to better hold the ball during cradling. With the orientation of the strands crisscrossed in the middle pocket section 33, this section can be less flexible toward and away from the respective sidewalls and generally more rigid. Optionally, the strands and/or material of the lateral sections can be oriented at a different angle and/or orientation relative to the longitudinal axis LA than the strands and/or material in the middle pocket section 33 to impart different functional characteristics to the respective sections and the pocket overall.

The sections of the pocket 10 and respective edges thereof can be constructed from a material, such as a thermoplastic polymer material or other polymeric or natural materials. The pocket, and optionally the sections and edges, can be constructed from a plurality of strands that can be knitted or woven in a network with one another, or alternatively non-woven. The strands can be in the form of threads, cables, yarn, fibers, filaments, cords and other strand-like elongated structures. Strands, however, optionally can exclude large diameter (greater than 2.0 mm and/or greater than 3.0 mm) laces, thongs or nylon webs that are manually tied or connected to one another or other structures. The sections and edges can be constructed from polymer meshes, fabrics, whether knitted, woven, or otherwise formed. Generally, thermally bonding the edges and/or sections together provides seams having an increased stiffness, rigidity, and/or wear resistance as compared to other portions of the sections. The thermal bonding also can be used to reinforce the pocket, provide areas of decreased flexibility, decreased permeability and/or increased stiffness as compared to other sections.

As used herein, thermoplastic polymer materials can refer to material that melts when heated and returns to a solid state when cooled. As an example, the thermoplastic polymer material transitions from a solid state to a softened and/or liquid state when subjected to sufficient heat, and then the thermoplastic polymer material transitions from the softened and/or liquid state to a solid state when sufficiently cooled. Accordingly, the thermoplastic polymer material can be melted, molded, cooled, re-melted, re-molded and cooled again in multiple cycles. Thermoplastic polymer materials can also be welded and/or thermal bonded as described above. Such materials can include knitted, woven and/or nonwoven sheets constructed from a variety of strands constructed from materials such as nylon, polyurethane, polyester, polyester polyurethane, polyether polyurethane, other polymeric materials, and combinations thereof. Other suitable materials are disclosed in U.S. Published Patent Applications 2012/0246973 and 2012/0318026, both of which are hereby incorporated by reference.

As mentioned above, the lacrosse pocket can be constructed from a variety of materials. Optionally, the pocket and respective sections also can be constructed from multiple layers of materials. As an example, the layers can be loosely disposed one above the other in some applications. In other applications, the sections can include laminate structures, with the different layers secured or attached to one another, one on top of the other. One example of a laminate structure is a woven sheet constructed from thermoplastic polymer material strands, disposed over another layer of a TPR, EVA, rubber, or polymeric open celled structure or mesh. On the opposite side of this layer, a second woven sheet of thermoplastic polymer material strands can be disposed, thereby sandwiching the open celled structure or mesh between the outer woven layer and the inner woven layer. The open celled structure or mesh can be constructed to provide added resilience and/or flexibility to the pocket. Optionally, different numbers of layers of different materials can be joined to form the laminate structure.

If desired, the different sections of the pocket can be constructed from different materials and/or layers having different properties. As an example, the middle section can be constructed from a relatively rigid, more dense, fabric while the first and second lateral portions 31 and 32 can be constructed from a relatively flexible, elastic, stretchable fabric or knitted structure. As another example, the sections 31, 32 and 33 can all include a first layer constructed from a single fabric. The middle section, however, might be reinforced with a second layer that is adhered, molded and/or otherwise joined with that middle section to add rigidity to the middle section. In other embodiments, the middle section can be knitted or woven with a second layer integrally and unitarily knitted or woven with the first layer to add inelasticity or rigidity to the middle section. In yet other embodiments, the middle section can be constructed from a more durable material. As an example, the middle section can be constructed from aramid, for example, Kevlar®, to add wear resistance to that portion and increase its longevity. If desired, the different components, layers and sections of the lacrosse pocket 20 can be mixed and matched, depending on the particular position for which the lacrosse pocket is to be used, that is, an attack, midfield or defensive position.

Figure 6:
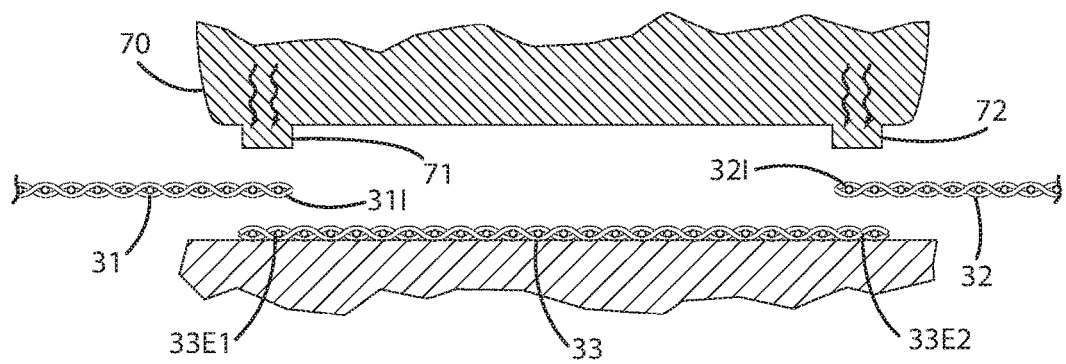
FIG. 6 is a section view of the lacrosse pocket illustrating seams being formed via thermal bonding.

FIGS. 4-6 illustrate the joining of the respective sections to construct the pocket 10. There, the inner edges 31I and 32I of the first and second lateral sections 31 and 32 are joined directly with the edges 33E1 and 33E2 of the middle pocket section 33. Generally, the first and second lateral sections can be disposed across the longitudinal axis of the pocket LA from one another. The respective opposing edges of the middle pocket section 33 also can be disposed across the longitudinal axis LA of the pocket from one another. Both the first and second lateral sections 31 and 32 can be configured and dimensioned to extend from a base portion 28PB to a scoop portion 28PS of the lacrosse pocket. The respective inner edges 31I and 32I of these lateral sections can extend from the scoop portion to the base portion of the pocket. The middle pocket section and its respective edges 33E1 and 33E2 can extend this length as well.

The joining of the respective sections can be accomplished via seams 41 and 42. The seams 41 and 42 can be disposed on or adjacent the opposite edges 33E1 and 33E2 of the middle pocket section 33. The seams can be disposed on or adjacent the edges 31I and 32I of the respective lateral pocket portions 31 and 32. Generally, the middle pocket section edge 33E1 can be joined directly with the inner edge of the lateral pocket section 31 at the seam 41. The second middle pocket section edge 33E2 can be joined directly with the inner edge 32I of the second lateral pocket section 32 at the seam 42. Although shown with two seams, the pocket herein can include fewer or more seams. For example, there can be one seam, two seams, three seams, four seams, five seams, ten seams, twenty seams, etc. connecting different sections and/or edges. Further, although seams 41 and 42 are shown oriented parallel to and/or adjacent the longitudinal axis LA of the pocket and/or head, those or other seams can be oriented transverse and/or intersecting to the longitudinal axis LA as described in an alternative embodiment below.

The first and second seams 41 and 42 can generally be formed where the edges of the respective sections meet and are joined. At or near the seams, the lacrosse pocket can be more rigid and/or less flexible due to optional doubling up of material in this location and/or additional material in this location. As shown in FIGS. 1 and 4, the seams 41 and 42 themselves are configured to form first and second seam runners 41R and 42R. These seam runners 41R and 42R generally run parallel to and/or adjacent the longitudinal axis LA, optionally on opposite sides of the longitudinal axis LA. The seam runners can provide an area of rigidity and/or decreased flexibility in the lacrosse pocket so that when a ball exits the pocket, it can generally follow along the runners, optionally centered between them. Thus, the seam runners can assist in directing the ball out from the head. Optionally, the seam runners 41R, 42R form a discontinuity in the flexibility or rigidity of the lacrosse pocket that can be used to guide a ball and/or impart spin on the ball. Further optionally, each of the seam runners can extend from a location adjacent a middle pocket 33M of the pocket toward the scoop portion 28PS. One or both of the seam runners can be substantially parallel to the pocket longitudinal axis LA. As described below, the seam runners can be constructed to extend upwardly from a front surface of any of the respective pocket sections. Generally, where there are first and second seam runners, those runners can extend substantially parallel to the pocket longitudinal axis LA. Of course, in some cases they can diverge or converge relative to the longitudinal axis and/or one another. Further optionally, the seam runners do not intersect, or overlap or otherwise contact one another. Even further optionally, the seam runners do not transition toward one another, nor are they joined with one another. They can be separate and independent elements that extend along the pocket.

The seams and seam runners can be formed via a variety of techniques. For example, in the current embodiment shown in FIG. 5, the seam runners 41R and 42R can be formed at the respective edges of the middle pocket section 33 and the lateral pocket sections 31 and 32 by thermally bonding the edges 33E1, 33I1 and 33E2, 32I to one another. The edges can be fused together, for example, with heat along the respective seams. Where the material is constructed from thermoplastic polymer material, and thermal bonding occurs, the respective edges and/or sections can be meltingly intermingled at the seams to join the edges of the lateral sections and the edges of the middle pocket section. Generally, the edges and/or the sections themselves are at least partially melted and/or softened so that the material thereof joins the respective edges and/or sections. In some cases, where one edge is constructed from a thermoplastic polymer material and another edge is constructed from a thermoplastic material with a higher melting point or some other material, the thermoplastic polymer material of the one edge can melt around the material of the other edge so that unmelted material is embedded within the melted thermoplastic material. Upon cooling, the edges and/or sections are respectively joined with one another at the seam.

To create a thermal bond or otherwise join the respective edges or sections of the material along the seam, the sections and/or seams can be heated. FIG. 6 illustrates a heating element 70 including protrusions 71 and 72 that can be heated to heat the edges 31I, 33E1 and 32I, 33E2 so that those components can be thermally bonded to one another. The heating element 70 can be constructed so that it can engage the pocket in either two-dimensional form as shown in FIG. 6, and/or in a three-dimensional form, with the different sections, for example, lateral 31 and 32 and middle 33 sections disposed in a contoured mold that approximates the shape of the finished and ready to assemble lacrosse pocket 10.

The heating element 70 and projections 71 and 72 can be heated to a temperature sufficient to melt and/or soften the material from which the respective sections are constructed. In one example, the heating element can be heated to at least 200°, 300°, 400°, 500°, 600° or more or less depending on the particular material from which the sections are constructed.

III. Method of Manufacture of the Current Embodiment

To manufacture the lacrosse pocket of the current embodiment, the respective sections can be formed and/or cut using die cutting, stamping, laser cutting or other techniques. As formed, the sections can include the above noted edges. The edges of the respective sections can be overlapped, or placed in abutting or engaging relationship relative to one another. For example, as shown in FIG. 6, the edge 31I can be overlapped with the edge 33E1. The edge 32I can be overlapped with the edge 33E2. The heating element 70 applies heat to the edges, optionally via heating projections 71 and 72. Where the edges and/or sections are constructed from a thermoplastic polymer material, the materials of the respective edges and sections melt and/or soften upon the application of heat to thermally bond to one another, thereby forming first and second seams 41 and 42. These seams effectively form seam-runners 41R and 42R which are adapted to guide a lacrosse ball as it exits from the lacrosse pocket.

Where thermoplastic polymer material soften and/or melts, the materials of the respective sections and/or edges can meltingly intermingle with one another, thereby structurally and physically bonding at a molecular level the respective sections and edges along the seams.

Sometimes, the region of the seams can include unbounded or loose portions of the respective edges of these sections. These edges can be trimmed and any excess material along the seams and/or around the exterior of the pocket can be trimmed as well. The pocket, when finished, generally approximates the shape, contour and profile of the pocket when it is to be strung to a head. After construction, the lacrosse pocket can be associated with a lacrosse head and/or packaged for distribution without an associated lacrosse head.

IV. First Alternative Embodiment

Figure 7:
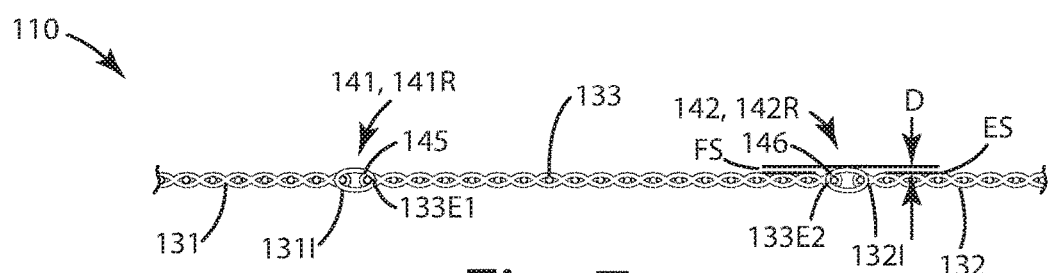
FIG. 7 is section view of a first alternative embodiment of the lacrosse pocket illustrating multiple sections joined at seams formed via stitching.

A first alternative embodiment of the lacrosse pocket is illustrated in FIG. 7 and generally designated 110. The pocket shown there is similar in structure, function and operation to the embodiment described above with several exceptions. For example, at the seams 141 and 142, where the seam-runners 141R and 142R are formed, the sections are joined with stitching. For example, first stitching 145 joins the edge 131I of the lateral pocket portion 131 and edge 133E of the middle pocket portion 133. The stitching 145 is sewn through the respective edges to join them with one another.

Second stitching 146 can be sewn through the edges 133E2 and 132I of the respective pocket sections to join those sections with one another. The stitching 145 and 146 can be in the form of one or more elongated strands of material, separate from the strands or material from which the respective sections 131, 132 and 133 are constructed.

The stitching can be a continuous, elongated strand that is repeatedly looped through the respective edges of the sections to join them with one another. Optionally, the stitching can be in any desired pattern.

As illustrated in FIG. 7, the stitching can extend or be generally raised a distance D above the front surface FS of the respective pocket sections 132 and 133, and optionally 131. This preselected distance D can result in raised stitching above the front surfaces FS and provide distinct raised seam runners 141R, 142R along the seams 141, 142. These seam runners can more easily engage a ball when it is secured within the pocket and/or is exiting the pocket. Depending on the thickness of the strands used for the stitching and/or the particular pattern, this distance D can range from optionally about 0.1 mm to about 8 mm, further optionally about 0.1 mm to about 2 mm, or other distances as desired.

V. Second Alternative Embodiment

Figure 7A:
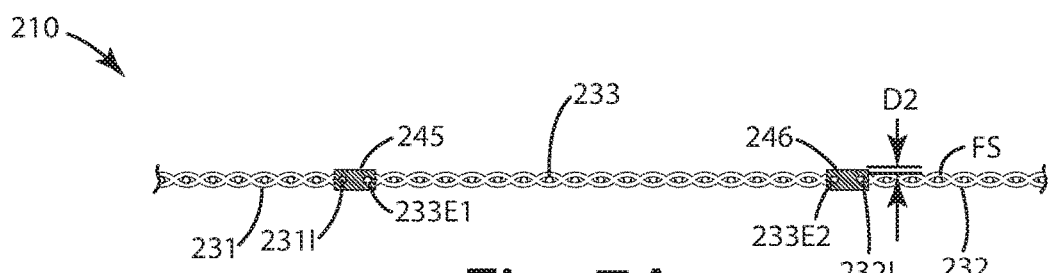
FIG. 7A is a section view of a second alternative embodiment of the lacrosse pocket illustrating multiple sections joined at seams formed with adhesive.

A second alternative embodiment of the lacrosse pocket as illustrated in FIG. 7A and generally designated 210. The pocket shown there is similar in structure, function and operation to the embodiments described above with several exceptions. For example, in this construction, rather than using a thermal bond or stitching, the edges of the different sections are joined with an adhesive. As shown, the inner edge 231I of the lateral section 231 is joined with the edge 233E1 of the middle pocket section 233 with an adhesive 245, which is illustrated in a finished, dried or cured state. The edges, as illustrated, are in close proximity with one another. Alternatively, they can be overlapped or abutted against one another depending on the particular application and the desired adhesive. The adhesive 246 can also join the edges 233E2 and 232I of the respective middle pocket section 233 and lateral pocket section 232.

The adhesives 245 and 246 can be configured so that they are raised above the front surface FS of the different pocket sections a preselected distance D2 to better define the seams and/or seam runners of the pocket. The distance D2 can range from optionally about 0.1 mm to about 8 mm, further optionally about 0.1 mm to about 2 mm, or other distances as desired.

If desired, the adhesives can be formed in predetermined shapes to provide seam runners of a predefined profile. As illustrated, the profile is simply a flat, generally rectangular profile extending upwardly from the front surfaces of the sections. The upper surface of the cured adhesive blocks can be modified to be polygonal, triangular, rounded, curved and/or angled to better define a ball channel between the adhesive blocks 245 and 246.

VI. Third Alternative Embodiment

A third alternative embodiment of the lacrosse pocket is illustrated in FIGS. 8-10 and generally designated 310. The pocket shown there is similar in structure, function and operation to the embodiments described above with several exceptions. For example, the pocket 310 can include fewer sections than the embodiments described above. As an example, the pocket can include only a first lateral section 331 and a second lateral section 332. These lateral sections are disposed on opposite sides of the longitudinal axis LA. These sections as shown in FIG. 9 can include the respective inner edges 331I and 332I similar to those described in connection with the embodiments above, these edges, however, rather than being joined with a middle section, can be joined directly with one another along the seam 341 as shown in FIG. 10. Where they are joined, the seam can be formed via a thermal bond, stitching, adhesive or other means described herein.

The seam 341 can form a seam runner 341R, which can extend upwardly along the longitudinal axis of the pocket and/or head. Though shown as a straight line, the seam 341 and/or seam runner can be of a zigzag, sinusoidal or other configuration extending from the ball stop toward the scoop of the head.

Optionally, in this embodiment, another seam 345 can be formed adjacent the scoop. This seam can effectively form a shooting string to assist in guiding a lacrosse ball as it exits the lacrosse pocket. This seam can be created via the joining of adjacent sections or edges of the pocket. This component can generally be referred to as a seam shooting string. The seam shooting string 345 can extend laterally from the first sidewall toward a second sidewall, optionally spanning the entire width of the lacrosse pocket. This seam shooting string can be of an angular, parabolic or rounded shape with an apex 345A closer to the scoop than to the ball stop.

VII. Fourth Alternative Embodiment

Figure 11:
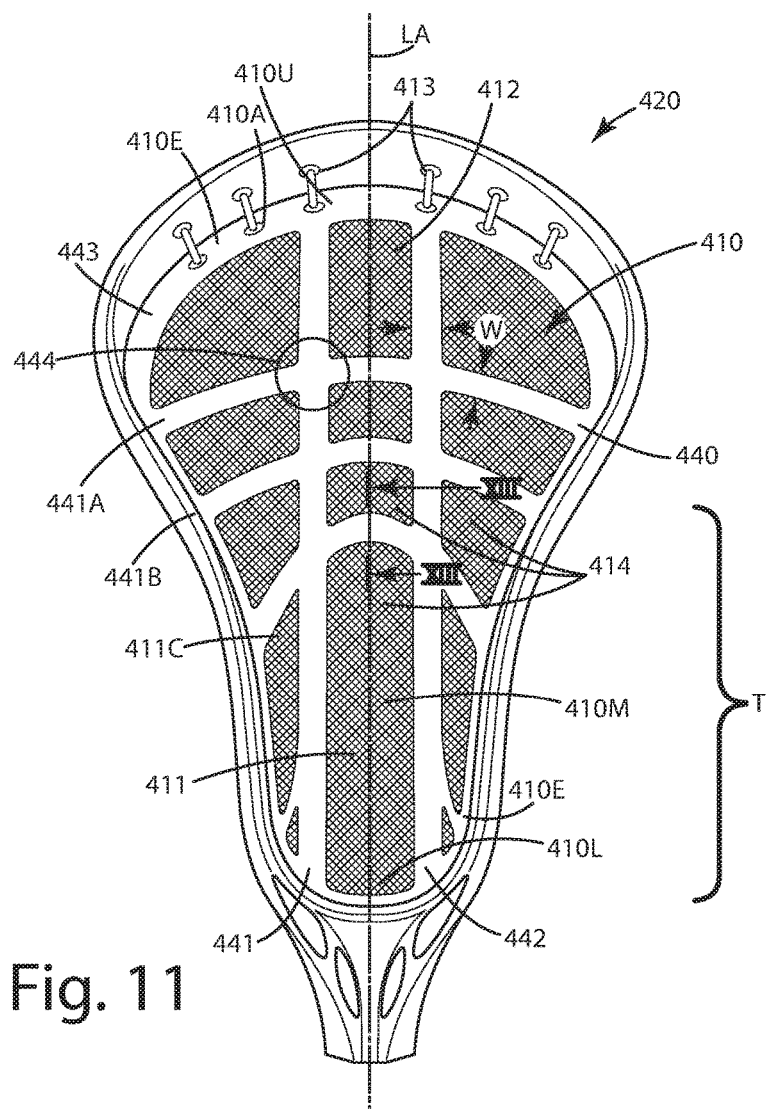
FIG. 11 is a top view of a lacrosse head including a fourth alternative embodiment of the lacrosse pocket.
Figure 12:
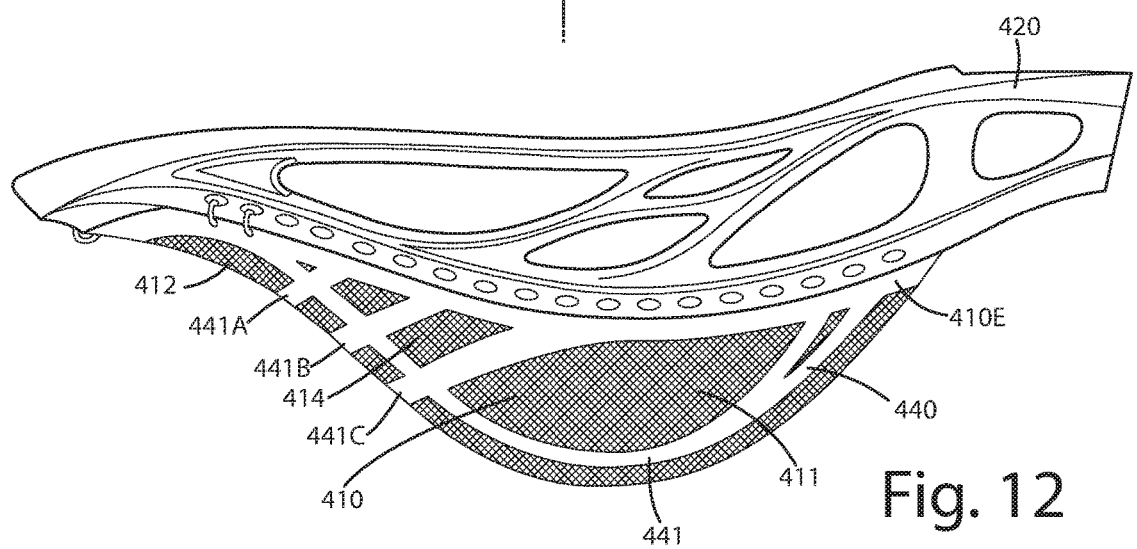
FIG. 12 is a side view of the lacrosse head of the fourth alternative embodiment of the lacrosse pocket.
Figure 13:
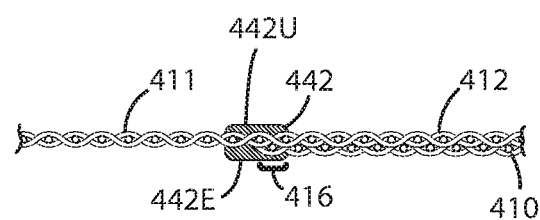
FIG. 13 is a section view of a frame and textile material taken along lines 13-13 of FIG. 11.

A fourth alternative embodiment of the lacrosse pocket is illustrated in FIGS. 11-13 and generally designated 410. The pocket shown there is similar in structure, function and operation to the embodiments described above with several exceptions. For example, in this construction, the pocket can be constructed from a textile material. A textile material is an article manufactured from strands, such as threads cables, yarn, fibers, filaments, cords and other strand like elongated structures. A textile material manufactured from strands optionally can exclude conventional lacrosse mesh. Strands, optionally can exclude large diameter or dimension (greater than 2.0 mm and/or greater than 3.0 mm) laces, thongs or nylon webs that are manually tied or connected to one another or other structures as noted above. Strands can be characterized by their fineness, flexibility and a generally high ratio of length to thickness. Some conventional strands have an indefinite length and can be combined with other strands to produce a yarn for use in textile materials. Some strands include synthetic and/or polymeric materials such as nylon, rayon, polyester and/or polyacrylic compounds. Silk is another type of strand, and in particular, a filament. Textile materials can be produced directly from certain strands by randomly interlocking the same to construct non-woven fabrics and felts. Alternatively, textile materials can be produced through machine implemented mechanical manipulation of strands, thereby producing weaved (woven) and/or knitted material. Optionally, the textile material and/or strands as used herein can exclude common large diameter or dimension (greater than 2.0 mm and/or greater than 3.0 mm) nylon webs, laces, thongs and speed lace loops, as well as leather or polymeric runners.

The textile material from which the pocket 410 is constructed can be produced by manipulating strands, using various techniques implemented on a machine, rather than performed manually, by a human. Those various techniques include knitting, weaving, intertwining and/or twisting. Knitting includes interlooping strands in a series of connected loops, optionally forming multiple columns of loops. In weaving, multiple strands are crossed and interweaved over and under one another at right or other transverse angles to each other at intersections. Strands used in weaving are usually characterized as warp and weft yarns. Intertwining and twisting can include techniques such as knotting and braiding, where strands intertwine with one another. Generally, knitting can encompass intertwining and twisting herein.

As shown in FIG. 11, the pocket 410 is adapted to join a lacrosse head 420 in the same locations and to the same structures of a lacrosse head as noted above in the other embodiments. The pocket can be strung with lacing 413 to the respective portions of the lacrosse head 420. The pocket can be constructed from a unitary textile material 410. This unitary textile material 410 optionally can be in the form of a single material element having a unitary construction, which encompasses a configuration where all the different regions or portions of the textile material are not joined together by seams, stitches, features or other connections, but rather via mechanical manipulation of the strands making up the unitary textile material to join the different regions, for example, the first region 411 and the second region 412, so that those regions are contiguous with one another. While being constructed from a unitary textile material, the different regions have different physical and/or mechanical properties, for example, different elasticity, different stretch, different three dimensional or two dimensional shape(s), different stiffness, different air permeability or flow, different support, different recovery, and/or different rigidity. Further, the strands in the different regions can be constructed from different material to import the different physical and/or mechanical properties. Physical properties, however, generally do not include aesthetic properties, such as color, hue or shading differences from one region to the next. Suitable mechanical manipulations for creating such a unitary textile material are disclosed in U.S. Pat. No. 7,347,011 to Dua, which is hereby incorporated by reference.

The unitary textile material generally extends from an upper portion 410U to a lower portion 410L of the pocket. Between these upper and lower portions is a middle portion 410M of the pocket. Generally, the middle portion 410M is within the throat T of the head which occupies the lower third, half and/or three-quarters of the head 420 as illustrated in FIG. 11.

As noted above, the pocket can include a first region of the unitary textile material 410 that is joined with one or more other regions, for example, a second region 412. The first region 441 can be disposed generally within and/or near the middle portion 410M of the pocket. Optionally, this region 411 can also extend downward to the lower portion 410L of the pocket. The unitary textile material can also include a second region 412 that is located near the upper portion 410U of the pocket, generally near the scoop. This second region also can extend downward toward the middle portion 410M, and can form at least a portion of the pocket adjacent the frame shooting elements 441A, 441B and/or 441C, as described below.

As shown in FIG. 13, the first region and the second region transition smoothly to one another at an intersecting portion 416. In the transition, there is no seam, stitches, or other separately constructed fastener connecting the different regions. Instead, the different regions of the unitary textile material 410 simply transition to one another by modifying the knitting and/or weaving pattern or structure from one region to the next, without adding a separately constructed attachment element to the unitary textile material. Optionally, the first region can be configured to stretch more and the second region can be configured to stretch less.

Although illustrated as a unitary one piece textile material, the pocket can be constructed from multiple ones of such unitary textile materials. For example, first and second different unitary textile materials can be joined with one another along a seam with stitching, such as a continuous strand that extends back and forth between the different materials, joining their edges or other parts at the seam. Each of the different pieces of joined unitary textiles can include different regions having different physical and/or mechanical properties, as noted above. Further, unitary textile materials can be mixed and matched with other materials, for example, sheets of woven or non-woven fabrics, polymeric sheets, composite laminates and other similar constructions.

As mentioned above, the first region and the second region can have a different set of properties. The different regions also can have varied geometric properties, for example, shape, dimension and thickness. Further, the different regions can define different size and shaped holes or openings within and surrounded by knitted and/or woven elements of the textile material. The different properties can enable the different regions of the unitary textile material to have functional variability. As an example of differences between the regions, the first region and the second region can include knit and/or weave patterns that impart a different modulus elasticity; for example, the first region can have a first elasticity that is greater than a second elasticity of the second region. Optionally, the first region can be configured to stretch more and the second region can stretch less.

As used herein, a modulus of elasticity is the measure of the ability to stretch in one or more directions. As a non-limiting example, the unitary textile material 410 can include a non-stretch region, a standard stretch region and a stretch region. These different terms provide a relative measure of elasticity. Therefore, the stretch region can provide greater modulus elasticity than a non-stretch region. Of course, the non-stretch region optionally is not without stretch. Instead, the non-stretch region may be more limited in stretch than the standard or stretch regions of the unitary textile material.

In combination, the different functional regions can provide increased shootability and/or cradling capabilities of the pocket 410 and head 420 in general. For example, the first region 411 can be a stretch region. This can enable a lacrosse ball generally in the middle 410M or lower portion 410L of the pocket to be cradled better. When a player cradles the ball, the increased stretch or elasticity within the first region 411 can allow the ball to seat deeper within the pocket and head. In contrast, the second region 412 can be a non-stretch region, which generally has a lesser level of elasticity than the first region. This second region 412 can be located in the upper portion of the pocket 410U generally toward the scoop. This region can undergo significant forces as the ball is shot from the head. Therefore, this region, being a non-stretch region, can optionally stretch or deform less or minimally when a ball is shot from the head. In turn, this limited stretch can enhance the exit velocity or acceleration of a ball from the pocket and/or reduce the wear within the upper 410U of the pocket.

Although described primarily as including first and second regions, the unitary textile material can include additional regions having different properties. For example, the third regions 414 optionally can be located in certain areas between the first 411 and second 412 regions. These third regions can, for example, be a standard stretch region having a modulus of elasticity that is between that of the first region and the second region. If desired, additional regions can be located elsewhere in the pocket.

As another example, the edges 410E generally surrounding the unitary textile material 410 of the pocket can be constructed to include another region. This region can be a non-stretch region, optionally less elastic than even the first region noted above. In turn, the edges 410E of the pocket can be effectively reinforced to reduce tear through of the lacing 413 that connects the pocket to the head.

The creation of the different regions can be accomplished in a number of manners. In one, different strand manipulation techniques, for example, different knitting and/or weaving patterns can be used to achieve variation in properties. For example, a non-stretch region can be formed from using a twill-like weave. A stretch region can be produced using a satin weave. Where decrease air drag of a lacrosse head is desired, a high airflow region can be produced by using a leno weave, a hatch weave, a slit weave and/or a plain weave. Other weaves contemplated herein include a basket weave, a Jacquard weave, a Rib weave and/or an Oxford weave. Optionally, multiple different layers can be incorporated to achieve the different properties, for example, additional layers can provide reinforcement functionality. Different types of suitable weaves can be better understood with reference to U.S. Patent Application 2014/0173934 to Bell, which is incorporated by reference in its entirety herein.

As shown in FIG. 11, the pocket 410 can be constructed so that it includes a generally flexible frame 440. The frame 440 can be attached to the one or more parts of the unitary textile material. Generally, certain portions of the textile material and its strands are encapsulated by the frame, while other portions of the textile material are not encapsulated by the frame. The flexible frame can be constructed from a polymeric material, such as thermoplastic polyurethane (TPU) or some other thermoplastic polymer material, and/or natural or synthetic rubber which are described above in connection with the embodiments above.

The flexible frame 440 can include multiple components. For example, as illustrated in FIG. 11, the frame can include first 441 and second 442 runners. The runners can extend generally from the upper portion 410U of the pocket downward toward the lower portion 410L. The runners, optionally can be substantially parallel, which means they are either parallel and/or in a range of 0°, less than 5°, or less than 10° offset relative to the longitudinal axis LA. Generally, the runners also run alongside the longitudinal axis LA on the left and right sides thereof. The runners can extend upwardly through the throat T and terminate at the upper portion 410U.

If desired, the runners can be configured to have a consistent thickness from the lower portion 410L to the upper portion 410U. If desired, the thickness can vary along that run. For example, the lower portion 410L in the throat T can have a first thickness that is less than the thickness of runners in the upper portion 410U, generally in the region of the shooting string elements 441A, 441B and 441C. In turn, this can provide greater stiffness to the pocket near the upper portion 410U and also can provide greater flexibility and stretch in the middle portion of the pocket 410M. Optionally, the runners 441 and 442 can be joined with both the first region 411 and the second region 412. The runners also can cooperate with these different regions to provide a desired stiffness to the pocket in these regions.

The runners optionally can be attached to an edge element 410E of the flexible frame. The edge element as illustrated in FIGS. 11 and 12 can extend around the entire edge of the pocket or outer perimeter thereof. This edge element optionally can provide additional reinforcement to the edges of the pocket, particularly where the pocket is laced with lacing 413 to different components of a lacrosse head. The edge element 410E can define one or more apertures 410A through which the lacing 413 is disposed. These apertures 410A can extend through the textile material 410 embedded in the edge element as well. In the regions near the apertures, the frame can be substantially reinforced in the edge element 410E to provide desired hold and tear resistance when excessive forces are exerted on the net.

The frame as shown in FIG. 11 can include one or more shooting elements 441A, 441B and 441C. These elements can extend laterally, crossing the longitudinal axis LA from a left side to a right side of the head. They can be strategically located above or partially within the throat T, and generally forward of the middle portion 410M of the pocket. The shooting elements can be concave or convex toward the base and/or scoop of the lacrosse head to provide desired shooting characteristics from the pocket. The shooting elements 442A, 441B and 441C can optionally intersect the first and second runners at intersections 444. There, the flexible frame can generally be of a unitary thickness with the shooting elements 441A and the runners 441 and 442 optionally being of a similar or same thickness. Of course, in certain applications, the shooting elements 441A, 441B, 441C can be of different thicknesses relative to the runners; for example, they can be thicker or thinner than the thickness of runners. The runners also can be contoured to form a ball channel. For example, the upper surfaces of the runners can include angled, chamfered or rounded surfaces that generally assist in guiding the ball along the longitudinal axis LA when traversing out from the head.

Although shown as a generally uniform width W, the runners and shooting elements can be constructed of varying widths. Indeed, where certain thicknesses are desired, the runners and/or shooting elements can be substantially wider than the other.

As illustrated in FIG. 13, the runners, shooting elements or other portions of the frame can be constructed from a polymeric material. The frame component illustrated 442 generally can encapsulate at least a portion of the textile material. As illustrated, the shooting element 442 substantially encapsulates the portion of the textile material of the first region 411 and the portion of the textile material of the second region 412, optionally where those regions transition to one another at an intersecting portion 416. Optionally, the frame need not be placed precisely over an intersecting portion of a textile element, and can instead be placed entirely within one of the different regions of the unitary textile element.

As illustrated in FIG. 13, the frame can include a front surface 442U and a rear surface 442E. The textile material 410 is embedded within and encapsulated within the frame component 442 between the front 442U and rear 442E surfaces. In some cases of course, the portions of the textile material can be reflected through and actually extend through portions of the upper or lower surface where desired. This can be acceptable on the outside or exterior of the pocket, but generally can present issues if the fabric is in a high wear location and projects through the front surface 442U of the component 442. Further, the illustrated portions of the flexible frame 442 encapsulating the textile material can be any of the different frame components. For example, the runners, the edge element and/or the shooting elements can be bonded to and encapsulate the textile material. Generally, the frame provides preselected stiffness to the textile material where it encapsulates the same. That stiffness can optionally vary from region to region of the textile material. Where the frame is disposed along an intersecting portion of the textile material, that material can be encapsulated by and/or embedded within the polymeric material forming the frame component.

A method for manufacturing the lacrosse pocket of the fourth alternative embodiment will now be described. Generally, the unitary textile material can be constructed from multiple strands. These strands can be manipulated to form the textile, for example, by weaving or knitting (which can encompass intertwining and/or twisting) the strands. As the textile material is constructed, the first, second and any other regions, having different sets of properties as described above, are formed integrally within the unitary textile material. In most cases, the first and second regions are not stitched, adhered, glued or otherwise fastened to one another. Instead the structure of the unitary textile material joins the different regions at some intersecting portion as described above, so that the different regions are contiguous and uninterrupted.

With the unitary textile material formed, the pocket can be shaped, which means it can undergo the action of cutting, trimming, shearing, etching, burning, melting or otherwise being removed from a larger piece to form the outline of a lacrosse head pocket. The shape can be selected to fit particular head configurations and/or provide other functional performance characteristics.

The pocket is formed with the upper portion 410U, the lower portion 410L and the middle pocket portion 410M. These different components can include different elasticities or other properties to provide desired performance characteristics as explained above.

The textile material 410 can be placed in a mold having a plurality of cavities mimicking a frame as described above. Polymeric material is injected into the mold cavities and flows around and/or through different components of the textile material. Generally, the polymeric frame material encapsulates some portions of the textile material and does not encapsulate other portions of the textile material. The polymeric material is then allowed to cure within the mold. In so doing, it forms the runners, edge element, shooting elements and other components of the frame.

Optionally, the mold can be configured in the same shape as the finished pocket. For example, with reference to FIG. 12, an interior mold cavity of a mold can be of the same shape as the pocket 410 and runners and frame 440 shown there. Thus, when the pocket is formed, it includes three dimensional contours, rather than being a flat, planar configuration.

After the frame cures, the pocket 410 can be removed from the mold. Again, where it is formed in a three dimensional form, the frame can generally continue to hold the pocket in its three dimensional form. The pocket can then be attached directly to a lacrosse head using lacing 413.

VIII. Fifth Alternative Embodiment

Figure 14:
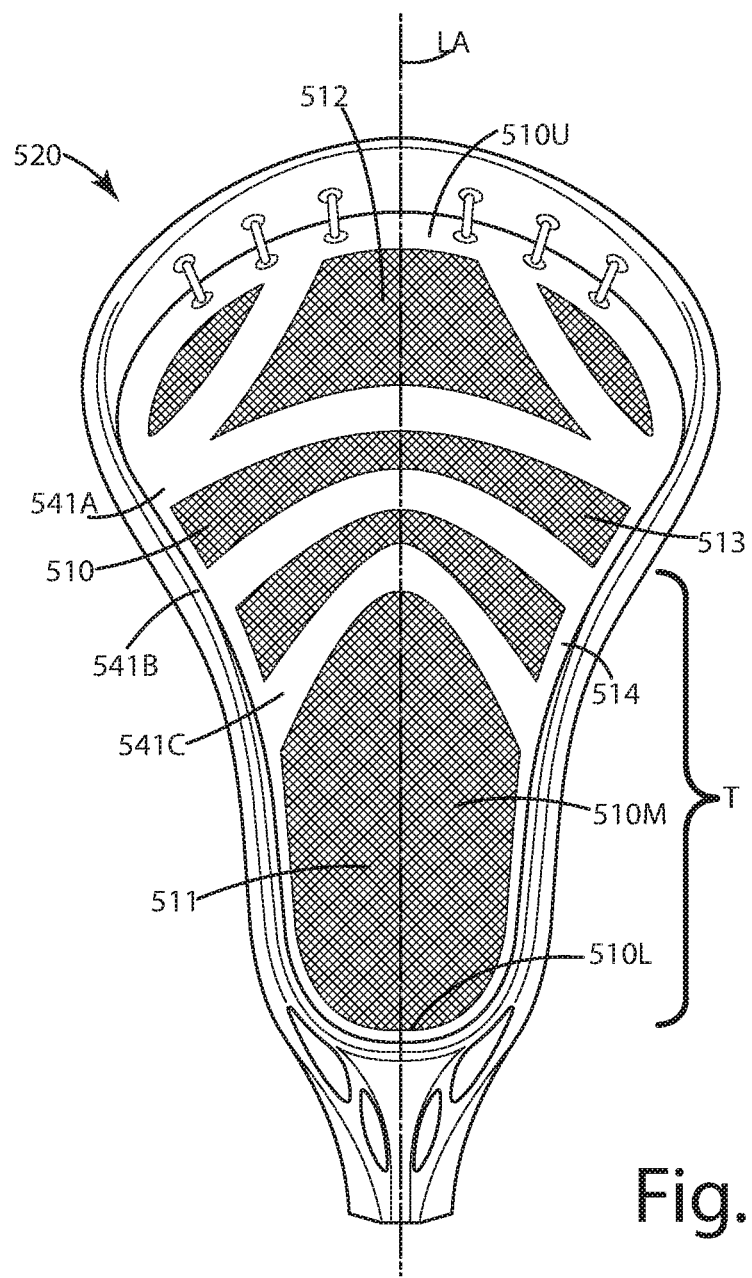
FIG. 14 is a top view of a lacrosse head including a fifth alternative embodiment of the lacrosse pocket.

A fifth alternative embodiment of the lacrosse pocket is illustrated in FIG. 14 and generally designated 510. The pocket shown there is similar in structure function and operation of the embodiments described above with several exceptions. For example, the pocket 510 is also constructed from unitary textile material having different regions. There can be a first region 511 located in the throat T of the pocket and/or head. The first region 511 can correspond to the middle of the pocket 510M and extend to the lower portion 510L of the pocket. The second region 512 can be located near the upper portion 510U of the pocket.

This embodiment, however, does not include conventional runners. Instead, it includes multiple shooting elements 541A, 541B and 541C. These elements can generally be of a convex or concave configuration generally pointing toward or away from the scoop and/or base, depending on a particular application. Between each of these elements, additional third 513 and fourth 514 regions of the textile material can be disposed. These additional regions 513 and 514 can offer a transition between the first region 511 and second region 512. For example, the first region 511 may be a stretch region having a high elasticity, whereas the second region 512 may be a non-stretch region having a very low elasticity. The third and fourth regions 513 and 514 can have elasticities between that of the first region and the second region to provide a ramped transition between those different regions. Additional regions having different properties can also be implemented in this embodiment. The unitary textile material 410 can include strategically placed functional regions, such as stretch regions. Further, there may be combinations of stretch, non-stretch and standard stretch regions strategically placed throughout the unitary textile material.

IX. Sixth Alternative Embodiment

Figure 15:
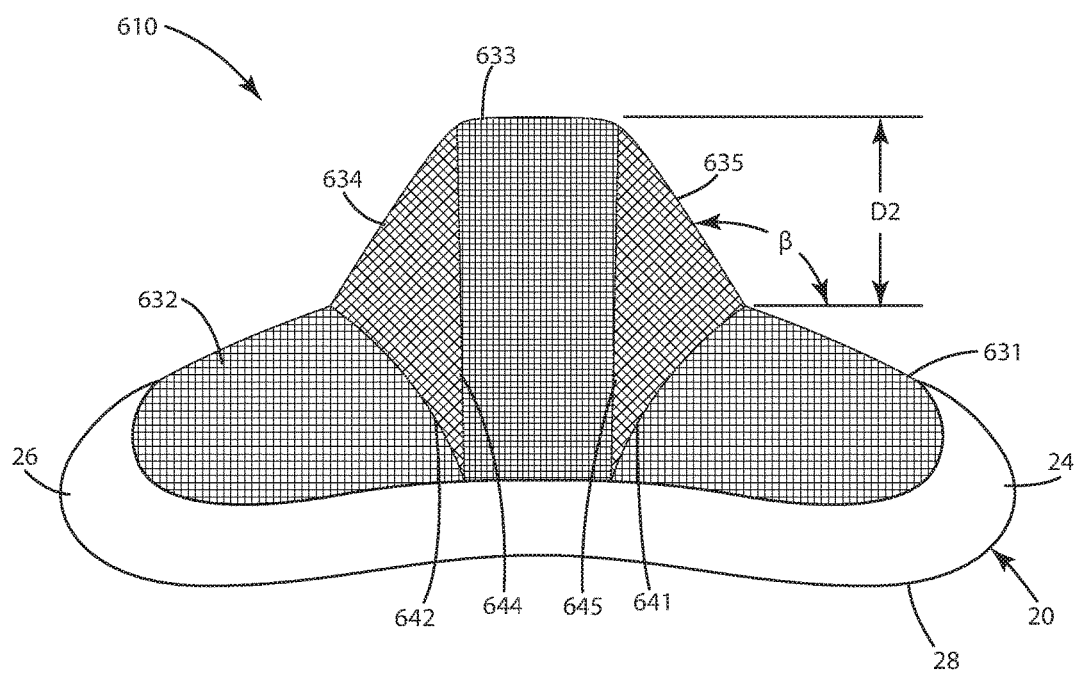
FIG. 15 is an upper view of a lacrosse head including a sixth alternative embodiment of the lacrosse pocket.
Figure 16:
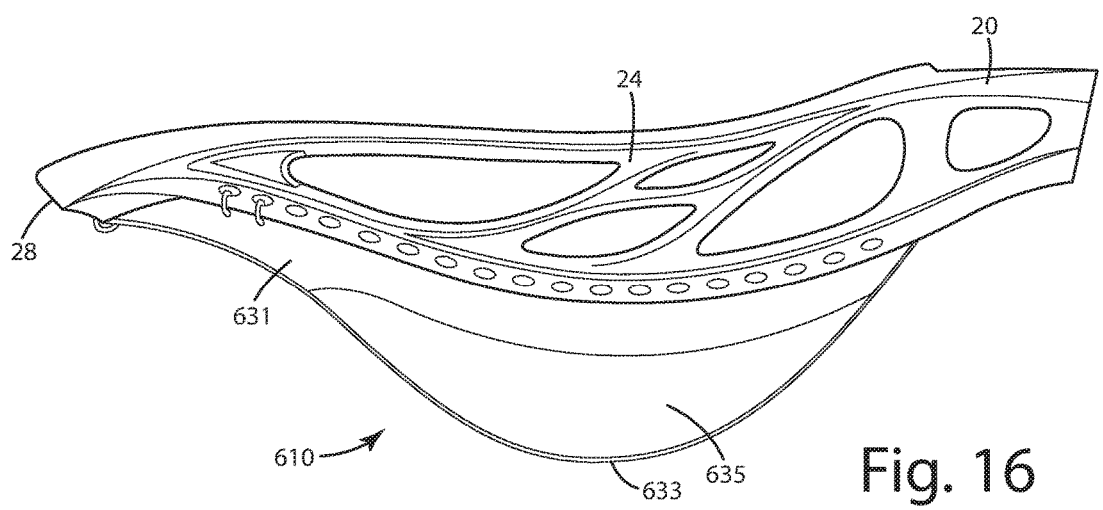
FIG. 16 is a side view of a lacrosse head including the sixth alternative embodiment of the lacrosse pocket.
Figure 17:
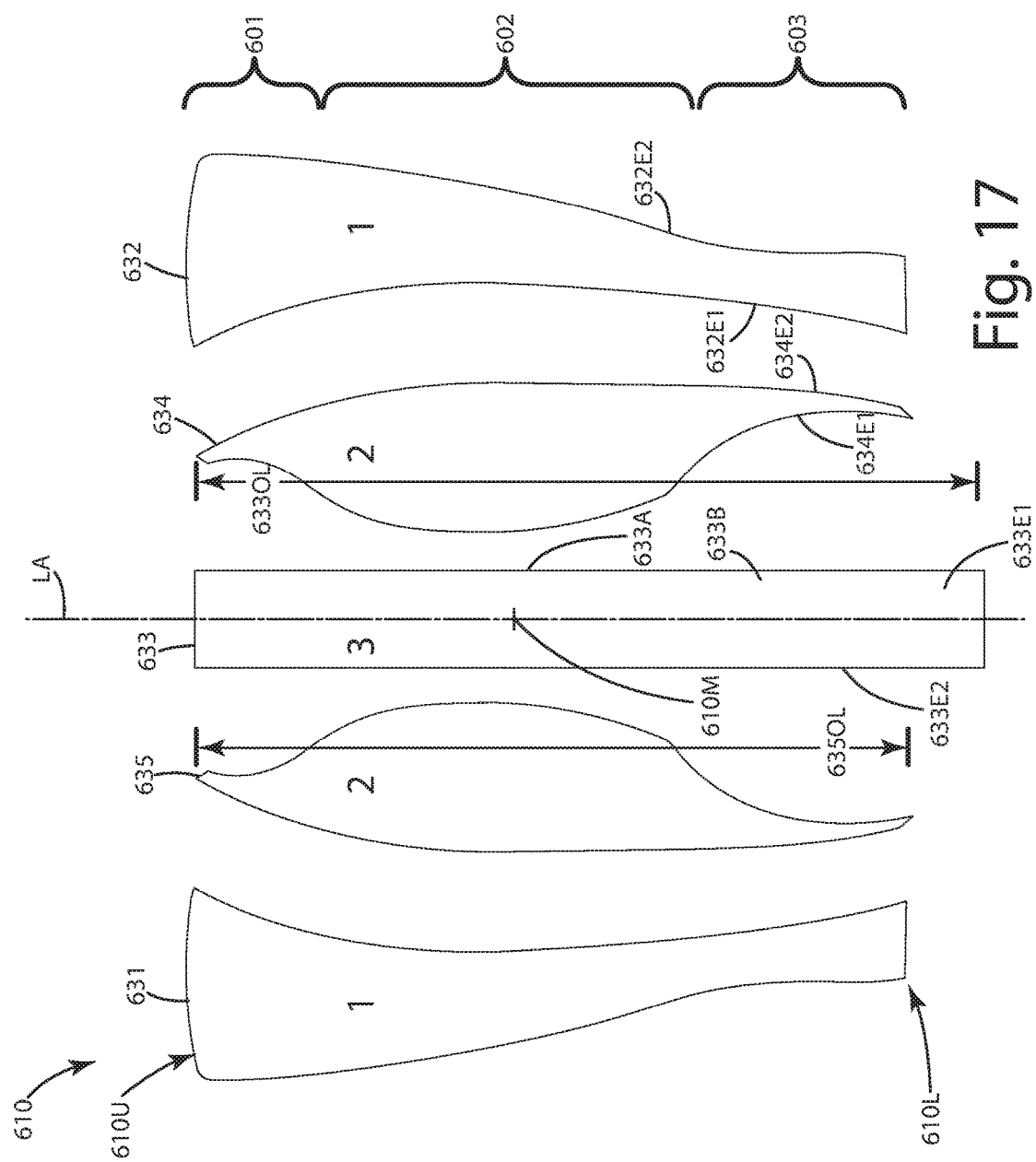
FIG. 17 is an exploded top view of multiple sections of the sixth alternative embodiment of the lacrosse pocket.

A sixth alternative embodiment of the lacrosse pocket is illustrated in FIGS. 15-17 and generally designated 610. The pocket shown there is similar in structure, function and operation to the embodiments described above with several exceptions. For example, the pocket 610 can be constructed to include multiple sections, namely a middle pocket section 633 which is flanked on opposing sides by a first lateral section 631 and a second lateral section 632. Between the middle pocket section 633 and the lateral sections 631 and 632, intermediate sections 635 and 634, respectively, can be disposed. These different sections can be constructed from a textile material, such as those described in the embodiments above. All the sections can be part of a same, contiguous, uninterrupted unitary textile material, as described in connection with the fourth alternative embodiment above, or alternatively, each section independently can be constructed from a unitary textile material, with the different sections joined along one or more seams. Further, each section can include different regions having different physical and/or mechanical properties within one or more of the different sections.

Optionally, as shown in FIGS. 15 and 17, the middle pocket section 633, intermediate pocket sections 634, 635 and first and second lateral sections 631 and 632 can be constructed separately from different materials such as those described in connection with the embodiments above. These different materials can be joined at seams, which can correspond to the number of edges of the different sections that are joined together. For example, as shown in FIG. 15, the lateral sections 631 and 632 are joined with the intermediate sections 635 and 634 via the seams 642 and 641, respectively. Such seams can be located at the respective edges of the different sections. A first lateral edge 633E1 of the middle pocket section 633 can be joined with the first lateral edge 634E1 of the intermediate section 634. At this seam, those edges can be joined with one another via thermal bonding along seams as described in connection with the embodiments above, adhering and/or stitching the different sections together. Alternative constructions for joining these different sections at these edges can be utilized as well. Optionally, as described above where the entire pocket is constructed from a unitary textile material, these different sections can be constructed so that there are no edges due to the unitary structure being one piece and melding the different regions of the same textile material together.

The different structural sections can be joined with one another to provide different functional aspects in different regions of the pocket. For example, the first lateral section 631 and second lateral section 632 can have different properties than other sections. As a further example, these first and second lateral sections 631 and 632 can include a first modulus of elasticity. The middle pocket section 633 can include the same modulus of elasticity. In contrast, however, the intermediate sections 634 and 635 can include a second modulus of elasticity. The second modulus of elasticity can be greater than the first modulus of elasticity of the first and second lateral regions and the middle pocket portion 633. As yet a further example, the first and second lateral sections 631 and 632, and the middle pocket section 633 can be in the form of a non-stretch region and/or standard stretch region, as described in connection with the embodiments above. The intermediate sections 634 and 635 however, can be constructed in the form of a stretch region, as described in the embodiments above. This can enable the first and second lateral portions and the middle pocket section to provide some level of rigidity to the pocket in regions where it is so desired. It also can enable the first and second intermediate regions to stretch and give as desired to provide enhanced ball retention within the pocket.

Optionally, the pocket along its length, from the upper portion 610U to the lower portion 610L, or longitudinal axis LA can be segregated into different areas including different stretch, non-stretch and/or standard stretch regions when taken along a line running left to right across the longitudinal axis LA. As an example, pocket 610 can include a first area 601, a second area 602 and a third area 603 along the longitudinal axis LA.

The first area 601, second area 602 and third area 603 can be disposed along different portions of the length of the pocket along the longitudinal axis. As an example, the first area 601 can be located along a first quarter to a first third of a longitudinal axis LA extending away from the scoop. The second area 602 can be about one-third to one-half the length along the longitudinal axis LA. The third area 603 can be about a last quarter to a last third of the length along the longitudinal axis LA of the pocket. Of course, these different areas can be altered in location and the amount that they occupy along the longitudinal axis LA, depending on the particular function and characteristics of the pocket.

The first area 601, near the upper portion 610U, corresponding to a region near the scoop, can be less stretchable, or generally less elastic, to improve shooting capabilities from the end of the lacrosse head. To achieve this level of elasticity across the region, the first and second lateral sections 631 and 632, and the middle pocket section 633 can comprise optionally 60% to 95%, further optionally 65% to 85%, even further optionally 75%, of the material spanning from left to right across the pocket generally perpendicular to the longitudinal axis LA. The intermediate sections 634 and 635, which can be constructed from a more stretchy stretch material having a higher modulus of elasticity than the other sections 631, 632, 633 can comprise a smaller proportion of the material in that area 601. For example, the intermediate sections can collectively comprise optionally 5% to 40%, further optionally 10% to 30%, even further optionally 25% when taken across a line or plane that is perpendicular to the longitudinal axis LA.

The second area 602 can include more stretch material or the sections 634 and 635 can comprise a larger portion of material taken along a line perpendicular to the longitudinal axis LA within that area 602. For example, taken through a middle pocket region 610M, the pocket in area 602 can comprise 30% to 70% of non-stretch or standard stretch material, located in the first and second lateral sections 631 and 632 and middle pocket section 633. The intermediate sections 634 and 635 can make up the balance of that amount, ranging from 70% to 30%. Optionally, there can be more stretch material or sections with higher elasticity within the second area 602 than non-stretch or standard stretch material or sections. This can enable the area 602 of the lacrosse pocket to be more stretchable, which can facilitate cradling of a lacrosse ball near the center or middle region 610M of the pocket.

The third area 603, near the lower portion 610L, corresponding to a region near the base, can be less stretchable, or generally less elastic, to improve shooting capabilities from the end of the lacrosse head. To achieve this level of elasticity across the region, the first and second lateral sections 631 and 632, and the middle pocket section 633 can comprise optionally 60% to 95%, further optionally 65% to 85%, even further optionally 75%, of the material spanning from left to right across the pocket generally perpendicular to the longitudinal axis LA. The intermediate sections 634 and 635, which can be constructed from a more stretchy stretch material having a higher modulus of elasticity than the other sections 631, 632, 633 can comprise a smaller proportion of the material in that area 601. For example, the intermediate sections can collectively comprise optionally 5% to 40%, further optionally 10% to 30%, even further optionally 25% when taken across a line or plane that is perpendicular to the longitudinal axis LA.

The different sections as mentioned above can include different modulus of elasticity. Of course, these different sections can also have other or additional different physical and/or mechanical properties, for example, different elasticity, different stiffness, different air permeability or flow, different support, different recovery and/or different rigidity as described in connection with the embodiments above.

It is further contemplated that the pocket of this embodiment can include different sections formed as a unitary structure having different regions that themselves have different properties. For example, the middle pocket section 633 can include a first region 633A and a second region 633B. While the entire section 633 itself can be constructed from a unitary textile material, the different regions 633A and 633B can have different physical or mechanical properties such as those mentioned above.

As a more particular example, the first region 633A can include a first elasticity that is less than a second elasticity of the second region 633B. Thus, along the longitudinal axis LA, the middle pocket section 633 can be divided into different regions having different properties, and in particular, different elasticities. Of course, other sections can include or be constructed from a different piece of a unitary textile material as well, and those other unitary textile materials can include different regions having different properties such as elasticity, stretch, rigidity, stiffness and the like as described in connection with the embodiments above. These different materials can be joined at seams, using thermal bonding, adhesives, stitching and/or a frame as described in the embodiments above. Optionally, the different regions 633A and 633B can have different properties via a combination of different types of strands constructed from different material within those regions. For example, the region 633A can be comprised of strands constructed from an aramid that is knitted or weaved to or from a portion in that region of the continuous unitary textile. These strands can be knitted and/or weaved unitarily with strands constructed from nylon in the region 633B. Due to the relative inelasticity of the aramid strands, that region can be less elastic than the region 633A having the nylon strands. As another example, the region 633A can be constructed to include a more open, or open knit or weave structure. In other words, this region can be less dense and can have a strand density that is relatively low compared to the strand density in the region 633B. The other region 633B can be less elastic than the region 633A, even though these two regions are unitarily formed with one another and part of a unitary textile material.

It is also contemplated that the different sections 631, 632, 634, 635 and 633 can be integral with one another forming different portions of the same, one-piece unitary textile material as described in connection with the embodiments above. In such a construction, however, a frame described in the embodiments above, can be strategically associated with and/or segregate the different sections. If desired, the frame came be constructed from the same polymeric material above, which can optionally physically encapsulate the different portions of the different sections. If desired, the frame can be located in the regions along different intersecting portions of the different sections.

Of course, the frame can crisscross different sections, form shooting strings and/or runners or the like, depending on the desired attributes of the frame. In one particular example, the frame can extend along the edges 633E1 and 633E2 of a middle pocket portion 633 along the entire length of the longitudinal axis. Thus, the frame can form runners in this location to assist in guiding the ball out of the lacrosse head when it is shot or passed. Optionally, the frame can be located in other regions and further optionally around the outermost edges of the different sections to provide a solid connection piece for the pocket to be joined with a lacrosse head or to form lace holes in that part of the frame and/or pocket sections.

The different sections as illustrated in FIGS. 15 and 17 can have different functions. For example, the first and second lateral sections 631 and 632 can extend laterally inward toward the longitudinal axis LA generally away from the sidewalls 24 and 26. These sections can, particularly in the area 601, be generally planar or slightly concave when viewing the top of the pocket. In turn, the area 601 can be relatively flatter than the second area 602 and/or the third area 603. The intermediate sections 634 and 635 can be formed and sized to provide a depth D2 of the pocket particularly in the second area 602, near the middle region 610M of the pocket. These intermediate sections 634 and 635 can also be sized and configured to form a specific angle β between them and the adjacent first and second lateral sections 531 and 532, respectively. This angle β, as well as the depth D2, can be selected to provide a desired depth and angle of a channel within the pocket 610 from which the ball is launched. The angle β can range from 90° to 180°, further optionally 70° to 120°, even further optionally 45° to 60°, depending on a particular application and the desired depth and length of the ball channel.

The respective intermediate portions 634, 635 can be joined with the middle pocket section 633 at their innermost edges closest to the longitudinal axis LA. The middle pocket section itself can create a track within which a lacrosse ball travels as it is shot or passed from the lacrosse head to which the pocket 610 is attached. Generally, the middle pocket section 633 can form a substantially continuous yet curved surface from the upper portion 610U of the pocket 610 to the lower portion 610L of the pocket. This section can be substantially planar from left to right across the longitudinal axis LA, but can undulate or form curves along or parallel to the longitudinal axis LA. In some cases, middle section 633 also can be of a longer overall length 633OL when laid flatter than the respective intermediate pocket sections and/or lateral pocket sections of overall length 635OL so that the intermediate pocket section can be joined with edges of those sections respectively.

Further, although shown with only a single set of intermediate sections 634 and 635, this embodiment can be outfitted to include multiple different intermediate sections. These intermediate sections can vary in elasticity or other physical and/or mechanical properties from the middle pocket section 633 outward away from the longitudinal axis LA. Alternatively, the intermediate sections can be divided into different portions along the longitudinal axis LA.

A method for manufacturing the lacrosse pocket 610 of the sixth alternative embodiment can be similar to the manufacturing methods of the other embodiments herein, and accordingly will not be repeated in detail here. Suffice it to say that the different sections 631, 632, 634, 635 and 633 can be formed as different regions within a unitary textile material, or optionally formed as different, separately constructed pieces of material, whether unitary textile material or otherwise. These components can then be joined to form a new pocket. In this joining, the depth and respective angles of the ball channel and different features of the pocket can be formed. Where the sections are constructed from different, separate pieces, those pieces can be joined via thermal bonding, adhering and/or stitching the different pieces along seams. If desired, a frame or a polymeric material can be molded over and encapsulate different portions of the respective sections and/or regions, similar to the other embodiments herein.

X. Seventh Alternative Embodiment

Figure 18:
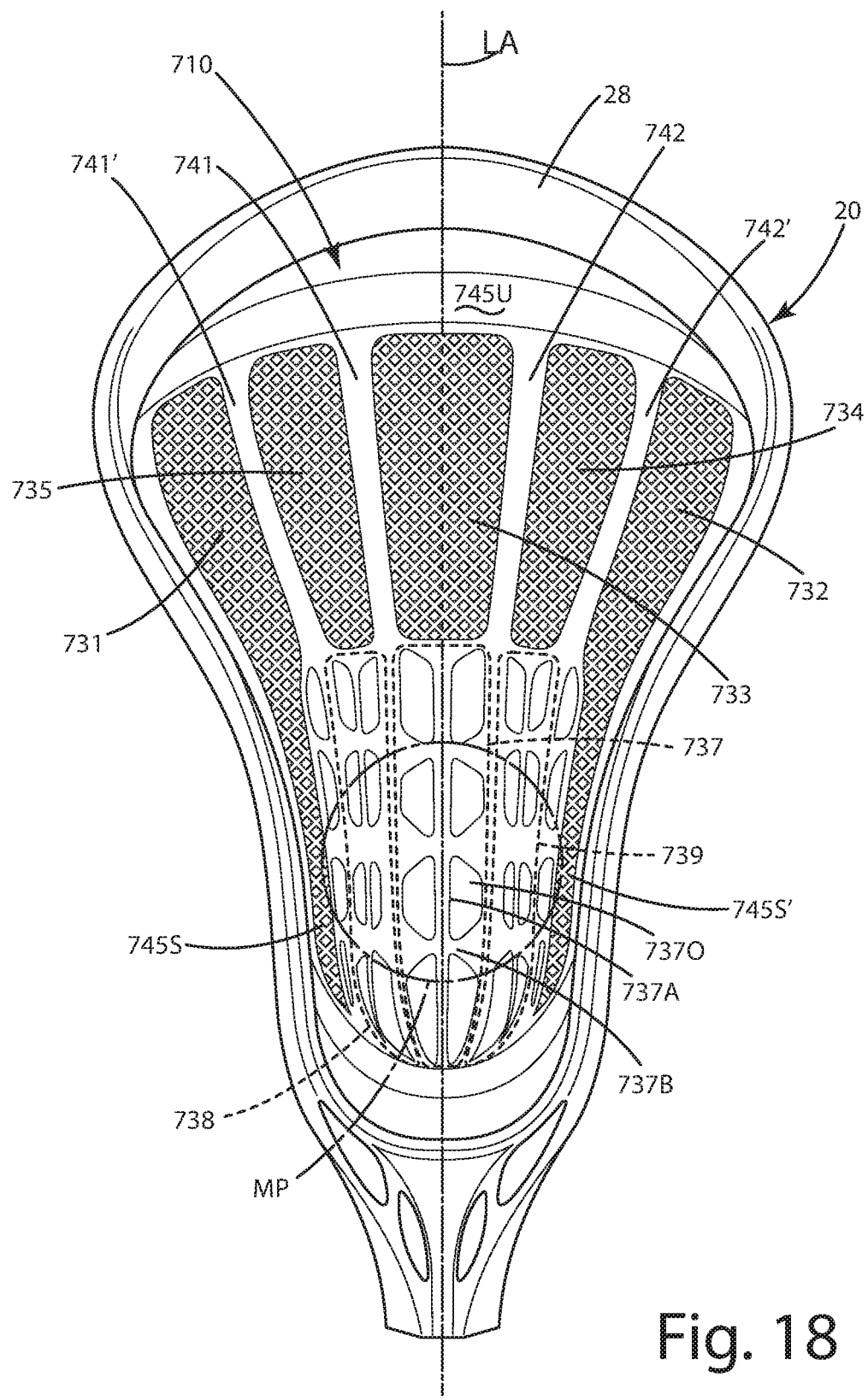
FIG. 18 is a top view of a lacrosse head including a seventh alternative embodiment of the lacrosse pocket.
Figure 19:
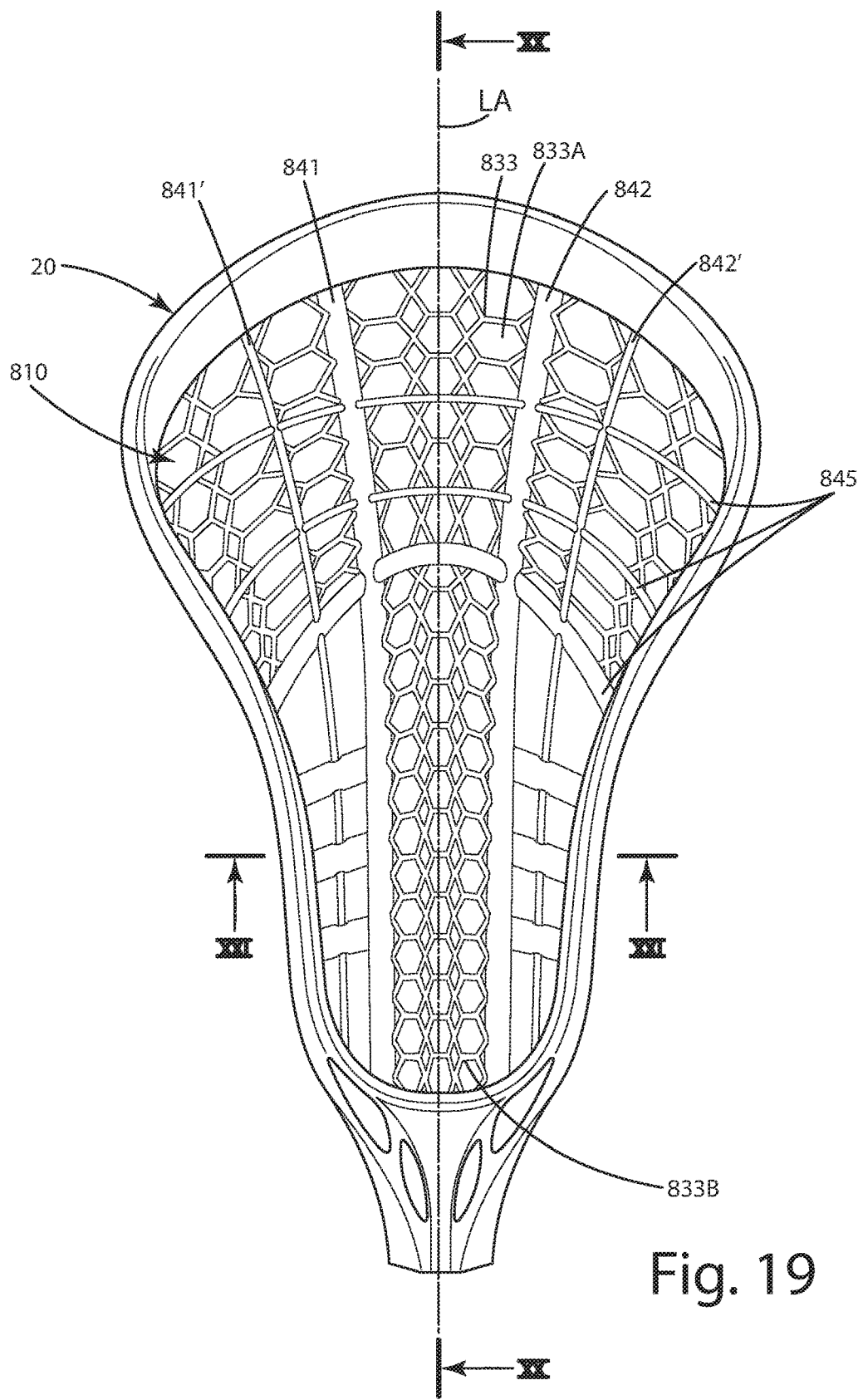
FIG. 19 is a top view of a lacrosse head including an eighth alternative embodiment of a lacrosse pocket.

A seventh alternative embodiment of the lacrosse pocket is illustrated in FIG. 18 and generally designated 710. The pocket shown there is similar in structure, function and operation to the embodiments described above with several exceptions. For example, the pocket 710 can be constructed to include multiple sections, namely runner pocket sections 741, 741', 742, and 742', perimeter portion 745S which corresponds to one side wall, 745S' which corresponds to the other side wall, and 745U which corresponds to the upper portion of the pocket adjacent the scoop 28 of the lacrosse head 20. All of these sections, for example the runners 741, 741', 742, 742', perimeter portions 745S, 745S' and 745U can all be constructed from a textile material which itself is constructed from strands such as those described in the embodiments above. All of the aforementioned sections can be of the same type of weave, knit or structural pattern and can exhibit desired physical and/or mechanical properties, and thus related performance characteristics. For example, these portions can be stretch, non-stretch and/or a standard stretch region as explained in embodiments above. Further each of these different sections can be part of the same contiguous unitary textile material, for example, as described in connection with the fourth alternative embodiment or sixth alternative embodiment above. Of course, alternatively each of the aforementioned runner sections 741, 741' 742, 742' and perimeter sections 745S, 745S' and perimeter section 745U can be constructed each from its own unitary textile material with the different sections joined along one or more seams, being sewn or joined with some sort of seam material such as those described in the embodiments herein.

The pocket 710 also can include secondary filler sections such as 731, 735, 734, or 732. Secondary filler section 731 can be disposed between the perimeter section 735S and runner 741'. Secondary filler section 735 can be disposed between runner 741 and 741'. Secondary filler section 733 can be disposed between runners 741 and 742. Secondary filler section 734 can be between the runners 742 and 742', and section 732 can be between the runner 742' and the sidewall perimeter 745S'. These different sections, for example the middle section 733 disposed between the textile runners 741 and 742 can exhibit a lower elasticity or stretch than other sections of the pocket, such as tertiary section 737, and yet be more elastic or stretchable than the runners 741, 742 and/or perimeter portions 745S, 745S'. The secondary filler sections also can be more open, and have a greater hole density than the respective runners. Generally the different materials in the different sections and/or runners can exhibit different material properties. Again, they may be more open to allow air to flow therethrough and/or may be more or less stretchable than other portions of the pocket. In this manner, these sections can elastically deform and/or stretch to facilitate better ball handling.

Optionally, the secondary filler sections 731, 732, 734, and 735 can all be constructed from the same textile material as the runners 741, 741', 742, 742' 745S, 745S'; however, each of the sections can have different knit and/or weave patterns or textures as mentioned above.

As shown in FIG. 18, and mentioned above, the pocket 710 can include one or more tertiary sections 737. Such sections can be a hybrid between the runners 741 and 742, and the secondary filler section 733. As an example, the tertiary section 737 can include major 737A and minor 737B sections that crisscross and/or intersect one another, leaving large open apertures 737O between adjacent ones of those components and/or the respective runners 741 or 742. Generally, the openings 737O are at least 2, 3, 4, 5, 10, or 20 times larger than the openings defined by the secondary filler portions, for example, the middle section 733. The tertiary section also can be isolated to the lower half or third of the pocket 710, generally forming a portion of the pocket that can cradle a ball when a ball is located in the lacrosse head and/or pocket. The respective outer perimeter portions 745S and 745S' flank these tertiary portions and/or the runners on left and right sides of the pocket and can generally be disposed adjacent to the side walls. Optionally these sections 731 and 732 can be disposed between the runners 741' and 742' and the respective outer perimeter portions 745S and 745S', to provide some elasticity and flexibility between those respective components.

As another example, the middle pocket MP of this embodiment can be comprised of multiple different sections of a unitary textile material, all including different physical and/or mechanical properties, and associated performance characteristics. The middle pocket MP can include the outer perimeter portions 745S and 745S', which transition to a generally vertical secondary filler portion 731. This secondary filler portion can be more flexible, elastic or stretchable than the perimeter portion 745S and can aid in hugging a ball located in the middle pocket MP. This secondary filler section 731 can transition to the runner 741 which can include the same textile material, but including a different density, pattern and/or texture. Optionally, the runner can be more densely knitted and less stretchable or elastic than the secondary filler portion. Between the runner 741' and the other runner 741, an additional tertiary section 738 can be disposed. As mentioned above, this section, for example in the middle pocket, can be somewhat more open and even more stretchable than the runners and/or secondary section. This tertiary section can transition to yet another runner 741, another tertiary section 737 and yet another runner 742 across the middle pocket MP. From there, the pocket can include yet another tertiary section 739 constructed from the same unitary textile material, but including the more open pattern than the respective runners. That tertiary section 739 can transition to yet another secondary filler section 732, which is similar to and includes similar performance characteristics as the section 731 on the opposite side. Thus, while including a single unitary textile material, the middle pocket MP can include different regions of that material that are structured, patterned and/or textured differently to provide different performance characteristics. Other portions of a lacrosse pocket can likewise be constructed from the unitary textile material, with different physical and/or mechanical properties and associated performance characteristics and/or attributes associated with different regions or sections of the pocket.

XI. Eighth Alternative Embodiment

An eighth alternative embodiment of a lacrosse pocket is illustrated in FIGS. 19-22 and generally designated 810. The pocket shown there is similar in structure, function and operation to the embodiments described above with several exceptions. For example, pocket 810 can be constructed from a textile material, with all the different components being part of the same contiguous unitary textile material, as described in connection with the fourth and sixth embodiments above. As an example, each of the runners 841, 841', 842, 842' can be constructed from the textile material having a common knit or weave pattern, density and associated physical mechanical properties, as well as associated performance characteristics. Other sections of the pocket, such as the shooting strings 845 can also be constructed from a similar type of material with a similar pattern and associated performance characteristics. The other sections disposed between respective runners and/or sidewalls, for example, middle section 833 can be constructed from the textile material, except with the structural pattern of material in that region being substantially more open so that multiple openings are formed within that region, which in turn can alter performance characteristics. As a further example, the middle section 833 can be constructed to include different upper 833A and lower 833B portions between the respective runners 841 and 842. In the upper section 833A generally above the lowest shooting string, this region can be relatively taut to hold the shape of a shooting ramp between the runners 841 and 842. Generally, this section can be inelastic. The lower section 833B, however, can be of a more open knitted, woven or mesh configuration so that this pocket portion forms part of the ball channel but is generally flexible and supple. It also can flow or sway from left to right relatively easily, and is adapted to hug a lacrosse ball disposed in that portion 833B.

Figure 20:
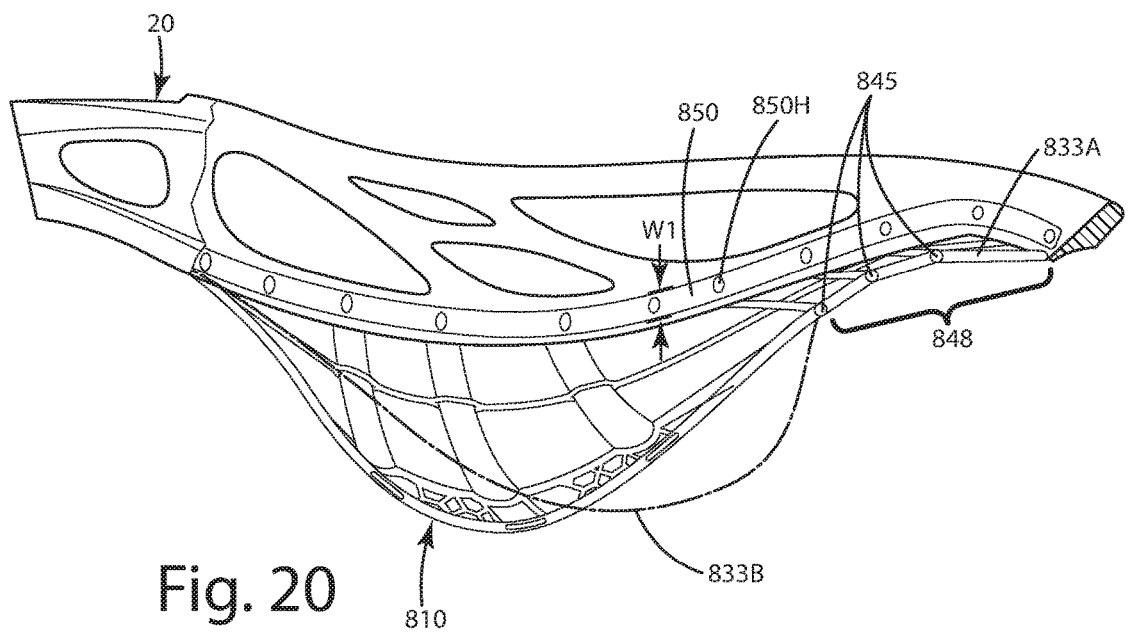
FIG. 20 is a section view of the eighth alternative embodiment of the lacrosse pocket taken along lines 20-20 of FIG. 19.

FIG. 20 shows a side perspective cross section taken along lines 20-20 of the pocket 810. In this figure, the pocket 810 is illustrated in varying configurations, showing movement of certain portions of the pocket. As an example, the lower pocket section 833B moves relative to the upper pocket section 833A. As shown in solid lines in FIG. 20, the pocket is in its relaxed state, which would correspond to a ball being held in the pocket. As shown in the broken lines, the pocket is illustrated as swaying toward and away from the scoop. As mentioned above, this portion of the pocket 833B under the shooting strings can be more flexible and less taut than the region above the shooting strings 845. The section 833A at or above the shooting strings remains generally taut so that this corresponding feature of the unitary textile material can engage the ball and propel it consistently in a desired direction. Optionally, the section 848 above the shooting strings again can be generally taut.

As further illustrated in FIG. 20, the pocket 820 includes a reinforced perimeter element 850. This reinforced perimeter element can be in the form of a binding that is constructed from a sufficiently wide portion of the unitary textile material. In this region, the textile material can be of a more dense pattern than the other regions. The reinforced perimeter element can be integral and contiguous with the remainder of the unitary textile material. The reinforced perimeter element 850 also can include a predetermined width W1, which can optionally be 0.5 mm to 5.5 mm, further optionally 1 to 3 mm, and even further optionally 2 mm. Respective net holes 850H can be defined entirely within that width W1 without substantially weakening the top or bottom portion of that reinforced perimeter element 850. If desired, the region immediately adjacent the holes 858 can be knitted in closed loops so that the hole includes no free ends of strands extending outwardly into the hole which optionally could compromise the integrity of the reinforced perimeter element 850.

The reinforced perimeter element 850 is configured to provide a strong, consistently formed, shaped and contoured portion that can be joined directly with the lower side walls of the head 20. In one optional construction, a user can align the holes 50H of the reinforced perimeter element 850 with the net holes defined by the lower rail of the head 20. The user can insert lacing through both holes and then optionally continuously lace the reinforced perimeter element or binding directly to the rail.

In other optional constructions, the reinforced perimeter element 850 can be molded directly into the bottom of the sidewall and held there in place via the action of the material from which the lacrosse head is made, encapsulating and embedding itself permanently within the textile material from which the reinforced perimeter element 850 is constructed. The remainder of the textile material, however, can be encapsulated by the material from which the lacrosse head 20 is constructed, such as nylon or other polymers.

Figure 21:
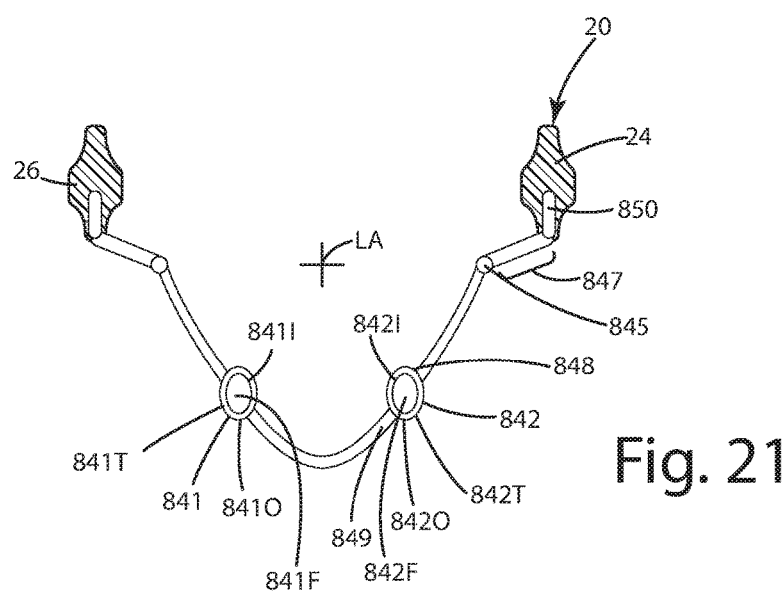
FIG. 21 is a section view of the eighth alternative embodiment of the lacrosse pocket indicating tube runners taking along lines 21-21 of FIG. 19.

An example of the encapsulation of the reinforced perimeter element 850 by a sidewall is illustrated in FIG. 21. There, the reinforced perimeter element 850 is embedded and encapsulated within the lower portion side walls 24 and 26. During formation, the material from which the lacrosse head 20 is constructed flows around individual strands of the textile material at the front and rear surfaces of the material, and substantially encapsulates the textile material from which the reinforced perimeter element 850 is constructed. Optionally, where the textile material of the reinforced perimeter element is sufficiently joined with the bottom of the respective side walls 24 and 26, the hole 850H can be deleted.

FIG. 21 illustrates the flow or swayability of the pocket rearward of the shooting string 845. There, the left to right, or lateral movement, of the pocket is illustrated in broken lines. The pocket in this region can sway back and forth, to the left and to the right relative to a longitudinal axis LA of the pocket. FIG. 21 also illustrates the section 847, located between the lowermost shooting string 845 and the reinforced perimeter element 850 and/or side wall. This section can be constructed so that the textile material is relatively taut, and does not flow or sway like the portion of the pocket in broken lines.

FIG. 21 also illustrates certain channels or tubes that are integrally formed in the textile material. Some tubes and channels are described in U.S. Pat. No. 8,839,532 to Huffa, which is hereby incorporated by reference in its entirety. The tubes or channels can correspond directly with the runners 841 and 842, in which case they can also be referred to as tube runners. In particular these runners 841 and 842 can define the tubes 841T and 842T, in which case they can also be referred to as tube runners. Generally the tube runners can be constructed from the knitted or woven textile material and form two distinct layers 841I and 842I located on the inside or ball facing portion of the pocket, and layers 841O and 842O, which are located on the exterior of the pocket, opposite the inside. These layers can transition directly to adjacent sections of the textile material, being integrally knitted, woven, or otherwise incorporated into the textile material. These layers can transition back together to a single layer of the textile material, for example, in regions 849 and 848 that are immediately adjacent the runner 842. There, the inner layer of textile material 842I can merge or blend back with the separate outer layer 842O to form a single unitary layer 848 and/or 849. This contrasts the open and separated construction adjacent the filler material 842F where the interior layer 842I and the exterior layer 842O of the textile material are separated to form an open space or tube 842T. Within this open space the respective runner can be stuffed or filled with a filler element or filler material. As an example, the fill element 841F and 842F inside the runners can be a thermoplastic polymeric material element that is generally supple and flexible. Optionally, the filler elements 841F and 842F can be constructed from EVA foam, silicone, rubber, rope, cable, and/or intertwined strands of material. Further optionally, the filler elements 841F, 842F can be elongated pieces of linked together parts, for example, in the form of a linked chain constructed from a polymeric or composite links or other material.

With the filler elements 841F and 842F on the interior of the tube runners 841 and 842, respectively, the inner layers 841I, 842I and outer layers 841O and 842O can generally assume, take on and/or reflect the shape of those filler elements 841F and 842F. As illustrated, the filler elements 841F and 842F can be the form of a structure having a circular cross section. In other constructions, the cross section of the filler elements can be elliptical, square, triangular, polygonal or irregular shapes, depending on the desired shape of the ball channel. Although shown in conjunction with the runners, the layered structure of the unitary textile material can be duplicated or included within the shooting strings or other portions of runners.

A variation of the reinforced perimeter element 850 shown in FIG. 20 is illustrated in FIG. 22. There, the reinforced perimeter element 850' of the knitted textile material is overmolded at its edge or its entirety by a thermoplastic polymer. This is illustrated in the close up section view of FIG. 22A. There, the thermoplastic polymer 852', which can be any of those described above, is molded over and encapsulates the reinforced perimeter element 850' of the pocket 810'.

FIG. 23 illustrates an even further alternative construction, where the reinforced perimeter element 850" includes upwardly extending laced loops 850, 855" which project from an upper edge of the reinforced perimeter element. The lace loops can be overmolded with polymeric material so that the material flows through and encapsulates the lace loops, thereby securing the remainder of the pocket to the head. As shown in FIG. 23A, the lace loops are overmolded by the lower rail 26 of the lacrosse head so that the loops form the connection between the reinforced perimeter element and the head 20. As illustrated in FIG. 23, the lace loops 855" can be aligned with various structural members of the knitted textile material that extend across the width and/or length of the pocket 810".

XII. Ninth Alternative Embodiment

Figure 25:
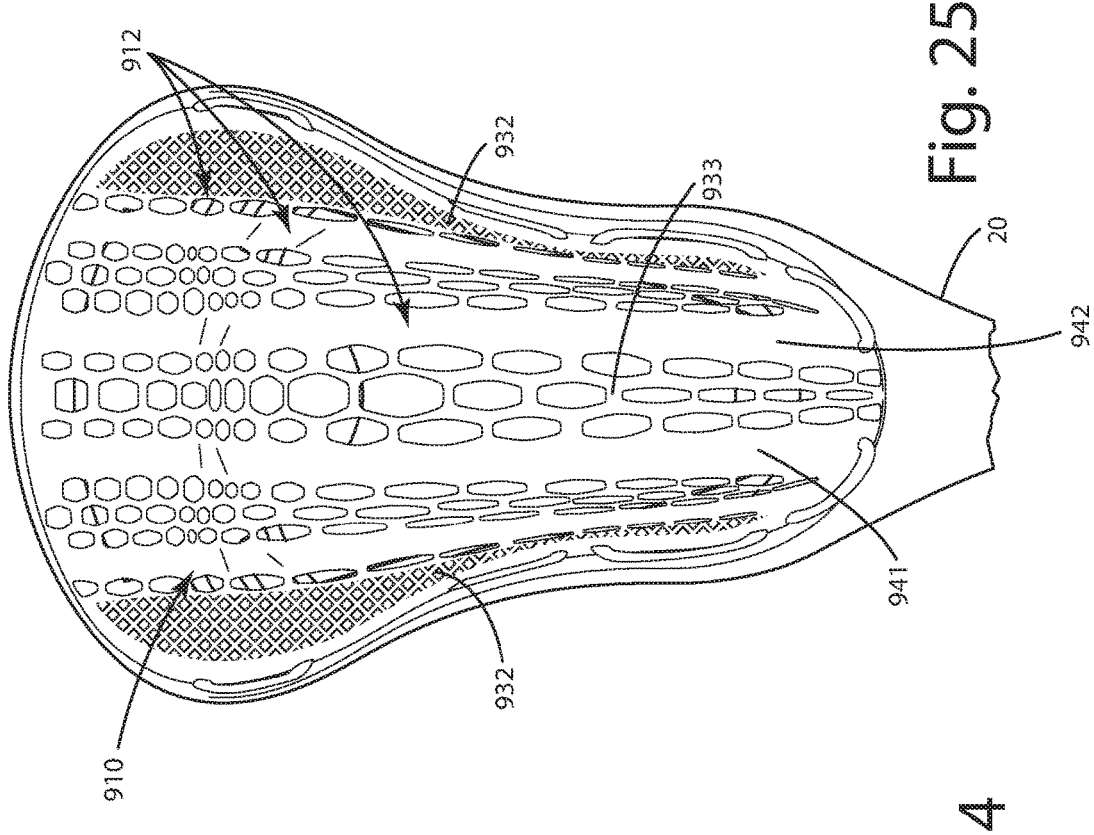
FIG. 25 is a bottom view of a lacrosse head including the ninth alternative embodiment of the lacrosse pocket.
Figure 24:
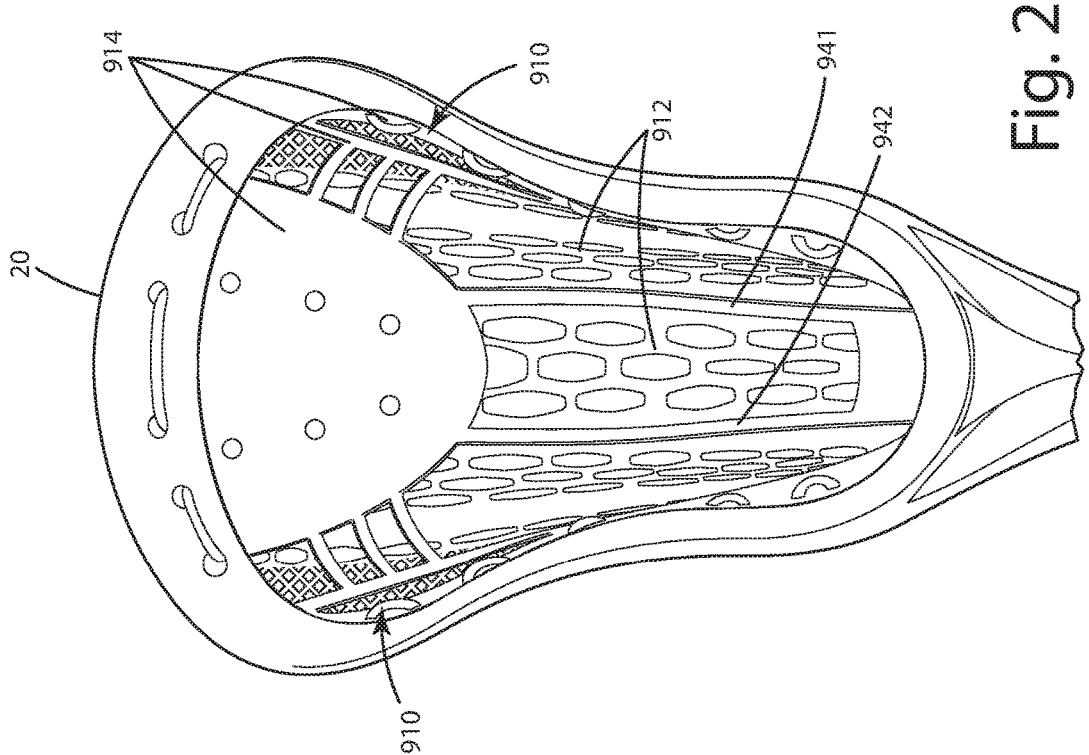
FIG. 24 is a top view of a lacrosse head including a ninth alternative embodiment of a lacrosse pocket.
Figure 28:
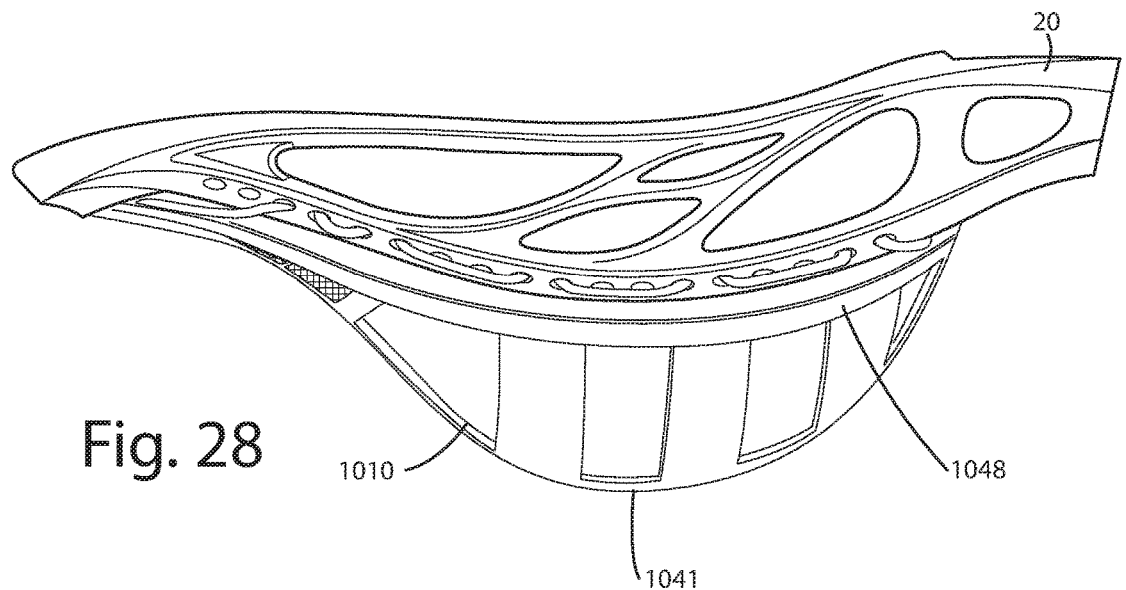
FIG. 28 is a first side view of the lacrosse head including the tenth alternative embodiment of the lacrosse pocket.
Figure 29:
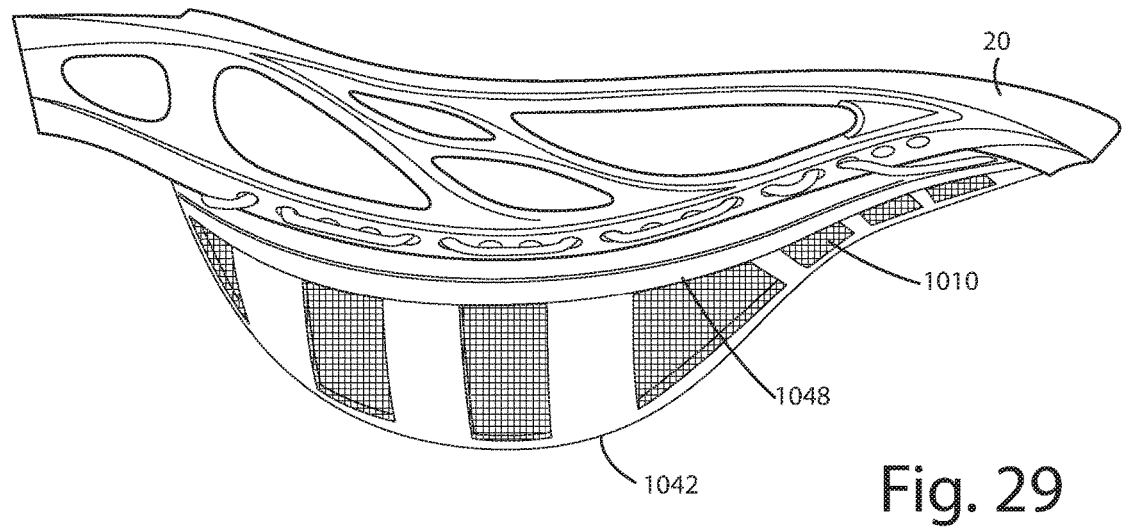
FIG. 29 is another side view of the lacrosse head including the tenth alternative embodiment of the lacrosse pocket.
Figure 30:
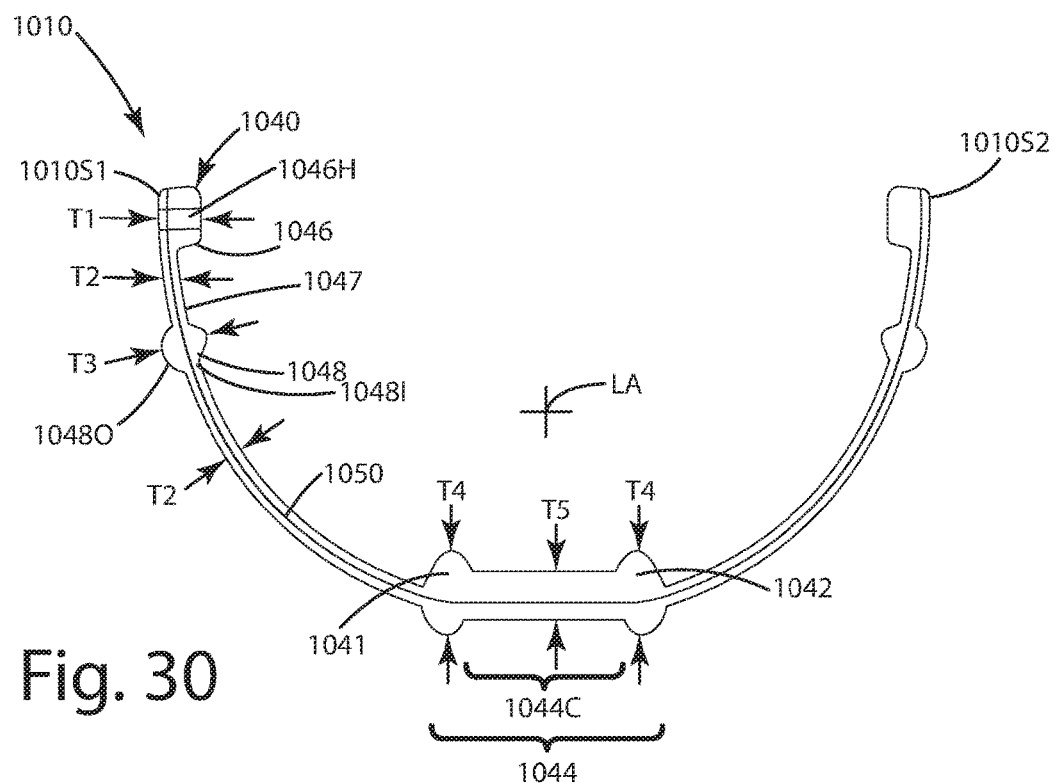
FIG. 30 is a section view of the tenth alternative embodiment of the lacrosse pocket illustrating different thicknesses of an overmolded material taken along lines 30-30 of FIG. 26.

A ninth alternative embodiment of the lacrosse pocket is illustrated in FIGS. 24 and 25 and generally designated 910. The pocket is generally similar in structure, function and operation to the embodiments described above with several exceptions. For example, in this embodiment, the pocket can be constructed from two different components, namely an underlying continuous unitary textile material 912, and a thermoplastic polymer layer 914 disposed over one or more surfaces of the unitary textile material.

The unitary textile material can be comprised of multiple different sections including, for example, runners, 941, 942 intermediate section 933 and side sections 932, which can be similar to the sections of the embodiments above. This unitary textile material can be knitted woven from Kevlar or other generally inelastic, nonstretchable strands. The shape of this textile can be pre-formed three dimensionally to mimic the desired profile of a pocket.

On the ball facing, interior surfaces 912 of the textile material, a gripping material 914 can be disposed. This gripping material can be somewhat elastic and can be of a predetermined durometer. As an example, the gripping material can be thermoplastic polymer, rubber, silicone, or any other suitable material. Generally this material can be relatively grippy to impart a friction or grip against a lacrosse ball in the lacrosse pocket. The material can have a durometer of optionally 5 to 95 Shore A, further optionally above 80 to 90 Shore A on the ASKER scale.

The precise overlaying of the gripping material 914 over one surface of the pocket can vary relative to the openings and patterns of the textile material layer 912. Generally, however, the interior face or ball receiving surface, or select surfaces of the pocket that engage the ball, can be covered with the gripping material. If desired, strips of the gripping material can cover the runners 941 and 942 which generally form the ball channel of the pocket 910. This can provide additional grip on a ball, spinning it as the ball is shot from the head. Where the textile material is not particularly grippy or has a low coefficient of friction, the addition of the gripping material optionally can provide enhanced performance.

XIII. Tenth Alternative Embodiment

Figure 31:
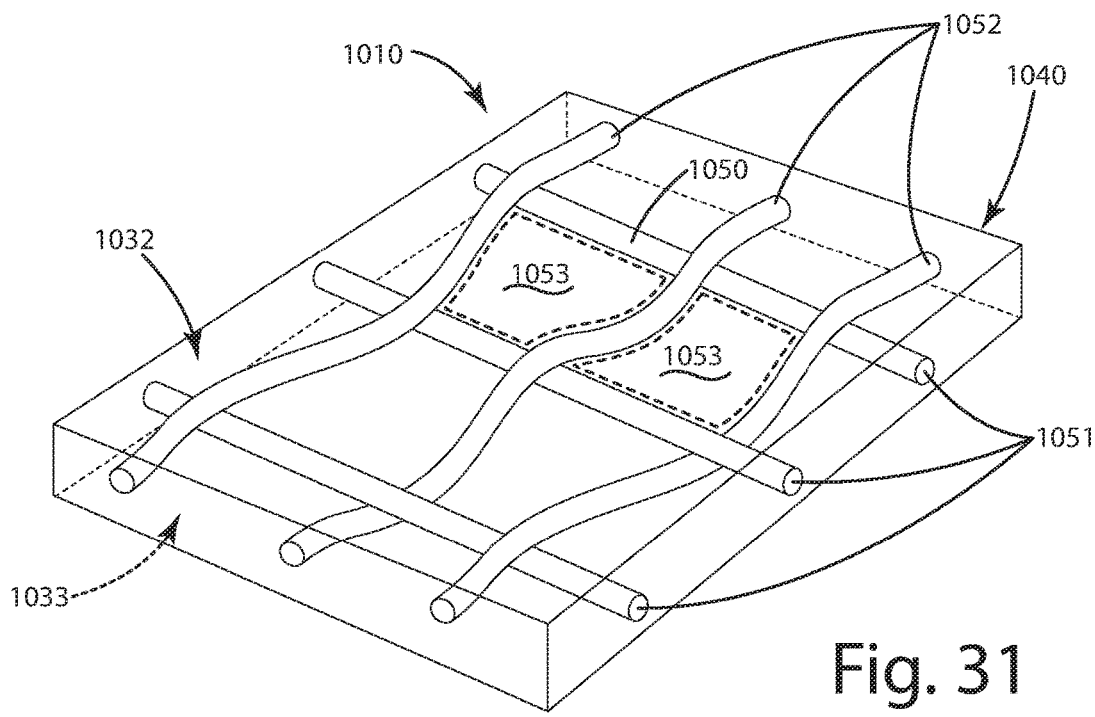
FIG. 31 is a close up view of the textile material skeleton encapsulated an overmolded material skin of the tenth alternative embodiment of the lacrosse pocket.

A tenth alternative embodiment of the lacrosse pocket is illustrated in FIGS. 26-31 and generally designated 1010. The pocket shown there is similar in structure, function and operation to the embodiments described above with several exceptions. For example, the pocket 1010 can be constructed to include a contiguous, unitary textile material forming a supportive, generally inelastic support skeleton 1050 and an overmolded, exterior skin 1040 encapsulating and substantially covering the textile material skeleton. The concept of the exterior overmolded skin 1040 and interior textile material skeleton 1050 is generally illustrated in FIG. 31. There, the textile material skeleton 1050 is fully encapsulated and embedded within the exterior skin material 1040, which can be a thermoplastic polymer or other materials as described in the above embodiments. Optionally, the exterior skin material 1040 can be transparent or translucent, so that a user can visually confirm that the pocket includes the internal textile material skeleton by viewing it through the exterior skin material. The textile material skeleton itself can be in the form of a knitted, woven, mesh, fabric or material, such as those are described in the embodiments above. Further, the textile material can be woven from multiple strands as those described in the embodiments above.

Optionally, the textile material includes a multiple of first strands 1051 and second strands 1052, disposed at right angles relative to one another. The strands can be interwoven with one another, with the first strands 1051 intermittently extending over and under the second strands 1052 to form a generally woven skeleton structure. The materials from which the strands are constructed can have a low elasticity and elongation. This can enable the material to control the stretch of the head in preselected regions, for example, between the shooting strings 1045 and the scoop 28 and/or within the ball channel 1044 of the pocket 1010 as shown in FIG. 26.

As shown in FIG. 31, the textile material skeleton 1050 can generally define polygonal open spaces 1053 between overlapping or adjacent first strands 1051 and second strands 1052. In this particular configuration, two adjacent ones of the first strands 1051 are transverse to two adjacent ones of the second strands 1052. These four respective strands form the open space 1053. The polygonal open spaces alternatively can be constructed as rounded openings or of other shapes. Generally the open spaces 1053 between the transverse strands 1051 and 1052 are substantially filled and encapsulated with the skin material 1040. The overmolded material or skins seeps into and fully encapsulates all four of the strands, thereby closing off the open space with the exterior skin material. In this construction, there effectively is no opening that extends from the ball receiving surface 1032 to the lower or exterior surface 1033 of the pocket 1010, at least between the individual overlapping first and second strands.

In some locations, for example 1036 and 1037, as well as sections 1038 and 1039, the pocket 1010 can include wide open pocket aperture where the pocket does not include either the textile material skeleton or the exterior material skin. Where these sections bound other sections such as the ball channel 1044, that ball channel 1044 is allowed to sway and/or move more freely than other sections of the pocket.

The overmolded material that forms the skin can be thermoplastic polymer, rubber, silicone, or any other suitable material. Generally this material can be relatively grippy to impart a friction or grip against a lacrosse ball in the lacrosse pocket 1010. The material can have a durometer of optionally 5 to 95 Shore A, optionally above 80 to 90 Shore A on the ASKER scale.

The pocket 1010 also can define different thicknesses in different regions. Generally, the textile material skeleton 1050 is of a uniform thickness, being constructed from a plurality of strands. Thus, in most circumstances it is not utilized to change the thickness of the pocket. The exterior skin material, however, can be molded in a way so as to manipulate the overall thickness of the pocket in various regions. This is best understood with reference to the cross section shown in FIG. 30. There, the pocket includes a textile material skeleton 1050 which extends from a first side 1010S1 of the pocket to a second side 1010S2. The textile material skeleton 1050 as shown is of a uniform thickness. The thickness of the skin 1040 however, varies from the first side 1010S1 to the second side 1010S2, or along different axes depending on the construction. The skin 1040 can include a first thickness T1 that is optionally 0.1 to about 8.0 mm, further optionally 0.5 mm to 5.0 mm. T1 can correspond to a perimeter or reinforced perimeter element 1046. The reinforced perimeter element 1046 can be attached directly to the sidewall of the lacrosse head 20. The additional thickness in this region can provide added structural support for laces that optionally can extend through holes 1046H defined in this portion of the pocket 1010.

As the pocket transitions downward or generally toward the longitudinal axis LA, the thickness of the overmolded material or skin is reduced to a thickness T2. This thickness T2 can be optionally 0.1 mm to 5.0 mm, further optionally 0.5 mm to 3 mm. This thickness can provide relative flexibility and enhanced elasticity/stretch to the pocket in the region 1047 which is immediately adjacent the reinforcement element 1046.

Between the reinforced perimeter element 1046 and the ball channel 1044, one or more additional runners 1048 can be formed with predetermined thickness. These runners 1048 can be constructed from a central encapsulated portion of the textile material skeleton and a thickened area of the skin forming the shape of the runner 1048. This thickened region can have a thickness T3 which is the same as or greater than the thickness T1, and greater than the thickness T2. Although shown as extending a greater thickness on both the interior and exterior of the pocket, the thickness T3 can be enhanced primarily on the interior. Accordingly, in such a construction, the outer runner projection 10480 can be absent and only the inner runner projection 10401 can be present.

Near the ball channel 1044 of the pocket 1010, the exterior skin material can be of one or more other thicknesses. For example, the ball channel central region 1044C can be of a first thickness T5, which can be greater than the thickness T2, optionally as great as the thickness T1 or T3. This thickness T5 can range from optionally 0.2 mm to about 10 mm, further optionally from 0.5 mm to 8 mm. The central portion 1044C can be flanked by runner projections 1041 and 1042, where the thickness of the overmolded skin 1040 is of a thickness T4. This thickness T4 can be the same for both runners 1041 and 1042, so that they can symmetrically engage a ball traveling along or near the longitudinal axis LA, out of the pocket. The thickness T4 can range optionally from 1.0 mm to about 6.0 mm, further optionally about 2.0 mm to about 5.0 mm. This thickness T4 can be greater than the thickness T5, as well as the thickness T2 of the remainder of the net. With the increased thicknesses in T4 and/or T5 in the ball channel, the ball channel 1044 is well defined, relatively rigid, and can provide good spin to the ball as it exits of the pocket. Near the scoop, the shooting strings 1045 can add rigidity and make that portion of the net more taut. In this region, the shooting strings can have thicknesses T3, T4 and/or T5, which are generally thicker than the surrounding thinner thicknesses T2 of the overmolded skin material. Of course, in these regions, as well as the ball channel, the textile material skeleton can reduce and/or control stretch of the pocket, which otherwise would occur if only the skin material was used, due to its elasticity and generally low durometer. By combining the generally unstretchable, or only moderately stretchable, textile material skeleton with the generally elastic, stretchable, exterior material skin, the pocket can be fine-tuned to include different regions of stretchability and/or reactivity.

To make the pocket of the current embodiment, a unitary textile material is provided. Generally the textile material can include a substantially continuous, unitary pattern. If desired, the unitary textile material can be comprised of different regions having different patterns, textures or performance characteristics.

The textile can be draped over a three-dimensional mold that mimics a desired pocket profile. The mold can define cavities that correspond to runners and/or shooting strings of varying thicknesses such as those described above. A thermoplastic polymer can be injected into the mold cavities, and can encapsulate the textile material skeleton. Spaces between individual transverse strands of the textile material are filled in. The respective components, for example the runners and/or shooting strings of varying thickness are also therefore formed in their respective cavities. The textile skeleton becomes embedded within and substantially concealed and covered by the overmolded material. Alternatively, the textile material skeleton can be laminated to the overmolded material skin and secured thereto via molding or adhesion. This laminate construction can contrast the capsulation and embedding techniques utilized in the embodiment above.

After the pocket 1010 is constructed and cured within the mold, it can be removed from the mold. When it is removed, sections of the skeleton and/or skin can be cut out from the pocket either manually or via a die cut machine. The parts cut out can correspond to regions where additional elasticity and/or deformation is desired, or where enhanced air flow through the pocket is desired to enable a player to easily whip and/or manipulate the head and associated pocket.

XIV. Eleventh Alternative Embodiment

An eleventh alternative embodiment of a lacrosse pocket is illustrated in FIGS. 32-38 and generally designated 1110. The pocket shown there is similar in structure, function and operation of the embodiments described above with several exceptions. For example, the pocket 1110 can be constructed to be joined via molding, tying, gluing, stitching and the like to the lacrosse head 20 at the respective scoop 28, sidewalls 24, 26 and base 22. The pocket however, includes an elongated first pattern 1111 that is joined with a generally U-shaped second pattern 1120, which is further optionally joined with a generally U-shaped third pattern 1130. The elongated first pattern 1111 can include a portion of a shooting ramp 1135 that extends to a middle pocket MP1. The first pattern 1111 can be joined with the second pattern 1120 at first seam 1141 and second seam 1142. These seams can be like the seam runners described in the embodiments above. The different patterns can be constructed from unitary textile materials that are constructed from a plurality of strands as described in the embodiments above. The textile materials can be formed using any of the knitting and/or weaving processes and/or machinery as described herein. Further optionally, the different patterns can be constructed from mesh materials which can be formed using mesh making processes.

Figure 33:
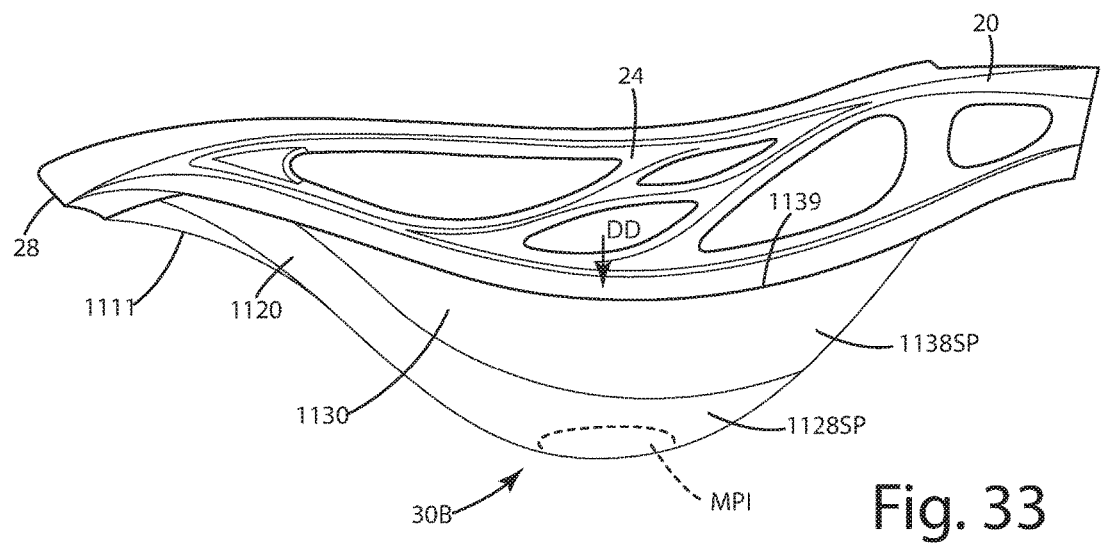
FIG. 33 is a side view of a lacrosse head including the eleventh alternative embodiment of the lacrosse pocket.

Generally, the first, second and third patterns can be joined with one another to form a three dimensional bulge 3DB as shown in FIG. 33 from a side view that approximates a preformed, pre-shaped lacrosse pocket adapted to readily capture and retain a lacrosse ball therein.

Figure 32:
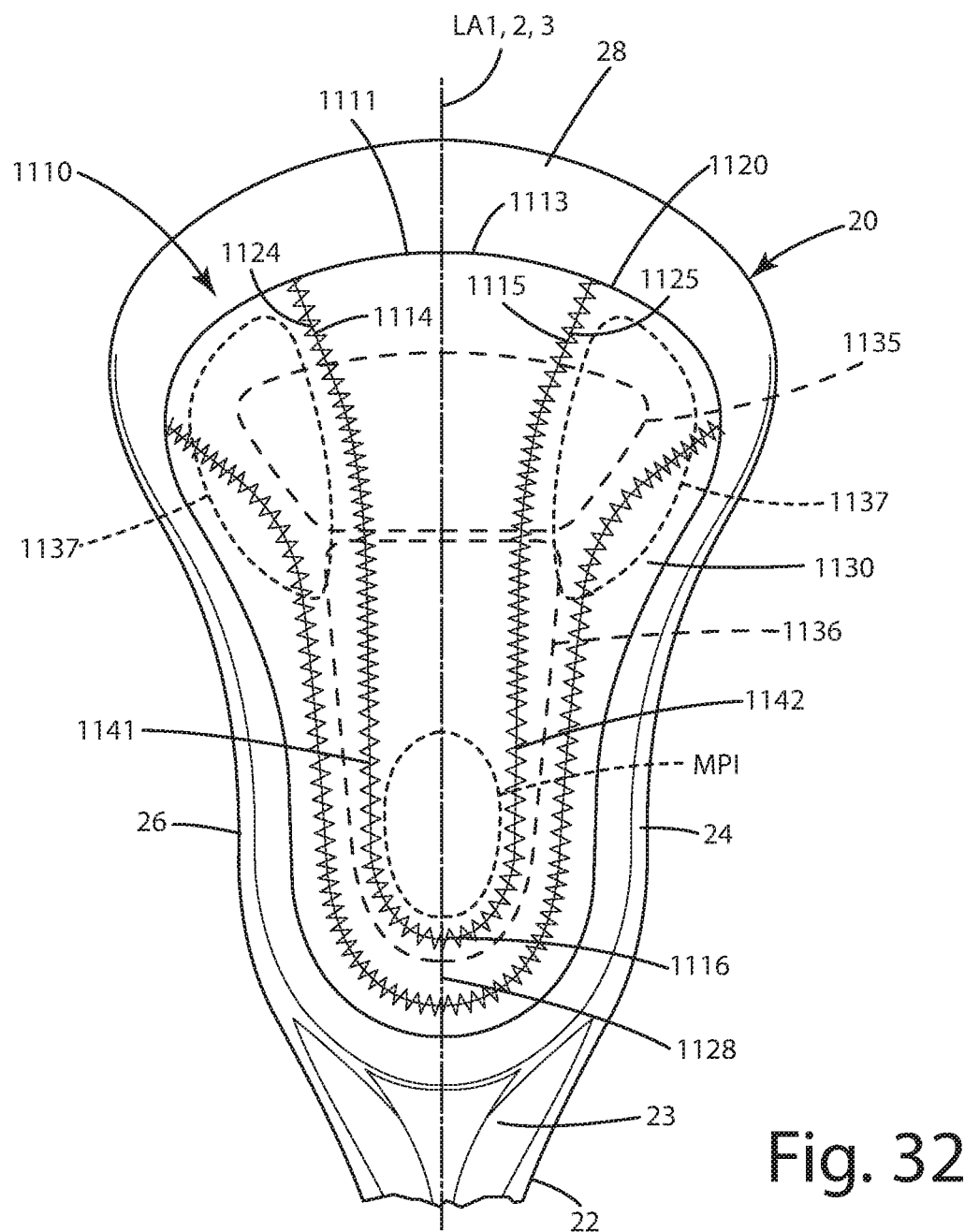
FIG. 32 is a top view of a lacrosse head including an eleventh alternative embodiment of a lacrosse pocket including multiple patterns joined with one another.

The different patterns can be joined with one another at their edges using a variety of different constructions. For example, the patterns can be stitched, glued, adhered, fused, melted, thermally bonded or over molded with respective pieces or parts to join them at their seams. In one embodiment as illustrated in FIG. 32, the respective patterns are flat lock stitched to one another. Other stitching techniques can be utilized as well. Where the respective edges of the different patterns are joined, a corresponding structural stitch, glue part, adhesive part, fused part, melted part, thermally bonded part or over molded part can be disposed.

Figure 34:
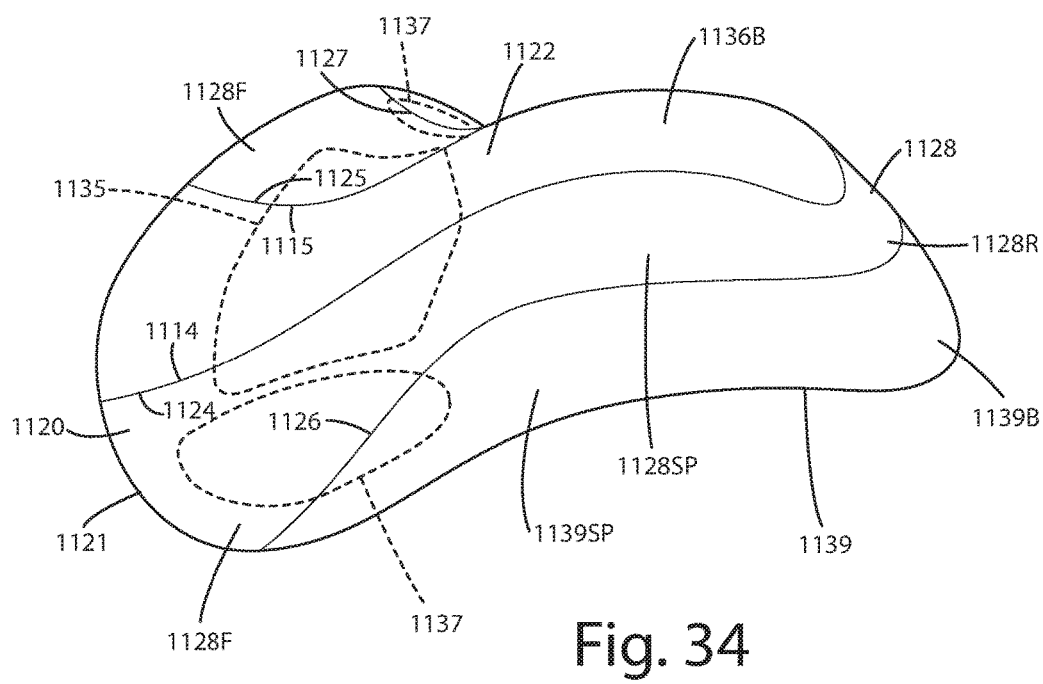
FIG. 34 is a bottom perspective view of the lacrosse pocket of the eleventh alternative embodiment including multiple patterns in a three dimensional shape.
Figure 35:
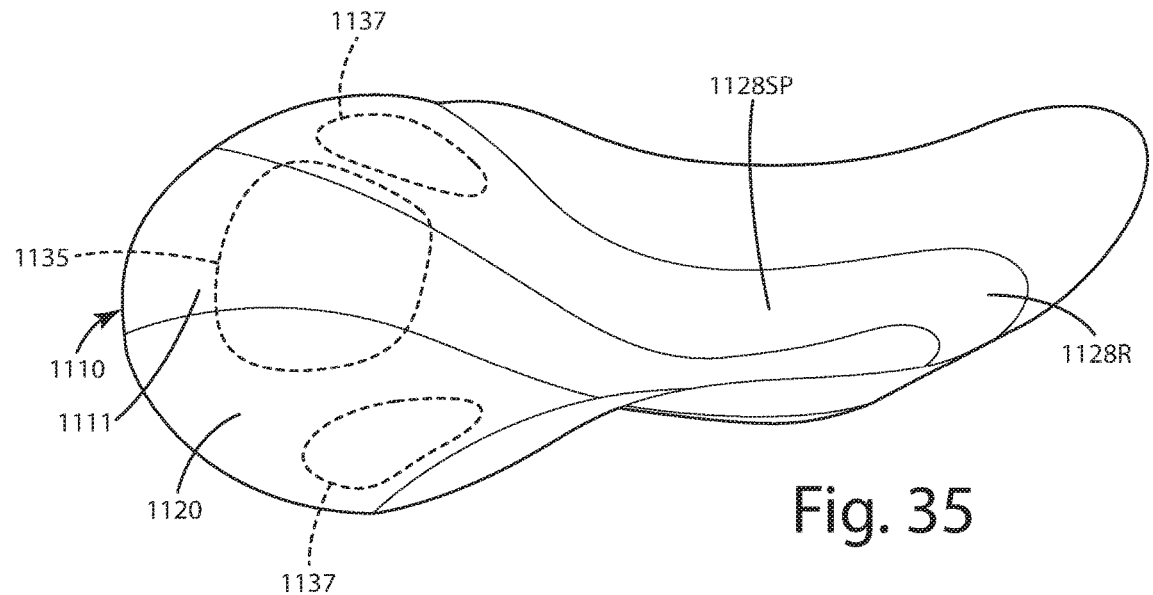
FIG. 35 is an upper perspective view of the lacrosse pocket of the eleventh alternative embodiment in its three dimensional shape.

As shown in FIGS. 33-35, the pocket as constructed with the unitary, textile and/or mesh material can be formed so that it maintains a three dimensional concave shape having a defined depth DD generally in the middle of the pocket MP1. With this shape being built into the pocket 1110 itself, and with the pocket able to retain this shape upon its construction, the pocket herein requires minimal break in. It also is extremely consistent from one pocket to the next and able to be precisely replicated on a mass commercial scale.

As shown in FIGS. 32-34, the pocket includes a first pattern 1111, a second pattern 1120 and a third pattern 1130. Each of these patterns can define a respective longitudinal axis LA1, LA2 and LA3. As shown in FIG. 32, the longitudinal axis of the first pattern LA1 is aligned with the longitudinal axis LA2 of the second pattern as well as the longitudinal axis LA3 of the third pattern. When independently constructed, of course, the longitudinal axes of each of the patterns can be offset and nonparallel with one another, depending on the different sheets and materials from which they are cut, formed or otherwise constructed.

A first pattern can include at least a portion of a ball channel bottom 1136, at least a portion of the shooting ramp 1135 and at least a portion of a pocket bottom 1136B. The first pattern can be elongated and can include a first pattern exterior edge 1113. This exterior edge 1113 is configured for placement immediately adjacent and optionally attached directly to the scoop 28 of the head. This exterior edge 1113 transitions to a first pattern first edge 1114 and a first pattern second edge 1115 which extend rearwardly away from the scoop 28 generally toward the ball stop 23 or base 22 of the head 20 when the pocket 1110 is attached to the head 20. These edges 1114 and 1115 can be substantially linear and can extend through the shooting ramp 1135, optionally outside the respective shooting ramp flanks 1137. As illustrated, the first pattern first edge 1114 lays across the longitudinal axis LA 1 from the first pattern second edge 1115.

The edges 1114 and 1115 can extend rearwardly toward a terminating edge 1116 of the first pattern. This terminating edge 1116 can be a continuation of the respective edges 1114 and 1115. As illustrated, the terminating edge 1116 can generally be rounded or U-shaped. Of course, in other constructions, it can be more angular and/or polygonal. Near this rearward terminating edge 1116, the middle pocket MP1 can be disposed. This middle pocket MP1 can be the location where the ball naturally rests within the pocket when the pocket is held in the orientation shown in FIG. 33. The predefined depth DD of the pocket in the middle pocket MP1 can be substantially equal to or less than the diameter of a NCAA Rule compliant lacrosse ball, for example, 62.7 mm to 64.7 mm.

The first pattern 1111 can be constructed from a knitted, a weaved and/or a mesh material. Optionally, multiple different types of knitted, weaved and/or mesh materials can be joined with one another integrally or at seams to form the first pattern 1111. Indeed, the first pattern can be comprised of multiple patchwork pieces that are sewn, stitched, glued, adhered, fused, melted, thermally bonded and/or over molded.

The first pattern 1111 can be constructed from a first material on a knitting machine and/or a weaving machine, or alternatively constructed from mesh on a mesh machine. That first material can be constructed to have a first mechanical or physical property. For example, the first material can include a first elasticity, opening size, or configuration and/or rigidity. The second pattern 1120 can be constructed from a second material having a second mechanical or physical property. For example, the second material can have a second elasticity than is greater that the first elasticity or the second material can have a second opening size being greater than the first pore size in which case the overall density of the second material in the second pattern 1120 is less than that in the first pattern 1111.

Figure 36:
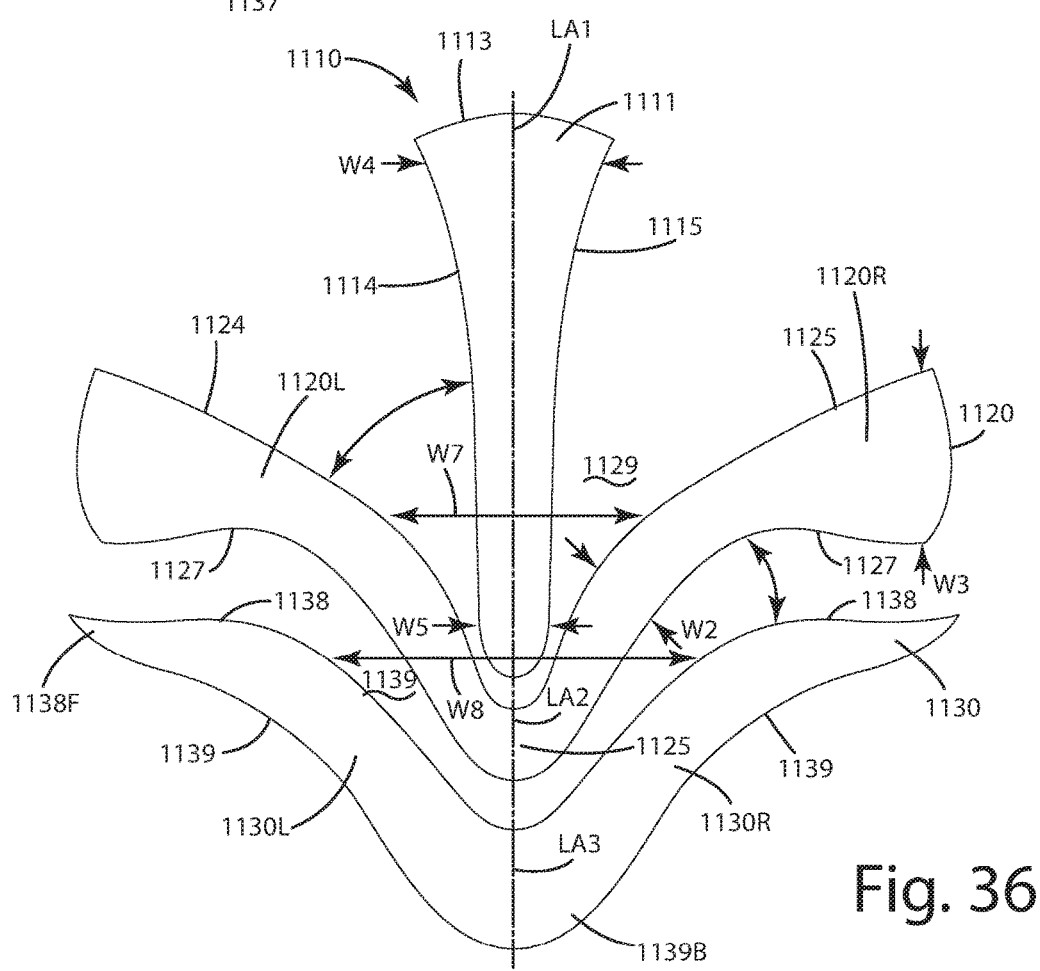
FIG. 36 is a two dimensional layout of the different patterns of the lacrosse pocket of the eleventh alternative embodiment.

Turning now to the second pattern 1120, as shown in FIGS. 32, 34 and 36, it can include a forward exterior edge 1121 that transitions to a second pattern first edge 1124 which itself transitions around a junction 1128 of the second pattern and into a second pattern second edge 1125 that extends upwardly on an opposite side of the longitudinal axis LA2 of the second pattern. The second pattern also includes a second pattern first exterior edge 1126 and a second pattern second exterior edge 1127 that generally surround the second pattern on its exterior most portions.

The second pattern as illustrated in FIGS. 32 and 36 is generally of a U- or V-shape, and defines a void 1129. Within that void 1129, the first pattern 1111 is disposed. In its final state, the respective first pattern first and second edges 1114 and 1115 are joined with the second pattern first and second edges 1124 and 1125, respectively, to close the void 1129. As also shown in FIGS. 32 and 36, the second pattern 1120 can form a first wing 1120R and a second wing 1120L that are joined via the junction 1128. The second pattern and the wings flare outward to form at least portions of the shooting flanks 1137. The overall width of the first pattern 1111 can vary, optionally being greater near the exterior edge 1113 than near the middle pocket MP1. Specifically, W4 can be greater than W5 as shown in FIG. 36. Of course, in some constructions, the width can be constant, that is, W4 can be equal to W5 and all widths therebetween.

In general, the respective first and second wings 1120L and 1120R can flank the first pattern 1111 on opposing sides of the longitudinal axis LA1 of the first pattern. As shown in FIG. 34, the second pattern 1120 near the junction 1128 can include a rearward wall 1128R. This rearward wall can extend generally toward a ball stop 23 of the head when this pocket is installed in the head. This rearward wall can be slanted or generally concave upward. This rearward wall 1128R can transition to respective pocket side portions 1128SP of the second pattern which themselves can transition to the forward flares 1128F that can include the respective shooting flanks 1137 and/or portions of the shooting ramp 1135 as illustrated in FIGS. 34 and 35. These respective sidewall portions 1128SP can be generally slanted and/or concave upward relative toward the sidewalls of the lacrosse head to which the pocket is attached. As shown in FIG. 34, the slanted and/or rounded sidewall portions 1128SP can transition to a generally flat and/or planar and slightly concave bottom 1136B.

As shown in FIGS. 32-36, the pocket 1110 also can include a third pattern 1130. This third pattern can include an interior edge 1138. This interior edge 1138 can extend generally from a forward edge or tip 1138F of the third pattern 1130 rearward into the ball stop portion 1139B of the third pattern. This interior edge 1138 can be joined directly with the exterior edge 1127 of the second pattern 1120 using any of the techniques disclosed herein. The third pattern 1130 also can be of a V- or U-shape and can define a second void 1139V between respective wings 1130L and 1130R of the third pattern. Within that void, the first and second patterns can be disposed and secured. The third pattern also can include an exterior edge 1139 that can be adapted to be joined directly to a lacrosse head, as well as a ball stop portion 1139B. The ball stop portion 1139B of the third pattern also can be upwardly slanted and/or concave toward a ball stop of the head to which the pocket is attached. This ball stop portion 1139B can transition to side pieces 1139SP. These side pieces can generally be more sharply angled upward relative to horizontal than the side portions 1128SP of the second pattern. This can add to the overall depth DD of the pocket as shown in FIG. 33.

Referring to FIG. 36, a method of making the lacrosse pocket of the eleventh alternative embodiment will now be described in further detail. A lacrosse pocket can be started by providing the first pattern 1111 in a flat two dimensional form, as illustrated in FIG. 36. The pattern as formed can be constructed on at least one of a knitting machine, a weaving machine and/or a mesh making machine. The material from which the first pattern is constructed can include one or more different regions having different physical and/or structural properties. For example, the entire region of the first pattern 1111 can be knitted to include a single knit pattern. Alternatively, multiple different patterns of knit or weave can be utilized so that those different regions exhibit different physical and/or structural properties, for example, different elasticities, air permeabilities, rigidity, etc. Of course, the entire first pattern can be of a unitary single construction.

Separately, the second pattern 1120 initially can be constructed in a flat two dimensional form as well. The second pattern can include the second pattern first interior edge 1124 and second pattern second interior edge 1125. The second pattern also can include the respective exterior edges 1127. As constructed, the second pattern can define the first void 1129 between the first edge 1124 and the second edge 1125, generally aligned with and/or bisected by the longitudinal axis LA2 of the second pattern. The void also can be defined between the first 1120L and second 1120R wings of the second pattern. Optionally, as mentioned above, the second pattern can be constructed from knitting, weaving and/or mesh making processes and can include one or more regions. Further optionally, the regions being knitted, weaved or otherwise made differently to include different physical and/or structural properties to provide different performance characteristics. In some cases, the second pattern can be knitted and/or weaved so that it is more elastic than the first pattern and third pattern. Alternatively, the second pattern can be knitted so that it is the same elasticity or a lesser elasticity than the selective first pattern and third pattern.

As illustrated in FIG. 36, the overall width W7 between the respective second pattern first edge 1124 and second pattern second edge 1125, or the wings 1120L and 1120R is substantially greater than the widths W5 and/or W4 of the first pattern. Thus, when the edges 1124, 1125 are joined with the edges 1114 and 1125, the second pattern, and in particular its wings, tend to angle or become curved upwardly toward a front face of the pocket. This causes the side pieces 1128SP and the rearward wall 1128R to round out or become more slanted relative to vertical. In this manner, the flat two dimensional form of the second pattern is reconfigured into a more three dimensional form. Likewise, the first pattern 1111 also is bent and reconfigured to a three dimensional form to produce at least a portion of the ball channel and/or shooting ramp of the pocket when its edges are joined with the interior edges of the second pattern. This, in turn, causes the first pattern to attain a flat, or upwardly rounded, or convex portion of the ramp 1122 as shown in FIG. 34.

As shown in FIGS. 34 and 36, as the second pattern is joined with the first pattern, at least a portion of the middle pocket bottom 1136B is placed adjacent to at least a portion of the side portions 1128SP. Further, at least a portion of the shooting ramp 1135 of the first pattern 1111 is placed adjacent to at least a portion of the shooting ramp flanks 1137 that are associated with the wings 1120L and 1120R of the second pattern 1120. The respective edges of the first pattern and the second edges can be joined via at least one of stitching, gluing, adhering, fusing, melting, thermally bonding and over molding the first pattern edges with the second pattern edges.

Optionally, the second pattern first wing 1120L is bent or folded toward the second wing 1120R. Alternatively, the first and second wings are each respectively bent towards the longitudinal axis LA2 of the second pattern. This bending causes the second pattern junction 1128 to translate upward to form an upwardly slanted or curved wall that slants or curves upwardly toward a ball stop of a lacrosse head to which the lacrosse head pocket is adapted to be joined. As mentioned above, upon this bending, the respective sidewall portions 1128SP also curve or slant generally upwardly at a first angle. This, in turn, creates a generally 3D configuration shown in FIGS. 33 and 34 of the first pattern and second pattern attached to one another.

In another step, the third pattern 1130 can be formed in a flat, two dimensional form. The third pattern can include a third pattern first and second interior edges 1138 that are disposed across one another on opposite sides of a third pattern longitudinal axis LA3. The third pattern can define the second void 1139V with the respective wings 1130L and 1130R disposed on opposite sides of the void 1139V, across the longitudinal axis LA3. The third pattern 1130 interior edges 1138 can be joined with the respective exterior edges 1127 of the second pattern 1120. As this is performed, the respective wings 1130L and 1130R are brought toward the respective longitudinal axis LA3 of the third pattern. This, in turn, causes the rearward wall 1139B of the third pattern to angle or slant to translate upward to form an upwardly slanted wall that slants upward toward a ball stop.

The respective third pattern side portions 1139SP also slant upwardly near the ball stop generally, at a second angle that is greater than the first angle of the side portions 1128SP in this region. In turn, the third pattern 1130 can provide a greater vertical component of the depth DD of the pocket shown in FIG. 33 than the vertical component provided by the second pattern 1120. As mentioned above, the third pattern can be constructed from a unitary textile material and can be formed by knitting, weaving or mesh making processes and machines. Because the width W8 of the void 1139V is greater than the overall width of the second pattern 1120, taken across an axis transverse to the longitudinal axes along the pocket, the respective third pattern wings and rearward portion or rearward wall all angle upward substantially to provide additional depth to the pocket. In turn, the middle pocket MP has a downwardly extending three dimensional bulge. Due to the configuration of the different patterns, the elongated ball channel also transitions to the shooting ramp.

Figure 37:
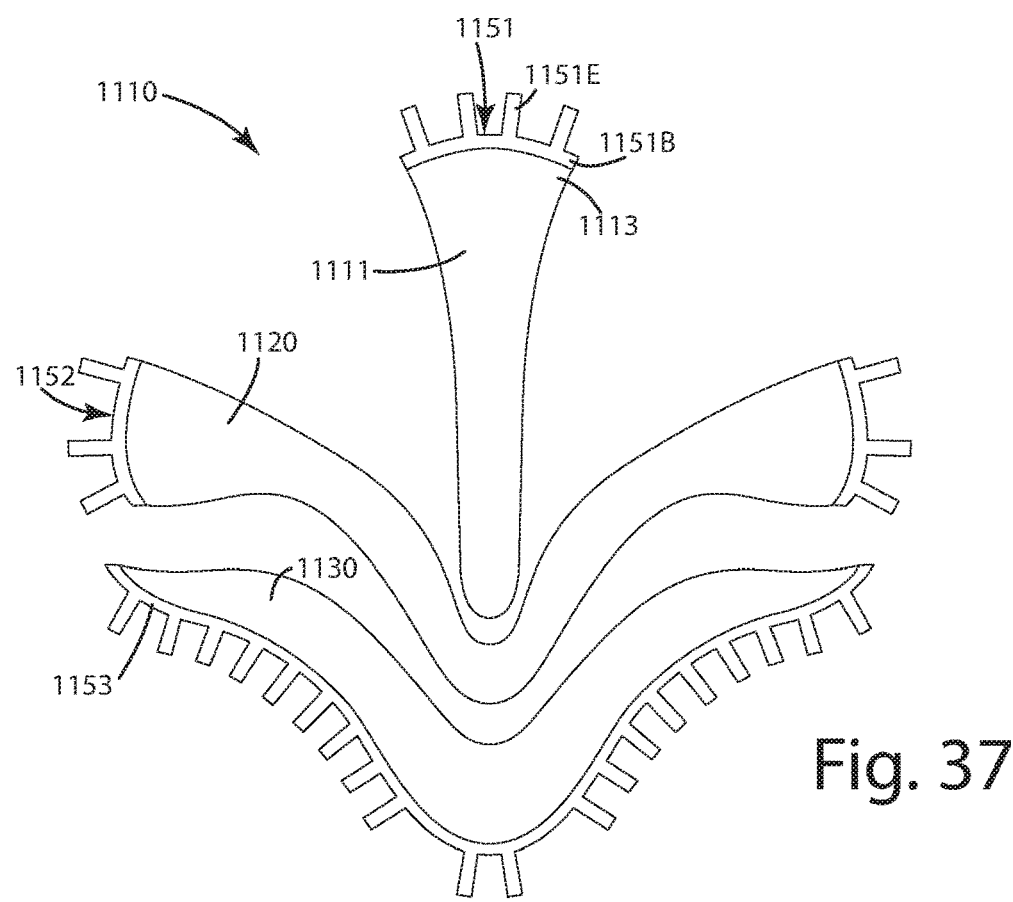
FIG. 37 is a two dimensional layout of the lacrosse pocket of the eleventh alternative embodiment including different patterns and attachment elements joined with respective edges of those patterns.
Figure 38:
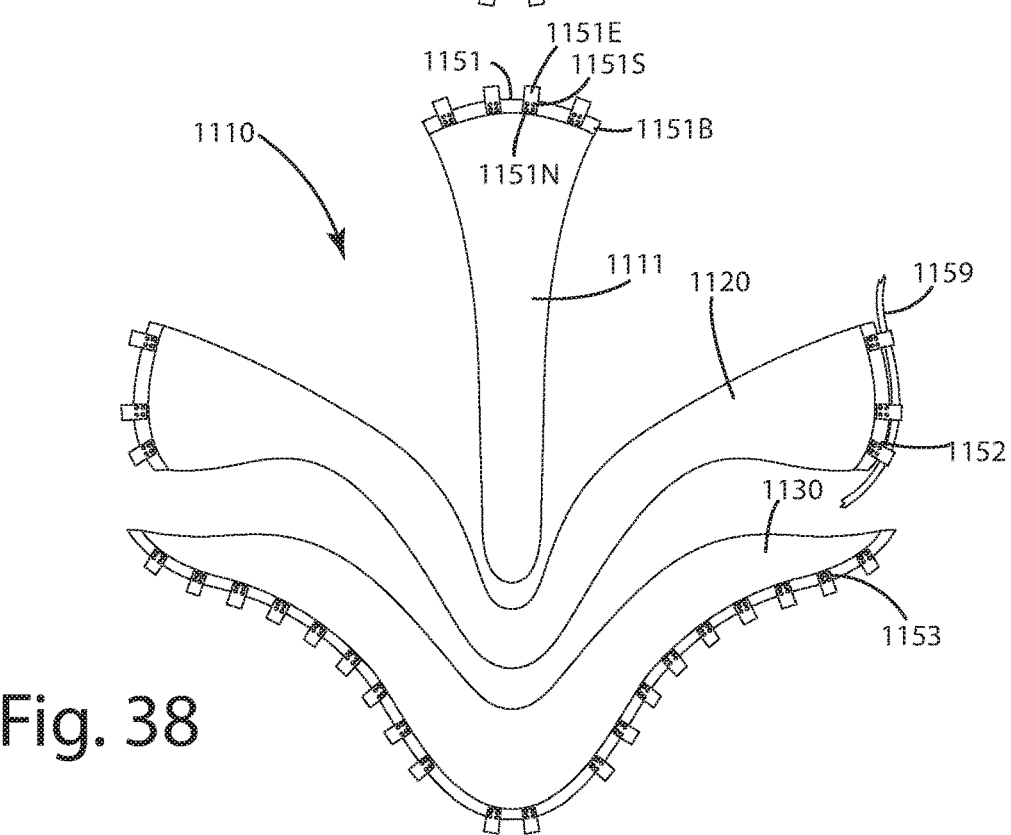
FIG. 38 is a two dimensional layout of the lacrosse pocket of the eleventh alternative embodiment including different patterns with the attachment elements reconfigured to form loops at the edges of the respective patterns.

The pocket 1110 of the eleventh alternative embodiment can be constructed to include one or more attachment elements 1151, 1152, 1153 that assist in joining the pocket 1110 with a lacrosse head 20. As shown in FIGS. 37 and 38, exemplary attachment elements are illustrated. It will be appreciated that other types of attachment elements such as simple strings, loops or apertures defined in the respective edges of the patterns can be utilized for connection.

As shown in FIG. 37, the first pattern 1111 includes a first attachment element assembly 1151. This assembly can be in the form of a base strip 1151B which is attached to multiple extensions 1151E that extend outwardly, away from the main body of the third pattern 1111. The attachment element assembly, and in particular the base, can be joined with the third pattern, optionally adjacent the exterior edge 1113 of the first pattern by gluing, adhering, stitching, fusing, melting, thermally bonding and/or over molding the attachment element 1151 to the first pattern 1111. In the particular example shown in FIG. 37, the attachment element 1151 is constructed from a polymeric material such as TPU. The TPU is molded over the exterior edge 1113 of the first pattern so that the polymeric material encapsulates and embeds within the network of strands that make up the first pattern 1111 at the exterior edge. The polymeric material can extend through minute pores and openings defined by the knitted or weaved textile material and/or mesh, joining with other portions of the over molded material to form a physical bond with the network of strands in that area. When it is molded, the attachment element can include the base 1151B and the extensions 1151E. The other attachment elements 1152 and 1153 can likewise be joined with the respective second pattern 1120 and third pattern 1130 in a similar manner.

Optionally, the extensions 1151E can be folded over one another, end over end as shown in FIG. 38. When so folded over, the ends 1151N of each extension 1151E can be stitched with a stitching 1151S or otherwise glued, thermally bonded or welded to the base 1151B and/or to itself. This, in turn, forms a loop through which a string or lace 1159 can be placed to secure the attachment elements and the respective patterns (after being adjoined with one another to form the completed three dimensional pocket) to a lacrosse head. In this manner, the attachment elements can assist in joining that three dimensional pre-shaped pocket 1110 to a lacrosse head.

XV. Twelfth Alternative Embodiment

A twelfth alternative embodiment of a lacrosse pocket is illustrated in FIGS. 39-42 and generally designated 1210. The pocket shown there is similar in structure, function and operation to the embodiments described above, and in particular, the fourth embodiment described above and illustrated in FIGS. 11-13 and generally designated 410, with several exceptions. For example, the pocket 1210 can be constructed from a mesh material, rather than a unitary textile material that is knitted or weaved. The mesh material can include a plurality of strands that are joined together to form a mesh on a mesh making machine. The mesh can have uniformly sized holes or openings defined within a network of crisscrossed or otherwise joined lateral, vertical and/or diagonal components or strands. The mesh can be generally contiguous throughout, with a single pattern of the mesh extending throughout the entire pocket.

Optionally, one or more seams, such as a central seam 1212 can be included in the mesh lacrosse pocket. As shown there, the seam 1212 can hold together opposing edges of the mesh generally along a longitudinal axis LA of the pocket. The seam can be formed by stitching, gluing, adhering, fusing, melting, thermally bonding and/or over molding free edges of the mesh together with one another. An example of over molding as shown above is shown in FIG. 13 in the fourth embodiment above.

Figure 41:
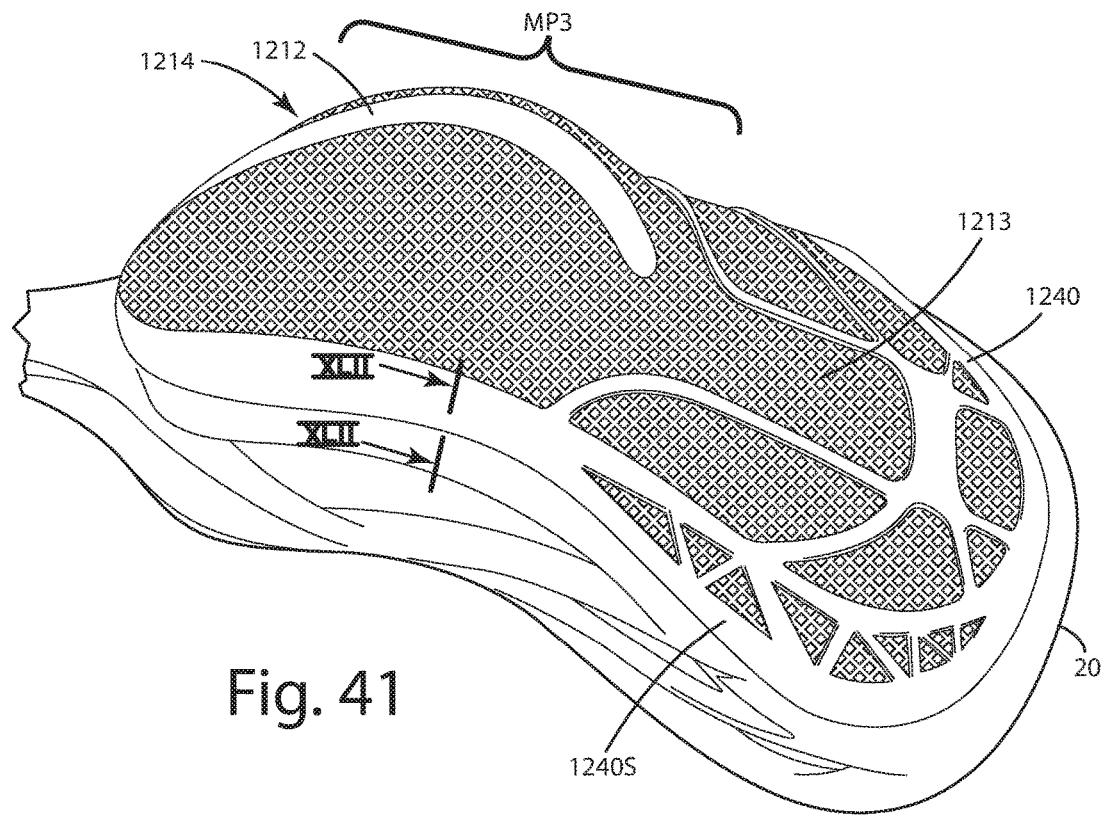
FIG. 41 is a rear perspective view of the lacrosse pocket of the twelfth alternative embodiment illustrating a three dimensional bulge or contour.

With the seam 1212 joining edges of the mesh generally in the middle pocket or throat of the head 20, that middle pocket MP3 can generally form a rearward extending bulge 1214 when viewed from the perspective in FIG. 41. When viewed from the perspective of FIG. 40, in the inside of the pocket, the middle pocket MP3 and/or throat generally includes a concave three dimensional shape across a portion of the width W9 of the lacrosse pocket 1210 as shown in FIG. 40. Further optionally, the mesh can be joined at the seam so that it forms a lengthwise concave three dimensional shape along a length of the lacrosse pocket 1210, leading from the ball stop 23 toward the scoop 28 of the lacrosse head 20. Of course, other constructions and concavities or features can be included in the mesh depending on the particular application.

As shown in FIGS. 39-42, the pocket 1240 can be constructed to that it includes a generally flexible frame 1240. The flexible frame 1240 can be attached to one or more parts of the mesh material. The frame can be constructed from a polymeric material such as a thermoplastic polymer, for example, thermoplastic polyurethane, as well as synthetic and natural rubbers, foams and/or other polymers. Optionally, the material can be of sufficient dimensions or constructed from an elastic material to allow certain portions of the flexible frame to elongate and/or stretch, optionally 0.25, 0.5, 1.0, 1.5, 2.0, 2.5 or more its original dimension. In turn, this ability to elongate can enable the pocket to act more like a suspension element when a ball impacts or lands in the pocket, which can prevent the pocket from overly rebounding the ball or bouncing it out of the pocket. Certain portions of the mesh material and its strands are encapsulated by and embedded within the material from which the frame is constructed, while other portions of the mesh material are not encapsulated nor embedded within the frame, in which case they can be exposed to the environment and visible to a viewer.

As shown in FIGS. 39-41, the frame 1240 can include multiple components. For example, the frame can include first 1241 and second 1242 runners. The runners can extend generally from an upper portion 1210U of the pocket toward the middle pocket MP3. Optionally, the runners 1241 and 1242 can be parallel, and can extend along the longitudinal axis LA. Near the middle pocket MP3, the runners can diverge outwardly as illustrated in FIGS. 39 and 40 and join directly with an edge element 1244 of the frame. As shown in FIG. 40, the runners can flare outwardly, away from the longitudinal axis until intercepting and/or intersecting the edge element 1244 of the frame. The edge element 1244 of the frame can extend from the ball stop along the respective sidewalls 24 and 26 and adjacent the rearward edge of the scoop 28. This edge element 1244 can add rigidity to the upper portion of the pocket where it is joined with the frame.

Alternatively, the edge element 1244 can be stretchable and/or elastic, in which case it can function as a suspension element. For example, the edge element 1244, as well as the other parts of the flexible frame, can be constructed from an elastomer, such as natural or synthetic rubber, polyisoprene, polybutadiene, polyisobutylene, and/or polydimethylsiloxane. Optionally, this elastic edge element can have a durometer that optionally is at least 15 Shore A, and further optionally less than 100 Shore D, and even further optionally less than 90 Rockwell.

The elastic edge element can be able to undergo large elastic deformations, that is, it can stretch and return to its original shape and dimensions in a reversible way. As an example, the edge element can include a width extending from below a side rail or scoop of the head. When a lacrosse ball enters the pocket forcibly, and some velocity, the ball engages the mesh pocket, which in turn pulls or puts tension on the edge element causing it to stretch elastically, sometime stretching to an extended width that is optionally 0.25, 0.5, 1.0, 1.5, 2.0, 2.5 or more its original width. This enables the mesh pocket to "give" somewhat, acting like a suspension element to provide a soft landing for the ball. With this reaction of the edge element, it prevents the pocket from rebounding the ball out of the pocket. After the initial impact and stretching, due to the elastic nature of the edge element, that edge element returns to its original un-stretched configuration.

Figure 42:
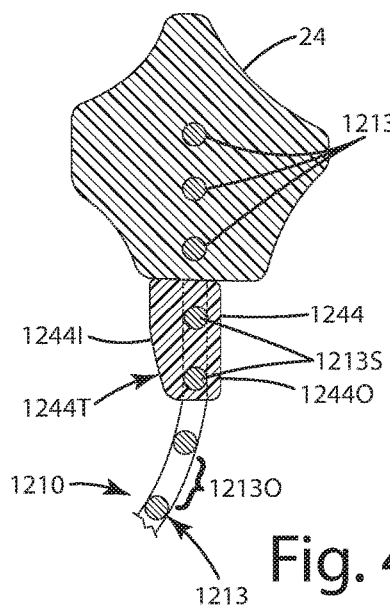
FIG. 42 is a section view of the lacrosse pocket of the twelfth alternative embodiment and head taken along lines 42-42 of FIG. 41.

As illustrated in FIG. 42, the pocket 1210 and in particular the mesh can be molded directly into the frame of the lacrosse head and in particular, the lower rim of the sidewall 24. The mesh 1213E embedded in the sidewall 24 is of a sufficient amount to anchor the pocket to that sidewall 24. Generally, the material from which the sidewall 24 is constructed, for example, nylon or some other polymer, substantially encapsulates the mesh 1213E that is ultimately embedded within that sidewall 24. This provides a solid adjoinment of the mesh with the sidewall.

To bolster that and add rigidity to the mesh, the edge element 1244 of the frame 1240 can be further joined with the mesh, immediately adjacent the sidewall 24 as shown in FIG. 42. There, the edge element 1244 (like the remainder of the frame) can generally encapsulate the mesh 1213. The material from which the edge element is constructed can also penetrate through the openings in the mesh to form opening fillers 1244O, which substantially fill the openings between adjacent strands 1213S of the mesh 1213. If desired, the interior 1244I of the edge element 1244, as well as any other elements of the flexible frame, can include a taper 1244T so that the overall thickness of the edge element or other frame component generally thins from one side to the other. Alternatively, the edge element or other component of the flexible frame can thin from a middle portion to outermost portions on opposite sides of that component. This construction can reduce weight of the flexible frame, and/or can be utilized to channel or maintain a ball in a particular orientation within the pocket 1210.

Optionally, the edge element 1244 and the other components of the flexible frame are not molded directly to the components of the lacrosse head 20. Instead, the lacrosse head is simply molded over the components of the mesh, for example, the encapsulated portions of the mesh 1213E as shown in FIG. 42. Of course, in other embodiments, the frame 1240 itself can encapsulate the outermost edges of the mesh. In such a construction, the edge of the frame can fit within a groove defined by the sidewalls and other head components. It can be glued, adhered, or friction fit within this groove.

Figure 42A:
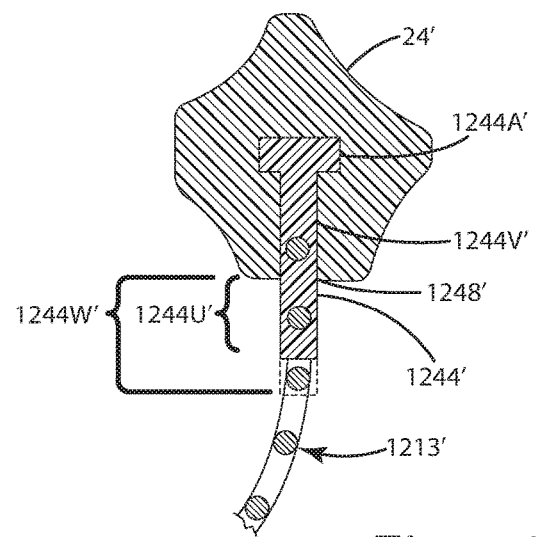
FIG. 42A is a section view of the lacrosse pocket with an elastic edge element of the twelfth alternative embodiment and head taken along lines 42-42 of FIG. 41.

In other constructions, the head can be molded over the edge of the frame to join these components. For example, where the edge element is elastic and configured to act like a suspension element to dampen the rebound of the pocket upon capture of a lacrosse ball, the edge element can be molded over by the head. As shown in FIG. 42A, the portion of the lacrosse head, for example the rail 24', is molded over the edge element 1244' of the flexible frame. In this construction, the elastic edge element can be anchored in the rail 24', with the mesh 1213' embedded within and encapsulated by the edge element 1244', but not the rail or other portions of the lacrosse head. This is so that the primary connection between the mesh 1213' and the head is via the elastic edge element 1244'. In this manner, the elastic edge element 1244' can be substantially the only item connecting the mesh to the head. Thus, any forces transferred to the mesh, for example, by a ball, also are transferred to the elastic edge element, which is allowed to stretch and provide relative movement of the mesh away from the lacrosse head.

As illustrated in FIG. 42A, an upper portion of the elastic edge element can include an enlarged head or anchor 1244A'. This anchor can assist in physically and mechanically retaining the edge element in the rail. The anchor can transition to a generally vertical web 1244V', which extends to and out the bottom 24B' of the lacrosse head portion or rail. The portion of the web 1244V' extending out the bottom can include the mesh 1213' embedded within and encapsulated by that portion of the web 1244V'. Generally, the mesh does not extend into the portion of the web above the bottom 24B'. This is so that the edge element is free to stretch outside the rail, unconstrained or unimpaired by the lower elasticity of the mesh, and/or so that the mesh can move away from the remainder of the lacrosse head.

Because the edge element is elastically deformable, force from the impact of the ball engaging the pocket can cause the elastic edge element to temporarily deform, for example stretch from its original dimensions to some greater dimensions, then return to the original dimensions. This is illustrated by comparing the width 1244W' when the edge element is in an un-stretched state, to the width 1244W" (in broken lines) when the edge element is in a stretched state, for example, after the ball impacts the mesh 1213', pushing on it, and thus stretching the edge element. Again, due to the stretch in the elastic edge element, the mesh and remainder of the pocket is able to move somewhat away from the lacrosse head, acting as a suspension element to thereby prevent the ball from bouncing out of the pocket.

Returning to FIGS. 39-42, optionally, the flexible frame 1240 can be outfitted with one or more shooting strings 1240S which can be placed in regions of the mesh corresponding to shooting strings.

A method for manufacturing a lacrosse head including the lacrosse pocket 1210 of the twelfth alternative embodiment will now be described. Generally, the mesh material is constructed from a plurality of strands on a mesh making machine. The mesh can be cut in an area corresponding to the middle pocket MP3, with a section of the mesh removed there. The remaining edges of the mesh in the middle pocket MP3 can be joined together at a seam 1212 utilizing any of the techniques identified above.

The mesh pocket so formed can be placed within a lacrosse head mold (not shown), with its outermost edges disposed in a mold cavity. Polymeric material, from which the lacrosse head is to be made, can be injected into the mold cavity. As this occurs, the portions of the mesh 1213E as shown in FIG. 42 are encapsulated by and embedded within the sidewall 24 the opposing sidewall of the scoop in the base. This in turn selectively secures and joins the mesh 1213 and the pocket 1210 with the head. The head is allowed to cure.

After it is cured, the head 20 and the now attached lacrosse pocket 1210 are removed and placed in second mold (not shown). The second mold can include a mold cavity that extends over selected portions of the mesh, generally in the areas of the runners, edge element and any optional shooting strings. Another material, such as a thermoplastic polymer such as TPU, is injected into the mold cavity. When so injected, it encapsulates and embeds within the mesh material, for example, as shown in FIG. 42. After the flexible frame cures, the pocket and an assembled head can be removed from the second mold.

XVI. Thirteenth Alternative Embodiment

A thirteenth alternative embodiment of a lacrosse pocket is illustrated in FIGS. 43-49 and generally designated 1310.

The pocket shown there is similar in structure, function and operation to the embodiments described above with several exceptions. To begin, the thirteenth alternative embodiment 1310 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material.

Optionally, large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

As noted above, a strand encompasses threads, cables, yarn, fibers, filaments, cords and other strand-like elongated structures. Certain conventional strands have an indefinite length and can be combined with other strands to produce a yarn for use in textile materials. The strands used in this embodiment can be constructed from materials such as thermoplastic polymers, such as nylon, polypropylene, high density polyethylene, ultra-high molecular weight polyethylene, as well as aromatic polyamide and other polymeric materials. Other abrasion resistant and durable material likewise can be implemented. As explained below, the forgoing materials can be mixed and matched within a single unitary textile material, making up a pocket to provide different mechanical and physical properties in different regions of the pocket as desired. As mentioned above, the pocket is a unitary textile material. Unitary textile materials can be produced via machine implemented mechanical manipulation of the strands, thereby producing a weaved or knitted material. The lacrosse pocket 1310 generally can be constructed automatically, by manipulating strands using various techniques implemented on a machine (rather than performed manually by a human). The various techniques include knitting, weaving, intertwining and/or twisting, the latter two of which are generally encompassed by knitting.

The pocket of this embodiment can be constructed on a textile manufacturing machine, such as a knitting machine and/or a weaving machine. A knitting machine utilized to construct one commercial embodiment of the pocket 1310. Knitting includes interlooping strands in a series of connected loops, optionally forming multiple columns of loops. In weaving, multiple strands are crossed and interweaved over and under one another at right or other transverse angles to each other at intersections. Strands used in weaving are usually characterized as warp and weft yarns. Intertwining and twisting can include techniques such as knotting and braiding, where strands intertwine with one another. Generally, knitting can encompass intertwining and twisting herein. Such machines are capable of producing knitted materials with a high degree of precision and reproducibility. With a pocket constructed from a unitary textile material as described herein, a particular pocket and its configuration can be reproduced or replicated with extreme precision. For example, from one pocket to the next, the dimensions elasticity, stretchability, contours are virtually identical when the pocket is installed in a lacrosse head. Further, where the unitary textile material pocket of the embodiments herein is molded directly into the material of a lacrosse head, it provides an advantage over pockets and heads of prior art. For example, almost all conventional mesh and traditional pockets over the years have been manually laced by a pocket stringer to the head. Depending on the stringer's talents, skills and preferences, the way that the pocket is strung to the head can vary considerably from one pocket to the next. With the current embodiments, that variability is overcome. Each pocket can be reconstructed and replicated precisely down to the same number of threads in every component of the lacrosse pocket. Further, where the pockets are molded into a head, the molding operation for the same can be precisely replicated from one head to the next. Thus, the variability in the head and pocket combination can be significantly reduced.

Due to this leap forward in pocket and head manufacturing capability, customers also can obtain lacrosse heads having a high degree of customization. For example, a particular player can have a preferred pocket profile. That profile can be determined and/or digitally captured or three dimensionally mapped into an automated pocket assembly machine. The automated pocket assembly machine, such as a knitting or weaving machine, can be programmed with data and/or code relating to or based on the preferred pocket profile. The machine can then precisely replicate that pocket profile in the form of a knitted or weaved lacrosse pocket which can then be installed in a lacrosse head. Generally, with the embodiments herein, a high degree of consistency can be achieved in manufacturing lacrosse pockets and complete heads, which can benefit players because they can know what to expect when they purchase a new lacrosse head with pocket.

Returning to FIGS. 43-49, the pocket 1310 can be installed in a lacrosse head 20. The pocket 1310 can extend from a scoop 28 toward the ball stop 23 and can be joined with the sidewalls 24 and 26. The pocket 1310 can be specially knitted and/or weaved in a particular manner on a knitting or weaving machine to create different zones A-E.

Optionally, zone A is a zone of release, where the ball last touches the pocket before exiting from the head 20. The lower portion of this zone A can be bounded by a first shooting string and/or element 1345A. This shooting string element can be in the form of a conventional large diameter lace, for example greater than 2.0 mm diameter, which is joined with the unitary textile material as described further below.

The next zone B toward the ball stop 23 can be referred to as a catching zone. Generally, it is located between the first shooting string element 1345A and the second shooting string element 1345B. Along the sides of the lacrosse head, however, that zone B material extends rearwardly toward the ball stop 23. This portion of zone B can also form the beginning of a shooting ramp SR. The second shooting string 1345B can be relatively taut as it forms the start of the shooting ramp.

The next zone C of the unitary textile material pocket 1310 can be a transition zone which generally forms the midpoint of shooting ramp SR. This zone C can be bounded between the second shooting ramp element 1345B and the reference lines 1345C as illustrated. If desired, there can be a shooting string in the form of a large diameter lace joined with the head in this construction.

As illustrated in FIG. 43, zone D can encompass a loading zone, where the pocket is generally supple and flowing to hold a lacrosse ball LB short of the ramp. Generally, this zone D is adjacent a fourth reference line 1345D, which also can be optionally in the form of a shooting ramp element when included.

The lacrosse head also can include a pocket also referred to as a middle pocket MP4, located generally in zone E. Although shown approximate ⅓-½ the distance from the ball stop 23 to the scoop, the precise location of the middle pocket MP4 can vary depending on the desired performance characteristics of the lacrosse pocket and head. In some cases, MP4 can be moved higher, closer to the scoop 28 than as shown in FIG. 43. In other cases, the middle pocket MP4 can be moved closer to the ball stop 23.

The unitary textile material forming the lacrosse pocket 1310 and in particular the lacrosse pocket main body 1310B is in the form of a single material element having a unitary construction. This unitary construction encompasses a configuration where the different regions or portions of a unitary textile material are not joined together by seams, stitches, adhesives or molded features, but rather the primary joining of the different regions is via mechanical manipulation of the individual strands making up the unitary textile material in the different regions to join those different regions as explained further below. This mechanical manipulation can be performed with an automated pocket assembly machine, for example, a knitting machine is mentioned in the embodiments herein, and/or a weaving machine. Of course, other types of automated machines capable of manufacturing the pocket without any manual manipulation of the strands during the automated process are also contemplated.

While the pocket and pocket body 1310 and 1310B are constructed from a unitary textile material, each can include different regions having different physical and/or mechanical properties. These physical and/or mechanical properties from region to region can vary. For example, the different regions can have different elasticities, different stretch capabilities, different stiffnesses, different air permeabilities and/or pore sizes, different air flow through it due to the pore or opening structure, different support, different recovery and/or different rigidity. The physical properties described in connection with these embodiments, however, generally do not include aesthetic properties such as color, hue, shading or visual pattern differences.

Figure 46:
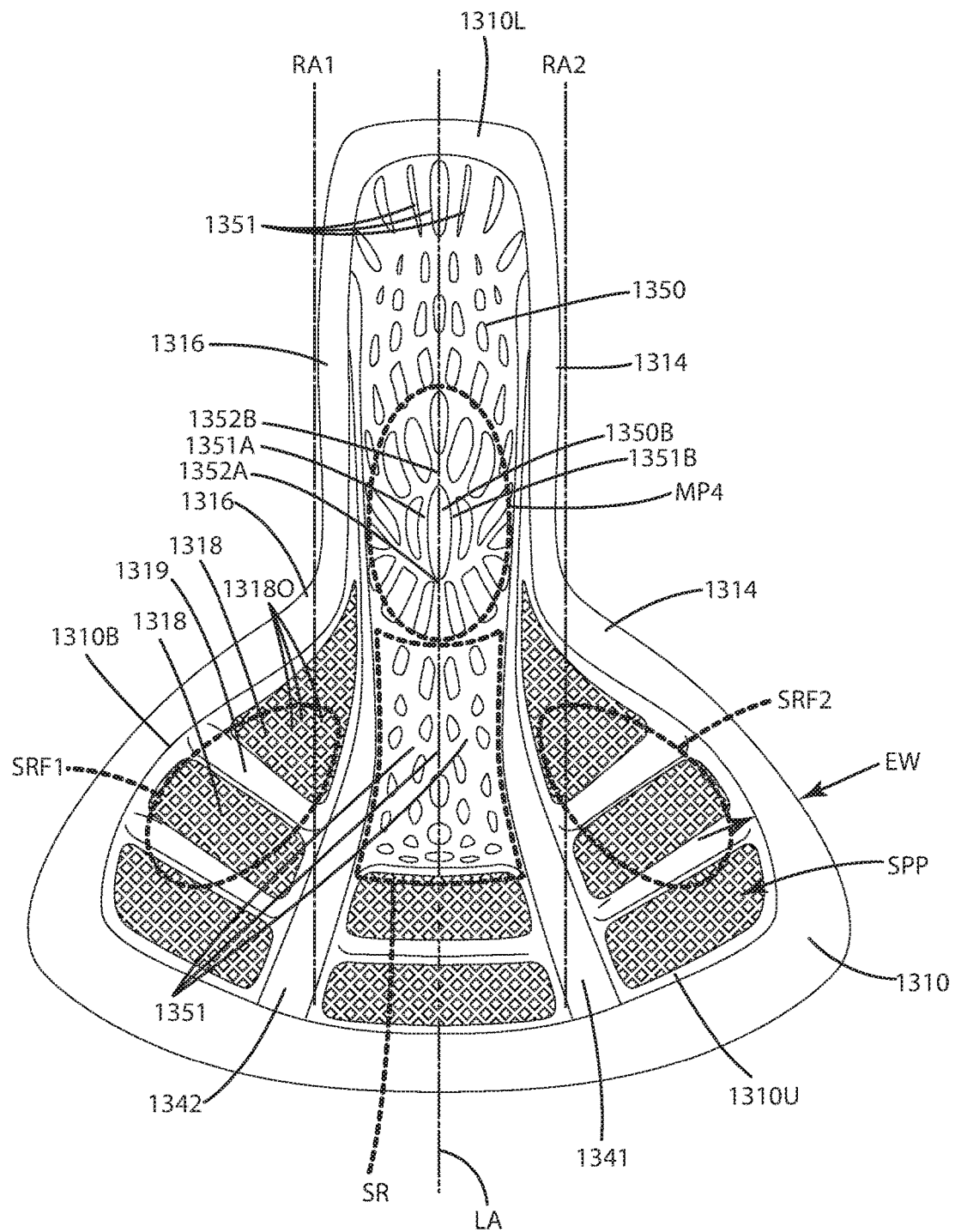
FIG. 46 is a front perspective view of the lacrosse pocket of the thirteenth alternative embodiment in a free standing form.

As shown in FIG. 44, the lacrosse pocket body 1310B generally includes several different regions. As mentioned above, the pocket includes a middle pocket MP4 which transitions at a transition T to a shooting ramp SR. The shooting ramp SR is disposed between knitted or weaved runners 1341 and 1342. These runners are integral with the unitary textile material from which the lacrosse pocket 1310 is constructed. The runners can include a more densely knitted pattern to provide enhanced rigidity and generally taut structures to better guide a ball being shot from the head 20. The runners can be constructed so as to extend from a region adjacent or forward of the middle pocket MP4 outward toward the scoop 28 as shown in FIG. 44. Optionally, the runners can be constructed as shown in FIG. 46 to extend from an upper portion 1310U to a lower portion 1310L of the pocket, optionally stopping short of that lower portion 1310L as shown in FIG. 46. The runners can be constructed to be approximately 4-7 needles wide, further optionally about 3 to about 15 needles wide, depending on the particular knitting machine utilized to knit the pocket. The runners can generally transition directly to the upper edge 1310U of the lacrosse pocket 1310 which generally provides a solid mounting location for those runners, particularly given the amounts of force that the runners are under as a ball moves through the shooting ramp SR.

Optionally, if desired, the runners 1341 and/or 1342 can be specially constructed to be less elastic than the remainder of the main body of the pocket. In turn, this can provide a more defined shooting ramp, also referred to as a ball channel, for the lacrosse ball to exit from the lacrosse head. As one example, the runners can be more densely knitted (with more courses and/or wales) or weaved than other portions of the pocket, such as the perimeter flange, the middle pocket and/or the shooting ramp flanks. In such a case, the runners can include another knit pattern which is different from the knit patterns of the perimeter flange, the middle pocket and/or the shoot ramp flanks. As another example, the runners can include less openings defined therein as compared to other portions of the pocket body. As yet another example, the lacrosse pocket body can be formed of a single unitary knit pattern. In the regions of the first and second runners, the strands can be different from the strands and other regions adjacent those runners. The strands in the regions of the runners can be less elastic than the material and adjacent regions. As a more particular example, strands in the regions of the runners can be constructed from an inelastic material such as metal strands, carbon or composite strands, or high tensile strength polymeric strands, while strands in adjacent regions, while constructed from the same knit pattern, can be made of thermoplastic polymers or some material that is less elastic than that of the strands in the runners. Even in these other constructions, however, the lacrosse pocket body, and in particular the unitary material from which it is formed, can include the first and second runners integrally formed therein without the addition of separately and/or independently constructed structures to the lacrosse pocket body.

Further optionally, to construct runners with different materials than the remainder of the lacrosse pocket, one or more additional spools of material can be added to the automated assembly machine. In particular, the spools can include a continuous strand of material constructed from materials different from other strands used in other portions of the lacrosse pocket. Where it is desired that the runner be less elastic than the remainder of the pocket, the continuous strand can be constructed from a material that is less elastic than other strands used in other portions of the pocket. The continuous strand of different material can be pulled off the dedicated spools holding the same.

Even further optionally, due to the mechanical manipulation of the strands used to make the pocket, the knitting and/or weaving machine can be programmed to knit or weave the runners 1341 and/or 1342 in a particular direction. For example, most traditional constructions include runners that are parallel to a longitudinal axis of the pocket, and centered about the longitudinal axis. In the current embodiments, it is contemplated that the first and second runners can be disposed at a variety of angles relative to the pocket longitudinal axis LA. For example, although not shown, the first runner 1341 can be configured to diverge at an angle of about 5° to about 45° away from the pocket longitudinal axis LA as the runner transitions from the base toward the scoop. Conversely, the second runner 1342 can be configured to converge at an angle of about 5° to about 45° toward the pocket longitudinal axis as the runner transitions from the base toward the scoop. Further, the first and second runners can be configured so that they are not centered on the pocket longitudinal axis at the upper edge of the pocket. For example, the first runner 1341 can be configured to join with the upper edge of the pocket a distance to the left of the pocket longitudinal axis LA. The second runner 1342 however can be configured to join with the upper edge of the pocket at the pocket longitudinal axis LA. This construction can be reversed with the second runner 1342 offset a distance to the right of the pocket longitudinal axis, while the first runner 1341 passes through the pocket longitudinal axis LA adjacent the upper edge. These different types of offset runners can be customized to accommodate a player's shooting techniques and/or the desired exit location of the lacrosse ball.

Returning to the embodiment shown in FIG. 44, the upper edge 1310U can be adapted to attach directly to the scoop 28 of the head. This can be accomplished by adding large diameter lacing to the pocket and lacing the pocket directly to the scoop. Alternatively, as described below, the pocket edges and/or a perimeter flange can be molded directly into the frame of the lacrosse head. The lower edge 1310L can correspond to a portion of the pocket adapted to attach to a base or ball stop 23 of the lacrosse head 20 as shown in FIG. 44. The pocket can be bounded by first and second sidewall edges 1314 and 1316 as well. These sidewall edges 1314 and 1316 can be of the same general knit pattern as the upper edge 1310U and the lower edge 1310L. Generally, this knitting pattern can be constructed so that the respective edges and/or the perimeter flange 1310PF in general, are optionally 1.0 mm to 20.0 mm, further optionally 2.5 mm to 15.0 mm, further optionally 5.0 mm to 10.0 mm in overall edge width EW as shown in FIG. 46.

The edges, 1310U, 1310L, 1314 and 1316 as well as other regions of the pocket depending on the application, can be constructed from a first material, which can be less elastic, and/or more abrasion resistant and durable than the second material. Optionally, the first material can be at least one of an aromatic polyamide and an ultra-high molecular weight polyethylene. One suitable aromatic polyamide is poly-para-phenylene terephithalamide, sold under the commercial name of KEVLAR® by DuPont of Wilmington, Del. The first material optionally can have strands having: a tensile modulus of elasticity of optionally 400-1000 g/d, further optionally 500-900 g/d, and even further optionally at least 500 g/d; an elongation at break of optionally 1.0% to 10.0%, further optionally of 3.0% to 2.4%, further optionally 3.6%; a breaking tenacity of optionally 100-300 cN/tex, further optionally 150-250 cN/tex, even further optionally 203-208 cN/tex; and a tensile strength of optionally about 2,000-10,000 MPa, further optionally 3,000-6,000 MPa and even further optionally about 3,600 MPa. This first material can be less elastic and more abrasion resistant and durable and tear resistant than the second material used in for example, the middle pocket shooting ramp or shooting ramp flanks.

Further optionally, the second material can be a thermoplastic polymer, for example high density or high strength polyethylene, polypropylene and/or a polyethylene multifiber yarn. The second material optionally can have strands having: a modulus of elasticity of optionally 0.1-2.0 GPa, further optionally 0.5-1.0 GPa; elongation at break of optionally greater than 50%, further optionally greater than 100%, even further optionally greater than 500%; and a tenacity of optionally 20-350 kN/tex, further optionally 30-320 kN/tex, and even further optionally 50-100 kN/tex, and even further optionally less than 150 kN/tex. The second material can include strands optionally in a range of 100 Denier to 1000 Denier, further optionally 150 Denier to 840 Denier, even further optionally 210 Denier to 750 Denier, yet further optionally 300 Denier and/or 420 Denier.

If desired, the first and second materials can include a UV inhibitor to protect the strands when the pocket is used in direct sunlight. Of course, the entire pocket can be constructed from the first material and second material, only one of the two materials, and/or other additional materials depending on the application.

As mentioned above, within the boundaries of the edges described above, the pocket body 1310B can include other features or components. As shown in FIG. 46, the pocket body can include runners 1341 and 1342. These runners can be constructed from the second material and/or the first material mentioned above. The pocket body also can include shooting ramp flanks SRF1 and SRF2. These can be disposed laterally of the longitudinal axis LA shown in FIG. 46, and further laterally of the shooting ramp SR and respective runners 1341 and 1342.

Figure 47:
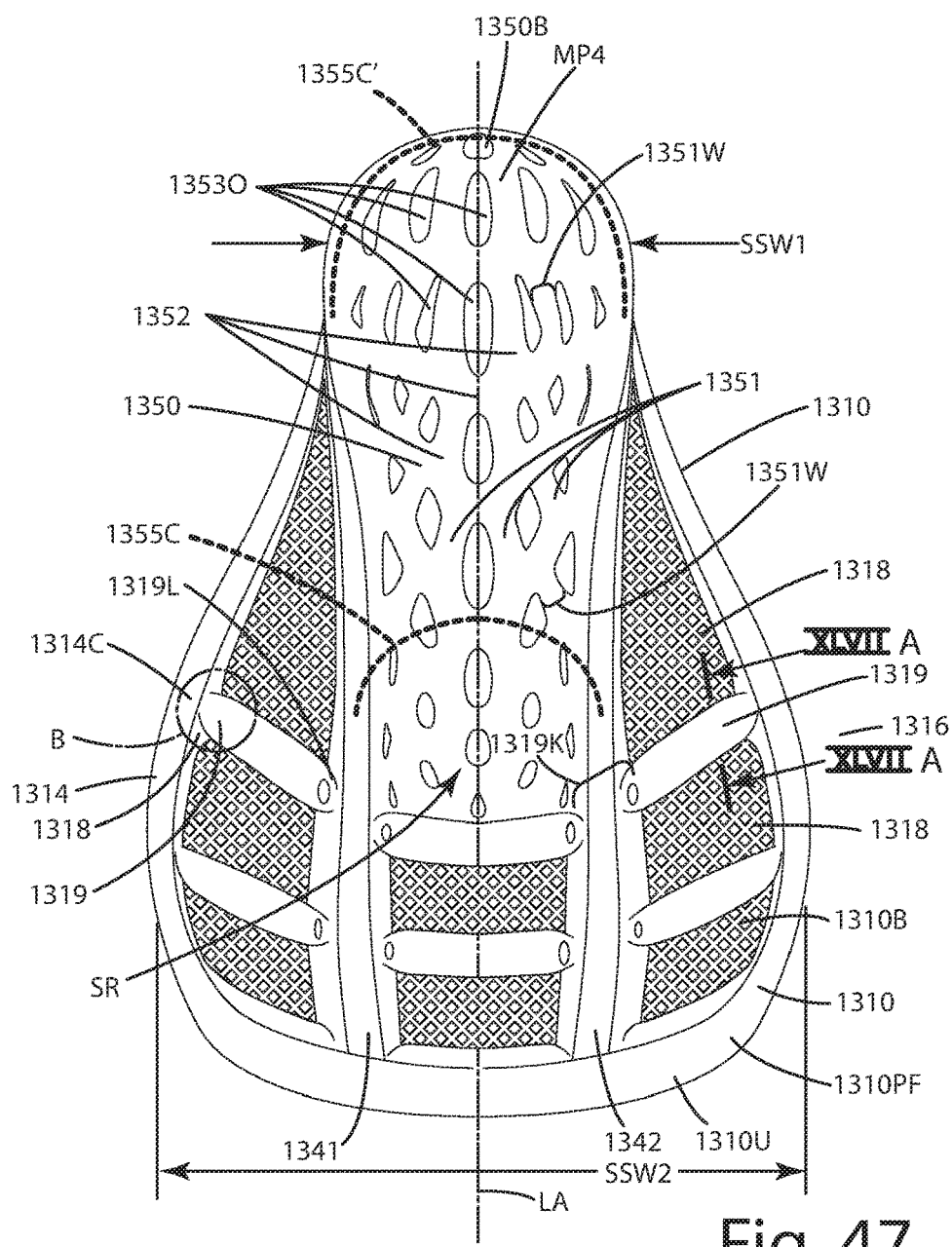
FIG. 47 is a rear perspective view of the lacrosse pocket of the thirteenth alternative embodiment in a free standing form.
Figure 47A:
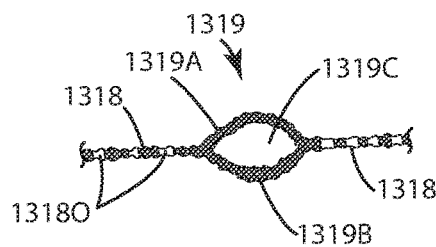
FIG. 47A is a section view of a shooting string tubular member taken along lines 47A-47A in FIG. 47.

The shooting ramp flanks SRF1 and SRF2 can be constructed from the second material mentioned above as well. The shooting ramp flanks can include one or more knit patterns that are different from knit pattern of the edges. For example, the first and second shooting ramp flanks SRF1 and SRF2 can include a second knit pattern 1318 and a third knit pattern 1319. The pattern 1318 can be more open yet relatively thick and three dimensional, forming large openings 13180 within that knit region 1318. The thickness of this region, however, can be such that it can render this region relatively taut even when placed under tension, for example, when disposed or molded into a lacrosse head. With reference to FIGS. 47 and 47A, the shooting ramp flanks SRF1 and SRF2 can include region 1319, which can be a layered knit pattern. For example, as shown in the cross section of the third knit pattern 1319, the unitary textile material within that third knit pattern can define an optional tubular structure or channel 1319C. This tubular structure can be formed from a first knitted layer 1319A and a second knitted layer 1319B which are joined with immediately adjacent knitted pattern 1318. In particular, the tubular structure can be formed by knitting a ripple stitch in the pocket. Within this structure, the layers 1319A and 1319B include a plurality of strands that extend outward and are interlooped with portions of the immediately adjacent knitted pattern of 1318. Likewise, the plurality of strands that make the knit pattern 1318 also extend into and are interlooped with strands in the first and second layers 1319A and 1319B. These layers themselves are integrally formed with one another and within the unitary textile material. They are separated a distance, which in turn forms the tubular structure or internal channel 1319C.

Optionally, the third pattern 1319 can be deleted, and in which case the second pattern 1318 can be continuous and uninterrupted by the third knit pattern making up its respective layers. Of course, where the third pattern is included, it can provide an additional functionality. First, it can exert different mechanical properties in the region. As illustrated in FIGS. 46 and 47, the third knitted pattern 1319 can extend transversely across the width of the pocket. In so doing, it can provide additional mechanical properties in this region, for example, it can make the pocket in the region more taut than other regions surrounding the third pattern, for example, the second pattern 1318.

If desired, the tubular structure 1319C also can be interrupted in regions 1319K and 1319L as shown in FIG. 47. In this construction, the tubular structure can extend from one sidewall edge 1314 to the opposing sidewall edge 1316, but can be interrupted and open in preselected areas. In those areas, the runners 1341 and 1342 however are generally contiguous and uninterrupted. Given their ability to form and guide the ball in the shooting ramp, in the embodiment illustrated, it sometimes is more helpful to have the runners uninterrupted than the tubular structures 1319C formed within the knitted textile. Of course, in certain applications, this can be reversed if desired.

Figure 51:
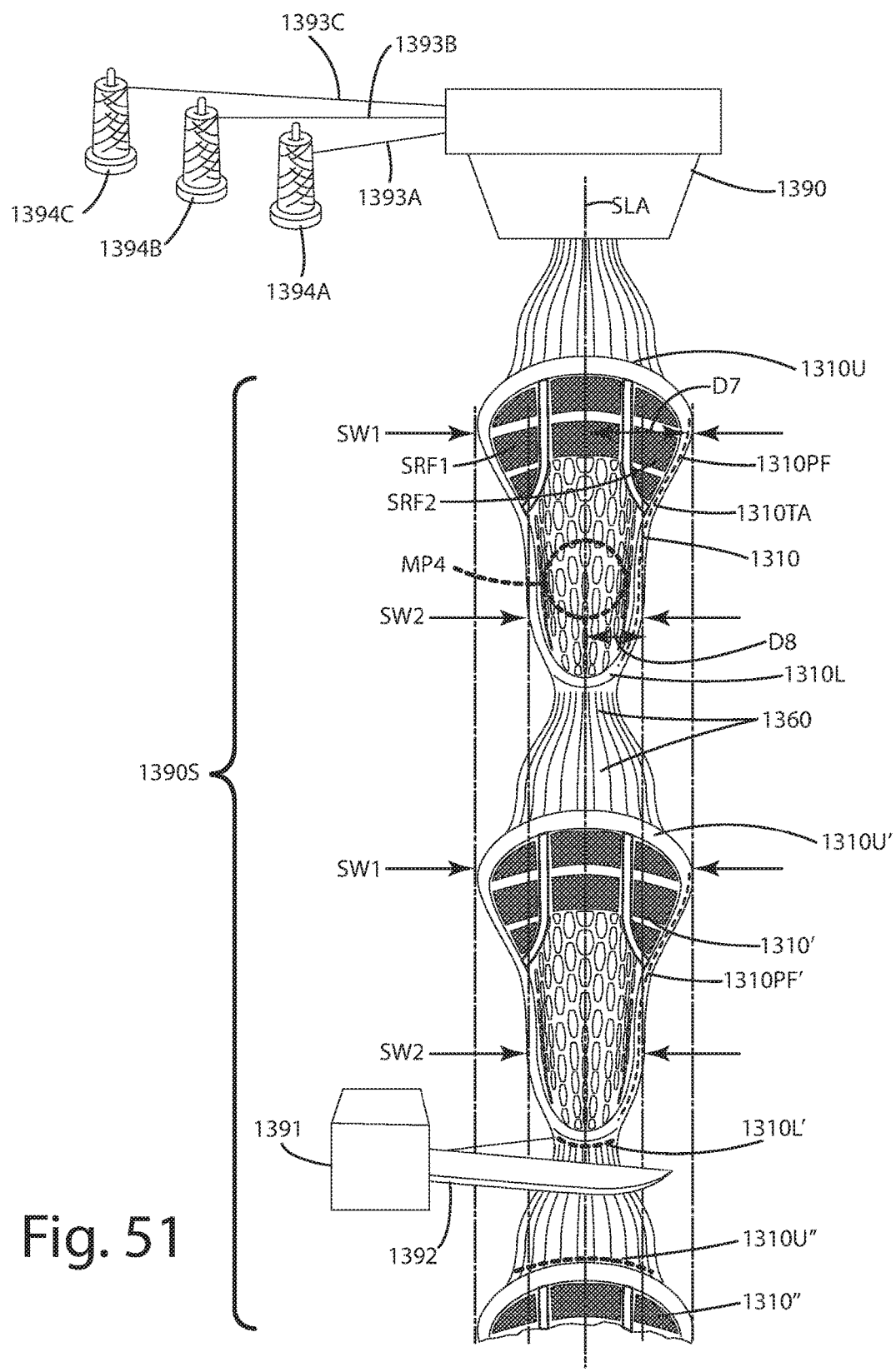
FIG. 51 is a schematic illustrating a strip of lacrosse pockets of the thirteenth alternative embodiment being manufactured with a knitting machine or weaving machine in a knitting process or weaving process.

As shown in FIG. 51, in a finished head, the tubular structures 1319C can include a large diameter (greater than 2.0 mm) lace threaded through them to act as defined shooting strings that are precisely located within the lacrosse pocket due to the tubular structures 1319C. With the tubular structures, there also leaves little room for error when precisely locating the laces within the lacrosse pocket body.

Figure 50:
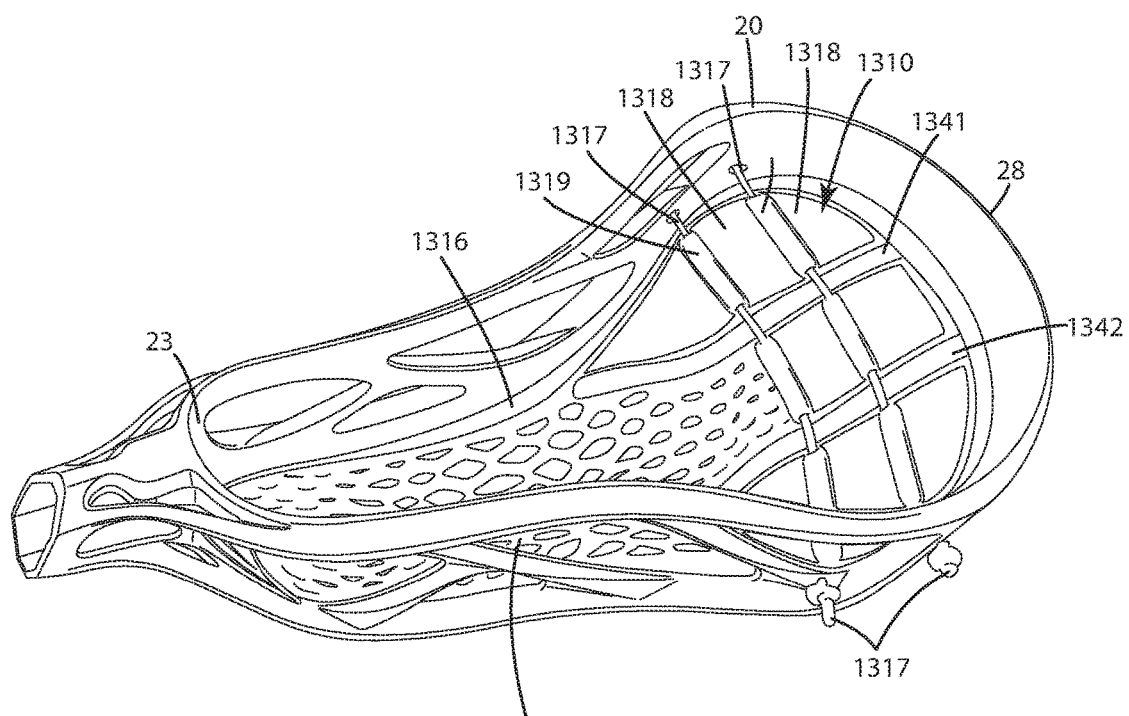
FIG. 50 is a perspective view of the lacrosse pocket of the thirteenth alternative embodiment mounted to a lacrosse head and including secondary laces inserted in tubular structures.

The large diameter laces 1317 can extend transversely through and across the lacrosse pocket, being partially concealed within the tubular structure 1319 and optionally intermittently exposed in certain regions, for example, adjacent the runners 1341 and 1342. Of course, alternatively, the large diameter laces can be completely sealed within the tubular structures or reversed so that they are only exposed intermittently on the rear of the lacrosse pocket 1310. Optionally, additional third knit pattern 1319 can be included in the head, for example, another shooting string element can be disposed closer to the base or ball stop 23 of the head as shown in FIG. 50. Another lace 1317 can be threaded through the respective tubular structure and intermittently exposed in certain areas. The laces 1317 or some other type of elongated element can be placed within the tubular structure 1319C. The elongated element is generally free floating relative to the tubular structure. However, in some cases, the elongated element can be stitched, adhered or hot melted to the tubular structure surrounding it so that relative movement between the two structures can be limited.

The tubular structure 1319C in the third pattern 1319 can include a plurality of strands that are interlooped via knitting, or weaved with strands of the adjacent second pattern 1318. Indeed, many of the strands of the third pattern can extend into and are interlooped with the strands of the second pattern. Further, some of the strands are continuous, with one of a plurality of strands extending through the second knit pattern 1318 also extending through the third knit pattern 1319, and/or other knit patterns. Accordingly, the different knit patterns can be contiguous and/or continuous with one another, being integrally sewn and connected via a plurality of continuous strands extending through both.

The precise interlooping of the knitting pattern or the precise weave of the weave pattern can vary depending on the strands and the desired patterns and their interfaces. Generally, however, as illustrated in FIGS. 47 and 47A, the transition between the different knit patterns, for example, 1318 and 1319 are imperceptible due to the extension of the strands of each of those respective patterns extending into both. Of course, this is accomplished via the special techniques implemented via the associated knitting and/or weaving machine associated with the knitting and/or weaving process used to construct the entire pocket. As illustrated, there are no defined "edges" that form the terminating boundaries of the respective regions or patterns, for example patterns 1318 and 1319. Further, there is no separate stitching, gluing, over molded portions or large diameter (greater than 2.0 mm) laces, thongs or webs that join the different patterns of the pocket.

Optionally, a plurality of knit patterns can come together and be contiguous and continuous with one another, integrally formed in the single, unitary textile material. As shown within the circle B in FIG. 47, the first pattern 1314C of the edge 1314 is joined and transitions seamlessly to the second pattern 1318, as well as the third pattern 1319, which itself includes the tubular structure 1319C. These different patterns are capable of merging into one another seamlessly, without having to join different edges or structures, other than the interlooped or interweaved strands of each pattern. Further, each of these different knit patterns are formed as an integral unit by the knitting and/or weaving process on a knitting machine and/or weaving machine. Thus, when the machine is done knitting, no further components or structures need be added to the pocket to join these different knitting patterns. This can eliminate human interface with the construction of the pocket via manual manipulation of different parts of the pocket.

Figure 49:
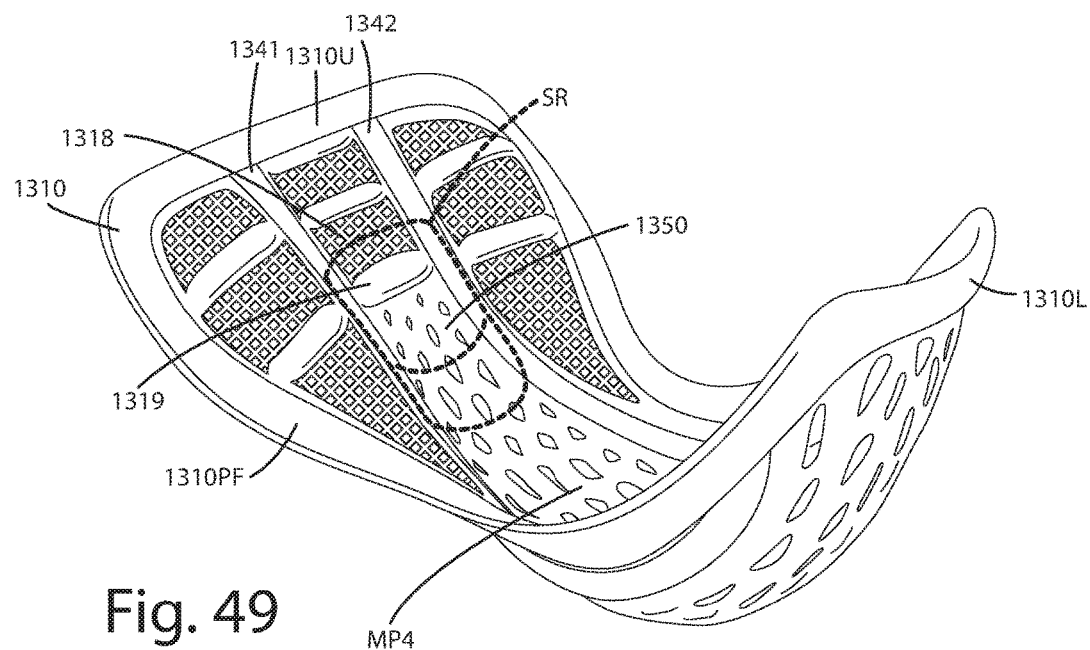
FIG. 49 is a front perspective view of a lacrosse pocket of the thirteenth alternative embodiment in free standing form.

Turning to FIGS. 44, 47 and 49, the pocket can be constructed to include a shooting ramp SR as mentioned above. Again, this shooting ramp can be flanked by the shooting ramp flanks SRF1 and SRF2. When initially formed by the knitting or weaving machine in any of the respective knitting and/or weaving processes, the respective shooting ramp flanks SRF1 and SRF2 can include a generally planar or convex configuration. By convex, it is meant that the respective shooting ramp flanks SRF1 and SRF2 generally bulge or bow upward when the pocket is placed in the generally horizontal configuration as shown in FIG. 49.

As shown in FIG. 49, the shooting ramp SR can include several different knit and/or weave patterns in the unitary textile material from which the pocket 1310 is constructed. For example, the shooting ramp SR can include and be partially bounded by the first and second shooting ramps 1341 and 1342. Again, these ramps can be constructed from a certain type of knit pattern, for example, a knit pattern including the generally contiguous surface being approximately 5-10 needles wide. Optionally, these ramps can be constructed from interlooped strands or interweaved strands of a different color than surrounding knit patterns so that a user can visually perceive the runners.

The shooting ramp SR also can include a portion of the second knit pattern 1318 toward the end of the shooting ramp, near the upper edge 1310U. The shooting ramp also can include a portion of the third pattern 1319, further optionally with its tubular structure 1319C. Of course, where an elongated element, such as a large diameter lace is placed through the tubular structure, that elongated element can also pass transversely through the shooting ramp SR. As the shooting ramp transitions rearwardly, and the middle pocket MP4 and the lower edge 1310 of the pocket, yet another knit pattern can be included. This knit pattern 1350 can be different from the first, second and third knit patterns described above. This knit pattern 1350 can transition to the respective runners 1341 and 1342, as well as the patterns 1319 and/or 1318.

Figure 48:
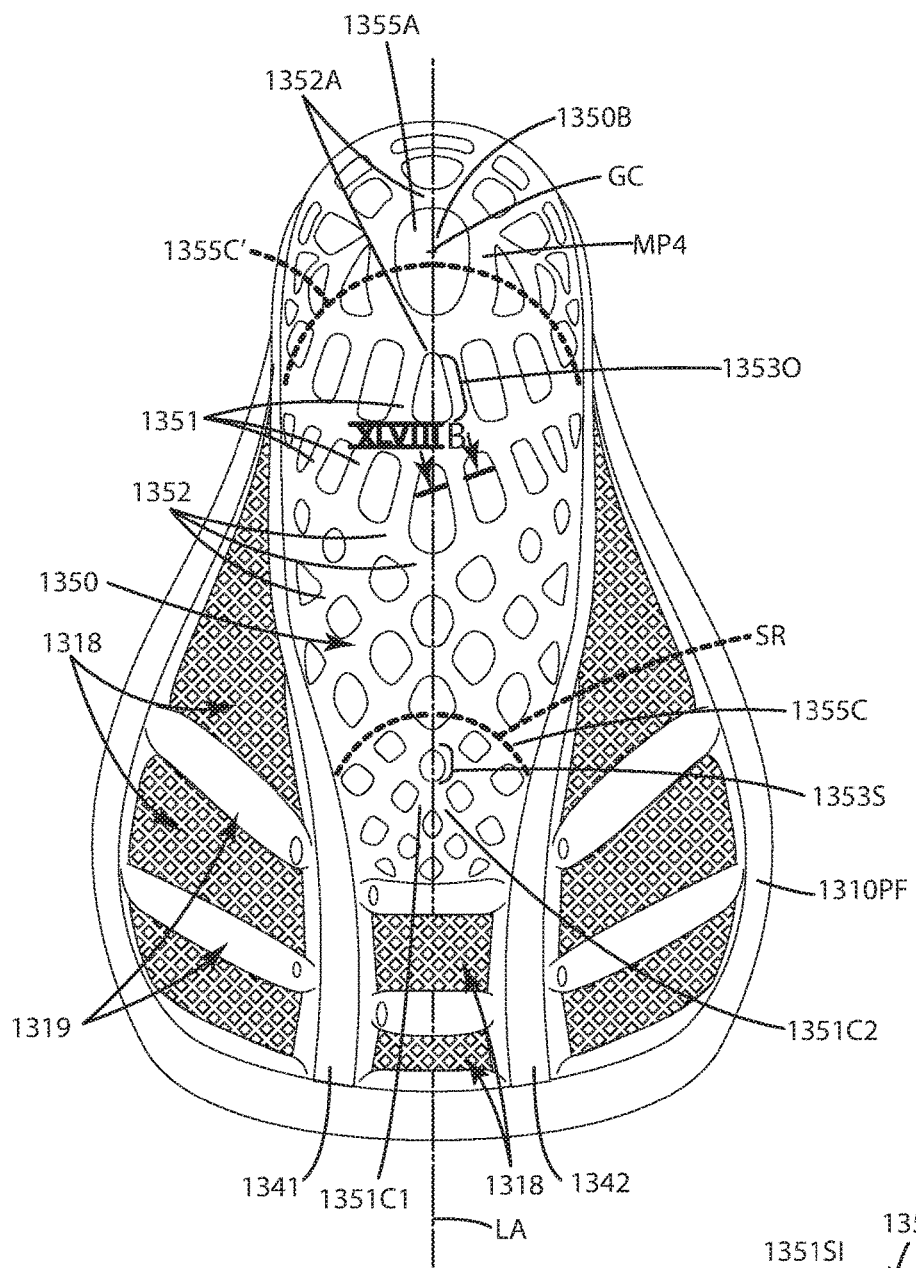
FIG. 48 is a rear perspective view of the lacrosse pocket of a thirteenth alternative embodiment placed on a contoured fitting structure.

As shown in FIGS. 47-49, the pattern 1350 defined within the shooting ramp SR can be part of the unitary textile material from which the pocket 1310 is constructed. This knit pattern 1350 can include a plurality of vertical elements 1351 intermittently joined via a plurality of join elements 1352. The vertical elements 1351 (FIG. 47) can generally be somewhat parallel with one another, extending generally parallel to the longitudinal axis LA of the lacrosse pocket 1310. These vertical elements 1351 can extend from the portion of the shooting ramp SR closer to the upper edge 1310U of the pocket and generally rearwardly toward the lower edge 1310L (FIG. 46). Certain ones of the vertical elements 1351 can be joined with the lower edge 1310L and integrally, continuously knitted and/or weaved to that edge.

The vertical elements 1351 can be constructed so that they will expand away from one another, generally providing a supple and elastic region as they transition closer to the middle pocket MP4. The width of any of the vertical elements, particularly when knitted on a knitting machine, can be adjusted to provide desired mechanical and physical properties of the knit pattern 1350. For example, in some cases, where the pocket is weft knitted on a tubular knitting machine, the vertical elements 1351 can be optionally less than 15 needles wide, further optionally less than 10 needles wide, even further optionally less than 8 needles wide when knitted on a knitting machine. Incidentally, as used herein, the term needles can be interchangeable with the term wales, which is known in the knitting arts. In some cases, the vertical elements are less than 7 needles wide so that the vertical elements do not begin to merge with one another, forming a continuous knit pattern that generally does not include any of the knit pattern apertures 1353, for example, as shown in FIG. 47. When that occurs, sometimes the knit pattern 1350 can become too rigid and stiff, which can affect the ability of the middle pocket MP4 to effectively grip a ball disposed therein. Generally, each of the respective vertical elements 1351 maintains a constant width 1351W as it transitions from the shooting ramp SR rearward through the middle pocket MP4 into the rear edge or lower edge 1310L. This can enable the plurality of strands making up each of the respective vertical shooting elements 1351 to be continuous and extend throughout the entire respective vertical elements.

Figure 48B:
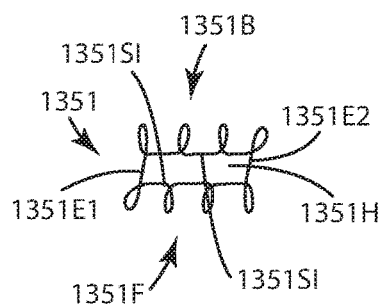
FIG. 48B is section view of a tubular vertical element taken along lines 48B-48B in FIG. 48.

Optionally, the vertical elements 1351 can be knitted in the form of tubular elements. A cross-section of a vertical element 1351 is shown in FIG. 48B. There the vertical element is constructed in the form of a knitted tubular structure. The knitted tubular structure includes a front face 1351F and a rear face 1351B. Each of these individual faces are constructed from respective front and rear needle beds during the knitting process. These faces also can be connected and joined with one another at the respective sides 1351E1 one and 1351E2. The front and rear faces are, however, separated from one another on their interiors which face one another. Thus, the faces cooperatively form a cavity or chamber 1351H. This chamber 1351H extends along the length of the vertical element a preselected distance, optionally along the entire vertical element. It is this interior chamber, bounded by the front and rear faces that gives the vertical elements the generally tubular structure. It is to be noted that in some cases, the front and rear faces in particular their interior facing surfaces 1351SI can engage and contact one another. In such a configuration, the chamber 1351H can appear collapsed and can have minimal to no volume.

Further optionally, depending on the pocket and desired features, other structures of the pocket can be knitted in the form of tubular elements. For example, the runners 1341 and 1342, the perimeter flange 1310PF or other elements of the pocket can be constructed in a similar manner to include the knitted tubular structure described above. Indeed, the pocket can be constructed from a variety of different or similar tubular structures, combined with other flat knit patterns or other knit patterns as desired.

As mentioned above and as shown in FIGS. 46-49A, the vertical elements 1351 can be joined with one another with a plurality of join elements 1352. These join elements 1352 can be constructed from a plurality of strands that are interlooped with the respective strands of the respective vertical elements 1351. Optionally, the joins can be constructed with an Intarsia knitting process or technique, further optionally by knitting two adjacent areas in an overlapped manner with a knitting machine. Even further optionally, the joins 1352 can be constructed by overlapping the rows, also referred to as courses herein, that form adjacent vertical elements. As an example, a join 1352 a can be formed by at least partially overlapping a row of knitting of the vertical element 1351C1 with another row of adjacent vertical element 1351C2. In some cases, another row from vertical element 1351C2 can overlap another row of the vertical element 1351C1. This can be repeated multiple times, overlapping certain portions of rows from adjacent vertical elements, until a join of desired dimension is achieved.

Referring to FIGS. 46-49A, the join elements 1352 can extend laterally of each of the respective vertical elements 1351 joining adjacent ones of those vertical elements 1351. The spacing of the joins can be varied in transitioning from the shooting ramp SR rearward toward the middle pocket MP4 and further toward the rear edge 1310L of the pocket 1310 or pocket body 1310B.

For example, as shown in FIG. 48, the join elements 1352 can be more widely spaced or distanced from one another along a respective vertical element 1351 in some areas than in others. Optionally, knitted rows from adjacent vertical elements can overlap one another at more frequent intervals to form more frequent joins. As shown in FIG. 48, the joins near the middle pocket MP4 can be spaced from one another so as to form openings 1353O. These openings can be of different sizes and shapes from the openings 1353S near the shooting ramp SR. In some cases, the openings 1353O near the middle pocket MP4 can be 2, 3, 4, 5, even 10 times longer or larger than the openings 1353S near the shooting ramp. In turn, this enables the vertical elements 1351 near the middle pocket MP4 and/or the apex 1355A of the pocket to more easily spread apart from one another, and thus become more supple and pliable to accommodate and optionally restrain a lacrosse ball disposed in the middle pocket MP4. This also can provide a greater sag in the middle pocket MP4 to better grip the ball. In contrast, with the smaller apertures 1353S there is an increased number of join elements 1352 in the shooting ramp SR, or there are more join elements per unit of distance in that region, so that the vertical elements 1351 cannot generally expand as much or distance themselves from one another as easily as in the middle pocket MP4. In turn, this creates a more rigid and/or taut knit pattern within the shooting ramp SR, which can be conducive to the ball easily rolling off or through that shooting ramp.

Optionally, as shown in FIG. 48, two or more vertical elements, for example 1351C1 and 1351C2 can extend continuously from the shooting ramp SR all the way to the lower edge 1310L. These vertical elements 1351C1 and 1351C2 can be attached to one another via a plurality of joins 1352. The frequency of the joins can decrease nearing the bullseye opening 1350B from either or both the shooting ramp direction or the direction of the upper edge of the pocket. With such a construction, the openings within the pattern of the middle pocket become progressively larger in area as they near the bullseye opening 1350B. Accordingly, the openings within the pattern of the middle pocket, and in particular those between the vertical elements 1351C1 and 1351C2 become progressively smaller in area as they increase in distance from the bullseye opening and/or the apex of the pocket. This progressive decrease in the overall area of the openings can occur in any direction emanating outward from the bullseye opening 1350B. The bullseye opening 1350B can be the largest dimensioned opening defined by the lacrosse pocket, and can have the largest area of any opening defined therein. Further optionally, the middle pocket can define multiple different sized openings formed as the pocket is produced via an automated assembly machine, such as a knitting machine. Each respective opening of the middle pocket can be bounded by at least one vertical element in at least one join element. The distances between the joins along the adjacent vertical elements can vary, depending on the desired area of the opening and its location within the middle pocket.

As shown in FIGS. 47 and 48, the unitary textile material from which the pocket 1310 is constructed can be specifically knitted and/or weaved by a respective knitting and/or weaving machine to include a predefined three dimensional concave shape integrally formed in the single type of textile. By predefined, it is meant that the machine, whether a knitting or weaving machine, automatically manipulates the plurality of strands in such a manner so that they achieve the respective three dimensional and/or planar shapes. These parameters can be preprogrammed into the machine.

Figure 49A:
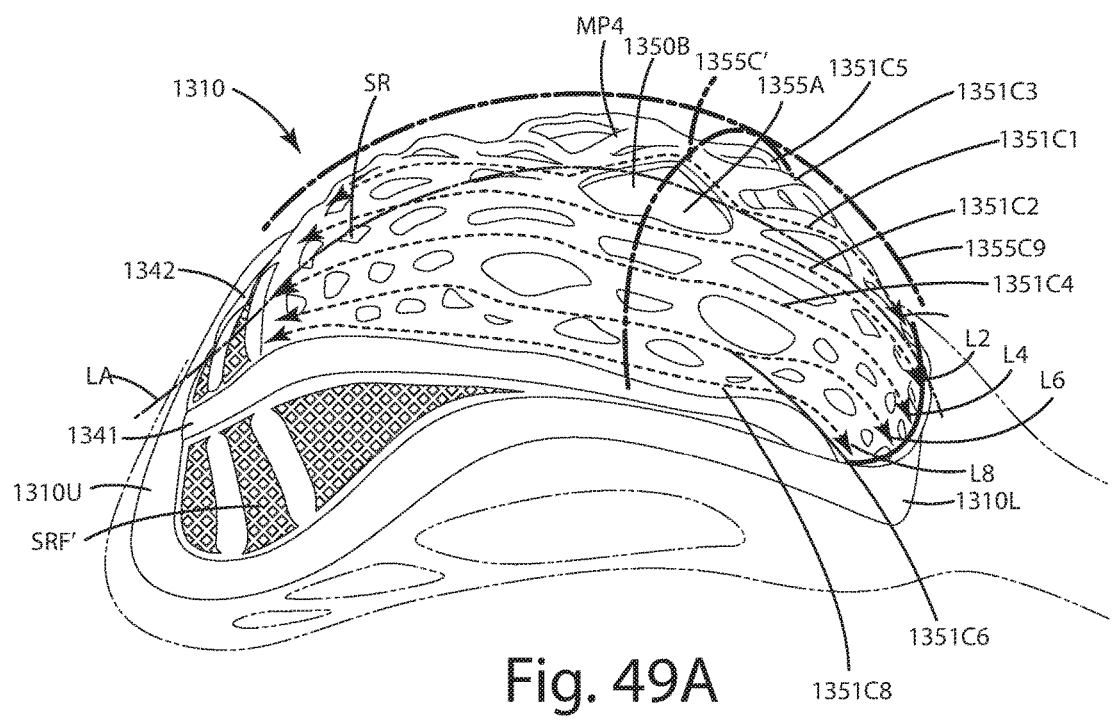
FIG. 49A is a perspective view of a lacrosse pocket of the thirteenth alternative embodiment illustrating the three dimensional contours of the pocket.

Referring to FIG. 49A, the three dimensional contours of the pocket 1310 optionally can be formed by manipulating the plurality of strands to form vertical elements having varying numbers of rows, and thus varying lengths. More particularly, as mentioned above, the middle pocket MP4 and shooting ramp SR can be comprised of multiple vertical elements spanning from or adjacent the lower edge 1310L toward the upper edge 1310U of the pocket 1310. These vertical elements can collectively cooperate to form the side to side curvature, for example 1355C', as well as the longitudinal curvature 1355C9 of the pocket. These curvatures as well as other features, whether flat, planar, convex or concave or some other configuration, can collectively form the three dimensional contour of the pocket. The vertical elements can become progressively shorter in length the farther they are laterally disposed from the longitudinal axis LA.

For example, the vertical element 1351C2, which can form at least a portion of the bullseye opening 1350B, can be longer than the vertical element 1351C8 that is adjacent the runner 1342. As a more specific example, the length L8 of vertical element 1351C8 can include approximately 100 rows of knitted stand, whereas the length L2 of the vertical element 1351 C2 can include approximately 300 rows of knitted strand. With more rows, the respective vertical elements become longer in their respective lengths. Optionally, the central vertical elements near or adjacent the apex or bullseye opening can include 50, 100, 150, 200, 250, 300, 350, 400, 450 or 500 more rows than the lateral vertical elements near the sides of the pocket. The other intermediate vertical elements 1351C4 and 1351C6 can include lengths L4 and L6 having a number of rows between the number of rows of the vertical elements 1351C8 and 1351C2. For example, 1351C4 can include 250 rows and vertical element 1351C6 can include 150 rows. The precise ratio of rows in one vertical element relative to another vertical element can vary depending on the intended contour and curvatures 1355C9 and 1355C'. In some cases the number of rows in the vertical elements can increase by at least 5%, 10%, 25%, 50% or more as the vertical elements are disposed farther laterally from the longitudinal axis LA. Likewise, depending on the particular depth and desired curvatures 1355C' and 1355C9 of the pocket, the number of rows in each vertical element can be varied. Further, it is to be understood that the vertical elements 1351C1, 1351C3, 1351C5 etc. on the other side of longitudinal axis LA, can be of a decreasing length, as the vertical elements are disposed farther from a longitudinal axis LA.

The vertical elements or other features within the shooting ramp SR can be constructed so that when the pocket 1310 is knitted and/or weaved, it forms a three dimensional concave contour 1355C. This concave contour 1355C can extend through and laterally across at least a portion of the shooting ramp SR. As shown in FIGS. 47 and 48, this concave shape or contour 1355C can gradually increase in depth as is transitions toward the middle pocket MP4. Of course, the precise concavity within this third pattern of the unitary textile material can vary depending on the location in the pocket. For example, in the shooting ramp SR, the concavity can be generally less than the concavity in the middle pocket MP4. Optionally, this concavity can be controlled by the number of joins between respective vertical elements. Again, for example, with more joins 1352 joining the adjacent vertical elements, those vertical elements 1351 can be closer to one another and less prone to expanding away from one another. This, in turn, can reduce the concavity of the third knit pattern 1350 within the shooting ramp. The overall width between the respective runners 1341 and 1342 also can be decreased due to increased number of join elements. Thus, a ball exiting the pocket can begin to ride up onto the runners 1341 and 1342, generally, coming up and out from the middle pocket MP4 onto the shooting ramp SR.

As shown in FIGS. 46-48, the knit pattern 1350 can transition to and/or include a middle pocket MP4. This middle pocket MP4 can be configured and specifically knitted and/or weaved so that it is generally supple and can hug a lacrosse ball when disposed therein. This can enable a player to better cradle the ball, keeping it within the pocket during a particular maneuver.

Optionally, the middle pocket MP4, like the shooting ramp SR, can include a plurality of vertical elements 1351 and joins 1352 generally extending between those vertical elements. All of these components can be constructed from a plurality of strands which are interlooped and/or interweaved with one another in a continuous manner.

As explained above, the middle pocket MP4 can include joins 1352 that are spaced farther from one another to create larger openings 1353O. Optionally, with reference to FIG. 48, the joins 1352A can be spaced a sufficient distance from one another, for example, ¼ inch to 2 inches, further optionally ½ inch to 1½ inches, even further optionally ¾ inch to 1¼ inch away from one another along the longitudinal axis LA of the pocket. This allows the immediately adjacent vertical elements 1351 to spread apart from one another, particularly when a lacrosse ball is placed in the pocket. In turn, this produces a large bullseye opening 1350B within the pattern 1350. This bullseye opening can be configured so that at least a portion of a lacrosse ball centers on or within, or is at least partially restrained in the bullseye opening 1350B within the pattern 1350. This centers the ball in the middle pocket MP4, providing a consistent location for the ball to rest within or to be snugly held within the pocket. With such a consistent resting location, which can be precisely replicated from one manufactured pocket to the next a player can be confident that the ball will begin to roll out of the same location within the middle pocket onto the shooting ramp in a consistent and reproducible manner.

Optionally, the bullseye opening 1350B is disposed within the pattern 1350 at the center of the middle pocket MP4. More particularly, the bullseye opening can have a geometric center GC as shown in FIG. 48. This geometric center GC can be aligned with and coincident with an apex 1355A of the middle pocket MP4. As mentioned above, the apex can be associated with the deepest depth of the pocket, and can correspond to the lowermost portion of a horizontally disposed lacrosse pocket when viewed from a side profile. The precise location of the bullseye opening 1350B can vary depending on the location of the apex and pocket profile. For example, where a high pocket is desired, the apex will be located relatively close to the shooting strings. Thus, the bullseye opening will likewise be located closer to the shooting strings than to the base or ball stop of the head. Where a middle pocket is desired, the apex will be located about midway between the shooting strings and the ball stop or base of the head. Thus, the bullseye opening will likewise be located and generally centered about midway between the shooting strings in the ball stop. Where a low pocket is desired, the apex will be located closer to the ball stop or base of the head than to the shooting strings. Thus, the bullseye opening will likewise be located closer to the ball stop or base of the head than to the shooting strings.

As shown in FIG. 48, within the middle pocket MP4, the vertical elements and joins can appear to emanate and project radially outward from the bullseye opening 1350B. This configuration of the verticals and joins appearing to project radially outwardly or otherwise surround the bullseye opening 1350 can be referred to as a starburst or flower pattern. This starburst or flower pattern can assist in orienting a lacrosse ball in the pocket to settle within that particular pattern, generally centered on the bullseye opening 1350B. Again, with this consistent resting location of the ball within a pocket, a user can typically manipulate the ball with the pocket and associated head more consistently.

Optionally, as shown in FIG. 46 the bullseye opening 1350B can be bounded by a first vertical element 1351A on a first lateral side of the pocket longitudinal axis, and a second vertical element 1351B on a second lateral side of the pocket longitudinal axis LA opposite the first lateral side. The bullseye opening also can be bounded by a first join 1352A and a second join 1352B. These joins can extend transversely or generally perpendicular to the longitudinal axis LA. These joins also can connect the first vertical element and the second vertical element to one another to form the bullseye. Generally, the spacing or distance between the first join and the second join adjacent the bullseye opening can be the greatest spacing or distance between joins adjacent any opening within the lacrosse pocket 1310. Again, the bullseye opening can generally include the greatest open area of any opening within the lacrosse pocket.

Figure 45:
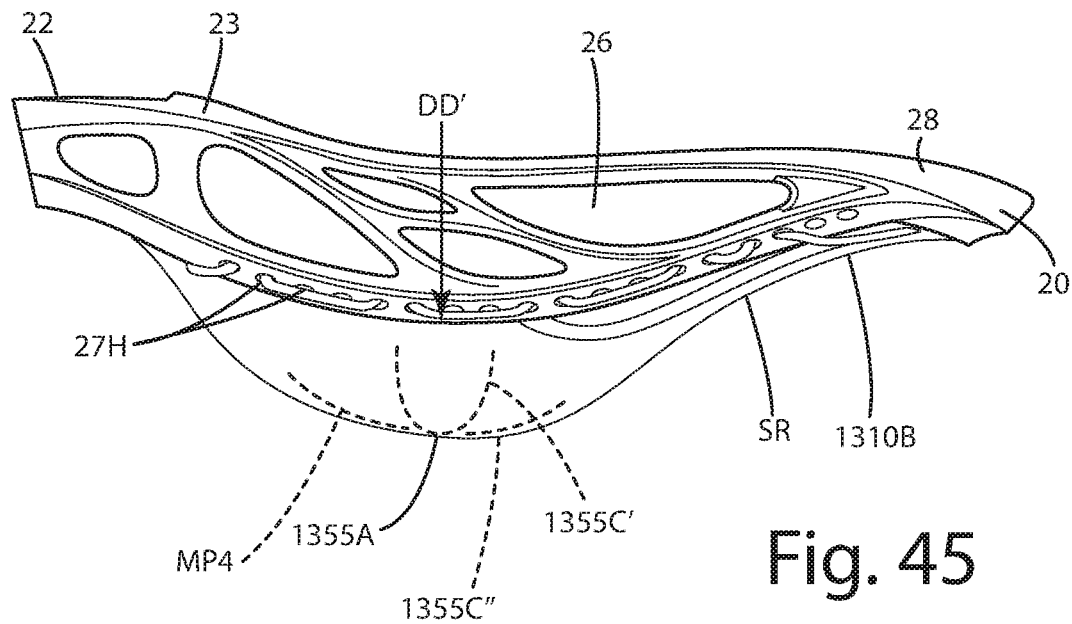
FIG. 45 is a side view of the lacrosse pocket of the thirteenth alternative embodiment mounted on a lacrosse head illustrating the concavity and three dimensional shape of the pocket.

As shown in FIGS. 47 and 48, the middle pocket MP4 can be constructed to include a predefined three dimensional convex shape 1355C'. This concave shape generally extends across a side to side width SSW1 of the lacrosse pocket in the middle pocket region, which width is taken perpendicular to the longitudinal axis of the pocket LA. The middle pocket MP4 as shown in FIG. 45 also can include a lengthwise predefined three dimensional concave shape 1355C''. As also illustrated in FIG. 45, this three dimensional concave shape can enable the pocket 1310 and in particular the pocket body 1310B to have a predefined depth DD'. This depth can range from 30 mm to 65 mm, further optionally 62.7 mm to about 64.7 mm. This depth DD' can be located and/or defined at the apex 1355A of the pocket.

With this concavity and general three dimensional shape built into the unitary textile material, the pocket attains a concave, curved, rounded shape from side edge 1314 to side edge 1316, as well as a concave, curved, rounded shape in and adjacent the middle pocket MP4 and sometimes the shooting ramp SR. This shape is effectively knitted and/or weaved directly into the strands of the pocket. Indeed, the plurality of strands, and in their particular knit or weave patterns, can support the pocket 1310 in its rough three dimensional shape as, for example, shown in FIGS. 47 and 49. In those figures, the unitary textile material, is self-supported in the predefined, three dimensional shape shown there by the network of a plurality of strands extending through the different patterns in that textile material. This shape approximates a final shape after the pocket is joined with a head, generally being stretched out and/or under tension, laterally and/or longitudinally, due to the attachment of the edges or perimeter flange to the lacrosse head. However, it is to be noted that after being produced by a knitting and/or weaving process, the pocket of this embodiment can approximate the final three dimensional shape of the pocket when it is placed on a lacrosse head.

Optionally, the middle pocket MP4 generally forms a rearward bulge or bulbous shape. As shown in FIG. 45, the apex 1355A of the middle pocket MP4 can generally be at the depth DD' of the pocket. The apex 1355A can also correspond to the location of the bullseye opening 1350B, and even further optionally to the precise geometric center GC of the bullseye opening. Further optionally, the middle pocket MP4 and shooting ramp SR can be constructed with a predefined three dimensional shape. This three dimensional shape can be concave as mentioned above, however alternatively, it can be arcuate, parabolic, rounded or generally bulging, when taken across a width of the pocket transverse to the longitudinal axis LA of the pocket 1310.

Due to the construction of the across pocket 1310 on an automated assembly machine, that machine can produce a pocket having varying overall widths from the upper edge 1310U to the lower edge 1310L of the pocket. For example, as shown in FIG. 47 and mentioned above, the middle pocket MP4 can include a side to side width SSW1, which is a side to side lateral measurement taken perpendicular to the longitudinal axis LA of the pocket at the widest portion of the middle pocket MP4 generally at the outermost portions of the perimeter flange 1310 PF. Near the upper edge 1310U of the pocket 1310, which is adjacent the scoop pocket portion SSP, the pocket can include a side to side with SSW2, which also is a side to side lateral measurement taken perpendicular to the longitudinal axis LA of the pocket at the widest portion of the pocket generally at the outermost portion of the perimeter flange 1310 PF near the scoop pocket portion. Of course, this side to side with SSW2 can also be taken immediately adjacent the shooting strings in the pocket. The side to side with SSW2 can be at least optionally 10 mm, further optionally at least 20 mm, and even further optionally at least 40 mm, yet further optionally at least 60 mm greater than the width SSW1. Due to this difference in the lateral side to side widths of the pocket along the longitudinal axis, the perimeter flange and/or the pocket outer when included perimeter curves outwardly in transitioning from the middle pocket toward the scoop pocket portion of the pocket or upper edge. Thus, when viewed from above, the outer pocket perimeter or perimeter flange appears to be slightly S-shaped or slightly reverse S-shaped as it extends from the lower edge to the upper edge of the pocket. Further optionally, the outer pocket perimeter or perimeter flange can be curved, rounded, undulating, sinusoidal, or generally nonlinear as it extends from the upper edge to the lower edge. The degree of undulation in the perimeter flange or outer pocket perimeter can vary depending on the particular application and configuration of the sidewalls of the head to which the pocket is to be joined.

As mentioned above, the middle pocket MP4 can be bounded by portions of the shooting ramps 1341 and 1342 as shown in FIG. 46. The middle pocket also can transition to and be integrally joined with the respective edges 1316 and 1314. Indeed, as mentioned above, a plurality of strands of the middle pocket and the pattern 1350 can be interlooped and/or interweaved with the corresponding strands of the edges 1314 and 1316 so that the textile remains a unitary single piece. As further illustrated in FIG. 46, the edges 1314 and 1316 can extend on opposite sides of the middle pocket MP4 and/or the shooting ramp SR from the lower edge 1310L forward toward the upper edge 1310U of the pocket 1310.

Optionally, the side edges 1314 and 1316 can be aligned with and follow in parallel the reference axes RA1 and RA2 which are generally parallel to the longitudinal axis LA of the pocket 1310. The side edges, however, can flare outward and deviate laterally away from the longitudinal axis and thus the respective reference axis RA1 and RA2 as they progress toward the upper edge 1310U. A portion of the shooting ramp SR can remain disposed between those reference axes RA1 and RA2. The shooting ramp flanks SRF1 and SRF2, however, can extend outwardly and laterally beyond the reference axes RA1 and RA2 on opposite sides of the longitudinal axis. Likewise, the side edges 1316 and 1314, near the upper edge 1310U can extend or flare laterally away from those reference axes RA1 and RA2. After being knitted or weaved on a knitting or weaving machine, respectively, this outward flaring of the respective shooting ramp flanks and edges of the pocket beyond the reference axes RA1 and RA2, the finished pocket 1310 approximates the three dimensional shape of the pocket when installed on a lacrosse head.

Upon completion, the pocket 1310 can have a particular weight. As an example, the pocket can weigh about 5 grams to about 50 grams, further optionally about 10 grams to about 25 grams.

A method of manufacturing the lacrosse pocket of the thirteenth alternative embodiment will now be described in further detail with reference to FIGS. 43-51. As mentioned above, the lacrosse pocket is constructed from a unitary textile material. Generally, the pocket is formed completely via a mechanized manipulation of a plurality of strands. The mechanized manipulation can be performed by a knitting or weaving machine 1390. Although described herein in connection with a knitting process on a knitting machine, it will be appreciated that the pocket can be weaved on a weaving machine using a weaving process. Thus, all the steps, configurations, structures and operations applied to knitting herein apply by analogy to weaving. Therefore, any description of the knitting process can be applied equally to the weaving process description here.

The knitting process can be any of a variety of different knitting processes, for example circular knitting, tubular knitting, flat knitting, Jacquard knitting, Intarsia knitting, weft knitting, warp knitting and other types of knitting. When a weaving process is utilized, the process can be any one of multiple weaving processes, including processes that construct a leno weave, a twill weave, a hatch weave, a slit weave, a plain weave, a baskets weave, a Jacquard weave, a Rib weave and an Oxford weave or other types of weaves.

As mentioned above, the knitting machine can be any type of sophisticated knitting machine. Suitable knitting machines include a Kauo Heng knitting machine, commercially available from Kauo Heng Precision Machinery Industrial Co. Ltd. of New Taipei City, Taiwan; a Shine Star knitting machine, commercially available from Zhejiang Shine Star Machinery Co. Ltd. of Jiaxing City, China; a Stoll knitting machine, commercially available from Stoll America Knitting Machinery, Inc., of New York, N.Y.; a Protti knitting machine, commercially available from Protti S.p.A. of Asola, Italy, or other comparable knitting machines. Optionally, the knitting machine can mechanically manipulate a plurality of strands of the unitary textile pocket and/or pocket body during a knitting process to form a predefined, three dimensional shape in the pocket 1310 and/or pocket body 1310B, for example, via a tubular knitting process in which multiple tubular elements are knitted and joined to form the various components and structure of the pocket 1310. If desired, the tubular knitting process can also implement a weft knitting technique.

The three dimensional shape of the pocket can include a concave shape disposed or located generally within the middle pocket MP4 and/or shooting ramp SR. The three dimensional shape also can encompass substantially planar and/or convex regions of the pocket, for example in the shooting ramp and/or shooting ramp flanks, which optionally does not include knitted tubular elements. The machine itself can be configured to interloop a plurality of first strands with a plurality of second strands, and any number of additional strands, so as to form that predefined, three dimensional shape in the pocket and/or pocket body. The machine also can mechanically manipulate other strands, or optionally the same strands, but different portions thereof, of the unitary textile material with a knitting machine during the knitting process to form the above mentioned predefined generally flat planar shapes in the pocket body and/or predefined three dimensional convex shapes in the pocket body. The latter shapes can correspond generally with the shooting ramp flanks SRF 1, SRF2 and/or the respective edges 1310U, 1310L, 1314 and/or 1316 or other portions of the pocket.

During the knitting process, the knitting machine knits a unitary textile pocket and body so as to form the respective components of the pocket and pocket body. For example, the knitting machine knits the upper edge, the first and second sidewall edges, the lower edge, the shooting ramp, the middle pocket and the shooting ramp flanks which have their respective predefined shapes and patterns. All of these different knitted components of the pocket body are contiguous and continuous with one another, being formed from the plurality of strands that make up the unitary textile material. Indeed, many of the individual strands can span the length of the pocket from the upper edge 1310 U to the lower edge 1310L and can be interlooped in specific regions of the pocket, thereby forming and becoming integrated with the different knit patterns of the pocket. Thus, as one example, a knitting machine can interloop a first strand with a second strand near the lower edge 1310L. The first strand can continue into a vertical element through the middle pocket and shooting ramp SR. In the shooting ramp SR, that strand can be interlooped with additional strands within the knit pattern 1350. The same strand can extend into and be interlooped with yet other strands in the knit pattern 1318. The same strand can extend along and be interlooped with yet additional or similar strands in the pattern 1319. The strand can extend and be further interlooped with yet other strands in the upper edge 1310U of the lacrosse pocket.

As mentioned above, the knitting during the knitting process knits the unitary textile body so that it forms in that body the shooting ramp SR, middle pocket MP4, respective shooting ramp flanks SRF1 and SRF2 as well as the different components of the pocket in the zones A-E as shown in FIG.

43. It does all this in a mechanized manner, without direct manual, human manipulation of any strands in the pocket.

The unitary textile material of the pocket 1310 and/or pocket body 1310B, and in particular its multiple strands, can be mechanically manipulated to provide different knit patterns. During the knitting process, the knitting machine 1390 effectively knits a plurality of strands individually and/or collectively so as to form the different regions of the pocket, for example, the first knit region 1318, the second knit region 1319, the runners 1341, 1342, the edges 13U, 1310L, 1314 and/or 1316, as well as the region 1350 in which the middle pocket MP4 and the portion of the shooting ramp SR are disposed. Optionally, a majority of the middle pocket region MP4 can be weft knitted, and can include multiple tubular elements, such as tubular vertical elements as described above. The knitting machine creates all of these different components and patterns in a mechanized process using multiple needles through which the thread is dispensed and included in the pocket body. Effectively, the plurality of strands are put in place via mechanical manipulation of the respective needles of the knitting machine, within the pocket body. None of the strands are subject to direct manual human manipulation to form the pocket body, let alone any of its three dimensional shapes or components.

As shown in FIG. 51, the knitting machine 1390 can be configured to receive multiple different strands 1393A, 1393B and 1393C that are spooled on respective cones 1394A, 1394B and 1394C as shown in FIG. 51. The different cones, also referred to as spools herein, and different strands can be constructed from different materials as further explained below, depending on the particular attributes and mechanical and/or physical properties of the pocket in certain regions. The respective cones 1394A, 1394B, 1394C each can be rotatably mounted on an axis so that the knitting machine 1390 can draw in stands of the material from the respective cones.

Optionally, the knitting or weaving machine can include 200-1,200 needles, further optionally about 400-1,000 needles, even further optionally about 500-800 needles. These needles can be manipulated and controlled by actuating mechanisms further controlled by a controller. The controller can have preprogrammed knitting or weaving patterns in memory. A user can select and/or program the controller so that it directs the actuating mechanisms and thus the respective independent needles to knit and/or weave the strands in a particular pattern and/or within a particular region.

Throughout the knitting process, the knitting machine knits different regions and different patterns. As mentioned above, it can knit the first pattern 1318, the second pattern 1319 forming the tubular structure therein, as well as the runners 1341 and 1342 as well as the pattern 1350 near the middle pocket. In constructing the different patterns, the knitting machine can change the density, that is the number of strands, courses and/or wales in a given region as well as in different regions of the pocket. For example, the knitting machine can manipulate the strands so that the density of strands in the perimeter flange 1310PF is greater than the density in the first pattern 1318. The density of strands in the third pattern 1319 can likewise be greater than the density in the pattern 1318. The runners 1341 and 1342 can have a strand density that is greater than the region 1318 but perhaps similar to the density in the edges and/or vertical elements of the middle pocket and/or shooting ramp. With these different densities, some regions of the pocket can be more or less densely knitted than other regions. This can provide desired mechanical and/or physical properties of the pocket in those specific regions, and/or across the pocket. For example, where it is more densely knitted, the pocket can be more robust and rigid. Where it is less dense, the pocket can be more supple. Optionally, however, these characteristics of suppleness and rigidity can be altered when the pocket is connected to a head. In some cases, the pocket can be stretched more in certain regions than in others, which can either increase or decrease the rigidity and/or suppleness of the pocket in the different regions and within the different knit patterns.

The pocket and pocket body can include different components and regions that are constructed from strands of different materials having different properties. To create such a pocket, the knitting machine 1390 can be set up so that the different spools 1394A, 1394B and 1394C include appropriate amounts of continuous, elongated strands of a first material and a different second material. In some cases, the first material 1393A can be less elastic and more abrasion resistant and durable than the second material 1393B and 1393C. Of course, the different materials can be constructed so that they have other different mechanical and/or elastic properties. As an example, a strand of a first material, for example an elongated aromatic polyamide can be placed on the first spool 1394A. Strands of a second material, for example thermoplastic polymer can be placed on spools 1394B and 1394C. The knitting machine 1390 can pull strands 1393A from the first cone or spool 1394A and construct at least one of the sidewall edges 1314, 1316, the upper edge 1310U and/or lower edge 1310L of the first pocket body 1310B with this plurality of strands. The knitting machine 1390 can separately pull the strands 1393B and 1393C of the second material off the cones or spools 1394B and 1394C, respectively, and interloop certain ones of those strands with the strand 1393A. Thus, the strands in certain regions can be of one material, and can be interloped and connected directly with strands of the second material in predefined locations.

Optionally, the knitting machine, or any automated pocket assembly machine described herein, can be configured to mechanically manipulate a strand drawn or pulled from a particular spool to form a predefined three-dimensional shape in a first unitary textile lacrosse pocket body. This first strand can be constructed from the second material, for example a thermoplastic polymer. The machine also can make a second lacrosse pocket body joined with the first lacrosse pocket body, where both the first and second lacrosse pocket bodies are constructed primarily from the strand of the second material. If desired, the machine can be coupled to spools of other types of elongated strands such as those constructed from the first material, for example an elongated aromatic polyamide strand. The automated machine also can interloop or otherwise join one or more strand of the first material with one or more strand of the second material.

All the strands 1393B and 1393C can be used to form the patterns 1318 and 1319, as well as the pattern 1350, including the middle pocket MP4 and a portion of the shooting ramp SR. The strands of the first material, however, as mentioned above, can be used to manufacture the respective edges around those components. Where the edges, constructed from the plurality of strands 1393A of the first material interfaces or transitions to the other components such as the second pattern 1318, third pattern 1319 or pattern 1350, the strands 1393A of the first material can be interloped and interlaced directly with the knitted strands 1394B, 1394C of the adjacent region of the second material. To achieve this, different needles of the machine can feed and interloop the different materials in the respective different locations. After a lacrosse pocket 1310 is knitted and completed by the knitting machine 1390, it can be removed from the knitting machine and later joined with a lacrosse head in a desired manner as described herein.

Where the pocket 1310 includes one or more tubular structures, such as tubular members in the location of shooting strings, an additional large diameter lace, web or thong can be placed through the tubular structure and joined with the pocket and/or an associated lacrosse head. Where the runners 1341 and 1342 optionally include a tubular structure (not shown) knitted in a similar fashion to the tubular structures 1319C above, elongated runner elements constructed from polymers, rubber or other synthetic materials can be placed in those tubes of the runners to further accentuate and raise the runners relative to the shooting ramp SR.

Optionally, the machine 1390, whether a knitting or weaving machine, can be programmed or otherwise controlled so as to generate a strip of lacrosse pockets including first, second, third and more complete lacrosse pockets, each knitted, weaved or otherwise constructed in a manner similar to that described above. As an example, with reference to FIG. 51, the machine 1390 can knit a first pocket 1310, second pocket 1310' and third pocket 1310", or any other number of pockets. These pockets can all be disposed on a pocket strip 1390S that exits the machine 1390. These pockets can be joined end for end to one another along the strip 1390S. For example, the first pocket 1310 can be joined at its lower edge 1310L with an upper edge 1310U' of a second pocket 1310'. These edges can be joined together at an edge interface 1360. This edge interface 1360 can be a relatively long structure, approximately 1-6 inches in length, or it can be a single strand that connects the lower edge 1310L directly to the upper edge 1310U'. Optionally, the edge interface 1360 can comprise a knit pattern that is different from the patterns of the respective pockets. Of course, the patterns can be changed to be similar to those of the respective pockets if desired within the edge interface as well.

Further optionally, the knitting or weaving machine, or other automated pocket assembly machine, can be controlled by the controller to produce the strip of pockets. The controller can be any conventional processor, computer or other computing device. The controller can be electrically coupled to the machine, and can be in communication with a memory, a data storage module, a network, a server, or other construct that can store and/or transfer data. That data can be particular type of data related to lacrosse pockets. For example, the data can be first lacrosse pocket data pertaining to one or more particular knitting patterns, weaving patterns or other patterns associated with and/or incorporated into the lacrosse pocket. The lacrosse pocket data can be implemented, accessed and/or utilized by the machine, in the form of a code, program and/or other directive. The lacrosse pocket data, when utilized to form the pocket with the assembly machine, ultimately can generate in the pocket features such as: the predefined three-dimensional shape; the position, dimension and/or depth of a middle pocket; the position of an apex of the pocket; the length and location of an outer pocket perimeter; the position and dimension of various edges of the pocket; the position and dimension of a shooting ramp, also referred to as a ball channel; the position and dimension the runners and/or shooting strings of the pocket; the side to side lateral width of the pocket; the minimum width of the pocket; the side to side curvature of the middle pocket and the like.

The controller and/or the automated assembly machine can access the lacrosse pocket data to thereby control the assembly machine and produce a strip of lacrosse pockets in a desired number and configuration. Each of the lacrosse pockets can include a substantially identical predefined three-dimensional shape, and can have virtually identical physical features, such as those enumerated above in connection with the lacrosse pocket data. Alternatively, where the machine is set up to produce only a single lacrosse pocket, the machine can be controlled by the controller, which can utilize the first lacrosse pocket data to produce a lacrosse pocket having features that correspond to the first lacrosse pocket data.

When producing a strip 1390S of lacrosse pockets, the individual lacrosse pockets can be separated from one another in a variety of manners. In one example, the respective edges, for example, 1310L and 1310U' can be joined with the edge interface 1360 in the form of a single pull stitch or strand. This pull stitch can be pulled by a machine or a human operator so that the respective edges separate from one another and/or the edge interface, thereby allowing the pocket 1310' to be removed from or dissociated from the pocket 1310. Likewise, the edge 1310L can include one or more pull strands that can be pulled via a machine or human operator to separate the lower edge from the edge interface.

In some cases, where the lower edge 1310L of one pocket is joined directly with the upper edge 1310U' of another pocket, a pull strand at the edge interface 1360 can be pulled to separate the second pocket 1310' from the first pocket 1310.

Another manner of separating the pockets from the strip can include the use of a decoupling element 1391. This decoupling element 1391 can decouple one pocket from the next, optionally at the edge interface or respective edges of the pockets. As shown in FIG. 51, the decoupling device 1391 can include shears or hot melt tongs that close across the lower edge 1310L' of the pocket 1310'. In so doing, those shears cut, melt or burn off the next adjacent or third lacrosse pocket 1310". The decoupling element 1391 can make multiple cuts, one adjacent the upper edge 1310U" of the third pocket 1310" and/or adjacent the lower edge 1310L' of the second pocket 1310'. Optionally, the decoupling element can be a laser cutting device or a die cutting mechanism. In cases where the edge interface element is only a strand or a couple strands wide, the decoupler can cut or hot melt across this edge interface, thereby separating the respective edges of the third and second pockets. From there, the pockets can be dropped into a bin or other container for further processing on an individual basis. Optionally, a continuous strip of multiple pockets can be rolled on a spool and delivered to a manufacturer who can then mechanically or manually disassociate the individual pockets from the pocket strip 1390S.

Upon the decoupling of the individual lacrosse pockets and/or lacrosse pocket bodies, each of the lacrosse pockets generally retain their predefined three dimensional shapes. For example, even upon decoupling, the individual pockets will retain the concavity of the concave shape and/or contour of the middle pocket and shooting ramp. Likewise, the shooting ramp flanks can maintain a generally planar and/or convex three dimensional configuration.

The method of making the lacrosse pocket 1310 of the thirteenth alternative embodiment in strip form can also generate a lacrosse pocket strip 1390S having varying widths. For example, as shown in FIG. 51, the machine 1390, can vary the widths of the pocket strip 1390S and/or individual pockets of the strip. For example, the machine 1390 can mechanically manipulate strands to generate pockets along the strip that have a width at their outermost lateral boundaries of SW1. This is generally the maximum width of the strip 1390S, along its length. This maximum width can correspond to the region of the pocket adjacent shooting strings and are close to the scoop. It also can be the maximum of width of any individual pocket that is formed along the strip. The machine 1390 also can mechanically manipulate the strands and the overall width of the strip so that the lacrosse pocket strip 1390S includes a second width SW2, which is less than the first width SW1. The second width SW2 can correspond generally to the region of the pocket near the middle pocket MP4 and/or rearward thereof. This width SW2 can be approximately half to three-quarters the maximum width SW1. By precisely knitting the strip 1390S in the respective pockets therein, minimal waste is generated from the process. This is true even where the individual pockets and strip width varies. Without the knitting and/or weaving machine 1390, the material between the maximum width SW1 and the smaller width SW2 would otherwise be removed and discarded as waste. Further, to remove this material would typically require additional machinery and/or human intervention or manipulation.

Optionally, the machine 1390 can mechanically manipulate the strands of each lacrosse pocket constructed on it so that an outer lateral perimeter along the strip of pockets undulates toward and away from longitudinal axis of the strip. Referring to FIG. 51, the strip 1390S includes a strip longitudinal axis SLA. The first pocket 1310 includes a first pocket perimeter flange, also referred to as a pocket edge or perimeter 1310PF disposed laterally of the strip longitudinal axis SLA. The second pocket 1310' includes a second pocket perimeter flange 1310PF'. Each of the respective first and second pocket perimeter flanges 1310PF and 1310PF' can undulate toward and away from the strip longitudinal axis SLA along the length of the strip. For example, near the upper edge 1310U and or a shooting ramp flank SRF2 of the first pocket 1310, the perimeter flange 1310PF can be a distance D7 from the strip longitudinal axis SLA. Near the middle pocket MP4, the perimeter flange 1310PF, can be a distance D8 from the strip longitudinal axis SLA. This distance D8 can be less than the distance D7. Optionally, the distance D8 can be about ¾, ½, ¼ or some other proportion of the distance D7. Further, in transitioning from the different distances D7 to D8 from the strip longitudinal axis SLA, the perimeter flange or pocket edge can transition smoothly along a nonlinear, curved and/or rounded transition area 1310TA. This transition area 1310TA can mimic or follow the curvature of sidewalls of a particular lacrosse head as desired.

After the lacrosse pocket of the thirteenth alternative embodiment 1310 is constructed, it can be joined with a lacrosse head 20 as shown in FIG. 44. The lacrosse pocket 1310 can be joined in a variety of different manners. For example, the respective edges 1310L, 1310U, 1314 and 1316 can each be configured to and include a plurality of lace holes. A large diameter lace (greater than 2.0 mm) can be fitted through those respective holes. This lace can then be tied directly to respective sidewalls 24, 26, ball stop 23 or base 22 and scoop 28 of a lacrosse head 20. In particular, the respective side edges 1314 and 1316 can be connected to respective sidewalls 24 and 26. Likewise, the lower edge 1310L can be joined with the ball stop and/or base 23, 22. The upper edge 1310U can be joined directly with the scoop 28 using the large diameter (greater than 2.0 mm and/or greater than 3.0 mm) laces. The lacing can be performed manually by human.

Optionally, this connection can be achieved via a computer guided robot with a computer guided lace needle that installs the large diameter lace through the pocket holes 27H of the head and corresponding holes defined and integrally knitted into the edges of the pocket. During the connection of the lacrosse pocket to the head, the lacrosse pocket can undergo a certain amount of stretch in the lateral and longitudinal directions. This, in turn, can add tautness and rigidity to the respective zones as described above in connection with FIG. 43. During the connection, however, the general three dimensional shapes of the respective components as described above are retained, and in some cases augmented via the connection of the pocket to the lacrosse head. For example, the middle pocket MP4 and portions of the shooting ramp SR retain the three dimensional concave shapes. The respective shooting ramp flanks SRF1 and SRF2 also can be configured so that they retain their generally convex and/or planar three dimensional configurations.

While the pocket 1310 constructed from a unitary textile material can be joined directly with a lacrosse head 20 using laces, that pocket optionally can be integrally formed with the lacrosse head via a molding process. On a high level, the edges of the lacrosse pocket are placed in a mold that is in the shape of the desired lacrosse head. The material from which the lacrosse head is constructed, for example, thermoplastic polymers, such as nylon or other suitable material, is injected into the mold cavity. Upon such injection, the injected material engages, encapsulates and becomes embedded within the edges of the unitary textile material and the pocket in general. The material is allowed to cure and the lacrosse head is removed from the mold, with the lacrosse pocket being integrally molded and embedded within the components of the lacrosse head. With this particular construction, the lacrosse head and associated lacrosse pocket can be precisely reproducible. In turn, consumers of this integral, combined lacrosse head and lacrosse pocket can experience a virtually identical mechanical performance and feel from one head to the next, upon initial use of the same. With this combination as well, there is no separate manual stringing of the head, which can lead to inconsistency and undesirable break-in periods for the pocket to achieve a desired shape and profile. With the current embodiments, that desired profile can be included in the pocket so that the head performs as desired by the user.

In addition, a plurality of different profiled pockets can be molded into one head or multiple heads. In turn, a user can experiment with those different pocket profiles and/or heads, and select the one that best suits their preferences. In addition, if a user has a particular profile preference, that profile of a particular lacrosse pocket can be stored in a database. When the user wears out their first head and pocket, they can go and request another pocket and head, identical to the first pocket and head are produced again. Thus, the player can start again with virtually the same pocket and associated feel as they had with the previous pocket and head. This can enhance the confidence of the player. Also, the player need not go through extensive break-in periods to make the pocket perform as desired. Instead, upon purchase of the new head and pocket combination, the pocket will consistently perform as expected.

Figure 45A:
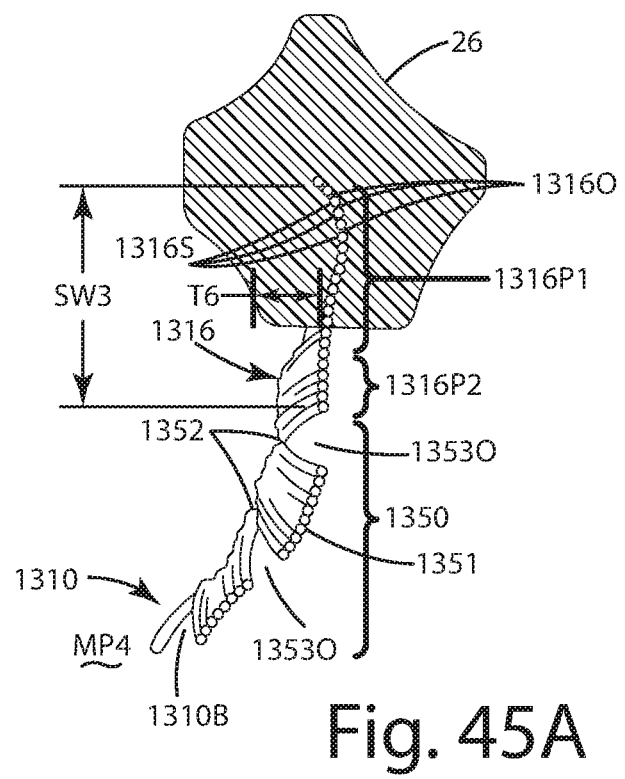
FIG. 45A is a section view of a portion of a lacrosse head over molded and encapsulating a portion of the unitary textile material of the lacrosse pocket of the thirteenth alternative embodiment, taken along lines 45A-45A of FIG. 44.
Figure 45B:
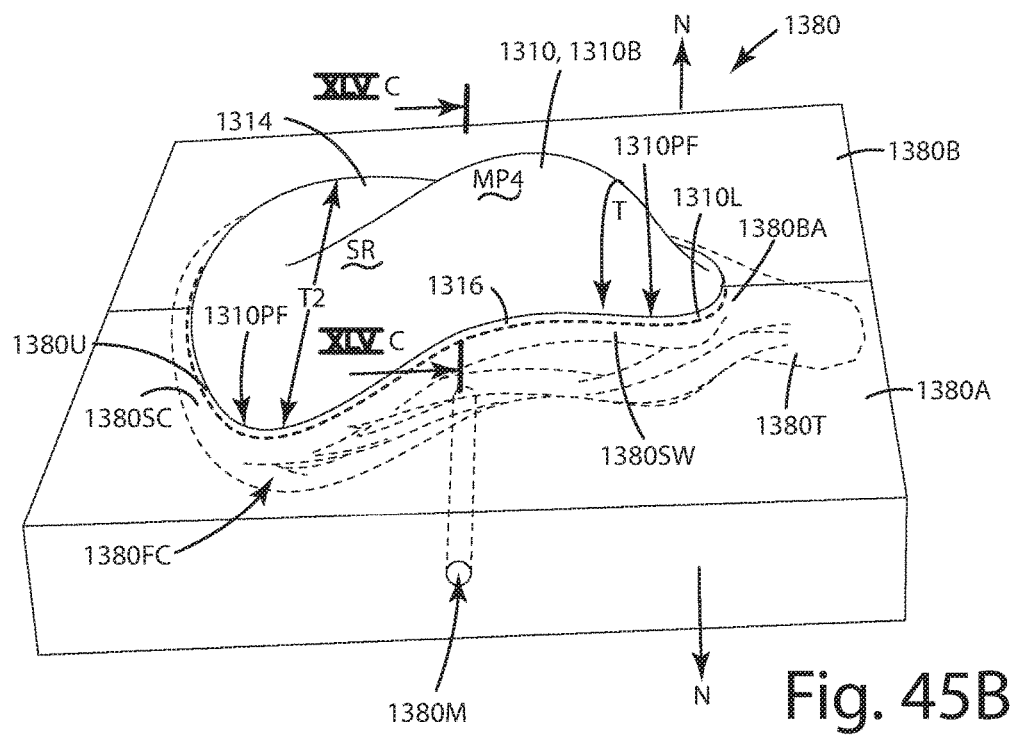
FIG. 45B is a perspective view of a lacrosse pocket of the thirteenth alternative embodiment being molded to a lacrosse head in a mold.
Figure 45C:
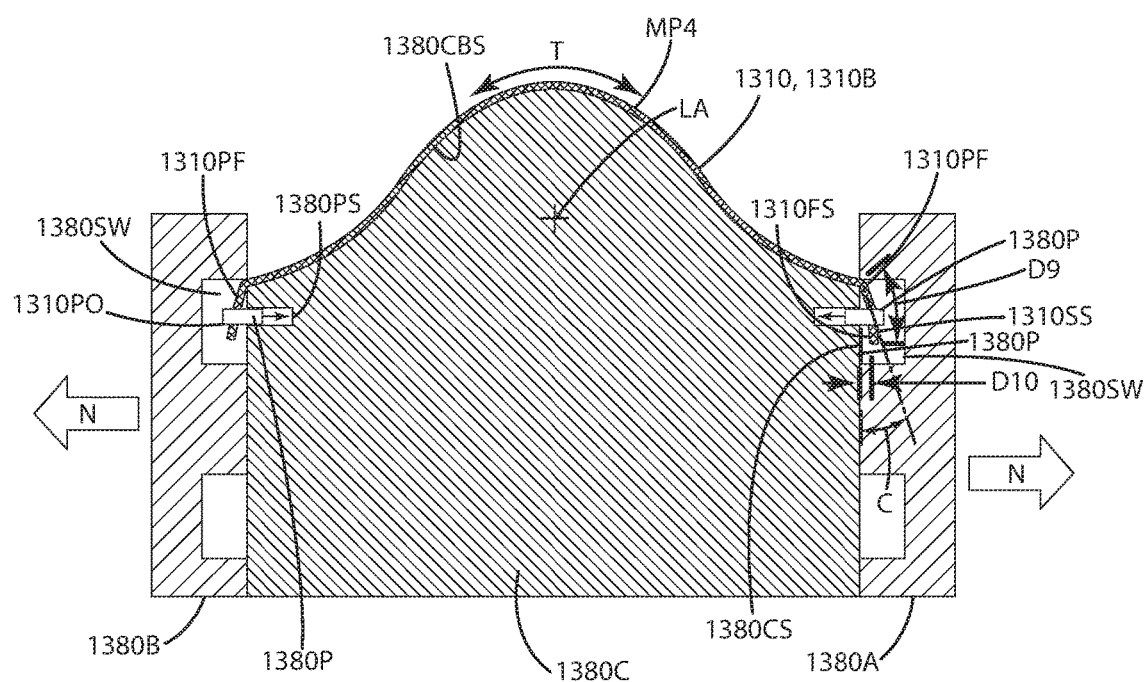
FIG. 45C is a section view of a lacrosse pocket of the thirteenth alternative embodiment being molded to a lacrosse head in a mold, particularly showing mold pins.

Referring to FIGS. 45A, 45B and 45C, a lacrosse pocket 1310/lacrosse body 1310B is placed adjacent a mold 1380. The mold 1380 can include multiple mold portions 1380A, 1380B and 1380C. As shown in FIGS. 45B and 45C, the mold portions 1380A and 1380B can generally be first and second laterally moving mold slides that assist in completing cavities as described further below. The mold portion 1380C, as shown in FIG. 45C can be a central stationary mold portion. This central mold portion can include an upper surface 1380CBS that is configured to directly engage an inner surface of the lacrosse pocket 1310 when the pocket is readied for molding. As can be seen, the surface 1380CBS can be in the shape of a convex, upwardly extending bulge. This bulging mold surface can be shaped three-dimensionally to mimic the desired or intended roundness, three-dimensional contour, and/or apex of the finished pocket. The bulging mold surface also can be shaped three dimensionally to mimic the longitudinal and lateral curvatures and angles of the shooting ramp SR. Further, the bulging mold surface can mimic the convex and/or planar shapes of respective shooting flanks adjacent the shooting ramp and/or ball channel of the pocket. Because the pocket is already specially constructed to include a concave, three-dimensional contour and other geometric features, the pocket readily conforms to and lays over the bulging mold surface 1380CBS.

Referring to FIG. 45B, the mold 1380 can define a mold cavity 1380FC that is configured to mirror the sidewalls 24, 26, scoop 28, base 22 and/or ball stop 23 of the lacrosse head 20, for example, shown in FIG. 44. In particular, the mold cavity 1380FC can comprise multiple different cavities to make different portions of a lacrosse head. For example, the mold cavity 1380FC can include a scoop mold cavity 1380SC, one or more sidewall mold cavities 1380SW, a base mold cavity 1380BA and/or a throat cavity 1380T. These different cavities are configured to form the respective scoop, sidewalls, base and/or throat depending on the particular construction of the lacrosse head. With the exception of the perimeter flange 1310 PF and any optional long locator pins 1380P, shown in FIG. 45C, these cavities, that is, the scoop mold cavity, sidewall mold cavity and base mold cavity, can be substantially empty or void of other structures before the introduction of molten material within those cavities. Of course, if it is desired to insert mold reinforcement elements, such as those described in U.S. Pat. No. 7,749,113 to Morrow or U.S. Pat. No. 8,282,512 to Winningham, both of which are hereby incorporated by reference in their entirety, then those elements can be placed in the respective cavities before the molding operation.

The lacrosse pocket 1310 can be placed so that its edges 1310U, 1316, 1310L, 1314 and 1316, which can be joined with one another in a continuous manner optionally to form the perimeter flange 1310 PF, are disposed at least partially within the cavity 1380FC of the mold 1380. In particular, the upper edge 1310U can be placed in the scoop mold cavity 1380SC, the sidewall edges 1314, 1316 can be placed in the sidewall mold cavities 1380SW, and the lower edge 1310L can be placed in the base mold cavity 1380BA. These edges and the perimeter flange can extend in a continuous manner through each of the respective cavities, so that the perimeter flange and associated edge or edges effectively circumferentiates and/or surrounds the entire pocket 1310. Further, all of the respective different edges of the perimeter flange, and the pocket outer perimeter in general can be simultaneously disposed within each of the scoop mold cavity, the sidewall mold cavities and the base mold cavity. The perimeter flange and the pocket outer perimeter can extend continuously within the sidewall mold cavities from a first end thereof near the base, to a second end thereof near the scoop. The perimeter flange and the pocket outer perimeter can extend continuously within the base mold cavity from a first end adjacent the first sidewall to a second end adjacent the opposite second sidewall. The perimeter flange and pocket outer perimeter also can extend continuously within the scoop mold cavity from a first end adjacent the first sidewall to a second end adjacent an opposite second sidewall.

Optionally, the edges and/or perimeter flange can be secured in the respective mold cavities during a molding operation using optional locator pins 1380P, which are shown in FIG. 45C. These locator pins can be movably disposed within locator pin slots 1380PS. The locator pins can be movable so that they can be removed from the respective sidewalls, scoop and/or base after formation of those components of the lacrosse head. Upon their removal, the lacrosse head can be released more easily from the mold 1380. In cases where the lacrosse head after formation is relatively flexible, the pins can be constructed so they are not movable. In which case, the head can be removed with some additional force, flexing or give to expand and allow the head to pop off the locator pins and the remainder of the mold.

As shown, the locator pins 1380P can be in the form of small cylindrical pins. The pins can be of a length sufficient to extend into the respective cavities. For example, the pins can extend into the sidewall mold cavity 1380SW a sufficient distance to enable the perimeter flange 1310PF or edge to be placed or secured to those pens, thereby suspending the perimeter flange sufficiently within the sidewall mold cavity, so that when the sidewall components are molded, the perimeter flange is well anchored within the resulting, cured lacrosse head. The pins also can be sized so that they fit through respective optional locator pin openings 1310LPO that are defined within the perimeter flange 1310 PF and/or respective edges of the lacrosse pocket 1310, 1310B, constructed by the automated pocket assembly machine. These locator pin openings can be the result of a particular knit or weave pattern of the pocket where the textile is interrupted to form those openings. If desired, the locator pin openings can be located only within the perimeter flange and/or edges of the pocket. Of course, they can be located elsewhere depending on the particular attachment points of the pocket to the mold as desired during the molding process.

The optional locator pins 1380P can be constructed so as to hold the perimeter flange 1310PF, or generally an edge or perimeter of the pocket body, a preselected distance D9 within the respective sidewall mold cavities 1380SW, scoop mold cavity 1380SC and/or base mold cavity 1380BA. This preselected distance D9 can be at least about 1.0 mm, further optionally about 2.0 mm, even further optionally 2.5 mm, or yet further optionally 3.0 mm or more, depending on the particular application and desired anchor strength. The locator pins and mold cavities also can be constructed so that a perimeter flange first surface 1310FS faces generally toward the pocket longitudinal axis LA when the perimeter flange is secured within the mold cavity. Accordingly, a perimeter flange second surface 1310SS faces generally away from the pocket longitudinal axis LA. Although FIG. 45C shows the perimeter flange first surface 1310FS and second surface 1310SS being generally vertical, or parallel to and interior cavity surface 1380CS, it is contemplated that the surfaces can be offset at an angle C of about 1° to about 45° or more relative to that cavity surface. Other angles can be selected depending on the textile material for which the pocket is constructed, the ease of embedding and/or encapsulating the pocket material with molten material, the cavity configuration and/or the desired anchor strength. Further optionally, the perimeter flange can be folded over toward and/or upon itself, or partially bent in a V-shape or U-shape within the respective mold cavities. This can be accomplished with more specialized locator pins and/or locator pin openings.

Optionally, the mold 1380 can include mechanisms different from the locator pins shown in FIG. 45C to properly position the perimeter flange within the mold cavity. For example, the mold cavity can include clamps that clamp the pocket immediately adjacent the perimeter flange or some other portion of the pocket. These clamps can hold the pocket, and in particular the perimeter flange, within the respective cavities. The mold portions themselves can in some cases act as clamps when closed, holding the perimeter flange within the respective mold cavities. As another example, the perimeter flange can include an adhesive that secures the perimeter flange to a desired surface within the respective mold cavities.

Figure 45D:
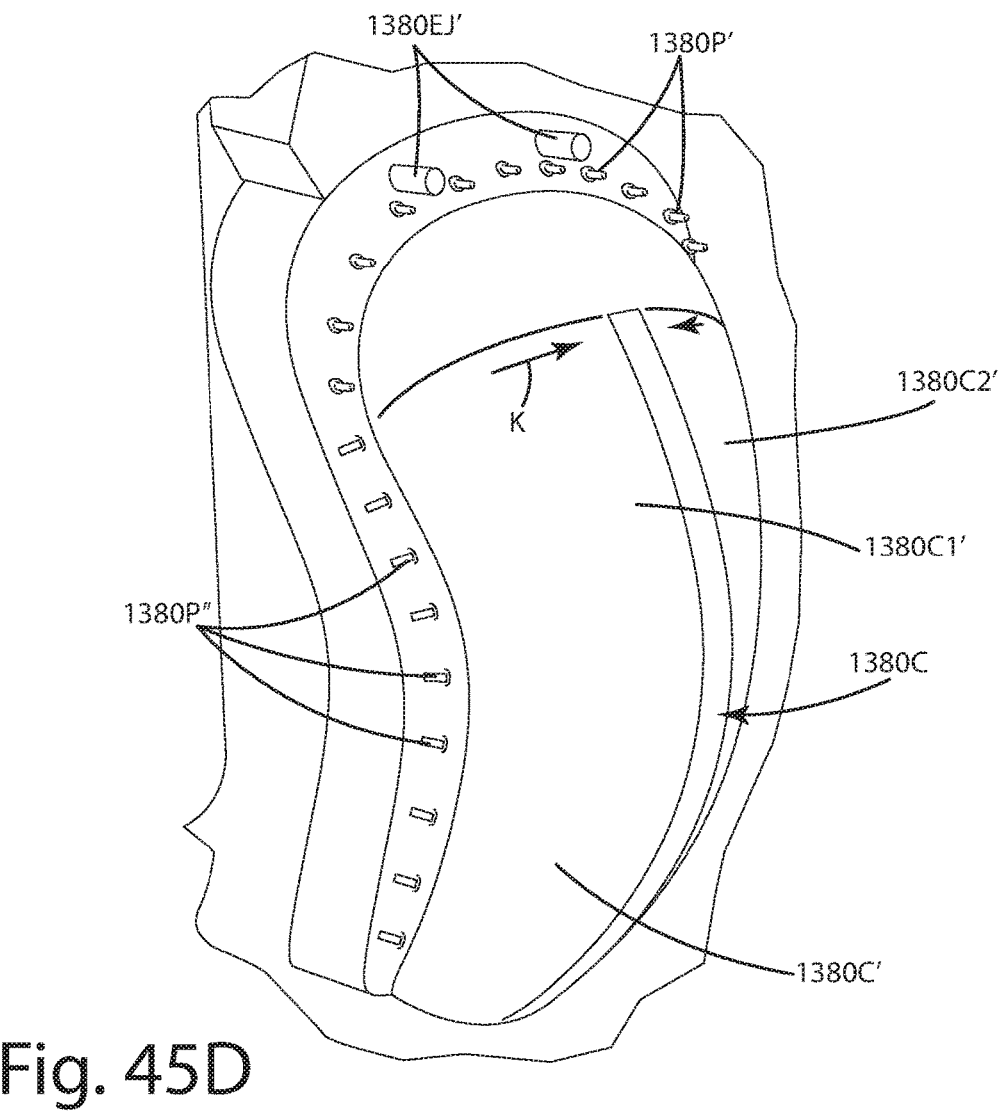
FIG. 45D is a perspective view of an alternative mold including ejectors of the thirteenth alternative embodiment.
Figure 45E:
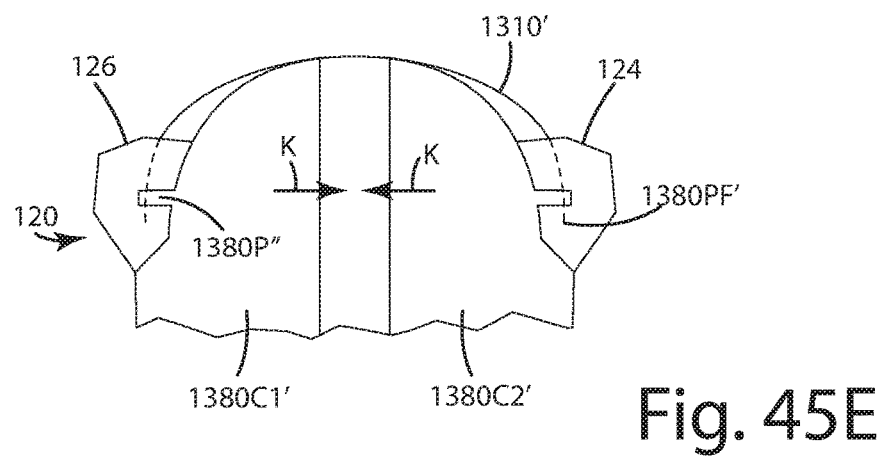
FIG. 45E is a section view of the alternative mold after a lacrosse head is molded over a perimeter flange of the lacrosse pocket of the thirteenth alternative embodiment.

Optionally, the mold can include different mechanisms to move the locator pins and/or eject a molded lacrosse head. For example, as shown in FIGS. 45D and 45E, the mold portion 1380C' can be bisected into corresponding left and right portions 1380C1' and 1380C2'. Each of these portions can include locator pins 1380P'', which are oriented to hold the perimeter flange 1380PF' during the molding process. The mold portions 1380C1' and 1380C2' are movable in the direction of the arrows K selecting toward and away from one another. The pins 1380P' can be immovable relative to the mold portions. When the mold portions move in direction K toward one another after the molding process, the pins 1380P' withdraw from the formed sidewalls 124 and 126. Thus the cured head can be easily removed from the mold. Further optionally, the mold can be outfitted with ejectors 1380ES'. These ejectors can push on the scoop of the head after it is formed to assist in popping the completed lacrosse head and pocket off the mold. Of course, these ejectors can be configured to engage other parts of the head and/or pocket to assist in the ejection from the mold.

As shown in FIG. 45C, the perimeter flange 1310PF can be held a preselected distance D10 away from the outwardly facing cavity surface 1380CS. The perimeter flange also can be held a similar or different distance away from an opposing cavity surface on the opposite side of the cavity. The distance D10 can be selected so that the perimeter flange 1310PF is not visible through the respective overmolded components of the lacrosse head. For example, the distance D10 can be optionally at least 1.0 mm, further optionally at least 2.0 mm, even further optionally at least 4 mm, and even further optionally at least 5 mm. The distance D10 from which the respective perimeter flange, first and second surfaces are held from adjacent cavity surfaces can also vary. For example, the first surface 1310FS can be held 2 mm from the cavity surface 1380CS, while the second surface 1310SS can be held 3 mm from an opposing cavity surface. Other distances can be selected depending on the particular application.

Further optionally, the locator pins 1380P and/or convex bulging surface 1380CBS can be used individually or in combination to apply a tension T shown in FIG. 45C to the pocket 1310. For example, when the perimeter flange 1310PF is joined with the locator pins 1380P, the main body 1310B of the pocket 1310 can stretch, thereby acquiring a tension T within it in the stretched state. This tension T can be exerted in the pocket so that when the components of the lacrosse head are joined with a perimeter flange and the lacrosse pocket in general, the pocket maintains a desired tension, or some degree of that desired tension, thereby retaining its intended contoured three-dimensional shape. Of course, in some embodiments, it may not be desired to include a tension in the pocket during the molding process. In such cases, the concave bulging surface can be reduced in size, or the pocket can be sized larger so that the pocket does not stretch under tension in a portion of the mold.

Even further optionally, the tension T applied to the lacrosse pocket can vary across the pocket. As an example, tension can be applied to a first portion of lacrosse pocket while at least partially maintaining the predefined three-dimensional concave shape in a second portion of the lacrosse pocket so that the entire lacrosse pocket does not become entirely planar. One example of this is illustrated in FIG. 45B. There, the pocket can be under a first tension T in the location of the middle pocket MP4. The pocket can also be under a second, different tension T2 near the scoop, shooting strings or upper edge 1310U of the pocket. That tension T2 can be greater than the tension T. In such a case, the tension T2 can form the pocket near the upper edge, scoop and/or shooting strings in a more planar or convex configuration than the remainder of the pocket. Likewise the relatively lower tension T in the middle pocket portion MP4 does not unduly distort or modify the three-dimensional concave contour of the pocket in that region, nor the associated lateral and longitudinal curvature.

As shown in FIGS. 45A, 45B and 45C, during the mold process, a material 1380M, optionally in a molten, fluid and/or liquid state, is injected under pressure into the mold cavity 1380FV, also referred to as a head frame cavity. Of course, molding techniques other than injection molding can be used, such as pour molding or casting. The molten material permeates throughout the cavity and fills each of its component cavities, for example the scoop mold cavity, the base mold cavity and the sidewall mold cavities. As it flows through these cavities, the material also comes into intimate contact with respective edges of the pocket, and/or the perimeter flange that are disposed within the mold cavity 1380FC, and optionally simultaneously disposed in the different component cavities. As mentioned above, one or more of these edges and/or the perimeter flange can form the outer perimeter of the pocket. If desired, all of the edges can collectively form a continuous perimeter flange or outer perimeter 1310PF that extends around the lacrosse pocket body. The perimeter flange optionally can be at least 2.0 mm, or at least 2.5 mm wide or wider. The perimeter flange 1310PF can be the portion of the lacrosse pocket 1310 that is over molded by at least a portion of the lacrosse head in joining the lacrosse pocket 1310 to the lacrosse head 20. Where the perimeter flange is at least the width mentioned above, it has been discovered that there is enough structure of the pocket to satisfactorily embed and securely join the pocket body with the portion of the head into which the perimeter flange is molded. With widths of the perimeter flange that are significantly less than those mentioned above, it is possible that without extra reinforcement or the use of special materials, the perimeter flange and pocket can rip or tear out from the overmolded polymeric material from which the head is constructed. This can be due to not enough pocket being satisfactorily anchored within the overmolded head material.

When the material contacts the respective edges and/or generally the perimeter flange disposed in the cavity 1380FC, the material, optionally under pressure, encapsulates the individual strands, coating their surfaces on front and back. The material also can extend from a front or first surface 1310FS of the perimeter flange that faces generally toward the pocket longitudinal axis LA, to a second surface 1310SS or outside of the perimeter flange that faces generally away from the pocket longitudinal axis. In many cases, the material also permeates through small spaces between the individual strands, connecting the injected material from one side of the flange or edge to the other. This, in turn, embeds the material within the edges and/or perimeter flange. Where the strands are knitted within the perimeter flange, those strands are typically interlooped with one another, or a single strand is interlooped with itself, in multiple columns. In these cases, the strand or strands form one or more loops in the perimeter flange. The molten or liquid material can permeate through and/or flow through the openings at the interlooped portions of the strand(s), in some cases impregnating the strands and/or spaces between the strands with the material in the perimeter flange. Optionally, the pocket is placed within the mold so that the molten material or liquid material is prevented from entering openings adjacent the perimeter flange, for example openings 1353O in FIG. 45A. This can be accomplished simply by not positioning those openings within the respective mold cavities. Accordingly, these larger openings, which can contribute to the functionality of the middle pocket or other components of the pocket, are not filled with the molten or liquid material.

As shown in FIG. 45A, after the injected material cures to form the sidewall portion 26, it embeds within and extends through the openings 13160 of the portion of the edge that was within the mold. Again, these openings can be formed between adjacent interweaved strands, or between loops formed from one or more continuous strands in a knit pattern. The material also can encapsulate one or more of the plurality of individual strands 1316S, surrounding or circumferentiating each substantially entirely so that all outer surfaces of the strand are within the molten material. With the above embedding, the edge 1360 is sufficiently trapped and molded within the sidewall to hold it in place under the rigors of use during a lacrosse activity.

As mentioned above, all or a portion of the respective edges and/or perimeter flange can be constructed from a first material, such as an aromatic polyamide and/or an ultra-high molecular weight polyethylene. These strands of this first material can be included in a first portion 1316P1 of the edge 1316. The edge 1316 can also include a second portion 1316P2, which can be constructed from a plurality of strands constructed from a second material, such as a thermoplastic polymer, or some other material different from the first material. This second portion 1316P2 can be joined with the pattern 1350, which is also constructed from a plurality of strands of the second material. Within the edge, more of the plurality of the strands constructed from the first material are embedded and encapsulated or otherwise over molded by the portion of the lacrosse head, for example, the sidewalls, scoop and/or base or ball stop.

Optionally, only the portion of the edges and the pocket constructed from the first material can be embedded in and encapsulated by the respective lacrosse head portion. If desired, a majority of the plurality of first strands incorporated into the lacrosse pocket can be embedded within the lacrosse head. Similarly, a minority of the plurality of strands constructed from the second material can be free from, and generally not encapsulated by or embedded within the portions of the lacrosse head. Further optionally, either a majority (greater than 50%) or a minority (less than 50%) of the width of the edge or perimeter can be embedded within the lacrosse head.

Further optionally, with the embedding of the edge 1316 and/or other portions of a perimeter flange 1310PF, such as the opposing side edge and/or upper or lower edges, the majority of that edge or perimeter flange is concealed within the lacrosse head and not visible to a user. In some cases, the respective first and second materials can be so disposed in the edge that when the edge is placed within the mold 1380, the first material and associated knit structure is placed within the mold cavity, but the second material and associated second knit pattern is not placed in the mold cavity 1380FC. Further, one particular knit pattern or knit structure of the edge may be placed within the mold cavity, but a second knit pattern of the edge, or some other component such as the middle pocket, shooting ramp and/or shooting ramp flanks, is not disposed in the mold cavity. Even further optionally, more of a plurality of the first strands than the plurality of second strands can be placed in the mold 1380 and in particular the mold cavity 1380FC during the molding steps.

Yet further optionally, the thickness T6 of head material disposed over the perimeter flange can be varied to provide different aesthetic effects, as shown in FIG. 45A. As an example, where it is desired to show a consumer that the perimeter flange is indeed embedded and encapsulated within the lacrosse head material, the thickness T6 of the molten and cured head material over the perimeter flange can be reduced to 0.1 mm to less than 0.7 mm, or some others thickness sufficient to allow the perimeter flange to visually show through the surrounding head material, generally in a somewhat translucent manner. On the other hand, in some cases the perimeter flange can be concealed within the material from which the head is constructed. In this case, the thickness T6 of the head material over the perimeter flange can be at least 0.5 mm, optionally 1.5 mm to 4.5 mm, and further optionally greater than 6 mm, on both the front and back sides of the perimeter flange. Sometimes, the thickness of the head material disposed over the perimeter flange can differ on the front and back sides thereof. As an example, in the scoop, the head material on the front, facing the interior of the pocket, can be of a thickness that is less than the thickness of the same had material on the back side of the perimeter flange. This can provide enhanced abrasion resistance on the back side and/or can provide a smoother transition from the pocket to the scoop when a lacrosse ball exits the head.

The width SW3 of the edge 1360 can be precisely selected so that the first portion 1316P1 of the edge 1316 is over molded and encapsulated by or embedded within the portion of the lacrosse head. The width SW3 also can be selected so that a small portion 1316P2 extends downwardly from the portion of the molded over lacrosse head and connects to the remainder of the lacrosse pocket 1310. In other constructions, the edges or in general the perimeter flange can be constructed in such a manner that a major portion (more than half) of the width SW3 of the edge or perimeter flange is embedded within the material from which the lacrosse head is constructed. In yet other constructions, the edges, or in general the perimeter flange can be constructed in such a manner so that a minor portion (half or less) of the width SW3 of the edge or perimeter flange is embedded within the material. Optionally, where the perimeter flange is constructed from a material such as a polyamide or other less elastic material, it can be yellow, having a wavelength of 570 nm to 590 nm. Further, this yellow material can project downward from the bottom of the scoop, sidewalls and/or base of the cured lacrosse head a preselected distance. With the material projecting from the bottom of the head, a user can visibly confirm the less elastic material, for example, the polyamide, is included in the head and pocket.

After the material introduced into the mold cavity is allowed to cure, the lacrosse head and its components, for example the scoop, sidewalls and base as well as a throat, are fully formed. The mold portions 1380A and 1380B can be moved in direction N, generally away from the mold portion 1380C as shown in FIGS. 45B and 45C. Any locator pins 1380P also can be withdrawn into the mold portion 1380C. Thereafter, the molded head and now integral pocket can be removed from the mold 1380.

After molding, the edge 1316, perimeter flange or outer pocket perimeter in general, of the lacrosse pocket 1310 are overmolded, and completely encapsulated by and concealed within the respective portions of the lacrosse head 20. The edge, perimeter flange or outer pocket perimeter project downwardly from the lowermost portion of the lacrosse head, without any other lacrosse head structure or component extending below the edge, perimeter flange or outer pocket perimeter. As an example, there optionally is no other structure under the edge or perimeter flange to secure or clamp the pocket to the head.

Generally, upon removal, the pocket is inextricably joined with the lacrosse head, and cannot be removed without damaging or destroying either the pocket and/or the head. Of course, in some other constructions, special removal mechanisms can enable nondestructive removal of the pocket from the head. With this construction, no part of the lacrosse pocket 1310 need be trimmed from the sidewall, scoop, base or other component of the lacrosse head when the lacrosse pocket and components of the lacrosse head are removed from the mold 1380. This can provide a clean appearing product, which need not be further manually or mechanically manipulated to trim off unsightly extra material of the pocket or otherwise modify the lacrosse head.

Optionally, the pocket can include a polymer layer that is secured via thermal bonding, adhesives or other constructions to the pocket. Generally, this polymer layer can provide additional grip and enhance friction between the pocket and a lacrosse ball held within the pocket. The polymer layer can be constructed from TPU, EVA, rubber, silicone and/or certain tacky or adhesive materials. To thermally bond the polymer layer to the pocket, the polymer layer can be placed between portions of a heat press that compresses and heats the polymer layer and portions of the pocket to effectively bond those elements to one another. In some constructions, the polymer layer can be a sheet or film of polymer material that is compressed and heated, and thereby melts, fuses and/or bonds to the strands of the pocket in preselected areas. In most cases, the polymer layer can be bonded to the interior of the pocket so that it faces and is configured to engage a lacrosse ball held in the pocket. In this construction, the polymer layer can be disposed only on the front surface of the pocket rather than the rearward facing surface distal from the ball receiving area of the pocket.

Further optionally, the polymer layer can be selectively disposed in certain areas of the pocket. As an example, the polymer layer can be selectively disposed over the runners to provide a raised surface above the remainder of the interior of the pocket upon which a lacrosse ball is guided when it is shot from or exits the pocket. The polymer layer in this region can include a texture and/or can be raised above the surface of the pocket by approximately 0.2 mm to 2 mm. when textured, the polymer layer can include a plurality of nodes separated from one another by a plurality of valleys. The nodes can extend upwardly from the valleys a distance of approximately 0.1 mm to 1 mm.

Even further optionally, the polymer layer can be selectively disposed along the pocket sidewalls adjacent the middle pocket. In such a construction, the polymer layer can be configured to differently or from a different material to reduce the friction between the lacrosse ball and the pocket in that area. For example, the polymer layer can be in the form of a film disposed over the strands of certain joint elements and vertical elements, and in some cases optionally can extend completely over openings in the middle pocket. The polymer layer can be constructed from a low friction, flexible material. In turn, this can enable a lacrosse ball to be held in the middle pocket relatively firmly by the pocket structure, yet still exit the pocket in a low friction manner due to the polymer layer. Sometimes, the middle pocket can be constructed with elements that effectively squeeze the lacrosse ball therein, however with the polymer layer reducing friction between the pocket and a lacrosse ball, the ball can still easily exit the middle pocket when the ball is forced in a particular direction, for example toward the scoop and/or along the longitudinal axis. The polymer layer can also be oriented in strips in the middle pocket so that friction is reduced only in a particular direction, for example, parallel to and/or along the longitudinal axis of the pocket.

XVII. Fourteenth Alternative Embodiment

A fourteenth alternative embodiment of a lacrosse pocket is illustrated in FIGS. 52-55 and generally designated 1410. The pocket shown there is similar in structure, function and operation to the embodiments described above, for example, the thirteenth alternative embodiment, with several exceptions. To begin, the fourteenth alternative embodiment 1410 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material.

Incidentally, large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

The pocket 1410 can include all the features and functions of the thirteenth embodiment pocket 1310 as well. In addition, the pocket can be integrally molded to a lacrosse head 120, where the head and pocket have the same structural and functional characteristics as those of the head and pocket in the thirteenth embodiment above. In addition, the head and pocket can be integrally combined and/or formed using the same structure or methods as described above in connection with the thirteenth embodiment, or any other embodiments herein for that matter.

Figure 52:
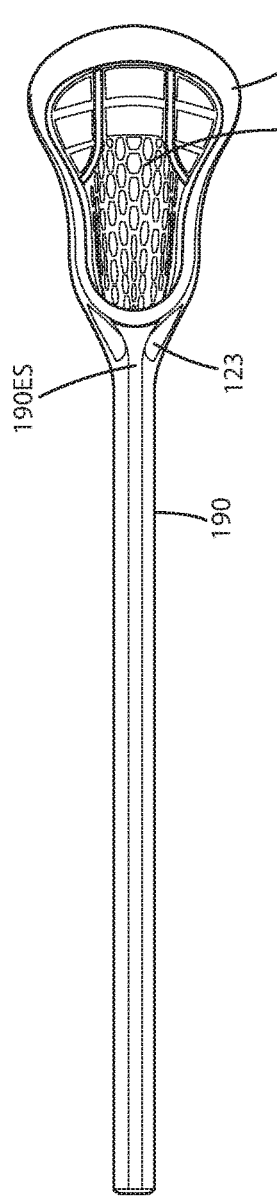
FIG. 52 is a front view of a lacrosse pocket of a fourteenth alternative embodiment integrally molded into a lacrosse head which is itself integrally molded with a lacrosse handle.

In this fourteenth embodiment, however, the head 120, with its integrally molded pocket, can be further integrally molded with a lacrosse handle 190 as shown in FIG. 52. To produce this construction, during a molding process in which the material of the head to 120 encapsulates and overmolds a portion of the pocket 1410, the handle 190 also can be simultaneously molded, formed. Accordingly this embodiment provides a true one piece integral lacrosse stick including the head, pocket and handle, all as one unit. There are no laces or strings joining the pocket to the head, nor is there a screw or other fastener joining the head to the handle.

With this combination of features, a complete one-piece stick including an integral pocket can be repeatedly and consistently manufactured and provided to consumers. This contrasts the inconsistency that plagues conventional multi-component, pieced together lacrosse sticks. For example, there has been inconsistency between individual manually formed pockets, as well as the manual attachment of those manually formed pockets to respective heads. As a further example, there also has been inconsistency in the attachment of a head to a handle. In some cases, the head and handle combination might not be a perfect fit, which can lead to a weak or wobbly connection between the head and handle. In other cases, with a removable head and handle, the plastic in the throat of the head can stretch out or become deformed. This can be problematic where the head is secured to the handle at a junction via a fastener such as a screw, bolt or pin. Over time, the fastener attached head can loosen relative to the handle, eventually becoming unacceptably wobbly with play over time. With the present embodiment, all of the above inconsistencies and problems can be eliminated. The present embodiment also provides a unitary lacrosse stick that addresses many of the fatigue issues associated with previous head to handle fastener connections. The one piece integral stick including the head, handle and integral pocket of the current embodiment also can be engineered and manufactured in a repeatable manner.

Figure 53:
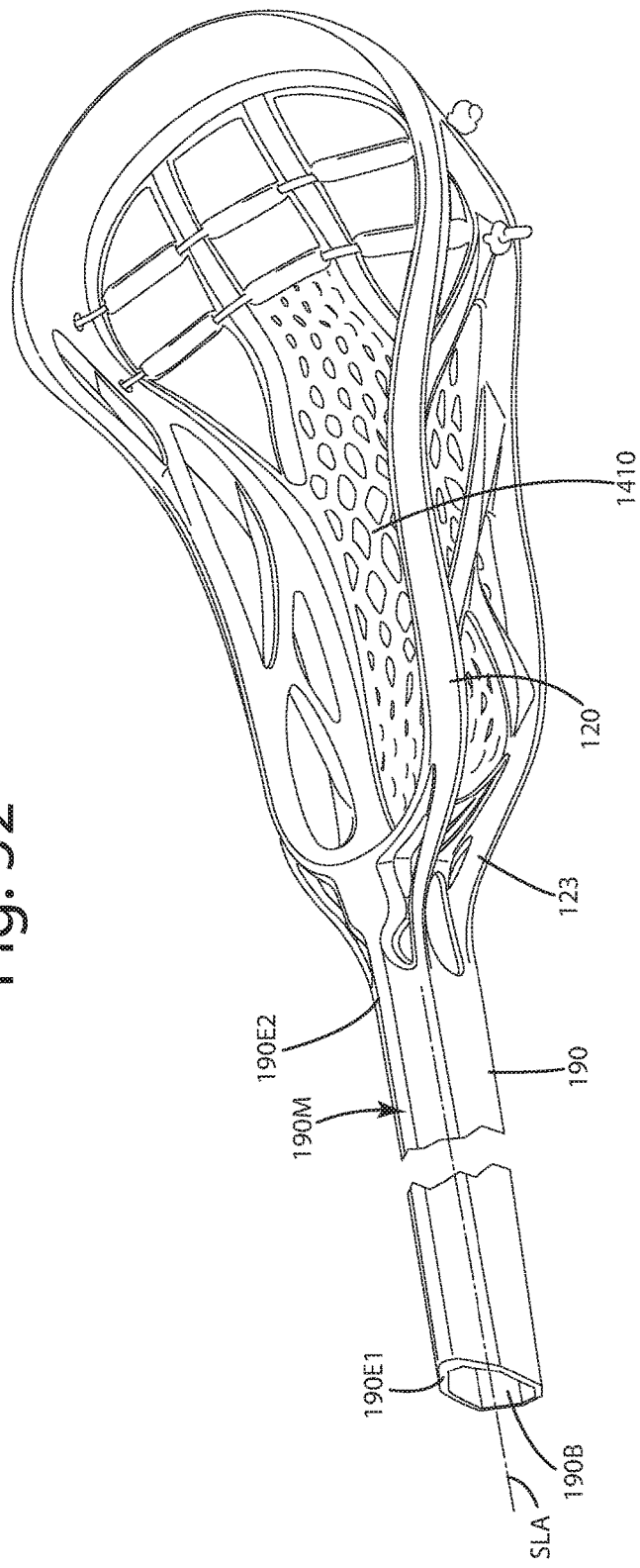
FIG. 53 is a perspective view of the lacrosse pocket of the fourteenth alternative embodiment integrally molded into a lacrosse head which is itself integrally molded with a lacrosse handle.

As shown in FIG. 53, the lacrosse handle 190 can be of a preselected cross sectional shape, such as an octagonal shape. Of course, in other constructions, the cross sectional shape can be circular, round, elliptical, polygonal or other shapes. The handle 190 can include a bore 190B. This bore can be of the same cross sectional shape as the exterior of the handle. This bore can also be specially formed during the molding process in which the head and handle are optionally simultaneously formed. The bore 190B can extend longitudinally along a shaft longitudinal axis SLA that extends from a first end 190E1 to a second end 190E2 of the shaft or handle 190. With this construction, the handle can generally be of a tubular configuration. In other optional constructions, the bore can be deleted, so that the handle is a solid continuous piece, without a bore on the interior. Further, if desired, the bore 190B can terminate at some location 190M between the first end 190E1 and second end 190E2. With such a construction, the handle between the termination portion 190M and the second end 190E2 can be solid. This can be helpful in some cases where it is desired to reduce flex or otherwise provide more rigidity near the base 123 of the head 120. Of course, the handle can be solid in other portions between the end 190E1 and the head 120, depending on the particular application.

With reference to FIGS. 52 and 53, it can be seen that the end 190E2 of the handle 190 is integrally formed and joined with the lacrosse head 120, and particular its base 123. The base 123 and end 190E2 of the handle transition smoothly and cleanly to one another without any visible seams. Again this because material forming each of these components is intermixed and intermingled with one another during a molding process.

The method of manufacturing the one-piece lacrosse stick including the integral lacrosse pocket, head and handle will now be described with reference to FIGS. 54-56. FIGS. 54 and 55 illustrate the mold 1480 that is used to construct the one-piece lacrosse stick. The mold can include opposing portions 1480A and 1480B. These respective portions can collectively define a head mold cavity 1480FC, which can include a base mold cavity 1480BA, a scoop mold cavity 1480SC and sidewall mold cavities 1480SW. These cavities and the head mold cavity can be substantially identical to the mold in the thirteenth embodiment described above. In addition, however the mold 1480 can include a handle mold cavity 1480HC in fluid communication with a head cavity 1480FC, and in particular the base mold cavity 1480BA. With this fluid communication, any molten material or liquid in the head cavity and handle mold cavity can intermingle and intermix with one another to some extent during a molding process.

As illustrated in FIGS. 54 and 55 the mold 1480 also can include a secondary handle slide 1490. This handle slide 1490 can include a bore producing extension 1481. This bore producing extension is typically in place within the handle cavity while the handle cavity 1490HC is filled with a molten material or liquid to form the handle 190. Thus, the bore producing extension 1481 can form the bore 190B in the handle. The length of the extension 1481 can be varied depending on the desired length of the bore in relation to the first end 190E1 and second end 190E2 of the handle. The exterior surfaces of the extension 1481 also can be modified depending on the desired cross section of the bore. Alternatively, a bore can be produced using a gas assist technique in which gas is introduced into molten material in the handle cavity to form the bore 190B. Of course, if no bore is desired in the handle, the handle slide 1490 can be deleted from the mold 1480.

Figure 56:
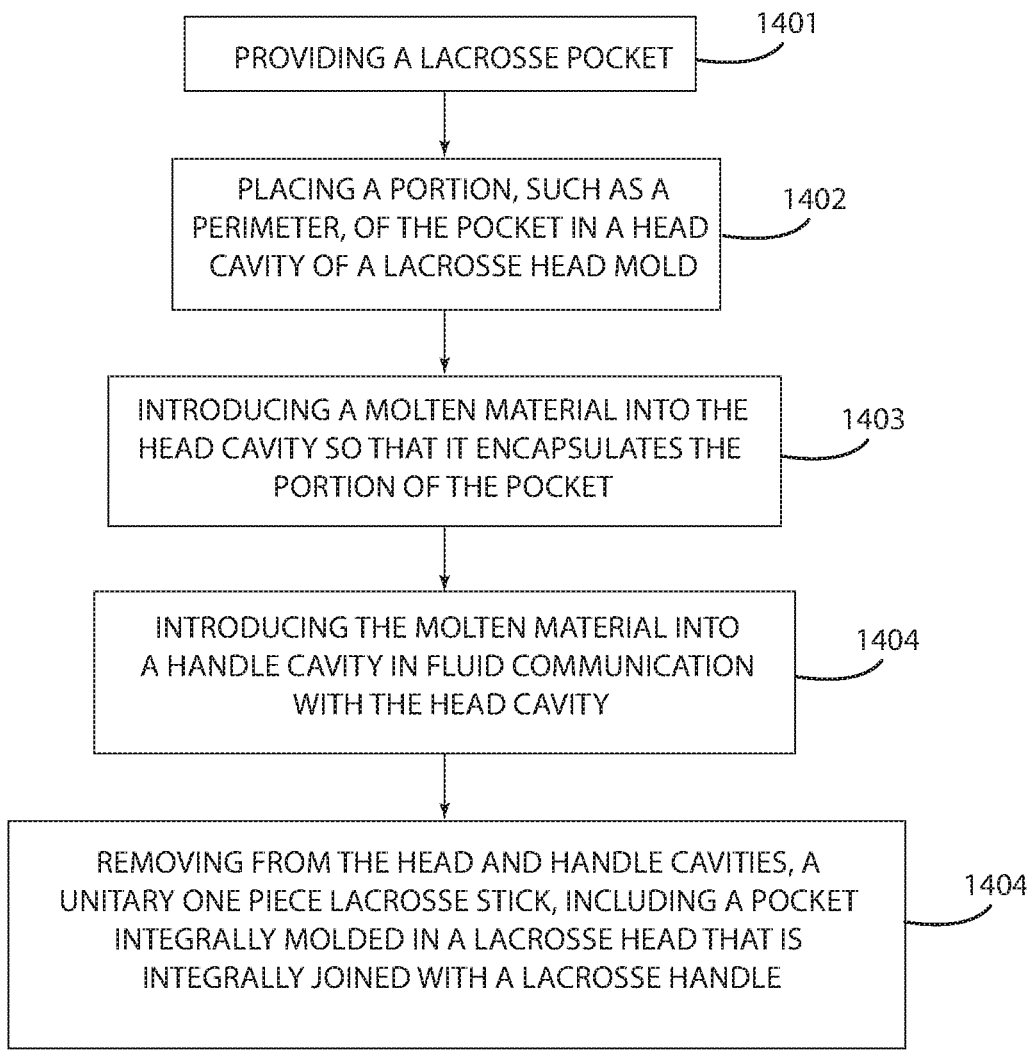
FIG. 56 is a flow diagram showing an exemplary method of manufacturing a unitary one piece lacrosse stick including a lacrosse pocket the fourteenth alternative embodiment.

The method of manufacturing the one-piece lacrosse stick can begin with step 1401 in FIG. 56 of providing a lacrosse pocket 1410, of the type described in any of the embodiments described above, for example, the pocket 1310 in the thirteenth embodiment. As with that embodiment, the outer perimeter, edge or perimeter flange of the pocket 1410 is placed within the respective mold cavities 1480SC, 1480BA and 1480SW, as shown in step 1402. Again these mold cavities make up the head cavity 1480FC. This head cavity is in fluid communication with the handle cavity 1490HC. If the handle is desired to define a bore, the bore producing extension 1481 is placed within the handle cavity 1490HC.

In step 1403, a molten material or liquid is introduced into the head cavity 1480FC so that it encapsulates a portion of the pocket 1410 as described in connection with the thirteenth embodiment above. Molten material is also introduced into the handle cavity 1490HC in step 1404, which can be simultaneous with step 1403. Because the handle cavity and head cavity are in fluid communication with one another, the molten material or and/or liquid forming the head and forming the handle can intermingle and/or intermix. Optionally, in some cases, different molten materials can be introduced into the head cavity versus the handle cavity. This can be helpful where different properties are desired of each of these components. Indeed, multiple different molten or liquid materials can be introduced into the mold cavities, depending on the particular performance characteristics of the one-piece lacrosse stick.

Where the bore producing extension 1481 is included in the handle cavity, it can effectively form the bore 190B in the handle during the introducing step 1404. After the molten material or liquid has sufficient time to cure, the mold 1480 can be opened. For example, the bore forming extension 1481 can be withdrawn from the handle cavity 1490HC in direction L as shown in FIG. 55. At this point, the bore 190B is effectively formed in the handle 190. The mold portions 1480A and 1480 B can be separated. In step 1404, the unitary one-piece lacrosse stick including a pocket integrally molded in the lacrosse head, which is itself integrally molded to the lacrosse handle 190, can be removed from the head and mold cavities.

XVIII. Fifteenth Alternative Embodiment

Figure 57:
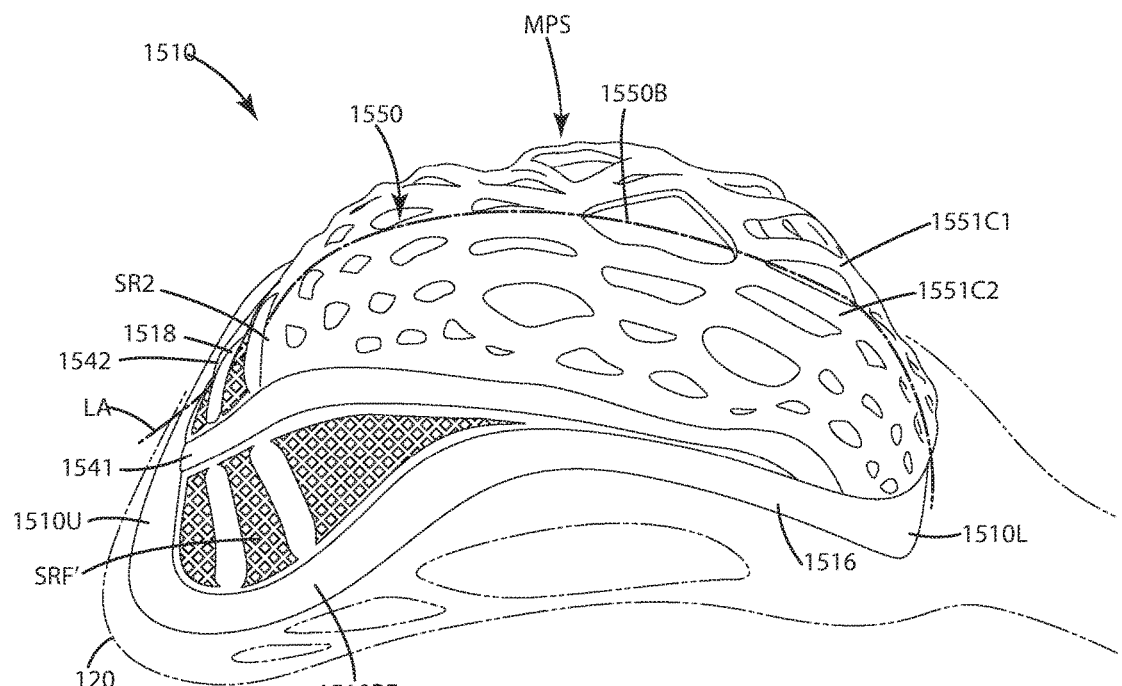
FIG. 57 is a perspective view of a lacrosse pocket manufactured according to a fifteenth alternative embodiment.
Figure 58:
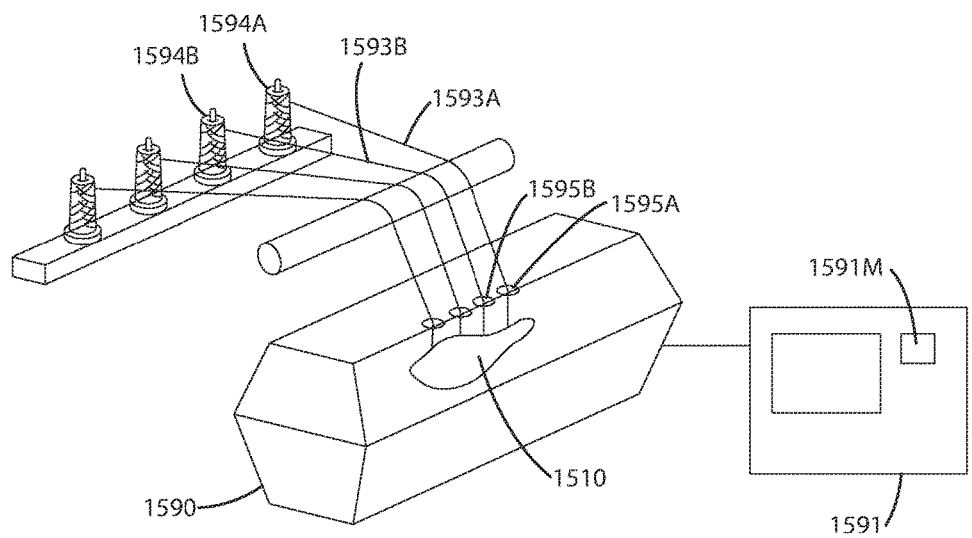
FIG. 58 is a perspective view of an automated lacrosse pocket assembly machine used to manufacture the lacrosse pocket of the fifteenth alternative embodiment.

A fifteenth alternative embodiment of a lacrosse pocket is illustrated in FIGS. 57-58 and generally designated 1510. The pocket shown there is similar in structure, function and operation to the embodiments described above, for example, the thirteenth alternative embodiment, with several exceptions. To begin, the fifteenth alternative embodiment 1510 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material. Large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (inter-looped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

The pocket 1510 can include all the features and functionality of the thirteenth embodiment pocket 1310 as well. In addition, the pocket can be integrally molded to a lacrosse head 120 (shown in broken lines), where the head and pocket have the same structural and functional characteristics as those of the head and pocket in the thirteenth embodiment above. In addition, the head and pocket can be integrally combined and/or formed using the same structure and methods as described above in connection with the thirteenth embodiment, or any other embodiments.

In this fifteenth embodiment, however, a particular method of manufacturing a lacrosse pocket, for example, that of the thirteenth alternative embodiment, that is integral with a lacrosse head is provided. In general, to perform the method, an automated pocket assembly machine is used to produce the lacrosse pocket from certain data that pertains to the pocket. A mold is used to join the produced lacrosse pocket with a lacrosse head by over molding portions of the lacrosse head over corresponding portions of the lacrosse pocket.

The method can provide an automatic pocket and head manufacturing method where a manufacturer can replicate pocket features, such as the location of the apex of the pocket, curvature of a ball channel shooting ramp and/or shooting strings, and the like, in a repeatable fashion, from one pocket to the next. This can provide previously unheard of consistency from one lacrosse pocket to another because the manual manipulation and connection of the pocket to the head is eliminated. With the method, there is no longer any need to manually lace a pocket to a head. Further, because the pocket is produced on an automated assembly machine, its features are precisely reproduced with each and every copy of the pocket output from the machine.

In addition, with conventional manufacturing processes, it is virtually impossible to create a performance pocket having an apex where the ball will naturally come to rest in a precise location that does not start to change after a player catches or shoots a ball several times. Current hand strung materials stretch and change as they are stressed in the activities of catching, throwing and shooting a lacrosse ball. It also is virtually impossible to produce a hand strung pocket with repeatable performance because as the pocket changes, the performance of it changes as well. With the current embodiments, it is possible to repeatedly and consistently manufacture a performance pocket having an apex, ball channel and/or shooting ramp curvature and other features in precise, predefined locations therein, where the pocket will last exponentially longer than conventional pockets, and will provide repeatable performance multiple times.

As mentioned in the embodiments above, the lacrosse pocket can be constructed from a unitary textile material on an automated pocket assembly machine. Generally, the pocket is formed completely via a mechanized manipulation of a plurality of strands, without any direct human manipulation of the strands during the method of the strands to incorporate them into the pocket. The mechanized manipulation can be via knitting and/or weaving for example on a machine. Although described herein in connection with a knitting process on a knitting machine, it will be appreciated that the pocket can be weaved on a weaving machine using a weaving process. Thus, all the steps, configurations, structures and operations applied to knitting herein apply by analogy to weaving; and any description of the knitting process can be applied equally by analogy to the weaving process.

The knitting process can be any of a variety of different knitting processes, for example circular knitting, tubular knitting, flat knitting, sweater knitting, Jacquard knitting, Intarsia knitting, weft knitting, warp knitting and other types of knitting. When a weaving process is utilized, the process can be any one of multiple weaving processes, including processes that construct a leno weave, a twill weave, a hatch weave, a slit weave, a plain weave, a baskets weave, a Jacquard weave, a Rib weave and an Oxford weave or other types of weaves.

The knitting machine can be any type of sophisticated knitting machine, such as the knitting machines described herein. The knitting machine can mechanically manipulate a plurality of flexible, elongated strands of the unitary textile pocket and/or pocket body during a knitting process to form the pocket 1510, and all its components and features, such as those explained above in connection with the thirteenth embodiment, which apply equally to this embodiment. As noted above, the automated machine can perform a tubular knitting process in which multiple tubular elements are knitted and joined to form the various components and structure of the pocket. If desired, the tubular knitting process can also implement a weft knitting technique.

The three dimensional shape of the pocket can include a concave shape disposed or located generally within the middle pocket and/or shooting ramp. The three dimensional shape also can encompass substantially planar and/or convex regions of the pocket, for example in the shooting ramp and/or shooting ramp flanks, which optionally does not include knitted tubular elements. The machine itself can be configured to interloop a plurality of first strands with a plurality of second strands, and any number of additional strands, so as to form that predefined, three dimensional shape in the pocket and/or pocket body. The machine also can mechanically manipulate other strands, or optionally the same strands, but different portions thereof, of the unitary textile material with a knitting machine during the knitting process to form the above mentioned predefined generally flat planar shapes in the pocket body and/or predefined three dimensional convex shapes in the pocket body. The latter shapes can correspond generally with the shooting ramp flanks SRF1, SRF2, the respective edges 1510U, 1510L, 1514 and/or 1516, perimeter flange, or outer perimeter 1510PF, or other portions of the pocket 1510 shown in FIG. 57.

During the knitting process, the knitting machine knits a unitary textile pocket and body so as to form the respective components of the pocket and pocket body. In doing so, the knitting machine shown in FIG. 58 draws a plurality of different strands 1593A, 1593B off of respective cones or spools 1594A and 1594B. Optionally, these strands can be constructed from different materials, for example materials having different elasticities or different mechanical properties as explained above in connection with first and second materials of the thirteenth alternative embodiment. These strands are fed to respective needles and/or armatures 1595A, 1595B which perform the knitting operation to form the components of the pocket 1510. The needles and/or armatures can be driven by the machine and/or controller. Generally, the lacrosse pocket data from the controller can be transformed, translated or otherwise converted by the automated pocket assuming machine to a plurality of signals. The signals can be transmitted to or otherwise control the needle and/or armature to direct the needle and/or armature to perform their automated movements to selectively incorporate the respective strands within the lacrosse pocket at predefined locations in a predefined pattern.

As an example, the signals can direct the needles and/or armature to either interloop and/or weave one strand with another during the mechanical manipulation by the machine. As a more particular example, the knitting machine knits the upper edge 1510U, the first and second sidewall edges 1516, the lower edge 1510L, the shooting ramp SR2, the middle pocket MP5, the bullseye opening 1550B, the runners 1541, 1542 and the shooting ramp flanks SRF' which have their respective predefined shapes and associated knitting patterns. All of these different knitted components of the pocket body are contiguous and continuous with one another, being formed from the plurality of strands that make up the unitary textile material. Indeed, many of the individual strands can span the length of the pocket, back and forth in rows of each of the components, from the upper edge 1510U to the lower edge 1510L, and can be interlooped in specific regions of the pocket, thereby forming and becoming integrated with the different knit patterns of the pocket.

As one example, a knitting machine can interloop a first strand with a second strand near the lower edge 1510L. The first strand can continue in a plurality of rows into a vertical element 151C1 through the middle pocket MP5 and shooting ramp SR2. In the shooting ramp SR2, that strand can be interlooped with additional strands within the knit pattern 1550. The same strand can extend into and be interlooped with yet other strands in the knit pattern 1518. The strand can extend and be further interlooped with yet other strands in the upper edge 1510U of the lacrosse pocket. As will be appreciated, all of the same structures described above in connection with the other embodiments, for example the thirteenth embodiment above, can be formed with similar knitting or mechanical manipulation techniques.

As shown in FIG. 58, further optionally, the knitting or weaving machine, or other automated pocket assembly machine 1590, can be controlled by a controller 1591 to produce the pocket 1510. The controller can be any conventional processor, computer or other computing device. The controller can be electrically coupled to the machine, and can be in communication with a memory 1591M, a data storage module, a network, a server, a cloud or other construct, all of which are considered a memory herein. The memory can store and/or transfer lacrosse pocket data in various forms to or from the automated pocket assembly machine. Although shown as separate elements, the controller and machine can be integrated into one component.

The lacrosse pocket data can be a particular type of data pertaining to one or more lacrosse pockets and/or portions of lacrosse pockets. For example, the lacrosse pocket data can be data pertaining to one or more particular knitting patterns or stitches, weaving patterns or stitches, or other patterns or stitches associated with and/or incorporated into the lacrosse pocket. As one example, the lacrosse pocket data can be data that relates to the combination of particular knitting patterns used to construct different portions of a lacrosse pocket. As a more particular example, the data can be the precise location and type of knitting structure in a particular location of the pocket. While the data may not reflect or readily translate to a particular lacrosse pocket structure, such as an apex of the pocket, a bullseye opening, an outer perimeter or perimeter flange, pocket openings, shooting flanks, runners or the like, the fact that those components can be produced with the data means that the data pertains to those features and structures, or others, depending on the application.

The lacrosse pocket data can be implemented, accessed and/or utilized, all generally referred to as utilized herein, by the automated assembly machine, whether in the form of a code or a program or other directive. The lacrosse pocket data, when utilized to form the pocket with the assembly machine, ultimately can generate in the pocket, certain features (and therefore, the data pertains to those features), such as: the predefined three-dimensional shape; the position, dimension, curvature and/or depth of a middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like.

The controller can access the lacrosse pocket data to thereby control the automated pocket assembly machine and produce one or more lacrosse pockets in a desired number and configuration, optionally individually and/or in a strip of lacrosse pockets, depending on the application. Each constructed lacrosse pocket can include a substantially identical predefined three-dimensional shape, and can have virtually identical physical features, such as those enumerated above in connection with the lacrosse pocket data.

After the lacrosse pocket 1510 is formed with the automated pocket assembly machine 1590, it is removed from the machine and readied for overmolding with a lacrosse head to integrally join the pocket with the lacrosse head, as in the thirteenth embodiment above. The mold used to form the lacrosse head can be the same as that illustrated in FIGS. 45B, 45C, 45D and 45E of the thirteenth alternative embodiment above, and the resulting output of the molding process can be the same as the construction shown in FIGS. 45A and 45E.

Figure 59:
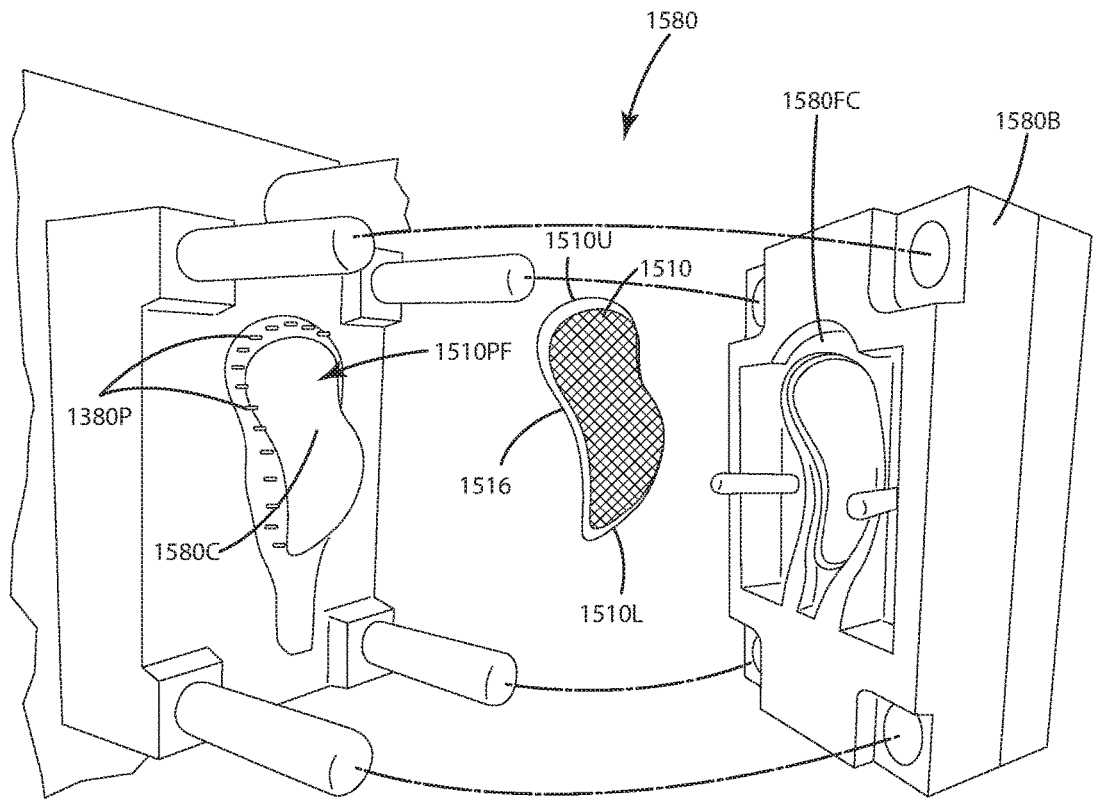
FIG. 59 is a perspective view of a mold used to overmold the lacrosse pocket with a lacrosse head of the fifteenth alternative embodiment.

An optional alternative mold 1580 that can be used to overmold the pocket is shown in FIG. 59. The mold 1580 includes first and second portions 1580A and 1580B. The mold portion 1580A includes a three dimensional contour 1580C which is shaped similarly to the three dimensional contour of the already formed lacrosse pocket. The mold portion 1580A also can include a plurality of locating pins 1580P, which can be similar or identical in structure to the locating pins in the thirteenth alternative embodiment above. The pins can function similarly to retain a lacrosse pocket over the three dimensional contour 1580C and adequately extend a perimeter flange 1580PF into the respective portions of the mold cavity 1580 FC which can be further defined in the second mold portion 15808.

In operation, the mold portions 1580A and 1580B are moved toward one another to complete the head cavity 1580FC and its respective component portions, with the perimeter flange of the lacrosse pocket being located in the head cavity 1580FC, again similar to that of the thirteenth alternative embodiment above. Molten or liquid material, for example polymeric material or other materials as described above in the other embodiments, is introduced into the head cavity. The lacrosse pocket, and in particular its perimeter flange, or perimeter can be embedded in and encapsulated by the material forming the respective portions of the head, for example the scoop, sidewalls and the base. As with the thirteenth alternative embodiment, the head is allowed to cure to form a cured lacrosse head having a scoop, base, sidewalls and other components of the lacrosse head. The resulting structure of the pocket over molded by the head can be similar to that of the thirteenth alternative embodiment described in connection with FIG. 45A. The lacrosse pocket 1510 can be secured to the lacrosse head 120 without having been manually strong to the lacrosse head with laces or other structures manipulated by a human during the molding process or otherwise.

Exemplary methods of utilizing the knitting machine and mold to produce a lacrosse pocket that is integrally overmolded by a lacrosse head will now be further explained with reference to FIG. 60. Generally, the method includes the steps of: mechanically manipulating one or more strands within automated pocket assembly machine utilizing lacrosse pocket data to form a lacrosse pocket, step 1501; placing a portion of the lacrosse pocket in a mold cavity corresponding to a lacrosse head, step 1502; molding a material to the portion of the lacrosse pocket, step 1503; and removing a cured lacrosse head with the first lacrosse pocket attached to it from the mold cavity, step 1504.

Optionally, the method can include a step of storing lacrosse pocket data in memory and utilizing it to drive or operate the automated pocket assembly machine or otherwise produce the lacrosse pocket in an automated fashion. As mentioned above, the automated pocket assembly machine 1590 can be in communication with a controller 1591 which can access the lacrosse pocket data in a memory 1591M. The lacrosse pocket data, as mentioned above can be in various forms, and optionally can be implemented in code, programs or other directives. While the data may be in the form of particular knitting, weaving or other pattern data or code, without any specific identification of features of the pocket, such as the apex, the outer perimeter or perimeter flange, openings, shooting ramps or other structures, that data still pertains to those features of the pocket.

The method can include different ways to collect, compile and store the lacrosse pocket data in memory. For example, the lacrosse pocket data, or parameters that can be translated into the lacrosse pocket data, can be based on input to the controller provided by a user related to different features of a lacrosse head. For example, the user can input into the controller or store in memory specific characteristics of features, such as: an apex located between a scoop portion and a base portion of the lacrosse pocket; the length, location and boundaries of an outer perimeter or perimeter flange, the predefined three-dimensional shape of the pocket; the position, dimension, curvature and/or depth of a middle pocket; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like. All of these characteristics can be input into a program or code, which can then automatically translate the characteristics into lacrosse pocket data, such as data relating to knitting patterns, weaving patterns or other assembly patterns, pertaining to those characteristics.

Alternatively, these characteristics can be utilized to generate one or more sample lacrosse pockets, for example by providing those characteristics to an experienced technician of automated pocket assembly machines. The technician can translate the characteristics into a corresponding set of lacrosse pocket data. The lacrosse pocket data can be in the form of data and/or code relating to particular knitting patterns, weaving patterns or other assembly patterns that can, when read and/or received by the automated assembly machine, carry out operations to implement the characteristics in the form of a lacrosse pocket. In some cases, the technician can construct multiple iterations of samples via experimentation, until a preferred lacrosse pocket structure is identified and produced. When that preferred lacrosse pocket structure is so identified and produced, the related lacrosse pocket data used to generate that pocket can be stored in memory as a particular file, unique to that preferred lacrosse pocket structure. Optionally, the technician can select one or more particular characteristics of the pocket to program the controller and produce a pocket of a preferred profile. For example, the technician can identify a theoretical position of the bullseye opening and/or an apex based on the specific characteristics of those features stored in memory. The technician can then write a knitting program comprised of lacrosse pocket data based on the estimated location of the apex and/or bullseye opening (optionally, along an anticipated longitudinal axis of the pocket). The technician can then use the machine to produce the pocket, utilizing the lacrosse pocket data. The technician can review the constructed pocket and determine whether the bullseye opening and/or apex is where it is desired to be located relative to the related characteristics in the memory. If the bullseye opening and/or apex are in place, the produced pocket is a success and related lacrosse pocket data can be stored. If not, the technician will modify the lacrosse pocket data and associated program to move the bullseye opening and/or apex (e.g. longitudinally along the longitudinal axis) to thereby produce a modified new pocket. The technician will utilize that data to produce yet another pocket on the machine, and inspect it to see if it is a successful, and to see if production of the pocket, the bullseye and/or apex are where they should be. The technician can repeat this iterative process multiple times before producing a final pocket with all the desired characteristics. It should be understood that the iterative process utilized by the technician can include use of the automated translation process described herein. For instance, the technician can utilize an automatic translation processor to generate lacrosse pocket data. If the technician determines an adjustment is worthwhile, he can adjust one or more settings, including one or more characteristics of the lacrosse pocket data and one or more parameters used by the automated translation processor to generate the lacrosse pocket data, to thereby produce a modified new pocket.

Multiple lacrosse pocket data in multiple files can be generated for a variety of different lacrosse pockets having different characteristics. Because most of lacrosse pockets can be identified as low pockets, mid-pockets or high pockets, the different lacrosse pocket data can pertain to the structure and characteristics of those different low, mid and high pockets. For example, a low pocket generally includes an apex, corresponding to the greatest depth of the pocket located centrally on a longitudinal axis of the pocket, where the apex is disposed between a middle pocket and a lower portion or lower edge of the lacrosse pocket. First lacrosse pocket data can be stored in memory that pertains to this low pocket construction. As another example, a mid-pocket generally includes an apex disposed within the middle pocket, that is, about midway between the upper edge and lower edge of the pocket. Second lacrosse pocket data can be stored in memory that pertains to this mid-pocket construction. As yet another example, a high pocket generally includes an apex disposed between the middle pocket and the upper edge or scoop portion of the pocket. The third lacrosse pocket data can be stored in memory that pertains to this high pocket construction. The respective first, second and third lacrosse pocket data can be stored in different files and identified accordingly. When a user desires to manufacture a particular pocket, such as a low pocket, the user can access the data related to that pocket in a particular file in memory. This data can then be used to guide the mechanical manipulation of strands with the automated pocket assembly machine to form the particular pocket and its features including for example a three-dimensional contour, an apex located in a particular location and/or a ball channel curvature, all corresponding to the respective lacrosse pocket data.

Figures 61, 62:
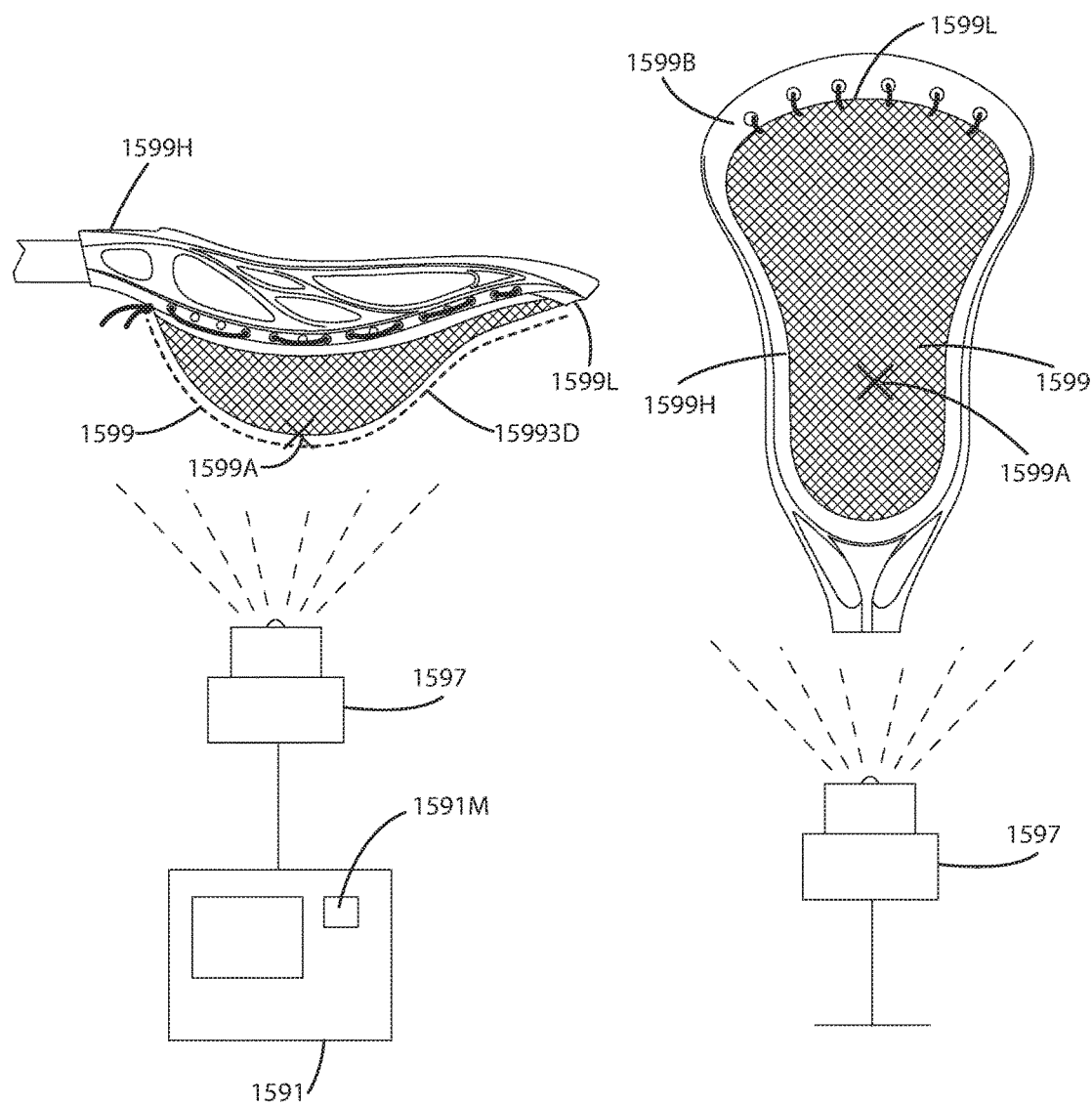
FIG. 61 is a side perspective view illustrating collection of an image of a hand strung lacrosse pocket used to generate lacrosse pocket data.
FIG. 62 is a top view illustrating collection of an image of the hand strung lacrosse pocket used to generate the lacrosse pocket data.

As mentioned above, the method can include different ways to collect, compile and store the lacrosse pocket data in memory. Another way to collect and store lacrosse pocket data is to start with an existing lacrosse pocket that is manually strung by a human to a lacrosse head. With reference to FIGS. 61-62, and imaging device 1597 can be used to capture an image of a first lacrosse pocket 1599 joined with a first lacrosse head 1599H, The first lacrosse pocket 1599 can be secured to the head with laces 1599L that are strung manually by a human between the pocket and the head. That lacrosse pocket 1599 can include a non-planar, three dimensional concave contour 15993D. Although shown only as extending in the plane of the drawing, the three dimensional contour can extend laterally across the width of the pocket as well. The lacrosse pocket 1599 can define an apex 1599A, which can be located within a bullseye opening, and can generally form the deepest depth of the pocket; and can include a pocket boundary 1599B. This pocket boundary can be the outermost extent of the pocket 1599. Because the pocket is hand strung, the boundary can be located adjacent the corresponding portions of the lacrosse head 1599H.

The lacrosse pocket 1599 can be imaged by the imaging device 1597, which can be a high-definition camera, a digitizing camera, or any other device capable of capturing images and/or data associated with an object. As an example, the imaging device 1597 can conduct a three-dimensional scan of an object to produce model information from which a three-dimensional digital model can be generated. A variety of three-dimensional models can be generated from the model information, including, for example, a polygon mesh mode, a surface model and a point cloud. The three-dimensional model or the model information, or both, may be editable by a user to enable modifications prior to translation of the model information to lacrosse pocket data for use in generating the lacrosse pocket 1510. Examples of such three-dimensional imaging devices include an active-scanner that actively emits radiation or light and detects the reflected radiation or light, and a passive-scanner that detects reflected ambient radiation.

The imaging device 1597 in the illustrated embodiment can be directly controlled by the controller 1591, and can communicate information to the controller 1591 relating to the scanned object. Optionally, the imaging device 1597 may be operated separate from the controller 1591, and may communicate information, such as scanned information or model information, to the controller 1591 to facilitate generation of lacrosse pocket data. For instance, a user or technician may utilize the imaging device 1597 to scan the pocket 1599 to generate scanned information from which a three-dimensional model of the pocket 1599 can be produced. This scanned information can be communicated, via a wired interface or a wireless interface, or both, to the controller 1591. The three-dimensional imaging device can be a portable device, such as a camera-enabled mobile phone. With such a mobile phone, a lacrosse player can generate scanned information relating to a three-dimensional model of the pocket 1599, and communicate the scanned information to a technician or the controller 1591, or both, to be used as a basis for generating the lacrosse pocket 1510.

The scanned information can be provided to the technician or the controller 1591, or both, in conjunction with a point-of-sale interface that allows the user to order a lacrosse pocket based on the pocket 1599. The point-of-sale interface can be provided by any type of device, including a web-enabled or a network-enabled device or a standalone device located at a retailer location. For instance, the point-of-sale interface can be communicated via a network to a point-of-sale terminal (e.g., a mobile phone or portable device), and enable selection and purchase of a manufactured lacrosse pocket, a lacrosse head, or an integrated lacrosse pocket and lacrosse head, or a combination thereof. The point-of-sale terminal can include the imaging device 1597 to scan the pocket 1599, or the point-of-sale terminal can receive scanned information relating to the pocket 1599 from another device. The scanned information or the model information of the pocket 1599 can be considered a digitized or digital form of the pocket 1599. Based on the scanned information or the model information of the pocket 1599, the point-of-sale terminal can suggest one or more options available for selection and ordering, including, for example, a lacrosse pocket based on the digital form of the pocket 1599, and an integrated lacrosse pocket and lacrosse head based on the digital form of the pocket 1599. Additionally, the point-of-sale terminal can enable selection and ordering of a substantial reproduction of a lacrosse pocket associated with a lacrosse head possessed by a professional lacrosse player, or an integrated lacrosse pocket and lacrosse head that is a substantial reproduction of the same possessed by the professional lacrosse player. The point-of-sale interface can also enable a user to adapt one or more features of a selected lacrosse pocket or a scanned lacrosse pocket, or both, to customize their order, including, for example, changing the location of the apex or the curvature of the shooting ramp. After a user has selected the desired options for their order, the point-of-sale terminal can communicate the order in the form of a point-of-sale request to a transaction processor for fulfillment.

After the image and/or associated data of the lacrosse pocket 1599 is captured with the imaging device, that image and its associated data can be digitized into a digital form that can be processed by the controller or some other computing device and then transferred to the controller. Based on the image of the first lacrosse pocket, and/or the digitized data relating to the image, either the controller or a machine technician can generate first lacrosse pocket data, as described herein alone. This lacrosse pocket data can be stored in memory, for example 1591M of the controller 1591. Generation of the first lacrosse pocket data from the digital form of the lacrosse pocket 1599 can be fully automated or manually performed. Optionally, the first lacrosse pocket data can be generated using automation in conjunction with manual input. Generation of the first lacrosse pocket data from the digitized form of the lacrosse pocket 1599 can be conducted completely or partially by a translation processor. The translation processor can form part of the controller 1591, or can be separate therefrom. The translation processor can be configured to perform instructions according to a translation module that is stored in memory or a computer readable medium and that can be accessed by a technician to generate the first lacrosse pocket data based on the digital form of the lacrosse pocket 1599.

The translation processor can process the digitized form of the lacrosse pocket 1599 or the digitized lacrosse pocket to identify one or more of the features described herein in connection with the lacrosse pocket data. For instance, the translation processor can use scanned information relating to the lacrosse pocket 1599 to identify the position, dimension, curvature and/or depth of the middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like. To facilitate identification of these features, the translation processor may orient its frame of reference or determine a frame of reference based on identification one or more generally known points, locations, or qualities, or a combination thereof, of the lacrosse pocket 1599. For instance, the distance between the uppermost and lowermost edges of the lacrosse pocket 1599 likely corresponds to the longest distance between any two features, and generally defines the longitudinal axis LA of the lacrosse pocket 1599.

The leftmost and rightmost edges of the lacrosse pocket 1599 can be identified by projecting features of the digitized lacrosse pocket onto one or more test planes that contain the longitudinal axis LA. (In practice, there are an infinite number of planes that contain the longitudinal axis LA, but a subset of available test planes can be analyzed by the translation processor, such as using 360 test planes that are each about 1 degree relative to each other about the longitudinal axis LA.) The translation processor may identify a single plane within these one or more test planes that includes two points whose distance from each other, in a direction perpendicular to the longitudinal axis LA, is the largest among all points (in a direction perpendicular to the longitudinal axis LA) for all of the one or more test planes. These two points likely correspond to the leftmost and rightmost edges of the digitized lacrosse pocket 1599 as projected onto the identified plane. The identified plane can be considered the face plane and can be used as a reference plane for determining one or more of the features of the lacrosse pocket data described herein. The face plane in one embodiment may be determined using an iterative method or process of inspecting several test planes until the face plane is identified.

The translation processor can also orient the face plane to identify the front and rear faces thereof with respect to the digitized lacrosse head. A point farthest from the face plane along a direction perpendicular or normal to the face plane likely corresponds to the apex of the digitized lacrosse pocket. Because the apex is generally considered the rearmost feature of a lacrosse pocket relative to the face plane, identification of the apex relative to the face plane can aid in differentiating between the front and rear faces of the face plane. Further, identification of the apex can facilitate identification of a point of origin for the reference frame. The point of original can be identified as the intersection between (a) the longitudinal axis LA and (b) a line normal to the face plane and containing the apex. The translation processor can use the identified face plane and the point of origin as a frame of reference for determining one of more of the features of the lacrosse pocket data in a consistent manner. For example, the depth of the apex relative to the face plane has already been determined, but the translation processor can also determine, based on the frame of reference, the position of the uppermost and lowermost portions of the digitized lacrosse pocket relative to the point of origin. As another example, the side to side lateral width of the pocket can be determined based on point of origin, the identified frame of reference, or the location of the apex, or a combination thereof. In yet another example, the curvature and dimension of one or more features, such as the middle pocket and the shooting ramp, can be determined based on the frame of reference, the position of the apex and the uppermost edge of the digitized lacrosse pocket. The curvature or dimension, or both, of the shooting flanks can be determined based on the curvature and dimension of the middle pocket and the shooting ramp. The determined one or more features of the digitized lacrosse pocket can be stored in memory as the first lacrosse pocket data, or further processed to arrive at the first lacrosse pocket data. The first lacrosse pocket data, as described herein, can be used as a basis for automatically generating a new lacrosse pocket. Optionally, in addition to or alternative to determining the one or more features, the digitized lacrosse pocket can be stored in memory and used to directly generate a set of instructions for automatically generating a new lacrosse pocket that is substantially similar to the lacrosse pocket 1599.

Optionally, the translation processor described herein can be configured to identify a type or class of a lacrosse head associated with the lacrosse pocket 1599 based on the information provided by the imaging device 1597. For instance, the translation processor can identify a type of lacrosse head based on the lateral width, the longitudinal length, the apex, the ball channel, and the like, or a combination thereof, of the digitized lacrosse pocket. The translation processor can facilitate generation the lacrosse pocket 1599 to be constructed with a lacrosse head substantially identical to the identified head. It is noted there is a possibility that a particular type of lacrosse head that is scanned by the imaging device 1597 may no longer be in production, or may be different from those available from a particular manufacturer. In such circumstances, the translation processor can identify a nearest fit lacrosse head that is available or a plurality of similar but available lacrosse heads based on the information provided by the imaging device 1597. The translation processor can adjust one or more parameters of the lacrosse pocket data to generate a lacrosse pocket 1510 that is similar to the lacrosse pocket 1599 but tailored to fit a currently available or currently selected lacrosse head. For instance, the translation processor can adjust the curvature and dimension of the shooting ramp and the curvature and dimension of the shooting flanks based on the currently selected head having a wider or narrower overall lateral width. The point-of-sale interface can be configured to identify a scanned lacrosse head type based on the scanned information, and enable selection of a nearest fit lacrosse head or one of multiple identified and similar lacrosse heads for purchase in conjunction with the lacrosse pocket 1510.

The method can include a step of selecting particular lacrosse pocket data from the memory to implement the mechanical manipulation. This particular lacrosse pocket data can be incorporated into a lacrosse pocket data library. The lacrosse pocket data library can include various lacrosse pocket data for constructing complete, individual lacrosse pockets. These individual lacrosse pockets can be constructed according to user driven or user selected pocket profile preferences. For example, there can be multiple sets of lacrosse pocket data that pertains to first, second, third, fourth, etc. different pockets stored in the library, which can be associated with the memory. A user can use the controller to select one of the different sets of lacrosse pocket data from the library to manufacture selected ones of the different pockets. If desired, the lacrosse pocket data optionally can be alterable or selectable so that a user can generate a modified version of a particular lacrosse pocket based on manipulation of that pocket's lacrosse pocket data. For example, this can entail selecting lacrosse pocket data pertaining to a first lacrosse pocket and generating a modified version of the lacrosse pocket data pertaining to the first lacrosse pocket. The modified version of the lacrosse pocket data can include a particular knitting pattern, weaving pattern or other data that has been altered or modified to provide a slightly different configuration of the first lacrosse pocket. For example, when implemented to construct the pocket, the data can be utilized to generate a modified version of the first lacrosse pocket that has: an apex in a different location than the first lacrosse pocket; an outer pocket perimeter that is different from the perimeter of the first lacrosse pocket; edges of a pocket that are different from the first lacrosse pocket; a shooting ramp or ball channel is different from the first lacrosse pocket; runners, shooting strings and/or shooting flanks that are different from the first lacrosse pocket and the like. The differences between the modified version of the pocket in the actual first lacrosse pocket can be subtle or significant, depending on the level of modification to the first lacrosse pocket.

Alternatively, the lacrosse pocket data can be separated within the library into subsets of data that pertain only to lacrosse pocket components, for example, individual parts of the lacrosse pocket such as the middle pocket; an apex of the pocket; an outer pocket perimeter; various edges of the pocket; the position, a shooting ramp, also referred to as a ball channel; runners and/or shooting strings of the pocket; the shooting flanks and the like. Based on this library, a user, the machine or controller can mix and match different lacrosse pocket data pertaining to different parts of a lacrosse pocket thereby forming an entirely new or unique lacrosse pocket having preselected parts, the construction of which is driven by the different lacrosse pocket data pertaining to those different parts and combined to form the complete lacrosse pocket. Generally, because any number of lacrosse pocket data pertaining to individual components of a lacrosse pocket can be entered to the library, there is almost an infinite number of combinations of that lacrosse pocket data to produce an almost infinite number of different lacrosse pockets.

Figure 60:
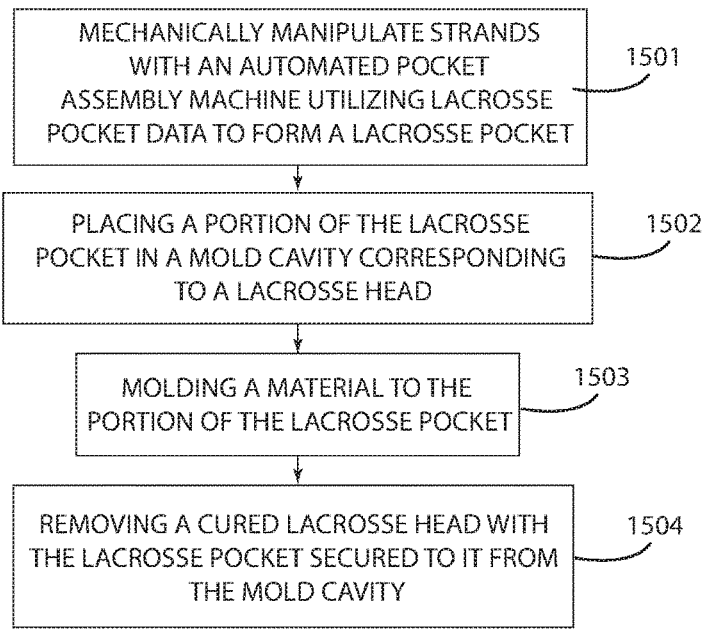
FIG. 60 is a flow diagram showing an exemplary method of manufacturing the lacrosse pocket of the fifteenth alternative embodiment and joining it with a lacrosse head.

Referring to FIG. 60, with further regard to step 1501, the controller 1591 and/or the automated pocket assembly machine 1590 are configured to utilize the lacrosse pocket data to guide mechanical manipulation of various strands 1593A, 1593B of material with the automated pocket assembly machine. This can be accomplished via pulling one or more different strands, from the spools and toward the needles and/or armatures 1595A, 1595B of the machine 1590. The needles and armatures are guided in movement by the machine 1590, which again is directed by the controller utilizing the lacrosse pocket data. Optionally, if the mechanical manipulation includes knitting, various strands can be interlooped with one another in courses and wales within the knitted pocket, where weft knitting is optionally implemented via the machine.

Optionally, the strands can be constructed from one or more different materials such as described in the embodiments above. For example, some strands can be constructed from a first material which can be less elastic and/or more abrasion resistant and durable than second strands constructed from another material. The first material can be at least one of an aromatic polyamide and an ultra-high molecular weight polyethylene. One suitable aromatic polyamide is poly-para-phenylene terephithalamide. Other relatively inelastic, durable, high-strength materials are also contemplated. The second material can be a thermoplastic polymer, for example high density or high strength polyethylene, polypropylene and/or a polyethylene multifiber yarn. Others synthetic or natural materials also can be included as the second material.

As a result of the mechanical manipulation in step 1501 as described above, the lacrosse pocket 1510 including the strands is formed. This lacrosse pocket can include features as described above, including but not limited to the predefined three-dimensional shape; the position, dimension, curvature and/or depth of a middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the side to side curvature of the middle pocket and the like. The pocket 1510 also includes the various knitted elements that form each of the above features, for example the join elements, vertical elements, edges, perimeter flange, etc., each of which can be constructed as described above and in connection with the thirteenth alternative embodiment.

As with the thirteenth embodiment, the perimeter flange 1510PF optionally can be at least 2.0 mm, at least 2.5 mm wide, at least 4.0 mm, at least 5.0 mm or wider. The perimeter flange can be the portion of the lacrosse pocket 1510 that is over molded by at least a portion of the lacrosse head in joining the lacrosse pocket 1510 to the lacrosse head 120. Where the perimeter flange is at least the width mentioned above, it has been discovered that there is enough structure of the pocket to satisfactorily embed and securely join the pocket body with the portion of the head into which the perimeter flange is molded. With widths of the perimeter flange that are significantly less than those mentioned above, it is possible that, without extra reinforcement or the use of special materials, the perimeter flange and pocket can rip or tear out from the overmolded polymeric material from which the head is constructed. This can be simply due to not enough pocket being satisfactorily anchored within the overmolded head material.

If desired, the mechanical manipulation step 1501 can optionally output multiple individual but substantially identical lacrosse pockets formed along a common strip of pockets. These lacrosse pockets can be joined end for end with one another along the strip, in a manner similar to that described in the thirteenth alternative embodiment above. The individual pockets can be separated from one another as mentioned in that embodiment, for example by shearing, hot melt cutting, die cutting and/or laser cutting, or otherwise removing a connecting strand or interface portion to separate pockets.

With the lacrosse pocket produced in step 1501, that pocket can then be readied for overmolded in step 1502. In general, step 1502 can include placing the lacrosse pocket 1510 over the mold portion 1580C. Where the mold portion includes locating pins 1580P, the perimeter flange 1510PF can be joined with those locating pins, optionally placing the pins through locating pin openings in the perimeter flange such as those described above in connection with the thirteenth alternative embodiment of the pocket. Alternatively, where other structures are used to hold the pocket in place, though structures can be actuated. In placing the perimeter flange, the upper edge 1510U can first be placed on the locating pins 1380P in the region of the scoop. The side edges 1516 can then be placed over the locating pins 1380P in that region of the mold. The lower edge 1510L can be joined with the locating pins in that region after that. Sometimes, the placement of the perimeter flange on the pins can create a tension T across the pocket as described in connection with FIG. 45C. Further, the perimeter flange 1510PF can be precisely placed within the respective mold cavities to provide desired distance of the perimeter flange projecting into the mold and placement relative to the sidewalls of the cavity in which the perimeter flange is placed, as described in connection with the thirteenth alternative embodiment referring to FIG. 45C. The mold portions 1580A and 1580B can be closed to complete the head cavity 1580FC including the respective scoop, side wall and base mold cavities. The perimeter flange remains disposed in portions of those cavities.

After the lacrosse pocket 1510 is placed in the mold 1580, the molding in step 1503 can commence. In general, the output of this step is in a lacrosse pocket embedded within portions of a cured lacrosse head, unable to be removed from the lacrosse head without destroying at least one of the lacrosse head and the lacrosse pocket. The molding can begin by introducing a molten material or liquid into the mold cavity 1580C to substantially fill the mold cavity and its respective scoop, base and sidewall mold cavities, with the perimeter flange remaining in these cavities. As the material is introduced, it extends and/or flows thorough the cavity, and also between adjacent ones of a plurality of strands within the perimeter flange in the cavity, also referred to as an outer perimeter, optionally simultaneously disposed in the different component cavities. The material can flow from a first side of the perimeter flange to a second side of the perimeter flange 1510PF.

As in the thirteenth embodiment, when the material contacts the respective edges and/or generally the perimeter flange disposed in the cavity 1580FC, the material, optionally under pressure, encapsulates the individual strands, coating their surfaces on front and back. The material also can extend from a front or first surface of the perimeter flange that faces generally toward the pocket longitudinal axis LA, to a second surface or outside of the perimeter flange that faces generally away from the pocket longitudinal axis. In many cases, the material also permeates through small spaces between the individual strands, connecting the injected material from one side of the flange or edge to the other. This, in turn, embeds the material within the edges and/or perimeter flange. Where the strands are knitted within the perimeter flange, those strands are typically interlooped with one another, or a single strand is interlooped with itself, in multiple columns and rows. In these cases, the strand or strands form one or more loops in the perimeter flange. The introduced material thus permeates through and/or flows through the openings at the interlooped portions of the strand(s), in some cases impregnating the strands and/or spaces between the strands with the material in the perimeter flange. Optionally, the pocket is placed within the mold so that the molten material or liquid material is prevented from entering openings adjacent the perimeter flange. This can be accomplished simply by not positioning those openings within the respective mold cavities. Accordingly, these larger openings, which can contribute to the functionality of the middle pocket or other components of the pocket, are not filled with material.

After the injected material cures to form the lacrosse head portions, it embeds within and extends through the openings of the portion of the edge that was within the mold. Again, these openings can be formed between adjacent interweave strands, or between loops formed from one or more continuous strands in a knit pattern. The material also can encapsulate one or more of the plurality of individual strands, surrounding or circumferentiating each substantially entirely so that all outer surfaces of the strand are within the molten material. With the above embedding, the perimeter flange is sufficiently trapped and molded within the respective portion of the head to anchor it there under the rigors of use during a lacrosse activity.

In some cases, where multiple lacrosse pockets are formed in the mechanical manipulation step, those additional lacrosse pockets can be sequentially molded one by one in the mold, or in a mass mold capable of molding of multiple pockets simultaneously. The process for over molding each of these additional lacrosse pockets similar to that above entails generally placing portions of the individual lacrosse pockets in the mold cavity introducing the molten material and/or liquid into the mold cavity to encapsulate the portions of the traditional lacrosse pockets. The resulting lacrosse pockets mounted in the heads are identical to one another.

After the molten material and/or liquid is satisfactorily introduced into the mold cavity to form the components of the head and encapsulate the perimeter flange, that material is allowed to cure to form a cured lacrosse head 120. The cured lacrosse head includes the various respective components, such as a scoop, side walls, and a base, as well as an optional throat. The cured lacrosse head can be removed from the mold in step 1504, and in particular the mold cavity again with the outer perimeter or perimeter flange of a lacrosse pocket remaining embedded within the lacrosse head. Optionally, during this step, any locator pins can be retracted from the formed head and respective openings in the perimeter flange to facilitate removal of the head from the mold. Additional ejectors can further ejector otherwise push the completed lacrosse head out from the mold, as explained in the thirteenth embodiment and applied to this embodiment.

Further optionally, during the molding step 1503, the lowermost portion of a lacrosse head can be molded. When the cured lacrosse head is removed in step 1504 from the mold cavity, however, no structure extends below the portion of the lacrosse pocket that is molded into the cured lacrosse head. As an example, there is no secondary frame or other structure that is joined with the lowermost portion of the lacrosse head to sandwich or secure any portion of the pocket to the lacrosse head. The anchoring and attachment of the pocket is completed with the encapsulation of the perimeter flange in the respective lacrosse head portions. Further, the perimeter flange optionally can extend from the lowermost portion of the structure forming the complete lacrosse head.

Depending on the desired number of completed lacrosse heads including integrally formed lacrosse pockets, the above steps of mechanically manipulating, placing, molding and removing can be repeated to produce multiple identical lacrosse heads with corresponding identical lacrosse pockets all attached thereto. In this manner multiple identical lacrosse heads can be produced on a mass scale and sold to consumers. Each such produced lacrosse head and pocket is virtually identical and dimension, contour and features to provide unparalleled consistency.

Optionally, as mentioned above, the method can include different ways to collect, compile and store the lacrosse pocket data in memory, one of which is to start with an existing lacrosse pocket that is manually strung by a human to a lacrosse head. This existing lacrosse pocket can come from a variety of sources. For example, the lacrosse pocket can be a pocket that is associated with a head possessed by a professional lacrosse player. In some circles, consumers desire to have a particular pocket and/or associated head that mimics those of a professional lacrosse player. To address this desire, a manufacturer or other person or entity can identify a professional lacrosse player who is generally admired by amateur lacrosse players. The professional player can be popular due to their good performance, capabilities and/or personality. The lacrosse pocket of the professional lacrosse player can be imaged and lacrosse pocket data relating to that image can be generated. This lacrosse pocket data can be used to manufacture or form one or more samples of second lacrosse pockets that are identical to that of the professional lacrosse player. In some cases, the second lacrosse pockets can be joined with heads using the overmolding methods herein, and sold to consumers, such as amateur players who admire the professional lacrosse player, desiring to have lacrosse pockets and heads similar to that of the professional lacrosse player. If desired, a significant supply of lacrosse pockets and associated over molded heads can be manufactured in response to a particular consumer demand.

Where the pockets are manufactured using the precise lacrosse pocket data, the manufactured pocket can include a three dimensional concave contour corresponding to the three dimensional concave contour of the pocket of the professional lacrosse player, immediately upon formation of the pocket. The manufactured pocket also or alternatively can include a second apex located in a location corresponding to the apex and location of the professional lacrosse player's pocket immediately upon formation. The manufactured pocket also or alternatively can include a ball channel curvature corresponding to the ball channel curvature of the professional lacrosse player's pocket immediately upon formation. In general, the manufactured pocket can mimic any of the characteristics of features of the professional lacrosse player's pocket.

If desired, the professional lacrosse player can request an additional supply of one or more lacrosse heads from a manufacturer having lacrosse pockets that precisely match her existing pocket, which can be a hand strung pocket. With the current embodiments, that precise pocket can be replicated consistently to form multiple lacrosse pockets, and optionally lacrosse heads joined with or overmolded to the pockets, for supply to the professional lacrosse player.

Optionally, the lacrosse pocket data associated with a professional lacrosse player's pocket, an amateur player's pocket, or any lacrosse player's pocket, can be stored in a file in a library, which itself can be stored in memory. Indeed, lacrosse pocket data corresponding to a plurality of lacrosse player's pockets can be stored in the library. This library and the respective lacrosse pocket data can be selectively accessed by a manufacturer to generate lacrosse pockets, identical to those corresponding to the lacrosse pocket data, for consumers. The consumers can place orders with a manufacturer to produce a desired pocket using preselected lacrosse pocket data, optionally offered via access to the library of different lacrosse pocket data. This library, or certain pocket characteristics associated with the lacrosse pocket data, optionally can be accessible to consumers by subscription via the Internet or some other medium from a manufacturer, distributor and/or retailer.

In an actual manufacturing setting, a manufacturer can collect or design and store multiple lacrosse pocket data in memory, each of which correspond to a lacrosse pocket of a lacrosse player, and/or a theoretical construction or design of a lacrosse pocket. Upon receiving a request or order from a consumer for the construction of a particular pocket, optionally joined with a corresponding head, the manufacturer can access the requested lacrosse pocket data. That data can be selectively input or otherwise accessed by the controller, which in turn controls the automated pocket assembly machine to produce a pocket including the features of the pocket associated with the lacrosse pocket data. The lacrosse pocket can thus be constructed. After it is constructed it can be overmolded with a lacrosse head according to the embodiments herein to produce a lacrosse head having an integrally formed lacrosse pocket attached thereto. This product can then be shipped directly to the consumer from the manufacturer, or through other acceptable channels of trade.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the broader aspects of the invention as defined in the appended claims, which are to be interpreted in accordance with the principles of patent law including the doctrine of equivalents. To the extent any definitions, interpretation or construction herein conflict with definitions, interpretations or construction of similar items in any item incorporated by reference herein, the definitions, interpretations or construction herein shall govern. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of making a lacrosse head with an integral pocket, the method comprising:
    knitting with a knitting machine a lacrosse pocket including a lacrosse pocket outer perimeter having a first knit pattern, the pocket outer perimeter including a perimeter flange that is at least 2.0 mm in width,
    knitting on the knitting machine a lacrosse middle pocket, the lacrosse middle pocket having a predefined, three dimensional, concave shape, the middle pocket being located within the pocket outer perimeter and having a second knit pattern, the second knit pattern being different from the first knit pattern;
    defining in the lacrosse pocket a bullseye opening that is the largest dimension opening defined by the lacrosse pocket, the bullseye opening adapted to restrain the lacrosse ball in the lacrosse pocket;
    placing the perimeter flange in a lacrosse head mold cavity;
    introducing a molten material into the lacrosse head mold cavity, so that the molten material becomes joined with the perimeter flange;
    allowing the molten material to cure to form a lacrosse head having a scoop, a sidewall and a base, and
    removing the lacrosse head from the lacrosse head mold cavity with the lacrosse pocket projecting downward from the lacrosse head and being integrally molded therein.

2. The method of claim 1 comprising:
    providing a handle mold cavity in fluid communication with the lacrosse head mold cavity;
    introducing the molten material into the handle mold cavity to form a handle integrally joined with the lacrosse head.

3. The method of claim 2 wherein the molten material is injected under pressure simultaneously into the handle mold cavity and the lacrosse head mold cavity.

4. The method of claim 1 wherein before the introducing step, the lacrosse head mold cavity is empty, except for the outer perimeter flange placed therein.

5. The method of claim 1 comprising defining in the middle pocket a plurality of additional openings forward of the bullseye opening, toward an upper edge portion of the lacrosse pocket, along the pocket longitudinal axis, the additional openings becoming progressively smaller in overall area away from the bullseye opening.

6. The method of claim 1 comprising knitting the first knit pattern with a first strand constructed from a first material having a first elasticity, and knitting the second knit pattern with a second strand constructed from a second material having a second elasticity greater than the first elasticity.

7. The method of claim 1 comprising knitting at least one of a join element and a vertical element adjacent the bullseye opening with an Intarsia knitting technique.

8. A method of making a lacrosse head with an integral pocket, the method comprising:
    knitting on a knitting machine a lacrosse pocket including a pocket outer perimeter constructed from a first strand constructed from a first material with a first elasticity, the pocket outer perimeter including a perimeter flange that is at least 2.0 mm in width, the lacrosse pocket including a middle pocket having a predefined, three dimensional, concave shape adapted to snugly hold a lacrosse ball therein, the middle pocket being located within the pocket outer perimeter and constructed from a second strand, the second strand constructed from a second material having a second elasticity greater than the first elasticity;
    defining in the middle pocket a bullseye opening that is shaped and sized to at least partially restrain the lacrosse ball within the middle pocket, the bullseye opening being bounded by a first vertical element on a first lateral side of a pocket longitudinal axis, a second vertical element on a second, opposing lateral side of the pocket longitudinal axis, and at least one join element extending transverse to the longitudinal axis, connecting the first vertical element and the second vertical element;
    removing the lacrosse pocket from the knitting machine;
    placing the perimeter flange in a lacrosse head mold cavity, so that the pocket outer perimeter is disposed in the lacrosse head mold cavity;
    introducing a molten material into the lacrosse head mold cavity, so that the molten material molds over the perimeter flange;
    allowing the molten material to cure to form a lacrosse head having a scoop, a sidewall and a base, and
    removing the lacrosse head from the lacrosse head mold cavity with the lacrosse pocket projecting downward from the lacrosse head and being integrally molded therein.

9. The method of claim 8 comprising:
    forming an opening in the perimeter flange; and
    engaging a width of the perimeter flange with the molten material but preventing the molten material from entering the opening adjacent the perimeter flange.

10. The method of claim 8 comprising knitting with the knitting machine first and second runners into the pocket with a portion of the first strand, but not a portion of the second strand.

11. The method of claim 8 comprising providing a third spool of a continuous third strand constructed from a material different from the first and second strands, and knitting first and second runners into the pocket with portions of the third strand with the knitting machine, wherein the first and second runners are less elastic than the first and second vertical elements and the join element.

12. The method of claim 8 comprising substantially encapsulating the perimeter flange with the injected polymeric material during the injecting step so that a major portion of the perimeter flange is concealed within at least one of the sidewall, scoop and base of the lacrosse head, and so that the injected polymeric material extends a thickness over the perimeter flange.

13. The method of claim 8 comprising encapsulating the perimeter flange with the injected polymeric material during the injecting step so that a minor portion of the perimeter flange is concealed within the at least one of the sidewall, scoop and base of the lacrosse head.

14. The method of claim 8 comprising holding the perimeter flange in the lacrosse head mold cavity with a plurality of locator pins.

15. The method of claim 8 wherein the lacrosse head mold is in communication with an elongated lacrosse shaft cavity, comprising introducing the molten material into the lacrosse shaft cavity simultaneously while the molten material introduces into the lacrosse head mold cavity.

16. The method of claim 15 wherein during the allowing step, the introduced material cures to form the complete lacrosse head and an elongated lacrosse shaft extending away from the completed lacrosse head, the elongated lacrosse shaft and complete lacrosse head being integrally joined with one another as a single piece unit.

17. The method of claim 15 wherein immediately before the introducing step, the lacrosse head mold cavity is substantially empty, except for the perimeter flange.

18. A method of making a lacrosse head with an integral pocket, the method comprising:
knitting on a knitting machine a lacrosse pocket outer perimeter including a perimeter flange having a first knit pattern and a lacrosse middle pocket having a second knit pattern, the lacrosse middle pocket having a predefined, three dimensional, concave shape, the middle pocket being located within the pocket outer perimeter, the second knit pattern being different from the first knit pattern so that the first knit pattern and second knit pattern exhibit different mechanical properties;
defining in the middle pocket a plurality of openings during the knitting, each opening being bounded by at least one vertical element and at least one join element;
removing the lacrosse pocket from the knitting machine;
placing the perimeter flange in a mold cavity;
introducing a liquid material into the mold cavity so that the liquid material flows between a plurality of strands within the first knit pattern;
allowing the liquid material to cure to form at least one of a scoop, a sidewall and a base of a lacrosse head in the mold cavity, and
removing the at least one of the scoop, sidewall and base of the lacrosse head from the mold cavity with the lacrosse pocket being integrally molded therein.

19. The method of claim 18 wherein the mold cavity defines an elongated lacrosse shaft cavity, comprising introducing the liquid material into the lacrosse handle cavity simultaneously while the liquid material introduces into the mold cavity, wherein during the allowing step, the introduced material cures to form the complete lacrosse head and an elongated lacrosse shaft extending away from the completed lacrosse head, the elongated lacrosse shaft and complete lacrosse head being integrally joined with one another as a single piece unit.

20. The method of claim 18 comprising knitting a first runner and a second runner each extending from adjacent an upper edge of the lacrosse pocket toward the middle pocket, the first runner and second runner being of a third knit pattern different from the first and second knit patterns.

* * * * *